United States Patent [19]

Lipe et al.

[11] Patent Number: 5,748,980
[45] Date of Patent: May 5, 1998

[54] SYSTEM FOR CONFIGURING A COMPUTER SYSTEM

[75] Inventors: Ralph A. Lipe, Woodinville; Pierre-Yves Santerre, Bellevue, both of Wash.

[73] Assignee: Microsoft Corporation, Redmond, Wash.

[21] Appl. No.: 356,058

[22] Filed: Dec. 13, 1994

Related U.S. Application Data

[63] Continuation-in-part of Ser. No. 250,698, May 27, 1994.
[51] Int. Cl.$^6$ .................. G06F 15/177; G06F 11/267
[52] U.S. Cl. .................................. 395/828; 395/284
[58] Field of Search .......................... 395/822, 823, 395/828, 829, 882, 281, 282, 284, 700, 500

[56] References Cited

U.S. PATENT DOCUMENTS

| | | | |
|---|---|---|---|
| 4,268,901 | 5/1981 | Subrizi et al. | 340/172.5 |
| 4,562,535 | 12/1985 | Vincent et al. | 395/284 |
| 4,589,063 | 5/1986 | Shah et al. | 395/828 |
| 4,660,141 | 4/1987 | Ceccon et al. | 395/829 |
| 4,727,475 | 2/1988 | Kiremidjian | 340/825.08 |
| 4,730,251 | 3/1988 | Aakre et al. | 395/284 |
| 4,974,151 | 11/1990 | Advani et al. | 395/828 |
| 4,982,325 | 1/1991 | Tignor et al. | 395/200.1 |
| 5,038,294 | 8/1991 | Arakawa et al. | 364/491 |
| 5,136,709 | 8/1992 | Shirakabe et al. | 395/700 |
| 5,157,384 | 10/1992 | Greanias et al. | 340/706 |
| 5,249,270 | 9/1993 | Stewart et al. | 395/200.1 |
| 5,252,951 | 10/1993 | Tannenbaum et al. | 345/156 |
| 5,257,368 | 10/1993 | Benson et al. | 395/600 |
| 5,257,379 | 10/1993 | Zwiakala et al. | 395/827 |
| 5,257,387 | 10/1993 | Richek et al. | 395/800 |
| 5,263,148 | 11/1993 | Jones, Jr. et al. | 395/500 |
| 5,289,372 | 2/1994 | Guthrie et al. | 364/403 |
| 5,297,262 | 3/1994 | Cox et al. | 395/282 |
| 5,335,350 | 8/1994 | Felderman et al. | 455/17 |
| 5,359,713 | 10/1994 | Moran et al. | 395/200.01 |
| 5,371,492 | 12/1994 | Lohrbach et al. | 340/825.03 |
| 5,379,431 | 1/1995 | Lemon et al. | 395/700 |
| 5,386,551 | 1/1995 | Chikira et al. | 395/575 |
| 5,408,618 | 4/1995 | Aho et al. | 395/325 |
| 5,412,798 | 5/1995 | Garney | 395/500 |
| 5,420,987 | 5/1995 | Reid et al. | 395/280 |
| 5,428,748 | 6/1995 | Davidson et al. | 395/830 |
| 5,432,941 | 7/1995 | Crick et al. | 395/700 |
| 5,450,570 | 9/1995 | Richek et al. | 395/500 |
| 5,452,454 | 9/1995 | Basu et al. | 395/700 |
| 5,454,078 | 9/1995 | Heimsoth et al. | 395/200.1 |
| 5,459,867 | 10/1995 | Adams et al. | 395/700 |
| 5,459,869 | 10/1995 | Spilo | 395/700 |
| 5,469,545 | 11/1995 | Vanbuskirk et al. | 395/200.01 |
| 5,471,675 | 11/1995 | Zias | 395/162 |
| 5,485,460 | 1/1996 | Schrier et al. | 370/94.1 |
| 5,491,813 | 2/1996 | Bondy et al. | 395/500 |
| 5,517,636 | 5/1996 | DeHart et al. | 395/284 |
| 5,517,646 | 5/1996 | Piccirillo et al. | 395/700 |
| 5,548,759 | 8/1996 | Lipe et al. | 395/600 |
| 5,553,281 | 9/1996 | Brown et al. | 395/600 |

*Primary Examiner*—Ayaz R. Sheikh
*Attorney, Agent, or Firm*—Jones & Askew

[57] ABSTRACT

A system for configuring a devices of a computer with minimal support by a user. Device information for the devices of the computer is collected to uniquely identify the devices and to describe the device characteristics associated with the operation of those devices with the computer. Computer resources, which support the functions of the devices within the computer, are allocated based upon this device information. This allocation process prevents a potential conflicting use of computer resources by the installed devices. A device driver, which enables communications between a corresponding device and the computer, is also identified and loaded for each of the devices in response to the allocation of computer resources.

19 Claims, 18 Drawing Sheets

5,748,980

SYSTEM FOR CONFIGURING A COMPUTER SYSTEM

RELATED APPLICATION

This application is a continuation-in-part of U.S. patent application Ser. No. 08/250,698, entitled "System for Configuring Devices for a Computer System," filed on May 27, 1994.

TECHNICAL FIELD

The present invention relates to data processing systems and, more particularly described, relates to configuring devices for operation with a computer without user intervention.

BACKGROUND OF THE INVENTION

The process of installing a peripheral device or an add-on type adapter board for use with a personal computer can be a relatively frustrating experience for the typical computer user. Nevertheless, a computer typically will not operate with a newly installed component until the user has completed a proper allocation of resources. Computer resources are allocated during a configuration process to permit the conflict-free use of the limited resources. To configure the computer, the user often must complete a relatively complex series of technical tasks. Thus, the difficulties faced by many users during the configuration process are emphasized by the absence of an automated process for resolving resource conflicts.

For many personal computers, neither the operating system nor the application programs running on the computer can determine which hardware components are connected to the computer. Likewise, the various hardware components connected to the computer often fail to detect the occurrence of a conflict between different hardware devices that attempt to share the same resource. Accordingly, a user typically must resolve a resource conflict by first identifying the problem and thereafter experimenting with hardware and software configurations in an attempt to correct the resource conflict.

When attempting to tackle hardware and software integration issues, the user is exposed to technical concepts that can be somewhat confusing for those without technical training, such as computer architecture issues, including hardware interrupts, direct memory access (DMA) channels, memory addresses, and input/output (I/O) ports. Likewise, many common configuration tasks require the user to be familiar with the finer details of the computer's operating system, including system configuration files, such as AUTOEXEC.BAT, CONFIG.SYS, and .INI files. In view of these technical concepts, some users find the configuration process so intimidating that they refuse to consider upgrading a component of their personal computer or connecting a new peripheral device to add a new capability to their computer.

Unlike today, early personal computers required minimum coordination between the computer hardware and software components. Users were presented with few difficult configuration issues after the initial installation of the computer. A limited number of peripheral devices were commercially available for supplementing the processing functions of the personal computer. In addition, early personal computers were primarily used for dedicated tasks, such as word processing or calculating financial information with a spreadsheet program, at a fixed desktop location.

In contrast, present computers are often portable systems that can be regularly connected to different peripheral devices and external systems. There exists many more computer peripheral devices that require the use of resources during computer operation than the limited quantity of available resources. Furthermore, a user can harness the powerful computing operations of a present personal computer to complete numerous tasks outside the traditional realm of word processing and financial calculations, such as graphics, audio, and video. For example, numerous peripheral devices and add-on systems are now commercially available to enable the user to customize the functions and operating characteristics of a personal computer. Docking-type computers enable a user to operate a mobile computer at either a base station or in remote locations. Thus, the rapid acceptance of portable computing and the multi-faceted uses of the personal computer emphasize the need for supplying a "user friendly" system that configures new hardware or software devices for use with the computer.

The Industry Standard Architecture (ISA) standard is a widely used bus architecture for personal computers. The ISA expansion bus, which is commonly associated with the IBM Personal Computer AT and other compatible computers, provides a 16-bit bus that supports the connection of adapter boards within the computer. The ISA bus structure requires allocation of resources, such as hardware interrupts, DMA channels, memory addresses, and I/O ports, among multiple ISA-compatible adapter boards connected to the ISA expansion bus. However, the ISA standard does not define a hardware or software mechanism for allocating those resources for use by the installed adapter boards. Consequently, configuration of the ISA adapter boards is typically completed by connecting jumper blocks or changing switch settings on the boards to change the decode maps for memory and I/O ports and to direct the DMA channels and interrupt signals to various pins along the expansion bus. Furthermore, system configuration program files of the operating system may need to be updated to reflect any modifications to the resource allocation.

Alternative expansion bus standards, such as the Micro Channel Architecture (MCA) and the Extended Industry Standard Architecture (EISA) standards, have limited hardware and software mechanisms to identify resources requested by a peripheral device and to resolve resource conflicts. However, these mechanisms are not implemented by the computer's operating system and are not compatible with the large installed base of personal computers based on the ISA standard. Furthermore, computers implementing the MCA and EISA standards are generally more expensive than ISA-compatible computers and lack the variety of add-on adapter boards and peripheral devices available for use with ISA-compatible computers.

To address the issue of configuration management, the computer industry is at present offering full-featured computers having preconfigured hardware and preinstalled software, thereby eliminating the need for a user to conduct the installation and configuration tasks for the purchased computer. However, this is a somewhat limited solution because vendors typically market a computer having a standard configuration of hardware and software components. Thus, this approach defeats the flexibility offered by the ISA bus expansion structure because users cannot obtain a computer capable of performing a customized function through this standardized configuration approach.

To overcome the frustration of users with present complicated configuration processes, it would be desirable to provide a system for automatically configuring a peripheral device or adapter board for a computer. A system is needed to enable a user to simply connect a device to the computer, turn on the computer, and have the device properly work with the computer. There is a further need for a system that determines the optimal configuration for its resources and enables application programs to fully utilize the available resources.

In recognition of the problems of prior configuration processes, the present invention provides a system that permits easy installation and configuration of devices which are capable of identifying themselves and declaring their services and resource requirements to the computer. The device identification and resource requirement information enable the system to determine and establish a working configuration for all devices connected to the computer, and to load the appropriate device drivers. In this manner, the present invention supports a variety of computer bus architectures and device classes. Accordingly, the present invention efficiently allocates system resources between the devices of the computer without substantial user intervention.

SUMMARY OF THE INVENTION

The problems associated with the manual installation and configuration of adapter boards and peripheral devices for computers are solved by the principles of the present invention. The present invention provides a system for configuring the hardware and software components of a computer by optimally allocating system resources for use by computer devices.

The present invention enables a user of a computer to install a new device by connecting the device to the computer, powering the computer, and using the computer to take advantage of the function supplied by the new device. Likewise, the present invention permits a user to insert a mobile computer into a base station while both the mobile computer and the base station are powered and to reconfigure the mobile computer for operation with the devices connected to the base station. Thus, the present invention addresses the needs of computer users by supplying a computer-implemented process for configuring devices for a computer and for accommodating seamless dynamic configuration changes of the computer.

A system constructed in accordance with the present invention configures devices of a computer by identifying the devices, determining the desired usage of the resources of the computer, detecting and resolving potential conflicting uses of the resources, and allocating resources for use by the devices. An operating system runs on the computer and supports these configuration tasks.

The computer includes various resources, including interrupts, direct memory access (DMA) channels, memory addresses, and input/output (I/O) ports, at least one system bus, and devices. System busses are components that supply physical connections to devices. Each of the devices is connected to one of the system busses of the computer.

The system busses can be compatible with a variety of bus architectures, including the Industry Standard Architecture (ISA), Micro Channel Architecture (MCA) and Extended Industry Standard Architecture (EISA) bus standards, as well as Personal Computer Memory Card International Association (PCMCIA), Small Computer Systems Interface (SCSI), Personal Computer Interface (PCI), Enhanced Capabilities Parallel (ECP), Vesa Local Bus (VL), Integrated Drive Electronics (IDE), and other bus standards. Typical devices supply the functions of system-level components, such as fixed and floppy disk controllers, display, keyboard, and mouse controllers, and serial and parallel controllers, and implement the functions offered by numerous add-on type adapter boards and peripheral devices.

Briefly described, the method for configuring the devices of the computer is started by collecting device information for each of the devices of the computer. This device information acquisition process permits the unique identification of the devices and the description of device characteristics associated with the operation of devices with the computer. A device driver, which enables communications between a corresponding device and the computer, is thereafter identified for each of the devices in response to the device information. The resources, which support the functions of the devices within the computer, are allocated based upon the device information. This allocation process prevents any potential conflicting use of the resources by the devices. In response to resource allocation, the devices are configured and device drivers for the devices are loaded. The devices are thereafter activated for operation with the computer.

More particularly described, the present invention configures devices of a computer based upon the collection of information about the devices and their connections to the system busses of the computer. To collect the device information, a particular device is detected on the system bus of interest and thereafter assigned a device identification code that identifies the particular device as being connected to the selected system bus. At least a portion of the device identification code, specifically an identification code, uniquely identifies the detected device. Logical configuration data, which supplies configuration requirements for operating the particular device with the computer, is also obtained for the detected device. This collection process is repeated until device information is eventually collected for each of the devices for all system busses of the computer.

The device information is stored within computer memory, such as volatile memory, to support the present configuration operation. At least a portion of the system memory is allocated for the storage of device information within a tree-like structure of device nodes. Each device connected to the computer is represented by a device node that stores associated device information. Furthermore, if an identified device represents a newly installed device for the computer, then this device information also can be stored in nonvolatile computer memory, such as a fixed disk, to supply an archival source of such information for future configuration tasks. A computer database having a hierarchical data arrangement is typically used to store this archival device information.

The collection of device information, which is also described as enumeration, is initiated in response to dynamic events that cause an asynchronous change in the operating state of the computer. These events typically affect the use of the resources by the devices of the computer and include: powering the computer; connecting another device to a system bus; removing a device from a system bus; and inserting the computer into or removing the computer from an expansion unit or a docking station.

The collection of device information supplies data that supports the identification of device drivers for the identified devices. A device driver can be obtained from one of several alternative sources of the computer, including selected files of the operating system installed on the computer, the device itself, a computer database maintained by the computer, or from the user via a disk containing the device driver. In general, the device driver for a device is often obtained by accessing a selected program file stored on either a fixed disk or another type of mass memory storage device of the computer.

If the devices of the computer include at least one network adapter, then the system for configuring devices of the computer further includes (1) the identification of "virtual devices" or layers connected to "virtual busses" or interfaces and (2) the loading of the identified layers for each of the interfaces. The layers of a network system typically include protocols, redirectors, and servers, and the interfaces include an interface between the network adapter and the protocols and multiple interfaces between the protocols and associated redirectors and/or servers.

In response to loading the driver for the network adapter, each layer for a particular interface is identified and the layers are subsequently loaded. The layer identification and loading steps are repeated for each layer associated with the remaining interfaces for the network adapter.

To identify the layers for a particular interface, a database of the computer is searched to locate a first entry having an interface identification code that is associated with the particular interface. The first entry also can include one or more layer identification codes that uniquely define the identity of the layers for this interface To load an identified layer, a second entry having the layer identification code for this layer is located within the computer database. The second entry also can include a driver identification code that uniquely defines a driver for this layer. By using the driver identification code as a key to search the database, a third entry is then located within the database. The third entry can contain configuration parameters for the driver for the identified layer. In response to this driver-related information, the driver is loaded within system memory of the computer. The configuration parameters are supplied to the driver to complete the loading operation.

The computer database can contain device information associated with a particular device, including information for that particular device, which is also described as a primary device, and information for devices that are "compatible" with the primary device. For example, a first manufacturer's device may be compatible with a second manufacturer's device because both devices perform the same function and conform to an industry standard for operations. If the devices are compatible, a device driver for the first device often can be used to enable the operations of the second device and, likewise, a device driver for the second device can be used with the first device. Thus, a compatible device driver, if available, may be used to enable communications of the particular device with the computer The stored device information for a particular device typically can be accessed by searching in the computer database for a location or a record that contains the identification code for the desired device. Thus, the identification code can be used as an entry key to search the records of the computer database. If the device information in a selected record describes the primary device, then the device driver intended for primary use with that device is maintained by the computer and is available to support the device operations. Likewise, a compatible device driver is maintained by the computer if compatible device information is stored within the selected record and associated with the particular device.

By convention, the primary device driver is typically selected to support the computer operations of the primary device over any of the device drivers for compatible devices. However, if the device driver for the primary device is not available, then a device driver for a compatible device is selected. In this event, if the compatible device information lists more than one device that is compatible with the particular device, then the compatible device having the highest priority or ranking is selected and used to support the operations of the particular device.

If neither the primary device driver nor a compatible device driver is available on the computer, then the user can be requested to supply a substitute device driver that supports the operation of the device with the computer. This request is typically supplied as a textual statement displayed on a display or monitor for the computer or as an audio prompt generated by the computer. In response to the request, the user can insert within the proper computer drive a flexible disk or other appropriate electronic media containing the device driver, thereby permitting the computer to access the device driver. The device driver then can be stored within an appropriate mass memory storage device and used to enable the communications between the particular device and the computer.

Resources, which typically include a finite set of resource elements, are allocated by first analyzing the device information to detect whether the devices require a potential conflicting use of resource elements for operation of the devices with the computer. The desired resource element is assigned for use by a device if this resource assignment does not conflict with the use of that particular resource by another device. A resource element is available for use by a device if this element is neither reserved nor assigned for use by another device. Some resource elements are typically reserved for use by selected devices to insure the compatibility of the present invention with existing devices. Thus, if at least two of the devices require use of an identical resource element, then this potential resource conflict is arbitrated and resolved in an iterative manner based upon the device information and the finite resources of the computer. The resources are then assigned for use by the devices based upon this conflict-free solution.

In response to allocating the assigned resources to the devices, the devices are configured for operation with the computer. Each device driver is loaded for use by the corresponding devices and the devices are activated for operation with the computer.

Focusing upon another aspect of the present invention, a system is provided for supporting the bus-specific operations of devices connected to a system bus of a computer. This system, which is alternatively referred to as an enumerator or a bus driver, is assigned to operate with a specific system bus and is programmed to recognize the operating parameters of the assigned bus. Each system bus typically requires a unique configuration process that is based upon the architecture of the bus. The enumerator, which can be part of an operating system, directly supports the configuration of devices on its assigned bus by accessing device information for those devices and storing this data with a central memory. This enables an operating system for the computer to be independent of the characteristics of a computer bus architecture because bus-specific information is handled by an abstraction layer, in this case, the enumerator.

The enumerator can perform three primary operations, specifically (1) detecting dynamic events causing an asynchronous change in the operating state of the computer; (2) enumerating each of the devices connected to the assigned system bus in response to the detection of a dynamic event; and (3) supplying assigned resources to each of the devices in response to an allocation of resources. To implement these operations, the enumerator can include one or more elements that are responsible for those functions, namely an enumerate element, a configure element, and an event detect element. These functions are typically defined by the characteristics of its assigned system bus.

The enumerate element includes a detection module for detecting a particular device on the system bus and a collection module for retrieving device information from the particular device. The collection module obtains device information from the detected device and stores this data within device nodes of the computer memory to maintain an up-to-date inventory of the devices on the assigned system bus. Thus, the detection and collection modules operate in tandem to enumerate these devices. The computer memory can be a hierarchical database structure formed by a tree-like structure containing the device nodes, which represent each of the detected devices.

The configure element can include a receive module for receiving the allocation of assigned resource elements, an assigned resource storage module for storing the assigned resources within the device nodes of the computer memory, and a transmit module for supplying instructions about the assigned resources to the appropriate devices. In response to the assigned resources, the configure element accesses the device nodes in the computer memory and stores the appropriate resource element assignments.

The event detect element typically can detect the installation of a new device on the assigned system bus or the removal of an existing device. For example, device installation or removal can be detected by intercepting a particular interrupt signal or by periodically polling all of the available sockets of the bus to determine the installed devices. Likewise, the event detect element can detect the insertion of a computer into or the removal of a computer from a docking station. The event detect element is further responsive to booting the computer or the power state for the computer. In response to one of these events, the event detect element can supply the event detection information to the enumerate element, thereby initiating the enumeration process. The event detect element also can be responsive to certain query-type instruction signals containing commands for actions by the enumerator. These commands typically include: delete device information in a designated device node because the associated device has been removed from the computer, stop a present operation, and start a new operation.

Turning now to the enumeration process, a method is provided for identifying devices connected to a system bus of a computer having resources. First, a particular device is detected on the system bus. For example, for the widely used ISA bus, devices are detected by instructing each of the devices to enter an inactive state, thereby disabling the function of the device. The detected device on the ISA bus is then isolated from the remaining devices to enable interference-free communication with the detected device. In contrast, for the PCMCIA bus, a particular device is detected by selecting the socket supplying the connection for that device. Thus, it can be seen that device detection is a bus-dependent operation and may vary among different bus architectures.

A device identification code is thereafter assigned to the detected device. The device identification code, which includes an identification code and a system bus code appended to the identification code, typically identifies this device as a certain device type that is connected to the system bus. The identification code typically contains a string of characters, such as American Standard Code for Information Interchange (ASCII) characters, which uniquely define the particular device. The identification code is useful for defining both the manufacturer of the associated component and the type of device, and for distinguishing between identical types of devices connected to the same system bus. The system bus code uniquely identifies the system bus associated with the connected device.

Logical configuration data is also obtained for the particular device to acquire the configuration requirements for operating the particular device with the computer. The resources of a computer generally offer a range of options or elements for using the resources. The logical configuration data includes resource requirement information that defines certain resources of the computer which are necessary for proper operation of the particular device with the computer. For example, resource requirement information for a modem may define a resource requirement for an interrupt within the range of interrupts 7-12. The logical configuration data also includes resource dependency information, which defines a particular combination of resource elements that are necessary for device operation. For a modem, typical resource dependency information may define the combination of interrupt IRQ4 with I/O3F8 (COM PORT 2).

The above-described steps of the identification process are repeated for each of the remaining devices connected to the system bus to permit the collection of device information from all connected devices. In the event that a device itself is implemented as a system bus, it may be necessary to identify device drivers, allocate resources, and load the identified device drivers prior to identifying any devices connected to this new system bus. For example, these tasks are typically completed prior to identifying a device connected to the PCMCIA bus which, in turn, is connected to an integrated expansion bus of the computer's system board, such as an ISA bus.

To assign the device identification code, the identification code can be accessed by reading the identification code from a memory storage device, such as read only memory (ROM) or a register, which is typically mounted on the interface board for the device. The system bus code is subsequently added to the identification code to complete the formation of the device identification code. The device identification code is thereafter typically stored within computer memory to support the configuration process.

Similarly, the logical configuration data can be retrieved from the particular device by reading the logical configuration data from the memory storage device for that device. The logical configuration data is thereafter stored within the computer memory and is associated with the device identification code for the particular device. In the event that the logical configuration data is not available from the particular device, at least a portion of the logical configuration data often can be retrieved from a selected file of the computer operating system, such as a configuration file, e.g., an .INF file.

The resource allocation process is supported by arbitrators that operate to determine the assignment of resource elements to the devices of the computer. An arbitrator is assigned to each resource of the computer and is responsive to the resource requirement information and resource dependency information related to its resource to produce a conflict-free allocation of the resource elements. The arbitrator for a selected resource is programmed to recognize the characteristics of its resource. For example, the arbitrator for a interrupt resource of a conventional personal computer recognizes that this resource includes 16 interrupt elements.

An arbitrator includes an analysis element that is responsive to a possible configuration which defines the set of resource elements that are appropriate for operating the devices with the computer. In response, the analysis element determines whether a particular resource element for a selected device is available for use by the selected device. The arbitrator also includes an assignment element for assigning the particular resource element for use by the selected device in response to determining that the particular resource element is available for use by the selected device.

Focusing upon yet another aspect of the present invention, a method is provided for obtaining a device driver to enable a device to communicate with a computer. The computer includes a database containing a set of records. Each record contains both a device identification field for storing the identification code of a primary device and a compatible device identification field for storing identification codes for compatible devices and at least one type of compatible device-related data.

Reviewing the data structure for a database record, the device identification field permits the recording of an identification code that identifies a primary device for operation with the computer. Likewise, the compatible device identification field permits the recording of both an identification code that identifies the primary device and identification codes that identify compatible devices. If the compatible device identification field contains an entry for the primary device, then a device driver specifically intended to support the computer operations of that primary device is available on the computer. Likewise, compatible device drivers are available to support computer operations for both the primary device and other associated compatible devices if the compatible device identification field contains identification codes for compatible devices.

As an option, the compatible device identification field also permits the recording of priority data to permit a further distinction between the devices represented by the compatible device identification codes. The priority data supports the selection for a device driver of one of the compatible devices over another compatible device driver based upon the assigned rankings of the compatible devices. For example, the priority data can include a preferred use ranking or priority assigned by the vendors for the compatible devices. The compatible device having the highest priority ranking is typically selected for installation.

To obtain the device driver for a certain primary device, the computer database is searched to locate a selected record which is associated with that device. The identification code for this device is used as the entry key for the database because it identifies the desired device. Upon locating the selected record, the compatible device identification field is reviewed to determine if this field contains the identification code for the certain primary device.

If the identification code for the certain primary device is located within the compatible device identification field of the selected record, then the corresponding primary device driver is selected for use with the computer. Upon identifying the proper device driver, the task of retrieving the desired device driver from its storage location is controlled by the operating system in a conventional manner. The identified primary device driver often can be retrieved from the mass memory storage device of the computer.

However, in the event that the compatible device identification field does not contain the identification code for this primary device, then this field is examined to determine if it contains one or more of the identification codes for compatible devices. If so, then the compatible device having the highest priority is selected and the corresponding device driver is retrieved from the computer.

In the event that the compatible device identification field does not contain an identification code for a compatible device, then the computer supplies to the user an indication of the absence of the necessary driver for associated device. This indication can be a text-based or a combined text/ graphics message, which is displayed by the computer monitor or supplied to a printer, or an audio prompt or statement.

In furtherance of these principles, it is an object of the present invention to provide a system for configuring devices of a computer.

It is a further object of the present invention to provide a system for configuring a new device connected to a computer.

It is a further object of the present invention to provide a system for identifying the devices connected to a computer.

It is a further object of the present invention to provide a system that identifies the resource usage and system resource options for a device by obtaining such information from the device.

It is a further object of the present invention to provide a system that optimally allocates resources for use by the devices of the computer.

It is a further object of the present invention to provide a system that identifies the devices of the computer, determines a working configuration for the devices, and loads the appropriate device drivers.

It is a further object of the present invention to provide a system that accommodates seamless dynamic configuration of resources by enabling the configuration of devices in response to docking a mobile computer to a base station, removing the mobile computer from the base station, adding a new device to a computer, or removing a device from the computer.

It is a further object of the present invention to supply remote and local access to information directed to the present configuration of the computer and the types of devices connected to the computer It is a further object of the present invention to provide a system for configuring a network system.

It is a further object of the present invention to provide a system for configuring a network adapter of a computer.

That the present invention accomplishes these objects and offers the above-described advantages will be apparent to those skilled in the art from the following description, the appended claims, and the accompanying drawings.

DETAILED DESCRIPTION

Figure 1:
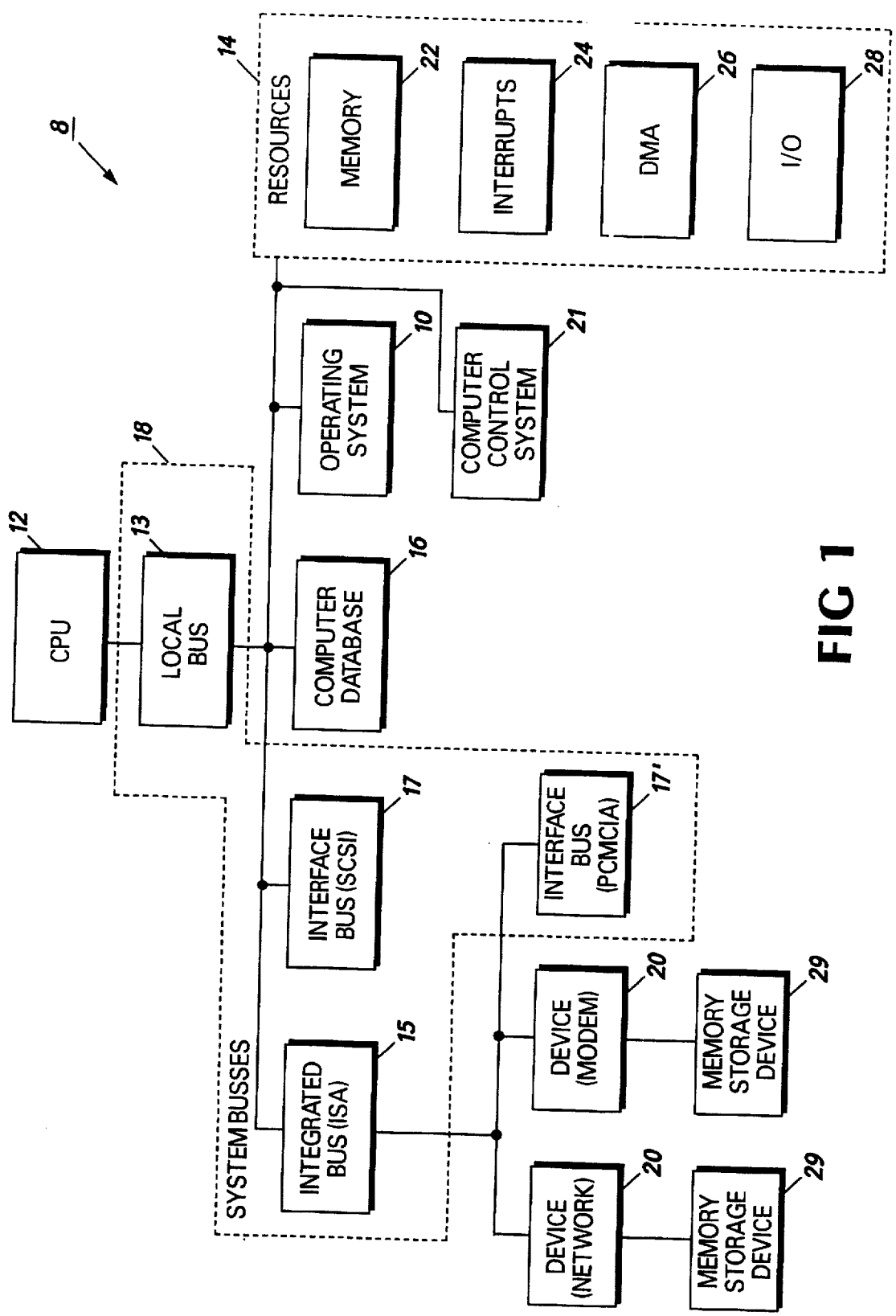
FIG. 1 is an overall block diagram of a computer in which the preferred embodiment of the present invention is operative.

To overcome the frustration of users with the present complicated and technical configuration processes for personal computers, the present invention provides a system for automatically configuring a peripheral device or an add-on type adapter board for use with a base or mobile computer. The present invention enables a user to simply connect a new device to the computer, power the computer, and have the device properly work with the computer without user intervention. To provide this capability, the present invention determines a successful configuration for the resources and enables the devices and the application programs to fully utilize the available resources. This can be accomplished for numerous computer bus architectures and types of devices.

The detailed description which follows is presented largely in terms of algorithms and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, an "algorithm" is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to these physical quantities that exist within the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

Furthermore, it should be kept in mind that there is a distinction between the methods, steps, or operations completed by a computer, and the method of computation itself. The present invention does not involve a method of computation. Instead, the present invention relates to methods, processes, steps, or operations for a computer and the processing of electrical or other physical signals to generate desired physical signals and to display results and interactions.

In addition, it should be understood that the programs, algorithms, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Automated Configuration System

FIG. 1 shows a block diagram of the preferred operating environment, a computer 8, for the preferred embodiment of the present invention. The present invention is based upon computer-implemented processes that can be embodied in one or more computer programs for a data processing system, such as the computer 8, to carry out the methods and functions described herein. This computer-implemented process operates upon electrical or other physical signals to generate the desired physical results.

Referring now to FIG. 1, the computer 8 runs an operating system 10 that operates with a central processing unit (CPU) 12, resources 14, system busses 18, devices 20, and a computer control system 21. The resources 14 include memory addresses for a memory 22, interrupts 24, direct memory access (DMA) channels 26, and input/output (I/O) ports 28. The system busses 18 typically include a local bus 13, an integrated bus 15, such as a system-level expansion bus, and at least one interface bus 17. The computer 8 represents a typical configuration for a conventional personal computer and it will be understood that the present invention is not limited to operations with the disclosed configuration for the computer 8. Indeed, the computer 8 is intended to be representative of a broad category of data processing devices.

The operating system 10 comprises a set of computer programs that control the internal functions of the computer 8, thereby allowing the computer 8 to run application software (not shown). For the preferred embodiment, the operating system 10 is a graphic-based operating system, such as the "WINDOWS" operating system available from the assignee for this application, Microsoft Corporation, Redmond, Wash. The operating system 10 is preferably installed on a mass memory storage device, such as a fixed disk drive, of the computer 8. During computer operations, the operating system 10 is also allocated a portion of the memory 22 to support operations with the other components of the computer 8.

The CPU 12 is typically implemented as a microprocessor, such as the models 80386 or 80486 that are available from Intel Corporation, Santa Clara, Calif. The CPU 12 operates in combination with computer software, such as the operating system 10 and application programs, to control the operations of the computer 8. One or more of the system busses 18 support communications of control, address, and data signals between the CPU 12 and the remaining components of the computer 8.

The resources 14 represent the resources of a conventional personal computer, such as the computer 8. The memory 22 is typically implemented by dynamic or volatile memory modules, such as random access memory (RAM), and static or nonvolatile memory modules, such as read only memory (ROM) units. The memory 22 preferably includes a conventional memory, which is the first 1024 kilobytes of dynamic memory in a personal computer, and an extended memory that extends above the 1024 kilobytes range. The interrupts 24, also referred to as the interrupt request lines, are signal paths within the computer 8 that carry signals informing the recipient that the sender is ready to transmit or to receive data. The DMA channels 26 enable the devices 20 or a computer program running on the computer 8 to access the memory 22 without involvement by the CPU 12, thereby supporting relatively fast data transfers. The I/O ports 28 represent ports used by the devices 20, such as peripheral devices or adapter boards, to communicate with the CPU 12.

The computer database 16 provides a central location for storage of archival information that supports the configuration of the devices 20. Specifically, the computer database 16 stores general system hardware and software parameters, as will be described in more detail below with respect to FIG. 8. The computer database 16 is preferably implemented by nonvolatile memory, such as a fixed disk or another type of mass storage memory device.

Each system bus 18 can be viewed as a "parent" capable of having "children" because a system bus provides a mechanism for connecting devices 20 to the computer 8. The system busses 18 typically supply the signal paths for the exchange of data, control signals, and addressing information among the components of the computer 8 and peripheral components, including the devices 20. The system busses 18 can be implemented as various bus architectures, such as the Industry Standard Architecture (ISA), Micro Channel Architecture (MCA), and Extended Industry Standard Architecture (EISA) standards, as well as Personal Computer Memory Card International Association (PCMCIA), Small Computer Systems Interface (SCSI), Personal Computer Interface (PCI), Enhanced Capabilities Parallel (ECP), Vesa Local Bus (VL), Integrated Drive Electronics (IDE), and other bus standards. The system busses 18 also can include local or personal computer (PC) busses, serial busses, and parallel busses. However, it will be understood that the present invention is not limited to operation with the above-described busses and that these busses are listed as representative of existing bus architectures.

The system busses 18 include the local bus 13, the integrated bus 15, and a pair of interface busses 17 and 17'. The integrated bus 15 is preferably an integrated or "fixed" expansion-type bus that enables the direct connection of peripheral devices or adapter boards to the computer 8. In contrast, the interface busses 17 and 17' are typically supplied by vendors as separate accessory or optional components that can be attached to the computer 8 via the local bus 13 or the integrated bus 15. Nevertheless, both the interface busses 17 and 17' permit the connection of additional devices to the computer 8. For the representative computing environment shown in FIG. 1, the integrated bus 15 is implemented as an ISA bus and is connected to the local bus 13 on the system board of the computer 8. In addition, the interface busses 17 and 17' are respectively implemented as a SCSI bus and a PCMCIA bus. In particular, the SCSI bus is connected to the local bus 13 and the PCMCIA bus is connected to the integrated bus 15.

The devices 20, which are connected to the system busses 18, represent the logical functions of components that can be connected to a personal computer. The devices 20 include components typically located on or connected to a system board of a personal computer, including system-level devices, such as I/O controllers (fixed and flexible disk controllers), keyboard controller, serial and parallel controllers, system timer, display controller, programmable interrupt controller (PIC), and DMA controller The devices 20 further include the functional devices for peripheral adapter boards and interface boards. Thus, for the representative computing environment shown in FIG. 1, the devices 20 include system-level devices (not shown), a modem card, and a network card.

A device 20 also can be implemented as a system bus 18 that is connected to another system bus. For example, in the computer 8, the PCMCIA bus is connected to the ISA bus and is capable of supplying a connection to the computer 8 for other devices Thus, the PCMCIA bus represents both a system bus 18 and a device 20 within the computer 8. Likewise, both the ISA bus and the SCSI bus may be viewed as a system bus 18 and a device 20. Following the earlier analogy to "parent" and "child" components, it will be appreciated that a system bus 18 may be both a "parent" and a "child" within the preferred operating environment of the computer 8.

Although each of the devices 20 are shown in FIG. 1 as separate physical components, it will be understood that a computer component can contain more than one function and, accordingly, that a component can contain more than one of the devices 20. Thus, it will be useful to consider the device 20 as a logical device rather than as a physical device. It will be understood that the devices 20 supply the building blocks that are required to harness the computing power offered by the CPU 12 and the resources 14.

With the exception of system-level devices, which are typically supplied as part of the system board of the computer 8, a device 20 can be connected to a memory storage device 29, such as a ROM or a register, for storing information about the associated device 20. The memory storage device 29 is useful for storing device-related information that supports the configuration of the devices within the computer 8. This device information typically includes a string of characters for uniquely identifying a corresponding device and resource usage data. For devices on adapter boards, the memory storage device 29 is preferably mounted on the board itself The inventors believe that the actual implementation of the memory storage device 29 can be any type of circuit or component that allows the device information to be accessed to support configuration operations. Typical data storage components include ROMs, registers, and other conventional memory components. Furthermore, the device-related information also can be "stored" by constructing circuitry that represents a "hard-wired" version of such information. Device information can be stored in a device-dependent fashion. Accordingly, it will be understood that the memory storage device 29 is not limited to the above-described implementations.

The computer control system 21 conducts initialization and test functions, as well as device configuration functions, when the computer 8 is first powered or "booted." Upon booting the computer 8, one or more start-up programs begin to run to implement necessary initialization and test functions. These start-up programs may be implemented as stand-alone programs or are integrated to function within the framework of the operating system 10.

The start-up programs typically include a basic input/output system (BIOS) program and a power-on self-test (POST) program. The BIOS program supplies device-level control or support services for the primary input/output devices of the computer during the boot "initialization" process. Furthermore, after boot, the BIOS program accepts requests from application programs or the operating system running on the computer and performs input/output services as requested by those programs. The POST program conducts a sequence of tests for certain system-level devices and resources, including memory, to verify the proper operation of the computer components that are required to be active upon completion of the boot process. The programs associated with the computer control system 21 are preferably stored in ROM located within the computer 8, typically on the computer motherboard. The functions and operations of conventional BIOS and POST programs are well known and will not be further described herein. However, as described in more detail below, the computer control system 21 preferably includes a modified BIOS program that is further capable of (1) configuring the boot-level devices of the computer 8 and, if required, (2) detecting the insertion or removal of the computer 8 from a docking station or an expansion system. This modified BIOS program can be viewed as a type of system bus because it supplies connections to the system-level devices on the motherboard to support the configuration of such devices.

When viewed collectively, the CPU 12, the resources 14, a fixed disk including the computer database 16, the system busses 18, and the devices 20 represent the hardware components for a typical personal computer as embodied by the computer 8. The devices 20, which are connected to system busses 18 that are organized in a hierarchical manner, perform their respective functions by operating with the resources 14. Nevertheless, with the exception of certain types of the peripheral devices or adapter boards, the typical user is rarely exposed to the technical aspects of computer operations. In view of the relative technical complexity of the typical personal computer, it will be appreciated that there is a need for a system for configuring the devices of a personal computer without substantial support by the user. The inventors' solution for this problem is a system that permits a user to simply connect or attach a desired device to a computer, power-on the computer, and thereafter use the function associated with the device. This configuration system is supported by the hardware components of its computing environment and the computer-implemented processes of the operating system 10 and the computer control system 21.

Figure 2:
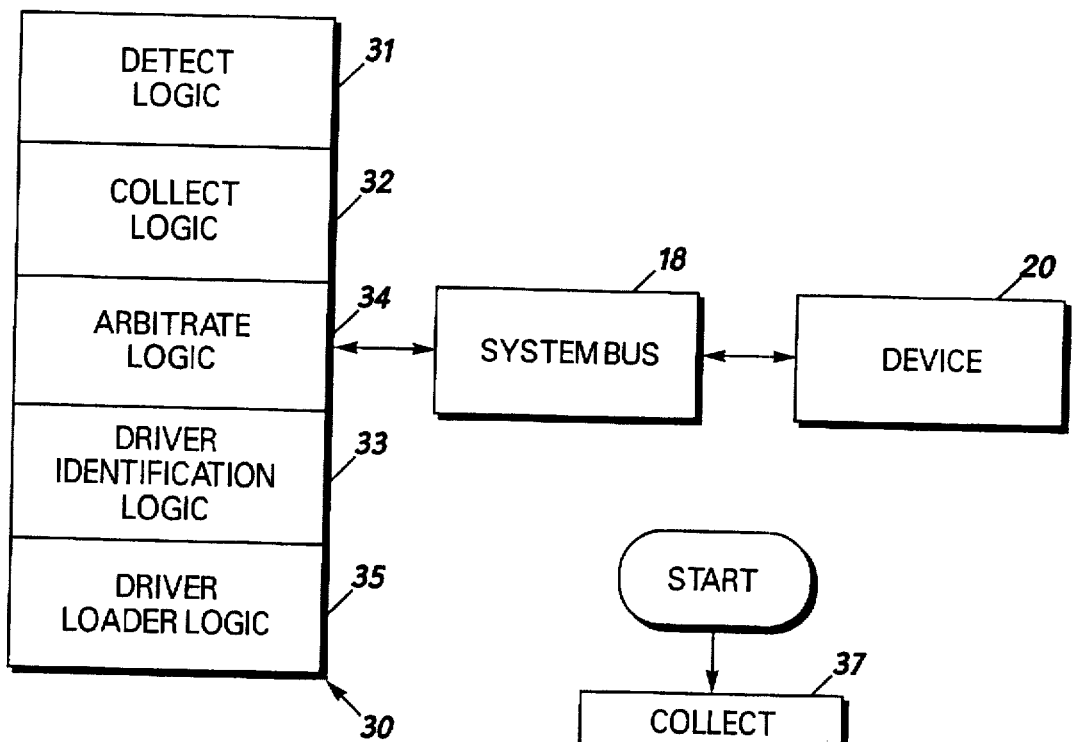
FIG. 2 is a block diagram that illustrates the preferred embodiment of the present invention.

FIG. 2 is a block diagram that illustrates the basic building blocks for the preferred embodiment of the configuration system. Referring now to FIGS. 1 and 2, the configuration system is useful for configuring the computer 8 to insure that the devices 20 have conflict-free access to the resources 14. Configuration logic 30, which can be implemented as a portion of the operating system 10, controls the configuration tasks. Specifically, the configuration logic 30 is supported by the operating system 10, the computer control system 21, and the processing and storage functions offered by the computer 8.

In response to an event causing an asynchronous change in the operating state of the computer 8, the configuration logic 30 operates to collect device information from each of the devices 20. For devices that have been designed to support the preferred operating system, this device information can be accessed by reading at least a portion of the data from a data storage mechanism associated with the device 20, such as the memory storage device 29. The configuration logic 30 thereafter allocates the resources 14 for the devices 20 in response to the collected device information. This prevents a conflicting use of the resources 14 by the devices 20 within the computer 8.

To collect device information from a selected device 20 on one of the system busses 18, the configuration logic 30 includes a detection module 31 for detecting a selected device on that bus and a collection module 32 for collecting device information from the detected device. Each system bus 18 in the computer 8 is preferably represented by a combination formed by a detection module 31 and a collection module 32. This combination defines the enumeration function of a component of the operating system 10 that will be described in more detail below with respect to FIG. 6, specifically an enumerator.

A driver identification module 33 responds to the device information by identifying a device driver for each of the devices 20 that supplied device information to the collection module 32. The collected device information is then analyzed by an arbitration module 34 to determine whether the selected device requires a potential conflicting use of the resources 14.

The arbitration module 34 assigns elements of the resources 14 by searching for available resource elements. As required, the arbitration module 34 resolves any potential conflicting use of an element of the resources 14 to enable the conflict-free allocation of a resource element to the selected device 20. Each resource 14 can be represented by a self-contained component of the arbitration module 34 to permit the efficient addition of arbitration capabilities for new resources. A driver loading module 35 thereafter loads the identified device drivers for use by the devices 20 in response to the allocation of the necessary elements of the resources 14.

Figure 3:
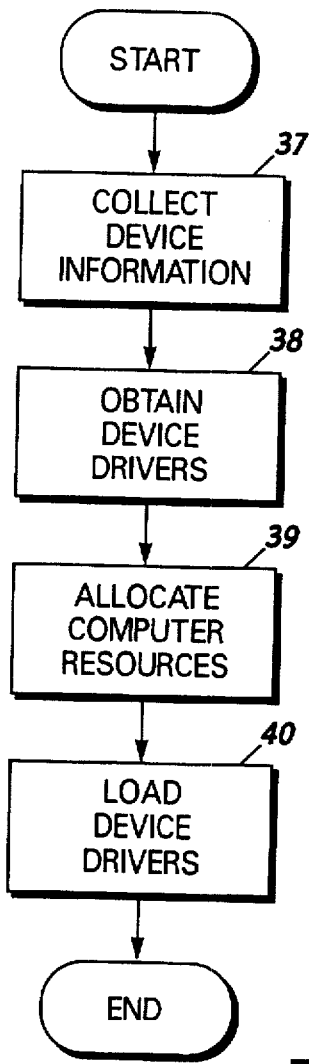
FIG. 3 is a flow chart diagram that illustrates the steps of a method for configuring the devices of a computer.

FIG. 3 generally shows the steps for a method for configuring the devices 20 for operation with the computer 8. Turning now to FIGS. 1 and 3, the computer-implemented process is started and device information is collected at step 37 for each of the devices 20. For each device 20, the device information includes identity data for uniquely identifying the corresponding device and resource allocation data for defining the resource requirements of the particular device. This device information is preferably associated with or otherwise linked with information for the corresponding system bus 18. The resulting product of this data collection process can be viewed as an inventory of the devices 20 connected to the system bus 18 of the computer 8.

For the devices that are designed to take advantage of the present inventive concept, at least a portion of the device information can be acquired by accessing the memory storage device 29. However, certain system-level components and existing "legacy" boards containing devices 20 may not include a memory storage device 29 for storing such device-level information. In this event, the device-level information is preferably acquired from other sources, such as the BIOS program of the computer control system 21 or configuration files of the operating system 10. For the legacy devices, certain device-level information can also be acquired by examining the signature-like responses output by these devices in response to command signals supplied to the I/O ports 28.

A device driver is thereafter obtained at step 38 for each of the devices 20 in response to the device information. At step 39, the resources 14, which are used by the devices 20 during computing operations, are allocated based upon the device information. Resource allocation is preferably an iterative routine that attempts to identify and resolve potential resource conflicts prior to an actual conflicting use of the resources 14 by the devices 20 during operation of the computer 8. In response to this allocation of the resources 14, the device driver for each of the devices is loaded at step 40 and the devices 20 are subsequently activated for operation with the computer 8, thereby terminating this configuration process.

Device information is preferably acquired for each of the devices 20, including all devices 20 supported by peripheral devices, add-on type adapter boards, system-level devices, and certain system busses. However, in the event that one of the devices 20 itself is implemented as a system bus, it may be necessary to complete the configuration tasks for the identified devices 20 connected to the system bus 18 prior to detecting any devices on the newly identified system bus. These tasks include identifying device drivers, allocating resources, and loading identified device drivers for the remaining devices 20 on the first system bus prior to identifying any of the devices connected to this newly identified second system bus.

For the computer 8, the steps shown in FIG. 3 are preferably conducted for the devices 20 on the integrated bus 15 and thereafter repeated to permit the identification of the additional devices connected to the interface bus 17'. This enables the devices 20 connected to the "parent" component represented by the ISA bus to be configured prior to the devices 20 on the "child" component of the PCMCIA bus. It will be understood that this type of configuration sequence is defined by the connection of second system bus (the PCMCIA bus) to a first system bus (the ISA bus).

In this manner, the devices 20 of the computer 8 are identified and associated with each of the system busses 18. In addition, the resources 14 are efficiently allocated based upon the device information, and the device drivers are assigned and loaded to enable the operations of the devices 20 with the computer 8. It will be understood that the proper configuration of the computer 8 is necessary for the devices 20 to use the resources 14 of the computer 8 and to communicate with the application programs (not shown) running on the computer 8. Accordingly, the computer 8 is typically configured prior to using the devices 20 for the desired computing functions.

Although it is desirable to configure all of the devices 20 during the power-up or boot processes, particularly prior to completing the test and initialization routines of the computer control system 21, many resource conflicts cannot be fully resolved without complete knowledge of all resource requirements for the devices 20. Nevertheless, the preferred system supports the configuration process during the computer start-up sequence for a limited set of the devices 20, specifically those boot-level devices that are required to "come-up" active during the boot process. Thus, this pre-boot configuration process is completed for the "fixed" system-level devices on the computer's system board, which is also described as a motherboard. Likewise, the pre-boot configuration process is completed for the set of devices 20 that are connected to integrated expansion board, specifically the integrated bus 15, and are required for boot-level operations. The remaining devices 20, which also may require resource allocation, are preferably configured only after the computer 8 has completed the boot process.

Figure 4A:
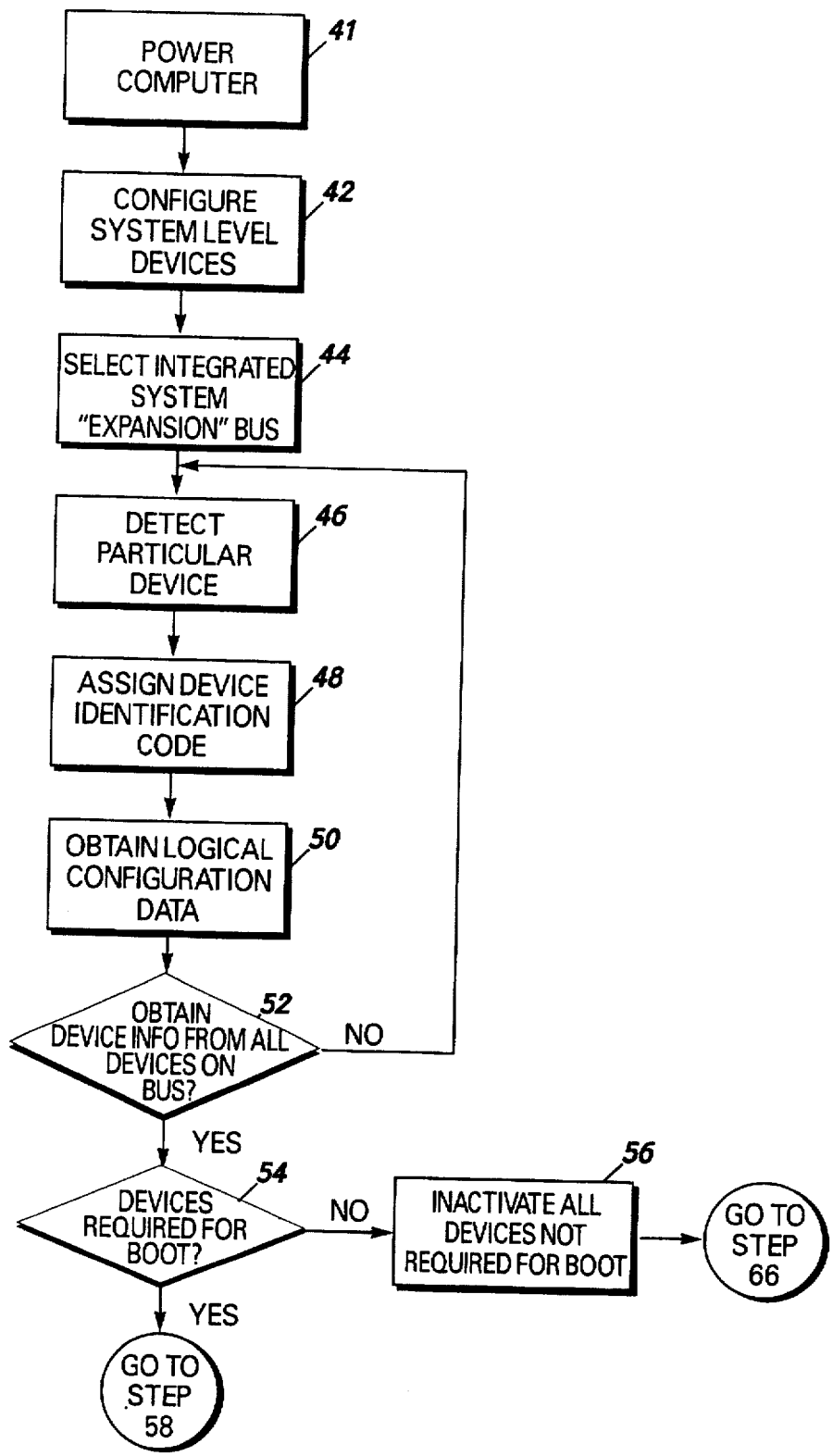
FIGS. 4A–C are flow chart diagrams that illustrate the preferred steps of a method for configuring the devices of a computer in accordance with the preferred embodiment of the present invention.
Figure 4B:
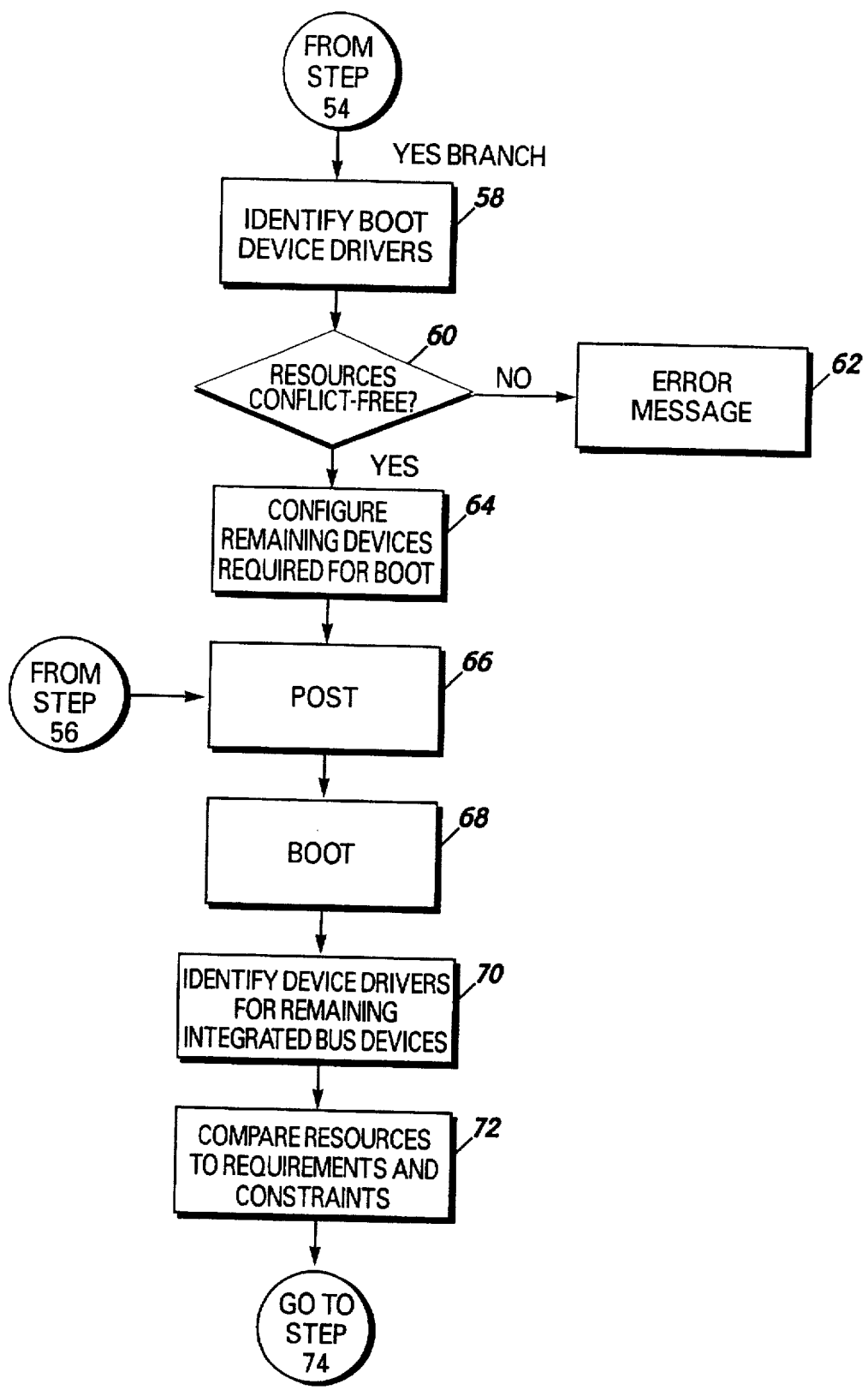
Figure 4C:
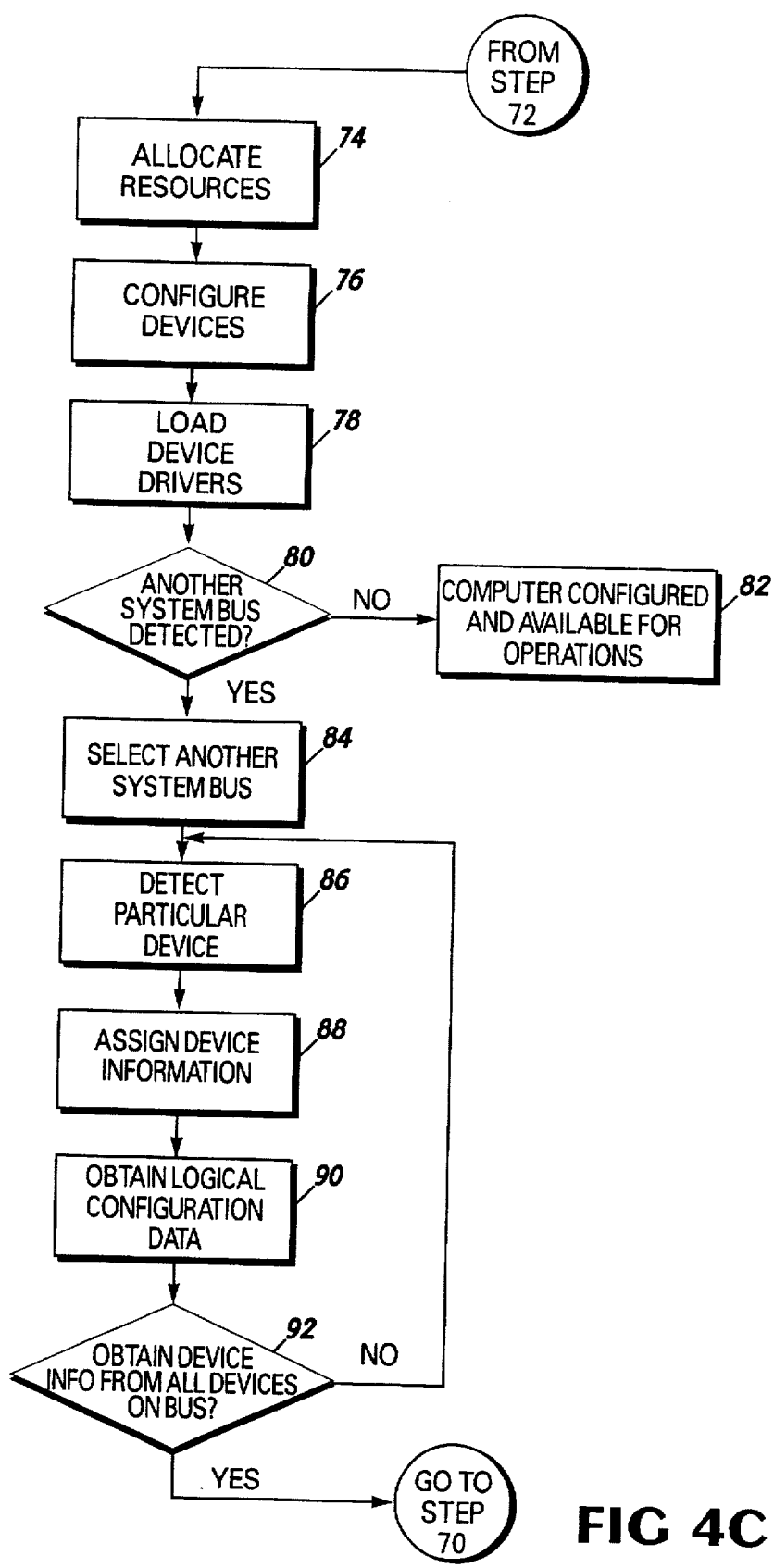

FIGS. 4A–C, collectively described as FIG. 4, are flow chart diagrams illustrating the preferred steps of a method for configuring the devices of a computer. Referring now to FIGS. 4A–C, which are collectively described herein as FIG. 4, and to FIG. 1, the configuration process is initiated in step 41 by powering-up the computer S.

In step 42, certain devices 20 on the system board, which are also described as system-level devices, are configured in response to powering the computer 8. These system-level devices, which are configured based upon power-on default configuration settings, typically include I/O interfaces, the 27 keyboard controller, the serial and parallel interfaces, the display controller, the system timer, the PIC, and the DMA controller. It will be appreciated that many of these components are mounted on the motherboard of a conventional personal computer. The system-level devices are preferably configured based upon default configuration parameters stored in the computer control system 21. The default configuration parameters for the system-level devices in the computer 8 are defined by the resource requirements and resource dependencies for such devices.

The preferred configuration process is based upon the collection of device-specific information from each of the devices 20 of the computer 8 to support the allocation of the resources 14 to those connected devices. Thus, still referring to FIGS. 1 and 4, the preferred configuration process continues for the devices 20 that are connected to the system-level expansion bus of the computer 8, specifically the integrated bus 15. In step 44, the integrated bus 15 is selected and an enumerator (not shown) is loaded for the ISA bus. In subsequent steps, each of the devices 20 connected to the ISA bus of the computer 8 is examined to obtain device information.

In step 46, one of the devices 20 on the selected ISA bus is detected to enable the communication of device information from the detected device 20. For the ISA bus, the detected device is isolated from the remaining devices on the bus to permit interference-free communications with that device. Nevertheless, it will be appreciated that other types of system busses do not require isolation of the detected device to enable communications with that device. The preferred system for detecting the interface boards associated with the devices 20, isolating a particular interface board, and collecting device information is described in a related application, U.S. patent application Ser. No. 08/023,689, filed Feb. 25, 1993, entitled "System and Method for Computer Interface Board Identification," which is assigned to the assignee for this application and hereby incorporated by reference. The system described in the referenced application automatically determines which interface boards are connected to a computer bus and automatically assigns parameter selections to ensure proper operation of the boards within the computer.

At step 48, the detected device 20 is assigned a device identification code that preferably identifies the particular device as a certain device type connected to a selected bus, in this case, the integrated bus 15. The device identification code comprises an identification code and a system bus code. The identification code comprises a data string which uniquely define the corresponding device. The identification code can include characters defined by the well known American Standard Code for Information Interchange (ASCII) or a combination of ASCII and non-ASCHI data bytes. Similarly, the system bus code, which also can be implemented as a string of ASCII characters or a combination or ASCII and non-ASCII data, uniquely identifies a corresponding system bus. The identification code is typically supplied by the device 20, whereas the system bus code is associated with the system bus 18 and is generated externally to the device 20, i.e., typically by an enumerator associated with that bus. For example, a modem is preferably assigned an identification code that is different from the identification code for a printer, and different architecture expansion busses, such as ISA and MCA busses, are preassigned different system bus codes. Thus, the identification code defines the detected device and the system bus code defines the selected system bus that supplies the connection for the detected device. Examples of device identification codes, also described as device identifiers, include: "Root\*PNP0000\0", "ISAPNP\ADP1522_DEV0000\E8123123", and "BIOS\*PNP0100\".

For the preferred embodiment, the identification code is used to identify the class or the type of the device 20. The vendor of the peripheral device associated with the device 20 typically defines the unique identification code for that device. Nevertheless, it will be appreciated that the identification code does not need to contain any information about the class or the type of the device 20. Indeed, the only requirement for the device identification code is that the data string formed by this combination of the system bus code and the identification code should be consistently used each time the computer 8 boots to uniquely identify the particular device 20 on the selected bus 18. The device identification code can include an instance number to distinguish the multiples instance of like devices within the computer 8.

The collection of device information continues at step 50. Specifically, logical configuration data is obtained for the detected device 20. The logical configuration data is preferably logically linked to the device identification code for the particular device 20. This device information is preferably stored in nonvolatile memory that is allocated for such use by the operating system 10. In addition, if the particular device 20 represents a newly installed device for the computer 8, then the device information is also stored within the computer database 16 to maintain an archival record of all of the devices 20 that have been installed for operation with the computer 8.

The logical configuration data defines the set of resources 14 necessary for operation of the particular device 20 with the computer 8. Specifically, the logical configuration data comprises both resource requirement information and resource dependency information. The resource requirement information defines certain resources 14 which are necessary for operation of the particular device 20. It will be appreciated that computer resources, such as the resources 14, include multiple resource options or elements, such as allocated memory ranges and a predefined set of interrupts, DMA channels, and I/O ports. Thus, the resource requirement information preferably defines a range of elements for each of the resources 14 required for the operation of the associated device. For example, a printer may require a communications port within a range of the I/O ports 28. In contrast, the resource dependency information defines a particular combination of resource elements which are necessary for the operation of the particular device 20. For example, the resource dependency information for a modem may define a specific combination of an interrupt and an I/O port for the operation of that device.

Upon completing the collection of device information from the detected device 20, an inquiry is conducted at step 52 to determine whether device information has been obtained from all of the devices 20 on selected bus, in this case, the integrated bus 15. If the answer is negative, the "NO" branch is followed to the step 46 to continue the collection of device information from the remaining devices 20 on the integrated bus 15. In contrast, the "YES" branch is followed to the step 54 if device information has been acquired from all such devices 20. At this point, the device identity data and resource usage information have been obtained for each device 20 that either is a system-level device or is directly connected to the integrated bus 15.

In step 54, an inquiry is conducted to identify the subset of the devices 20 that must be active upon completion of the boot process. For the devices 20 that do not require a default-type configuration during the power-up sequence, the "NO" branch is followed to the step 56 and those devices preferably remain inactive during the power-up sequences. In contrast, the "YES" branch is followed from the step 54 to the step 58 for the devices 20 that must be activated during the boot process. Based upon this inventory of the identified devices 20 requiring activation during the boot process, a boot-level device driver for each of those devices is obtained in step 58 to enable communications between the boot-level devices and the computer 8. These boot-level devices typically include the system-level devices 20 on the system board of the computer 8 and certain adapter boards connected to the integrated bus 15, such as a display controller or a mass memory storage device controller, i.e., a fixed disk controller.

In step 60, an inquiry is conducted to determine if the resources 14 required by the set of identified devices 20 requiring enablement for the boot process are conflict-free. If so, the "YES" branch is followed to step 64. The resources required by these devices 20 are allocated during the step 64 and the required device drivers are subsequently loaded to permit boot-level operations. Alternatively, if the response to the inquiry in step 60 is negative, then the "NO" branch is followed to step 62 and the user is preferably supplied an error message based upon the detection of a resource conflict during the boot process. In response, the user may be required to power down the computer and manually reconfigure the computer 8. However, it is not anticipated that a resource conflict for boot-level devices will be a common occurrence because the configurations for many of the boot-level devices mounted on the system board are typically pre-defined to be conflict-free by the computer vendor.

The above-described configuration steps 42–64 are preferably supported by software routines for the modified BIOS program of the computer control system 21. The modified BIOS program supports the identification of each of the boot-level devices, including system-level devices and the boot-level devices on the integrated bus 15, and stores device-related information within computer memory to support the configuration tasks for those devices. With the exception of the system-level devices, the configuration support supplied by the modified BIOS program concludes after the POST process is completed. Specifically, after POST, the control of the configuration process for all remaining devices 20 is preferably maintained by the operating system 10 rather than by the computer control system 21.

Upon completion of this portion of the configuration process, the conventional POST and BOOT routines are then conducted for the computer 8 during the steps 66 and 68, respectively. As a result of loading the operating system 10, selected configuration files of the operating system 10, such as CONFIG.SYS and the AUTOEXEC.BAT files, are processed by the computer 8. The CONFIG.SYS file is a system configuration file that contains parameters which determine how the computer will operate. The AUTOEXEC.BAT file supports user customization of computer operations, particularly the handling of application programs. The operations of both CONFIG.SYS and AUTOEXEC.BAT files for conventional operating systems are well known and will not be described herein.

Although FIG. 4 shows a specific sequence for the POST and BOOT routines, it will be understood that the configuration process can be adapted to operate with a different sequence of those routines. For example, at least a portion of the task operations of the POST routine can be completed after power-up and prior to the configuration of system-level devices in step 42.

Unlike the system board devices and the boot-level devices connected to the integrated bus 15, which are respectively configured during steps 42 and 64, the remaining devices 20 connected to the integrated bus 15 are configured only after the boot operations for the computer 8 have been completed. However, the configuration operations for the nonboot-level devices on the integrated bus 15 are supported by the collection of device information that occurred prior to the BOOT process of step 68. In particular, this configuration process is supported by the current inventory of both the system board devices and the set of devices 20 connected to the integrated bus 15.

At step 70, the device drivers for this set of nonboot-level devices are identified in response to the device information collected during the preboot operation. The device drivers are typically identified by accessing corresponding device-related information that is stored in the computer database 16 or by accessing a predefined file of the operating system 10. The process for identifying and obtaining the device drivers will be described in more detail below with respect to FIG. 5.

The device information collected during the preboot operation further supports the allocation and the assignment of the resources 14 required by the nonboot-level devices on the integrated bus 15. In step 72, the resource requirements and dependencies for each of the nonboot-level devices 20 on the integrated system bus 15 are compared to the available resources 14. This comparison permits a determination of whether a potential resource conflict exists. In an iterative fashion, potential resource conflicts are arbitrated and resolved prior to resource allocation. In step 74, the resources 14 are allocated to the nonboot-level devices 20 based upon the arbitration results of the step 72 and those devices are configured in step 76. In view of the allocated resources, the identified device drivers are loaded in step 78 and the devices are enabled for operation with the computer 8. This arbitration process is described in more detail below with respect to FIG. 13.

For the system board devices and the set of devices directly connected to the integrated bus 15, device information has now been collected and stored in volatile computer memory and, as required for newly installed devices, in the nonvolatile memory of the computer database 16. The device information for the devices 20 on the integrated bus 15 may identify one or more of the devices as another system bus 18 capable of supporting other connected devices 20. Device information has not yet been collected for the "children" devices of each system bus 18 connected to the integrated bus 15. Nevertheless, for the preferred embodiment, the tasks of identifying device drivers, arbitrating and allocating the resources 14, and loading the identified device drivers for the set of nonboot-level devices 20 on the integrated bus 15 enable the subsequent collection of device information from these children devices. Thus, at step 80, an inquiry is conducted to determine whether any of the devices 20 on the selected integrated bus 15 are operable as system busses. If not, the "NO" branch is followed to step 82 and the automated configuration operation for the computer 8 is completed. In contrast, if another system bus is connected to the computer 8, then the "YES" branch is followed to step 84 to continue the data collection process.

Referring still to FIGS. 1 and 4, in step 84, another one of the system busses 18 is selected to support the configuration of the set of the devices 20 connected to that selected bus. For the illustrative example of FIG. 1, the interface bus 17' is selected and the enumerator for that bus is loaded. One of the devices 20 on the interface bus 17' is subsequently detected in step 86. At step 88, the detected device 20 is assigned a device identification code comprising the identification code for the detected device and the system bus code for the interface bus 17'. Likewise, logical configuration data is obtained for the detected device 20 during the step 90 to define the resources 14 necessary for operation of the device.

Upon completing collection of device information from the detected device 20, an inquiry is conducted at step 92 to determine whether device information has been obtained from all of the devices connected to the interface bus 17'. If the answer is negative, the "NO" branch is followed to the step 86 to continue the collection of device information from those remaining devices 20. In contrast, the "YES" branch is followed to the step 70 to enable the sequence of identifying device drivers, arbitrating and allocating the resources 14, and loading the identified device drivers for the detected devices 20 of the interface bus 17'. This process will be repeated until all of the system busses 18 within the computer 8 are detected.

It will be understood that the device information collection process has now been completed for the existing devices 20 of the computer 8. Specifically, the device identification code and the logical configuration information have been collected from each of the devices 20. This device information is preferably stored in the computer memory 22 to support any additional configuration operations that are necessitated by another asynchronous event affecting the operating state of the computer 8.

It will be appreciated that existing personal computers generally do not include a modified BIOS program to implement the specific sequence defined by the steps 42 through steps 64 for the configuration process shown in FIG. 4. Accordingly, for computers with a conventional BIOS program, the system board devices are configured by the BIOS program and the initialization processes performed by the POST and BOOT routines are conducted in a known manner in response to powering the computer. After the completion of the boot sequences, an embodiment of the present invention supports the automated configuration of the remaining devices connected to this computer.

Specifically, upon booting the computer, this postboot configuration process for a conventional computer starts at step 84 by selecting one of the system busses 18. However, unlike the previously-described configuration operation, the integrated bus 15 is selected only after the completion of the BOOT routine. In this manner, the sequence of tasks starting at step 84 of FIG. 4 are completed to identify and characterize the existing devices 20 of the computer 8, to identify the associated device drivers, to allocate the resources 14, and to load the device drivers.

Referring now to FIG. 1, a device driver for an associated device 20 can be obtained from one of several alternative sources of the computer 8, including the operating system 10, the device 20 itself, or indirectly from the user via a disk containing the device driver. The preferred operating system 10 includes one or more files that contain device drivers for supporting the most commonly used peripheral devices and add-on type adapter boards. Similarly, the memory storage device 29 located on certain adapter boards also can be used for storing device drivers for operating the associated device with a personal computer In addition, conventional peripheral devices and adapter boards are often times supplied by vendors with one or more computer disks containing installation software programs and supporting software programs, including device drivers. Upon loading a device driver for use by the computer 8, the device driver is typically stored on the computer's mass storage memory device, such as a fixed disk.

To maintain an archival record for each device 20 installed on the computer 8, the device information for a particular device is stored within a corresponding record of the computer database 16. Thus, the central database 16 preferably maintains a set of records containing a listing of the identification codes for the devices 20 of the computer 8 and a listing of compatible device information. Each record contains a device identification field for storing an identification code associated with a certain primary device and a compatible device identification field for storing identification codes associated with both a primary device and corresponding compatible devices. A compatible device is a device that performs the same functions to achieve the same results in the same manner as the primary device. For example, a first modem card may be compatible with a second modem card because both cards perform the same function and conform to an industry standard for modem communications.

The compatible device identification field also permits the recording of priority data to permit a further distinction between the devices compatible with a primary device. For example, this priority data can include vendor-assigned ranking data and is supplied by ranking the identification codes for compatible devices in the preferred order of use. In this manner, priority data is supplied by the order in which the identification codes within the compatible device identification field are listed.

Table 1 shows a several of the data fields for a record of the computer database 16. The first field, which is labeled "Device Identification", contains identification codes for the devices 20. The second field, which is labeled "Compatible Device Identification", contains identification codes and related information for compatible devices. This information represents at least a portion of the data stored in typical record in the computer database 16.

TABLE 1

| Device Identification Identification Code | Compatible Device Identification Identification Code |
|---|---|
| Audio B3 | Audio B3 Sblast Windows Sound |

As shown in Table 1, each identification code in the device identification field has one or more corresponding entries in the compatible device identification field, namely entries for identification codes and installation dates. A primary device is identified in the device identification field by the identification code "AudioB3". The compatible device identification field also contains the same identification code. When the device identification field and the compatible device identification field contain the same identification code, a device driver specifically designed for use with the identified device is available on the computer 8. This type of device driver is also described as a primary device driver. Thus, for the example shown in Table I, the primary device driver is available to support the operations of the particular device 20 identified by the entry "AudioB3" in the device identification field.

The primary device driver, if available, is preferably obtained to support the operations of the corresponding device 20. If the primary device driver is not available, then the compatible device identification field is preferably searched for an entry representing a compatible device. If at least one compatible device entry is present, then a device driver that is compatible with the primary device is available on the computer 8. It is well known that a device driver may support the operations of both the intended primary device and one or more other compatible devices sharing similar operating characteristics with the primary device. Thus, a "compatible" device driver, if available, may be used to enable communications of the particular device 20 with the computer 8 in the absence of the primary device driver for that particular device. It will be understood that the primary device driver is intended to support the computer operations of the primary device, whereas each compatible device driver supports computer operations for the primary device and other compatible devices.

The compatible device identification field in Table 1 further shows a pair of identification codes associated with devices that are compatible with the "AudioB3" device, namely the devices identified by the codes "Sblast" and "Windows Sound". Compatible devices are identified by identification codes having names that are dissimilar to the identification code for the primary device.

For the preferred embodiment, the selection of a device driver corresponding to a compatible device is determined by the following convention: if a primary device driver is not available to support the particular device, then the device driver for the compatible device having the highest priority ranking is selected from the compatible device driver candidates. The identification code for the compatible device having the highest priority ranking is preferably listed within the compatible device identification field prior to any of the remaining identification codes. Thus, the identification codes for compatible devices are ordered based upon priority ranking assigned to those devices. Assuming the absence of the identification code for that primary device in the compatible device information field, this convention indicates that the "Sblast" device driver should be selected to support the "Audio B3" device based upon the order of the identification codes for the listed devices.

Figure 5:
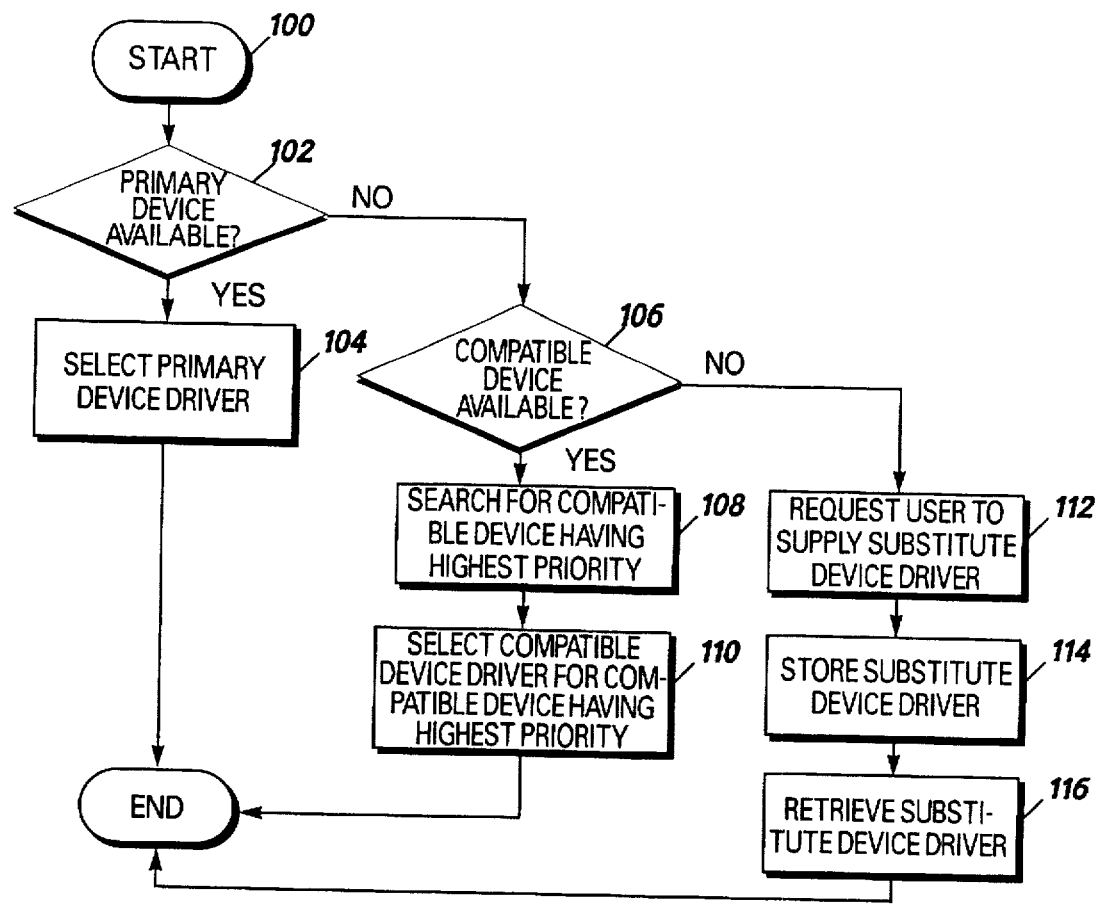
FIG. 5 is a flow chart diagram that illustrates the preferred steps for a method for obtaining a compatible device driver for use with a device of the computer.

FIG. 5 is a flow chart diagram that illustrates the preferred steps for a method of obtaining a device driver for use with a device of the computer. Turning now to FIGS. 1 and 5, a computer-implemented process for obtaining a device driver is started in step 100 and proceeds to step 102, where a determination is made whether the records of the computer database 16 contain an entry designating that a primary device driver corresponding to the particular device 20 is available on the computer 8. To locate the record associated with the particular device 20, the computer database 16 is searched by using the identification code for the particular device 20 as the entry key. If the identification code for the particular device 20 is found in both the device identification and compatible device identification fields of a selected record, then the "YES" path is followed to step 104. This affirmative response indicates that the primary device driver for the particular device 20 can be obtained on the computer 8. A device driver maintained by the computer 8 typically can be retrieved by accessing a corresponding file on the fixed disk of the computer 8 and reading the stored device driver. For the preferred operating system 10, certain device-related information, including the identity of device drivers for the corresponding device, is stored within information files called .INF files. In the step 104, the device driver corresponding to the primary device is selected and assigned for use by the particular device 20. The process concludes if the primary device driver is available. In contrast, if a positive match is not achieved, then the "NO" path is followed to the step 106.

If the primary device driver for the device 20 is not available, then the compatible device identification field for the selected record is preferably searched in step 106 for an identification code that corresponds to a device that is "compatible" with the particular device 20. If one or more of the identification codes representing compatible devices are contained in this field, then the "YES" branch is followed to the step 108. In step 108, the compatible device identification field is also searched for the identified compatible device having the highest priority ranking. The preferred compatible device is listed first within the compatible device identification field. Upon finding the preferred compatible device, the process proceeds to the step 110. In the step 110, the device driver corresponding to the compatible device having the highest priority ranking is selected and assigned for use with the particular device 20, thereby concluding the search for a compatible device driver.

If the response to the step 106 is negative, then the "NO" branch is followed to the step 112. The user is requested in step 112 to supply a substitute device driver for the supporting operation of the device with the computer 8. This request is typically supplied as a text-based statement displayed on a display or monitor for the computer 8 or as an audio prompt generated by the computer 8. In response to the request, the user can insert within the appropriate computer drive a flexible disk or another form of appropriate electronic media containing the device driver program, thereby permitting the computer 8 to access the device driver program. In response to reading the disk, in step 114, the computer 8 stores the device driver program on a selected mass storage memory device.

In step 116, the substitute device driver is obtained and instructed to enable the particular device 20 for operation with the computer 8. In addition, to maintain the records on the computer database 16, the identification code for the device associated with the new substitute device driver is listed in the appropriate record(s) of the computer database 16. This database update is achieved by adding the identification code for the device driver within the compatible device identification field for the record associated with the particular device 20. In this manner, the archival record indicates that the substitute device driver supports the operations of the particular device 20 and has been installed for use on the computer 8.

Automated Configuration System Components

Figure 6:
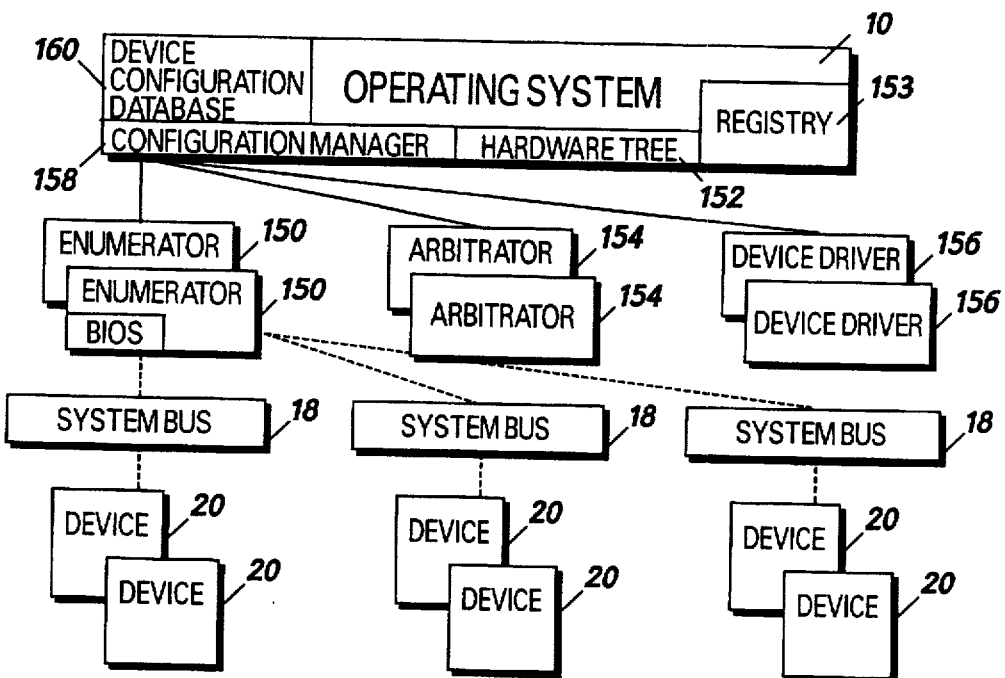
FIG. 6 is a block diagram that illustrates the components of the preferred embodiment of the present invention.

FIG. 6 is a block diagram that illustrates the components and their structural communications links for the preferred embodiment of the operating system 10. Referring to FIGS. 1 and 6, the operating system 10 comprises numerous software programs or modules, including enumerators 150, a hardware tree 152, a registry 153, arbitrators 154, device drivers 156, a configuration manager 158, a device manager 159, a device configuration database 160, and device and class installers 161a and b. The enumerators 150, the registry 153, the arbitrators 154, and the device drivers 156 are associated with the configuration manager 158. The device manager 159 works in conjunction with the configuration manager 158 to install devices 20, and is associated with the device and class installers 161a and b. It will be understood that the operating system 10 also preferably interacts with a modified BIOS program of the computer control system 21, i.e., a BIOS program modified to support "Plug and Play" compatible operations of the present invention, and various hardware components of the computer 8, including the system busses 18 and the devices 20, to support the configuration system.

Figure 7A:
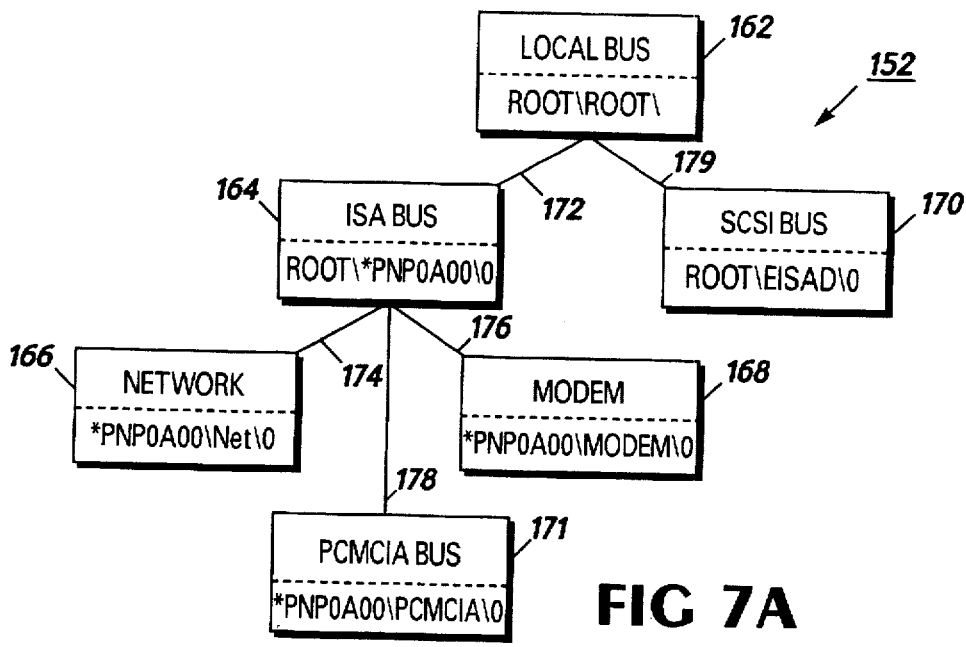
FIGS. 7A and 7B are diagrams that illustrate one of the components of the preferred embodiment of the present invention, specifically a hardware tree comprising device nodes for storing device-related information for the present configuration of the computer.
Figure 7B:
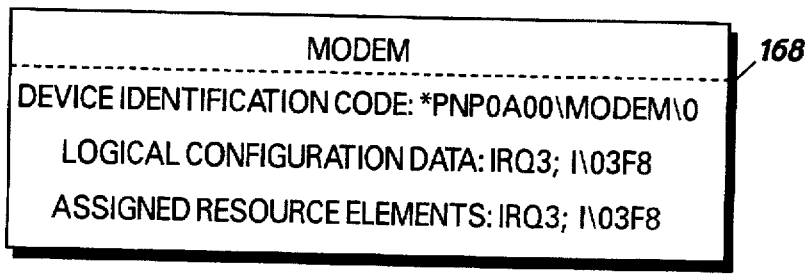
Figure 8:
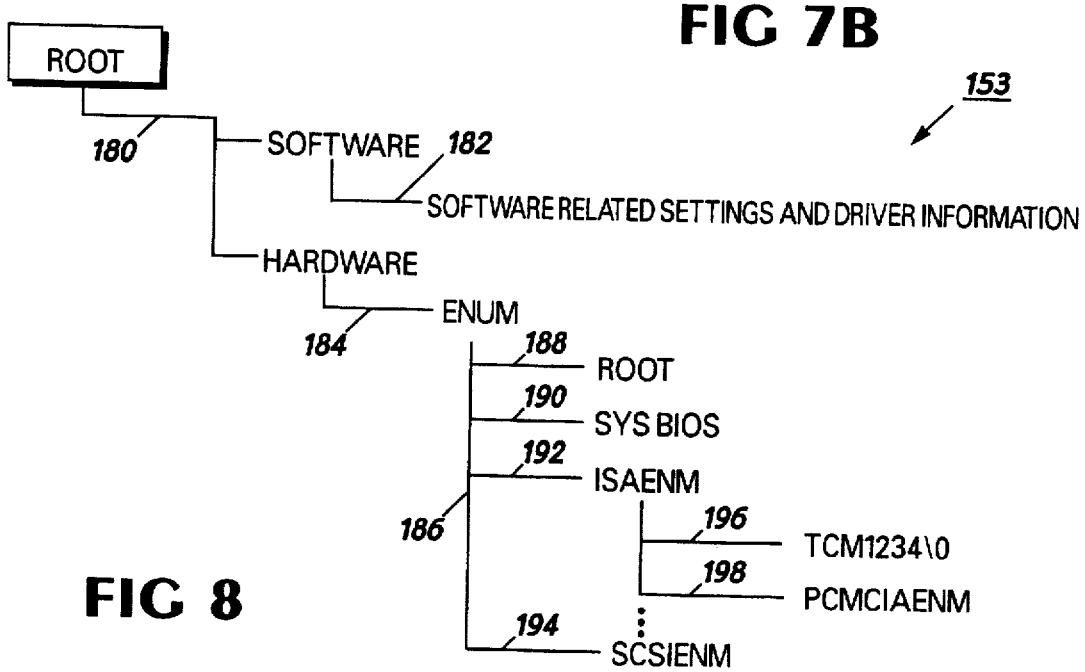
FIG. 8 is a diagram that illustrates one of the components of the preferred embodiment of the present invention, specifically a registry for storing archival device-related information for the computer.

These components are generally described within sections headed by their respective identifying legends and are best shown in FIGS. 6–8. A more detailed review of certain components, namely the enumerator 150 and the arbitrator 154, is also supplied below with respect to FIGS. 9–13.

Enumerators

The enumerators 150 "enumerate" or operate to report the identities of detected devices 20 on the system busses 18 in response to certain events that affect the operating state of the computer 8. These events include changes to the state of power supplied to the computer 8, including the states Power-on, Standby, Suspend, or Resume. The events also include the insertion of a device onto or the removal of a device from a system bus, or the insertion into or the removal of a computer from a docking station or an expansion chassis. It will be appreciated that this connection (or removal) of a device 20 to the computer 8 can be completed by a physical connection or as a logical connection via a wireless communication link or a network. In addition, for certain devices 20, the enumerators 150 also can transmit assigned resource elements from the configuration manager 158 for use by the devices 20 in response to an allocation of the resources 14.

Each enumerator 150 is assigned to a component of the computer 8 that is capable of having children, namely, those components that provide a connection for yet another hardware component. It will be understood that computer busses, such as the system busses 18, represent a common mechanism for connecting adapter boards and peripheral devices to a personal computer. In similar fashion, for the preferred computer control system 21, the modified BIOS program represents a mechanism for providing a central connection for the system-level devices of a personal computer, including the interfaces for the keyboard controller, the display controller, the I/O controller, and the serial and parallel controllers. Thus, for a typical personal computer, the enumerators 150 can be assigned to the computer busses and to the modified BIOS program that supports the configuration of boot-level devices. For the computer 8 shown in FIG. 1, individual enumerators 150 are assigned to the system busses 18, including the local bus, the ISA bus, SCSI bus, and the PCMCIA bus, and to the modified BIOS program of the computer control system 21.

For each system bus 18, the associated enumerator 150 is programmed to recognize the operating characteristics of its assigned computer bus and to support the configuration of the devices 20 connected to that computer bus. Specifically, these enumerators obtain device-related information from the devices 20 and subsequently store such information within a central memory location of the hardware tree 152. As outlined above, this collection of device information is initiated in response to the events affecting the enumerator's assigned system bus 18, such as the insertion or removal of a device or a change in the power state of the computer 8. It will be understood that this collection of device information from the devices 20 in the computer 8 is described as an enumeration process.

Likewise, for the computer control program 21, an enumerator 150 can be programmed to recognize the system-level devices of the computer 8 and to support the configuration of those system-level devices. The enumerator 150 assigned to the modified BIOS program accesses the default-type configuration parameters for the system-level devices from the modified BIOS in response to events affecting the computer's operating state, including the power-on event, and stores this information within the hardware tree 152. Furthermore, the enumerator 150 for the modified BIOS program can be programmed to detect the insertion of the computer into or the removal of the computer from a docking station and outputs an indication of these events to the configuration manager 158.

A unique system bus code is associated with each of the enumerators 150. For example, the ISA bus enumerator has a particular system bus code that is different from the system bus code assigned to the MCA bus enumerator. An enumerator 150 forms a device identification code for each device 20 connected to the assigned system bus 18 by appending its system bus code to the identification code for the device 20. The device identification code also can include an instance number that is assigned by the enumerator 150 to distinguish identical devices 20 connected to the same system bus 18.

An instance number can be obtained by the enumerator 150 from the device 20 itself, if available, or is assigned to the device 20. By way of example, for the ISA bus, the ISA bus enumerator assigns an instance number to a logical device based upon a serial number that is stored in the memory storage device 29 associated with that device. If no serial number is available for the device 20, then the enumerator 150 is required to use some other unique attribute to generate an uniquely addressable instance number. For the PCMCIA bus, an alternative scheme for assigning an instance number is based upon the use of the slot number for the bus socket connected to the device 20.

The enumerator 150 also obtains logical configuration data for each of the devices 20 of the computer 8. Logical configuration data is preferably linked to corresponding device information to maintain a logical link with the represented device 20. For a typical device, the device identification code and the logical configuration data, which are collectively referred to as device information, are preferably stored within a device node associated with that device. Each device node is preferably maintained in the tree-like memory structure of the hardware tree 152, as described below.

As a result of the resource assignment process, the enumerators 150 receive data packets containing assigned resource elements for the devices 20. In response to receiving an assignment of the resources 14 for a particular device, the enumerator 150 accesses the appropriate device node to store the resource assignment. In this manner, the assigned resource information is maintained in a central memory location that is accessible by the device and, as required, by the device driver corresponding to that device. Thus, it will be appreciated that the assigned resources for the each of the devices 20 are stored within corresponding device nodes.

The enumerators 150 provide an abstraction layer that effectively separates the controller portion of the operating system 10, the configuration manager 158, from the underlying bus structures of the computer 8. By placing the system bus-level information within the inventive concept of the driver-like enumerators 150, the operating system 10 can be adapted to operate with a variety of present and future computer bus architectures. Thus, unlike conventional operating systems, the configuration manager 158 can communicate with a variety of system busses without any knowledge of the characteristics of those system busses because such information is supplied by the abstraction layer of the enumerators 150. The structure and operations of the enumerators 150 are described in more detail below with respect to FIGS. 9 through 11.

For the preferred embodiment, the operating system 10 includes a variety of specific enumerators 150, including the root enumerator, BIOS enumerator, ISA bus enumerator, PCI bus enumerator, PCMCIA bus enumerator, EISA bus enumerator, COM enumerator, and LPT enumerator. The configuration manager 158 includes the root enumerator, which does not operate to detect devices 20, but rather relies on the registry 153 to determine whether a device 20 exists within the computer 8. If there is an entry in the registry 153, the root enumerator assumes that it exists and the appropriate drivers are loaded. This is the method by which legacy devices are supported because it is difficult to determine with complete accuracy and safety that an existing particular ISA bus-compatible adapter card is installed.

The BIOS enumerator is responsible for identifying the devices 20 on the motherboard of the computer 8. The ISA bus enumerator detects Plug and Play-compatible devices connected to the ISA bus in the computer 8. The PCI bus enumerator uses the PCI BIOS and the PCI device configuration space to detect and configure devices 20 connected to the PCI bus. The PCMCIA bus enumerator uses a Socket Services driver to determine whether a PCMCIA cards is inserted in each socket of the PCMCIA bus, and for those which are present, the tuple space of the PCMCIA-compatible card is read to identify which card is inserted and what resources are required. The EISA bus enumerator identifies the EISA-compatible devices that are installed within the computer 8 and determines the resources 14 required by these devices. The COM enumerator identifies compliant devices attached to a serial port of the computer 8. The LPT enumerator identifies compliant devices attached to P1284-capable parallel ports.

Hardware Tree

The hardware tree 152 supplies a hierarchical representation of the device identities and requirement lists, including resource usage requirements and the resource assignments, for the present devices 20 operating with the computer 8. The data structure for the hardware tree 152 is maintained in a hierarchical arrangement of device nodes within an allocated portion of the nonvolatile memory supplied by the computer memory 22. This stored information can be accessed by the operating system 10, specifically the configuration manager 158, by device drivers, or by application programs (via a common interrupt).

Each device node in the hardware tree 152 represents one of the devices 20 presently installed for operation with the computer 8 and generally contains three main attributes that describe the capabilities and resource requirements for that device. A device node, which is also described as a devnode, is a specific entry in the hardware tree 152. Each device node can contain a unique device identifier, i.e., the device identification code, and a list of resource requirements. The device identifier is a string which uniquely describes the device 20 represented by the device node. The string typically identifies the component that found the device. Because this device identifier is also used as a key in the registry, it must be unique within the system so that information about the represented device 20 can be reliably retrieved.

The requirements list of a device node can include logical configuration data which identifies the possible types of resources 14 that the associated device 20 needs to successfully operate within the computer 8 and any constraints associated with those resources 14. Constraints are often resource interdependencies, such as a device requiring that it must use the IRQ3 and the I/O port 02F8 in combination in order to operate successfully. Thus, the requirements list supplies possible logical configurations for a device. The enumerators 150 are preferably responsible for creating the logical configurations when they create the device nodes.

The device node also can include a currently assigned resource configuration, status information, a device driver entry point, an enumerator entry point, and arbitrator entry point(s). The currently assigned resource configuration data represents allocated resources. The status information represents the state of a device 20, such as whether it is disabled or configured. When a device driver 156 is loaded for a specific device node, the device driver 156 preferably passes an entry point that can be called to assign or change hardware configurations.

Upon the completion of data storage, the device node typically will include the device identification code, the logical configuration data, and the assigned resource elements. The device identification code is useful for accessing the hardware tree 152 and maps into a unique entry key for the archival data structure of the registry 153. It will be appreciated that the device information for each device 20 is stored within a corresponding device node to enable all information pertaining to a common device to be maintained in a central storage location with the hardware tree 152.

The device information collected from the devices 20 by the enumerators 150 is used to populate the device nodes of the hardware tree 152. Thus, it will be understood that the enumerators 150 created the device nodes of the hardware tree 152. However, those skilled in the art will appreciate that certain existing interface boards or peripheral devices do not include a mechanism for storing configuration data. Upon identifying these "legacy" devices, at least a part of the hardware tree 152 can be populated when the configuration manager 158 copies information for those devices to the hardware tree 152 from an available information source, such as the device configuration database 160 or text-based information files stored on a mass memory storage device of the computer 8.

Because the hardware tree 152 reflects the identities, resource requirements, and current resource allocations for the existing devices 20, the data stored within the hardware tree 152 can change each time the computer 8 boots with a new hardware configuration or in response either to adding a new device or to removing an existing device. Likewise, the insertion into or withdrawal of the computer 8 from a docking station can modify the data stored by the hardware tree 152. Accordingly, it will be appreciated that the hardware tree 152 is a computer database containing device information which reflects a snapshot of the characteristics for the devices presently installed for operation with the computer 8.

A user can access the device configuration information in the hardware tree 152 to verify the present configuration of its computer. Access to this useful information can be achieved by either local or remote communications means, such as directly from the computer itself or via a network.

In view of the foregoing, it will be understood that the hardware tree 152 is a type of data structure, in memory, which is built and maintained by the configuration manager 158. The hardware tree 152 contains configuration information for all presently installed devices 20 in the computer 8. This allows the configuration manager 158 can access this data structure to keep track of the resources associated with each device 20, such as IRQs, I/O ports, and even non-sharable resources like SCSI identifiers. The hardware tree 152 can describe existing devices and resources, resource requirements, resource interdependencies, and current resource allocations.

The creation of a device node within the hardware tree 152 leads to the loading of an appropriate device driver 156. Although a device driver 156 or other component cannot access the hardware tree 152 or its device nodes directly, these components can retrieve a handle to any device node and carry out tasks that retrieve and set information in the device node. By examining the assigned resource allocation data within a device node, a device driver 156 can determine which resources 14 have been allocated for the represented device 20.

Referring to FIG. 7A, which illustrates the tree-like data structure of the hardware tree 152 for the computer 8 shown in FIG. 1, the hardware tree 152 contains a set of device nodes, including a device node 162 for the local bus, a device node 164 for the ISA bus, a device node 166 for the network card, a device node 168 for the modem card, a device node 170 for the SCSI bus, and a device node 171 for the PCMCIA bus.

A branch between any pair of the device nodes of the hardware tree 152 indicates that the connected device nodes share a common link. For example, upon entering the hardware tree 152, the device node 164 for the ISA bus can be reached only by first passing through the local bus device node 162 and a branch 172. This defines an interconnection between those system busses 18 (FIG. 1), thereby supplying an indication that the ISA bus is connected to the local bus.

Likewise, both the network card and the modem card are connected to the ISA bus because branches 174 and 176 respectively extend from the device node 164 to the device nodes 166 and 168. In similar fashion, a branch 178 extending between the device nodes 164 and 171 indicates that the PCMCIA bus is connected to the ISA bus, and a branch 179 extending between the device nodes 162 and 170 indicates that the SCSI bus is connected to the local bus.

FIG. 7B illustrates the data structure for a representative device node of the hardware tree 152, in this case, the device node 168 for the modem card. Referring to FIGS. 7A and 7B, collectively described as FIG. 7, upon completion of the configuration of the modem card, the device node 168 preferably includes the device identification code, logical configuration data, and assigned resource elements. For the modem card, the device identification code is "*PNP0A00\Modem1234\0". A review of this device identification code indicates that the modem card is connected to the ISA bus, which is represented by the system bus code "*PNP0A00". In addition, the modem card is assigned an identification code "Modem1234\0" and is the first identified modem card of its type on the ISA base as evidenced by the instance number "0". The logical configuration data includes a specified combination of resource elements required for operation of the modem, in this case, the interrupt IRQ3 and the I/O port I/O3F8. This is followed by the assigned resource elements, which, for this example, include this same resource combination of the interrupt IRQ3 and the I/O port I/O3F8.

It will be appreciated that the above description of the attributes for the device node 168 is supplied as a representative example of the information that can be stored within a device node of the hardware tree 152. However, it will be understood that the data stored within the device nodes of the hardware tree 152 can be different because each device node contains data describing the identification and resource requirements for the represented device.

Registry

Returning now to FIG. 6, the registry 153 is a hierarchical, tree-structured database for storing various software and hardware parameters, including device information. The registry 153 is initially stored within the nonvolatile memory of the computer database 16 upon installing the operating system 10 for use on the computer 8. The registry 153 preferably contains hardware archival data, which is a superset of the memory-resident hardware tree 152, and software archival data containing software-related parameters and software driver information. The preferred operating system 10 can use the registry 153 to store information about which drivers should be loaded when a particular device is enumerated, as well as such information as the driver revision number, manufacturer, and potential logical configurations of the device.

In contrast to the hardware tree 152, which contains device information for currently detected devices 20, the registry 153 contains a complete listing of any and all hardware components that have been installed on the computer 8. In this manner, even if a particular device 20 is removed for one session and then available again for the next session, the user will not be required to set-up the device again for the next session because all necessary device information is contained in the registry 153. Thus, if a particular device 20 is removed from the computer 8, the device information for that device 20 remains in archival storage within the registry 153.

Turning now to the preferred tree-like data structure of the registry 153, the operating system 10 stores information about devices and device drivers in the branches of the "HKEY_LOCAL_MACHINE" key (HLM). Initially, the operating system 10 creates registry entries during system setup in response to detecting or enumerating a device 20. A setup utility can copy information about the given device or a compatible device from a matching .INF "device information" file to the registry 153. The .INF file provides the instructions needed to add resource requirements, driver-specific data, and switch settings to the appropriate branches of the registry 153.

A "HLM\ENUM" branch contains information the devices 20 that are presently and were previously installed in the computer 8. The operating system 10 uses this branch during system startup to retrieve information about the enumerated devices 20. If the system cannot find information about a device 20 in this branch, it assumes that new hardware has been installed and automatically invokes a device installer routine, such as the device installer 161a, that creates the necessary entries and install the drivers. Information remains in this branch, even if the corresponding device is removed, so that the necessary information is present if the device is reinstalled.

A "HLM\CONFIG" branch contains information about hardware profiles. A hardware profile is a set of information that defines the hardware, i.e., system-level components, adapter boards, peripheral devices, etc., present in the computer 8. Hardware profiles are typically used in docking systems in which the number and type of devices may be different with each docking station. The typical docking system has one hardware profile for each docking station and one for when it is not docked.

A "HLM\SYSTEM" branch contains detailed information about the available devices 20 and their current configuration. This includes information about each class of device as well as individual devices.

A "HLM\SOFTWARE" branch stores information about application programs and system components. Information for an application program is preferably stored information under its own subkey in the registry 153. The subkey preferably has the general form SOFTWARE\manufacturer\product\version.:

The system-wide database of the registry 153 stores a hierarchical tree of "keys" and "values" in a tree-like data structure. The following keys identify branches of the "HKEY_LOCAL_MACHINE" key or "ROOT" key that contain device-related information within the registry 153:

CONFIG\profile

Contains configuration information for a specific hardware profile. The profile subkey is a 4-digit, hexadecimal number identifying a specific hardware profile.

CONFIG\profile\ENUM\ROOT\device-id\instance-number

Contains configuration information for a specific legacy device for a specific hardware profile. The profile subkey is a 4-digit, hexadecimal number identifying a specific hardware profile. The device-id and instance-number specify the device's ID and an instance number that uniquely identifies the device. This branch may contain an "CSConfigFlags" value, which is a bitmapped field defined as follows:

Bit 0: Device is disabled
Bit 1: Device is removed
Bit 2: Do Not Start

ENUM

Contains information for the legacy devices, the "Plug and Play"-compatible devices adapted for use with the present invention, and the user-installed devices. Initially, this branch receives subkeys and values during system setup.

ENUM\enumerator

Contains a permanent record of all hardware components that have been installed or are presently installed within the computer 8. This information typically includes the list of the devices 20, their resource requirements, and device driver bindings. The enumerator subkey uniquely identifies an enumerator; there is one subkey for each Plug and Play-compatible enumerator 150 of the operating system 10.

ENUM\ROOT

Contains information for all detected legacy devices. The "root" enumerator uses this information to load the device drivers 156 for these components. If ENUM\ROOT identifies a legacy device, the operating system 10 preferably loads the corresponding device driver 156.

ENUM\enumerator\device-id\instance

Contains device-specific information. The enumerator uniquely identifies the enumerator 150 associated with the particular device 20. The device-id is the device identifier for this device, and instance is a string that uniquely identifies a particular instance of the device. This branch contains values such as "DeviceDesc", "Class", "CompatibleIDs", and "Driver". The "Device Desc" value identifies the localized name of a particular device 20. The "Class" value identifies the name of the device class. The "Driver" value identifies the branch that contains information about the device driver 156 to load for a corresponding device or routine.

ENUM\ROOT\device-id\device-number

Contains information for a specific legacy device. The device-id is the device identifier for a particular device 20 and device-number is a 4-digit, hexadecimal number that uniquely identifies an instance of that device. This branch contains values such as "DeviceDesc", "Class", "CompatibleIDs", "BootConfig", and "Driver".

The "Device Desc" value identifies the localized name of a particular device 20. The "Class" value identifies the name of the device class. The "CompatibleIDs" value identifies a list of identification codes for compatible devices. The "BootConfig" value identifies the boot configuration for a particular device 20. The "Driver" value identifies the branch that contains information about the device driver 156 to load for a corresponding device or routine.

ENUM\ROOT\device-id\device-number\LogConfig

Contains logical configuration information for a legacy device. The device-id is the device identifier for the device 20 and device-number is a 4-digit, hexadecimal number that uniquely identifies an instance of that device.

SOFTWARE\vendor-name\product-name\version

Contains information about the given version of a given application program. The vendor-name is preferably be a unique name identifying the manufacturer. The product-name also should uniquely identify the application program. The version identifies the given version of the application program. This data field also can be set to "CurrentVersion" to indicate the most recent current version if multiple versions of the application program reside on the computer. This branch contains zero or more application-specific subkeys and values.

SYSTEM\CurrentControlSet\Control\IDCONFIGDB

Identifies the hardware profile database. This branch contains one or more keys that identify instances of hardware-profile information. This branch contains values such as "CurrentConfig", "FriendlyNamexxxx", and "Map". The "CurrentConfig" value identifies the current hardware profile. The "FriendlyNamexxxx" value specifies a user-defined name for a given hardware profile. The "Map" value specifies an ID-to-Hardware-Profile for a system.

SYSTEM\CurrentControlSet\Services\Class

Contains information about detected or "enumerated" devices. This branch contains zero or more subkeys. Each corresponds to the registry-path given in the "Driver" value of a corresponding ENUM\enumerator\device-id\instance or ENUM\ROOT\device-id\instance branch.

SYSTEM\CurrentControlSet\Services\Class\device-class

Contains information about a specific device class. The device-class is the unlocalized name for the class. This branch contains values such as "Installer", "Icon", and "EnumPropPages". This branch also contains an unnamed value that specifies the localized name of the class to present to the user during device installation The "Installer" value specifies the name of the class installer for the device class. The "Icon" value specifies the icon used to represent the class installer within the control panel of the operating system 10. The "EnumPropPages" value specifies the name of the property page handling function for this device class.

SYSTEM\CurrentControlSet\Services\Class\device-class\instance

Contains information about a specific device or routine within the given class. The device-class is the class name; the instance is a 4-digit, hexadecimal number. This branch contains values such as "DriverDesc", "DevLoader", and "Enumerator".

The "DriverDesc" value identifies the localized name of a particular device driver 156. The "DevLoader" value identifies the device loader associated with a device. A device loader is responsible for loading the device driver(s) 156 at the correct time and in the proper order, and for making initialization calls. The "Enumerator" value identifies the enumerator 150 associated with this device.

SYSTEM\CurrentControlSet\Services\VxD

Contains information about static virtual devices, that is, those virtual devices which are loaded with the operating system 10 rather than being dynamically loaded. This branch is used to identify virtual devices, such as the configuration manager 158 ("CONFIGMG"), which are not associated with a specific component.

SYSTEM\CurrentControlSet\Services\VxD\device-class

Contains information about device drivers 156 and other system components that do not necessarily have corresponding devices. The device-class is the class name of the virtual device. This branch contains values such as "Start" and "StaticVxD".

The "Start" value indicates whether the given virtual device should be started. The "StaticVxD" value identifies a static virtual device.

The preferred operating system 10, the Microsoft "WINDOWS" operating system, provides real-mode access to the registry 153 to allow its use during boot-up prior to switching to the protected mode of operation.

FIG. 8 shows a representative example of the tree-like data structure for the registry 153. Referring to FIGS. 6 and 8, a ROOT key 180, also described as the "HKEY_LOCAL_MACHINE" key, includes two branches, the software archive 182, which contains software archival data, and the hardware archive 184 containing hardware archival data. The software archive 182 contains information related to location and identity of various program files, including the device drivers 156. The hardware archive 184 can contain hardware-related information, including the identity of detected devices; any user-defined configuration; the "last working configuration"; and information concerning the loading of device drivers. The information maintained by the software archive 182 and the hardware archive 184 is organized into logical classes and additional branches extending from the archive branches are associated with the classes or categories of this information.

Focusing on the hardware archive 184 in FIG. 8, an ENUM branch 186, which represents the enumerators 150 for the operating system 10, extends from the hardware archive 184. Under the ENUM branch 186, each enumerator 150 is assigned its own branch, with one "child" device or device branch extending from the enumerator branch for each device it has ever enumerated and set-up. In addition, one enumerator branch, the "ENUM\ROOT" branch, contains entries for legacy devices, i.e. the non-Plug and Play-compatible hardware for which there is no enumerator 150. Most of the information for legacy devices is provided either by the .INF device information file that is provided with the legacy device or directly by the device's setup module.

The ENUM branch 186 includes the enumerator branches 188, 190, 192, and 194, which define the respective enumerators 150 for the root, the modified BIOS program (SysBIOS), the ISA bus (ISAENM), and the SCSI bus (SCSIENM). It will be understood that the device identification codes, which are assigned by each enumerator 150 to the detected devices 20, operate as a key to the corresponding entries in the hardware archive 184 of the registry 153.

The registry 153 also contains device branches for each of the devices 20 that have been installed during both past and present operations of the computer 8. These tree-like device branches, which can extend from each of the enumerator branches, such as the branches 188, 190, 192, and 194, represent the past and present devices of the computer 8. The device branches preferably contain pertinent device-related data, including an identification code, logical configuration data, and a pointer to the device driver for that device. Accordingly, the device branches, such as the branches 196 and 198, represent the archival device-related information for devices that have operated in the past or at present with the computer 8 and can extend from each of the enumerator branches 188, 190, 192, 194.

The root branch 188, which extends from the ENUM branch 186, can include device branches representing device-related information for existing devices 20 that lack a mechanism for storing the identification code and the resource usage data. These devices, which are typically referred to as legacy or static devices, can be represented by branches extending from the root branch 188. In similar fashion, the SysBIOS branch 190, otherwise referred to as the system BIOS branch, also extends from the ENUM branch 186 and can include device branches representing the system-level devices located on the motherboard of the computer 8. In addition, the SCSI branch 194, which extends from the ENUM branch 186, can include device branches representing device-related information for SCSI bus-compatible devices. Although it will be recognized that a personal computer is operable with system-level devices and one or more legacy devices and/or SCSI-compatible devices, device branches for these types of the devices 20 are not shown in FIG. 8 to simplify the illustration of the registry 153.

Device branches 196 and 198, which extend from the ISAENM branch 192, are examples of typical device branches and represent the devices 20 that have been or are at present connected to the ISA bus. It will be appreciated that the device branches 196 and 198 represent typical devices connected to the ISA bus in the computer 8 and are shown in FIG. 8 as examples of the device branch concept for the registry 153.

The Modem1234\0 branch 196, which extends from the ISA bus branch 192, indicates that a single device, in this case, the modem card having the identification code "Modem1234\0", is (or has been) connected to one of the system busses 18 (FIG. 1), namely the ISA bus. In general, the identification code can represent the manufacturer's identity, the model of the corresponding device, and the instance number. For this example, the manufacturer is "Modem", the model is "1234", and the instance number is "0".

The PCMCIAENM branch 198 extending from the ISA bus branch 192 indicates that another device 20 having the device identification code PCMCIAENM is (or has been) connected to the ISA bus. This device identification code indicates that the detected device 20 is actually another bus, specifically the PCMCIA bus, which is capable of supporting the connections of additional devices 20. Thus, the branch 198 also represents an enumerator branch because an enumerator 150 is assigned for the enumeration of any of the devices 20 connected to the PCMCIA bus. If the PCMCIA bus represented by this device branch is the parent for "children" devices, then the PCMCIAENM branch 198 can include device branches representing such devices oil the PCMCIA bus.

Arbitrators

Returning again to FIGS. 1 and 6, it will be seen that each of the arbitrators 154 is assigned to a particular resource 14. Arbitrators 154 operate to determine the assignments for their respective resources 14 in view of the resource requirements and dependencies for the devices 20 connected to the computer 8. The arbitrators 154 are programmed to recognize the characteristics of their assigned resources 14, including the specific elements of the corresponding resources. For example, the arbitrator 154 for the I/O ports 28 has a built-in knowledge base which confirms that a conflict can occur when assigning 16-bit addresses if the computer 8 is configured with one or more devices 20 that are performing 10-bit decoding operations. In addition, the arbitrators 154 preferably maintain a table of reserved resource elements to insure compatibility with the fixed designs of existing computer components. Reserved resource elements are generally available for use by certain devices 20 that are known to require the use of such resource elements.

In response to a potential working configuration for the detected devices 20, each arbitrator 154 operates to allocate its respective resource elements to the various devices 20 that require use of such resources during computer operations. For the computer 8, the arbitrators 154 are assigned to handle access to the message addresses for the memory 22, the interrupts 24, the DMA channels 26, and the I/O ports 28. The arbitrators 154 are implemented as individual components that are separate from the remaining portion of the operating system 10 to allow the extension of the preferred operating system to other possible resources of a personal computer.

The arbitrators 154 work in tandem with the configuration manager 158 to complete the allocation and assignment of resources 14 to the devices 20. For a selected arbitrator 154, the configuration manager 158 supplies one or more possible configurations of elements of the corresponding resource 14. This possible configuration is based upon the device information acquired for all of the devices 20 of the computer 8. It will be appreciated that the resource portion of this device information, which can specify resource ranges, particular resource elements and resource dependencies for the devices, will support the prioritized ranking of possible configurations by the configuration manager 158.

For a selected resource 14, if a working configuration solution is developed by the corresponding arbitrator 154, then the resulting resource element assignments are supplied to the configuration manager 158 to enable the allocation of the assigned resource elements to the proper devices 20. However, if a potential resource conflict for a resource element is located by the arbitrator 154, then an error flag is set to advise the configuration manager 158 that a working configuration is not available for this possible configuration. In this event, the configuration manager 158 can either supply an alternative configuration to this arbitrator 154, if available based upon the device information, or can supply a message to the user that requests user input to resolve a resource conflict. Thus, it will be appreciated that the arbitrators 154 develop resource assignments for their respective resources 14 in an iterative fashion based upon the collected device information.

The structure of and the operations conducted by the arbitrators 154 will be described in more detail below with respect to FIGS. 12 and 13.

Device Drivers

Device drivers 156 support communications between the devices 20 and the computer 8. For proper computer operations, each device 20 is represented by a corresponding device driver 156. Certain device drivers 156, known as compatible device drivers, are useful for supporting more than one device 20. Information for the device drivers 156 is stored within the registry 153 or can be accessed by reading certain configuration files of the preferred operating system 10, such as the text-based information files called .INF files.

Configuration Manager

The configuration manager 158, which is implemented as a VxD, controls the various configuration tasks conducted by or involving the enumerators 150, the hardware tree 152, the registry 153, the arbitrators 154, and the device drivers 156 (and device loaders). The configuration manager manipulates three primary data sources, including the device nodes of the hardware tree 152, the hardware tree itself, and the registry 153. When the computer 8 boots, the configuration manager 158 instructs the enumerators 150 to identify the devices 20 of the computer 8, thereby enabling the acquisition of device information for those devices. The configuration manager 158 subsequently examines the device nodes of the hardware tree 152 and, for the devices 20 that are newly installed, will direct the transfer of device information to the registry 153 for archival storage.

The configuration manager 158 also controls the acquisition of appropriate device drivers 156 in response to the stored device information and directs the allocation of the resources 14 in response to the resource assignments supplied by the arbitrators 154. Assigned resources are distributed by the configuration manager 158 to the appropriate enumerators 150 to support the resource allocation operation. To complete the configuration process, the configuration manager then controls the loading of the device drivers 156. Accordingly, it will be appreciated that the configuration manager 158 effectively controls the configuration operations by operating as a "traffic cop" to direct the operations conducted by the other components of the operating system 10.

Device Configuration Database

The device configuration database 160, which is typically implemented as one or more files of the operating system 10, contains information about known computer components, including certain devices 20, and their configuration requirements. Upon loading the operating system 10 on the computer 8, this program file is preferably stored on a computer mass storage memory device, such as a fixed disk.

Unlike the registry 153, the information stored in the device configuration database 160 does not necessarily represent data about the set of devices 20 that have been connected at one time or another for operation with the computer 8. Instead, the device configuration database stores general component-level information about existing devices that can be installed for operation with a conventional personal computer, such as the computer 8.

The configuration manager 158 can access the device configuration database 160 for each newly installed device represented in the hardware tree 152 and, if available, copies relevant information concerning the identified device into the registry 153. The relevant information, which typically includes compatible device information and known resource requirements and dependencies, is maintained in the registry 153 by linking this information to the identification code for the identified device 20. Thus, it will be understood that the identification code operates as an entry key for the device configuration database 160.

In addition, during the initial set-up of the operating system 10, information is preferably obtained from the device configuration database 160 for known "legacy" computer components that can be installed for operation with a conventional personal computer. Thus, this device information is preferably stored in the device configuration database 160 and, during the initial set-up of the operating system 10, transferred to the registry 153 under the root branch 188, as illustrated in FIG. 8.

Device information (.INF) files provide the information that the operating system 10 needs to install a given device and its associated software. These files can be maintained within the device configuration database 160. Each .INF file is a collection of sections which describe a particular device 20, the resources 14 required by that device, and the installation procedure. An .INF file for a hardware component preferably includes the sections described below.

Version section

Contains a header that identifies the .INF file and the class of device 20 which this .INF file supports.

Class section

Defines a new class for the device 20.

Manufacturer and Manufacturer Name sections

Lists all the individual manufacturers of the devices 20 identified in the .INF file and lists devices associated with each of those manufacturers. These entries are displayed directly to the user and can be used to generate the appropriate entries within the registry 153. This section preferably contains at least one manufacturer.

Install section

Describes the device driver 156 and physical attributes of the device 20. It also identifies the names of all Installation sections that contain information and instructions for installing this device.

Miscellaneous Control Sections

Specifies how a device 20 is handled by the user interface of the operating system 10.

Strings section

Defines all local strings used in the .INF file.

Each section typically starts with a section name enclosed in brackets. Section names are preferably unique. Each section can contain one or more entries. Typically, an entry is a keyname and a value separated by an "=" sign.

Many of the fields defined in the .INF can be written to the registry 153. Because much of the registry 153 is binary data and the .INF file is formatted as text, the .INF permits "ASCII Binary" values, i.e., values which are written as text but represent hex data in Intel byte order. This allows binary data to be moved directly to the registry 153 from an .INF file. An ASCII Binary data record can be extended beyond the 128 byte line limit in the .INF by using a backslash (\) character.

.INF files also can contain comments. Any string of text up to the end of line which begins with a semicolon is treated as a comment. A comment can start anywhere on a line. Comments are preferably not used on a line with ASCII Binary data that also uses a continuation mark.

The registry 153 can be set-up when a device 20 is first installed within the computer 8 and recognized by an enumerator 150 for a system bus 18. This is initiated in response to the creation by the configuration manager 158 of a device node which includes a device ID that is not contained in the registry 153. If this device has not been previously configured, the configuration manager 158 calls a device manager to set-up the registry 153 for the particular device 20. The device manager will look up the device ID entry in the appropriate .INF file and obtain the resource information for device drivers which already exist in the default directory for device drivers 156. If a "default" device driver is found, its configuration information is copied to the registry 153 and this device driver is loaded. If no device driver 156 is found within the default directory, then the user is preferably prompted to initiate an installation process.

Device Manager

The operating system 10 uses a number of components or routines to control various classes of the devices 20. Classes identify logical device-types such as a display, a keyboard, or a network system. Because each subsystem has a different driver architecture, different user options, and different compatibility constraints, it is difficult to develop a single utility support installation for all possible types of the devices 20. Instead, each class is responsible for providing its own installer.

A single installer 161 often can support installation of both the class and individual devices. However, this typically depends on the class and, in some cases, separate device installers are used. Typically, the installer 161 is combined with the control panel applet (.CPL) for the given class, although this is not a requirement. Whether the installer 161 is combined with the applet or is a separate dynamic-link library (DLL), the device manager 159 controls and directs the action of the installer 161.

The device manager 159, which is preferably represented on the display screen by a control panel applet, is responsible for displaying dialog boxes to the user. These dialog boxes prompt for information about adding and modifying device drivers 156. The device manager 159 is also responsible for installing any device drivers 156 for devices 20 enumerated during the operation of the configuration manager 158.

The device manager 159 relies on the device installers 161a and class installers 161b to display the appropriate dialog boxes or to carry out appropriate installation tasks. Although the device manager 159 gives the installer 161 full control of the installation process, in most cases, the installer 161 simply directs the device manager 159 to complete the task for it. The installer 161 can insert additional configuration dialogs, hardware detection, and other features into the process as is appropriate for a class.

The operating system can define a set of "default" device classes and provides corresponding class installers 161b for these classes. The device manager 159 can use the default class installers 161b to install devices 20 belonging to these default classes. As shown in Table 2, representative default classes include:

TABLE 2

| Adapter | Default device install |
|---|---|
| Printer | MSPRINT.DLL |
| CDROM | Default device install |
| Disk Drives | Default device install |
| Sound video and game controllers | Default device install |
| Keyboard | Default device install |
| System Devices | sysclass.dll |
| Multi Functions Cards | Default device install |
| Modem | Modem.Cpl |
| Monitor | Default device install |
| Display adapters | SetupX.Dll |
| Floppy disk controllers | Default device install |
| Hard disk controllers | Default device install |
| Mouse | SetupX.Dll |
| Ports (COM & LPT) | Default device install |
| Network adapters | netdi.dll |
| PCMCIA Socket | PCCard.dll |
| SCSI controllers | Default device install |
| Unknown Hardware | sysdm.cpl |

The device manager 159 can add new classes to the operating system 10 if a given .INF file specifies a "ClassInstall" section, and this class of devices 20 has not been previously installed on the computer 8.

Referring now to FIGS. 1, 6 and 7, the configuration tasks are preferably conducted in phases. During the real-mode boot process, the devices 20 preferably uses only static configurations; however, dynamic resource allocation or arbitration can be provided as an option for "plug & play" devices which are adapted for use with the present invention and are required for booting the system. In general, the modified BIOS will configure the devices 20 on the motherboard of the computer 8, i.e., system-level components, in a static configuration process because the configuration parameters for these devices are known and remain constant. The modified BIOS also will access non-volatile memory to determine which devices 20 on the integrated bus 15, such as the ISA bus, should be enabled, where their option ROMs should be mapped, and what I/O, DMA, and other assignments to give to each of these devices. All cards that do not have a configuration stored in non-volatile memory are preferably disabled by the modified BIOS to eliminate the chance of a configuration conflict.

When the boot process begins, the system remains in real mode. For this preferred process of real-mode initialization, the computer hardware profile is determined, the CONFIG.SYS and AUTOEXEC.BAT files are processed, and the real mode loader is started. A hardware profile for the computer 8 is preferably generated after the BIOS bootstrap and subsequent to execution of the CONFIG.SYS file. This hardware profile detection process combines interrupt checksums, BIOS COM/LPT data, BIOS machine identification data, BIOS docking station data, and, if available, docking station data which is unique to each OEM to build a 2 byte value called the current hardware profile. In general, the hardware profile supports the calculation of a current configuration for a docking-type computer. There is no automated device enumeration at this phase of the boot process. Drivers that need to be loaded must be explicitly specified by the CONFIG.SYS or AUTOEXEC.BAT files maintained on the mass storage device of the computer 8.

Next, the VMM32.VxD (virtual device driver) real mode loader can load base drivers specified in the registry 153, static VxDs for devices enumerated by other VxDs, and static VxDs specified in the SYSTEM.INI file, which is maintained on the mass storage media device of the computer 8. Base drivers can include the static VXD for the configuration manager 158, as well as the static VxD for the V86 memory manager. Static virtual devices can open and retrieve values from the registry 153 during the real mode initialization. Accordingly, the root enumerator is loaded during this phase. At this time, the root enumerator can scan the registry 153 for entries associated with legacy devices and construct device nodes within the hardware 152 to represent these devices. If BIOS had not already configured these devices, then the root enumerator can support their configuration. In addition, the ISA enumerator will be loaded during this phase if an ISA bus exists as the integrated bus 15 in the computer 8. Likewise, the BIOS enumerator is loaded if the machine has a modified "Plug and Play"-compatible BIOS. Both the ISA enumerator and the BIOS enumerator are preferably loaded based upon locating corresponding entries within the registry 153.

Upon completing the loading of real mode drivers and static VxDs in the memory 22, the kernel of the operating system 10 has completed its initialization and thereafter switches to protected mode. In this phase, the configuration manager 158 is initialized. The configuration manager 158 imports device identifier information from the real-mode loader. In turn, device nodes in the hardware tree 152 are created by the enumerators 150, resources 14 are allocated, and device drivers are loaded and initialized to support the configuration of the computer 8.

In view of the foregoing, it will be understood that the modified BIOS program of the computer control system 21 initiates the detection of the devices 20 that are system-level devices on the motherboard of the computer 8. Although a device node will be formed and stored within the hardware tree 152 for each of the system-level devices, most of these device nodes are not shown in FIG. 7 to simplify this explanation of the configuration phases. Thus, for the purpose of this discussion, only the computer local bus 13 and the integrated bus 15, specifically the ISA bus, are considered as being identified by the operation conducted by the BIOS enumerator 150 for the modified BIOS program.

As shown in FIG. 7, the device identification codes for the local bus and the ISA bus are respectively "Root\Root\" and "Root\*PNP0A00\0". Focusing specifically on the device node 164 for the ISA bus, the system bus code is "Root" and the identification code is "*PNP0A00\0".

After enumerating the system-level devices on the motherboard and detecting the integrated bus 15, device-related information is stored in the hardware tree 152 for the existing legacy devices that were designed for use with conventional personal computers. The legacy devices are preferably added to the hardware tree 152 under the local bus device node 162. Thus, the device node 170 for the SCSI bus is added at this time to the hardware tree 152 because the SCSI bus is considered to be an existing legacy-type device. For the device node 170, the system bus code is "Root" and the identification code is "EISAID," which in combination form the device identification code "Root\EISAD\0." At the conclusion of this configuration phase, the hardware tree 152 contains the device nodes 162, 164 and 170, and the registry 153 has been updated as necessary to reflect any new device information contained in the hardware tree 152.

The configuration manager 158 then examines the hardware tree 152 for the entries associated with each device node of the hardware tree 152 and determines the set of devices 20 previously identified by the first configuration phase. In view of the entries for the system busses 18, specifically the ISA bus and the SCSI bus, the configuration manager 158 instructs the assigned enumerators 150 to conduct enumeration operations for the ISA bus and the SCSI bus. For the ISA enumerator, device information is acquired for each of the devices 20 directly connected to the ISA bus, specifically the adapter boards implemented by network card and the modem card, and a system bus 18, the PCMCIA bus. Thus, three new device nodes, the device nodes 166 (network card), 168 (modem card), and 171 (PCMCIA bus) are now added to the hardware tree 152 under the respective device identification codes "*PNP0A00\Net\0", "*PNP0A00\Modem\0", and "*PNP0A00\PCMCIA\0".

In response to the identification of the additional devices 20, the entries in the registry 153 also are updated to reflect the detection of newly installed devices as required. In turn, the appropriate device drivers 156 are identified for the network card and the modem card, as well as the detected busses. The configuration manager 158 will then load the device loader (not shown) for each of these devices 20 based on information in the registry 153. For the example of the PCMCIA bus, the device loader for this device 20 can be contained in the enumerator 150 for the PCMCIA bus.

The configuration manager 158 then instructs the appropriate arbitrators 154 to develop an assignment for the resources 14 based on the resource requirements and constraints for the detected devices 20. In particular, the configuration manager 158 calls a selected arbitrator 154 and, if it returns a valid resource allocation, then the configuration manager 158 will call the next arbitrator 154 until all resources are properly allocated. If an invalid allocation is returned by one of the arbitrators 154, the configuration manager 158 initiates a new round of exchanges with the arbitrators 154 based on other possible configurations supported by the various devices 20. The assigned elements of the resources 14 will be supplied by the configuration manager 158 to the detected devices 20 via the abstraction layer supplied by the enumerators 150.

Upon a determination of a proper working configuration and assignment of the necessary resources, the configuration manager 158 will instruct an associated device loader program (not shown) to load the identified device drivers 156, thereby enabling the operation of the network card and the modem card with the computer 8 (as well as the detected busses).

In view of the foregoing, it will be understood that a similar configuration process would be completed for the devices 20 connected to the PCMCIA bus and the SCSI bus of the computer 8. For example, the devices 20 connected to the sockets of the PCMCIA bus, which is typically installed as an adapter card connected to the ISA bus, are enumerated after configuration of the devices 20 on the ISA bus. Specifically, the configuration manager 158 calls an PCMCIA enumerator 150 to enumerate the devices on the sockets of the PCMCIA bus. For each detected device, a device identification code, also described as a device ID, is generated based on the tuples maintained on the board representing the device. In addition, logical configuration data preferably will be created based on the tuples on the PCMCIA-compatible card. As part of the enumeration process, the PCMCIA enumerator 150 creates device nodes within the hardware tree 152 for each of the devices 20 associated with the cards in the PCMCIA sockets. As described above with respect to the ISA bus, these additional device nodes for the hardware tree 152 support the configuration of the devices 20 connected to the sockets of the PCMCIA bus Application Programming Interfaces Referring still to FIGS. 1, 6, and 7, the operations implemented by the computer 8 are supported by the modules of the operating system 10, including the enumerators 150, the hardware tree 152, the registry 153, the arbitrators 154, the device drivers 156, the configuration manager 158, and the device configuration database 160, and the computer control system 21. Specifically, the operating system 10 comprises a plurality of computer software programs and at least one program is associated with each of the components 150, 152, 153, 154, 156, 158, and 160. Those persons skilled in the art will understand that the described computer-implemented processes can be coded as computer software programs using known software development techniques.

An Application Programming Interface (API) is a defined set of functions supplied by a computer program, such as operating system, for use by an application program or by other routines of the operating system. As described below in detail, API functions have been defined for the preferred "WINDOWS" operating system to implement services offered by the configuration manager 158, the registry 153, and the device manager 159.

Configuration Manager APIs

It will be appreciated that the configuration manager 158 is the central component of the "Plug and Play" architecture for the present invention. Working in conjunction with other components, the configuration manager 158 finds workable configurations for all devices of the computer 8 so that each device 20 can use its assigned resources 14, including IRQ number, I/O port addresses, and other resources 14, without conflict with other devices 20. The configuration manager 158 also helps monitor the computer 8 for changes in the number and type of devices 20 present in the computer and manages the reconfiguration of the devices 20 as needed when changes take place. The present configuration of the computer 8 is represented by the hardware tree 152. The device nodes in a hardware tree 152 are preferably arranged hierarchically, i.e., a device node is either at the root of the hardware tree 152 or is the child of a parent device node. A device node can have child device nodes. The other children of a device node's parent can be described as siblings. The configuration manager 158 provides services and messages that the enumerators 150, arbitrators 154, device loaders (not shown), and device drivers 156 use to create and maintain the computer configuration.

The services supplied by the configuration manager 158 to carry out tasks on a device node or "devnode" within the hardware tree 152 can include the following:
CONFIGMG_Create_DevNode
CONFIGMG_Disable_DevNode
CONFIGMG_Enable_DevNode
CONFIGMG_Get_Child
CONFIGMG_Get_Depth
CONFIGMG_Get_Device_ID
CONFIGMG_Get_Device_ID_Size
CONFIGMG_Get_DevNode_Status
CONFIGMG_Get_Parent
CONFIGMG_Get_Sibling
CONFIGMG_Locate_DevNode
CONFIGMG_Move_DevNode
CONFIGMG_Query_Remove_SubTree
CONFIGMG_Reenumerate_DevNode
CONFIGMG_Remove_SubTree
CONFIG MG_Remove_Unmarked_Children
CONFIGMG_Reset_Children_Marks
CONFIGMG_Setup_DevNode A logical configuration, which is also described as logical configuration data, is a description of the resources required by a device 20 to operate successfully within the computer 8. Any given device 20 can have several possible logical configurations. The configuration manager 158 uses the logical configurations of a device 20 to determine how to allocate resources among competing devices. The configuration manager 158 provides services that the enumerators 150, device drivers 156, and other components can use to examine and create logical configuration data.

These logical configuration services can include:
CONFIGMG_Add_Empty_Log_Conf
CONFIGMG_Free_Log_Conf
CONFIGMG_Get_Alloc_Log_Conf
CONFIGMG_Get_First-Log_Conf
CONFIGMG_Get_Next_Log_Conf
CONFIGMG_ISAPNP_To_CM
CONFIGMG_Read_Registry_Log_Confs The device drivers 156 typically use the CONFIGMG_Add_Empty_Log_Conf service to create empty logical configurations in which they can fill their explicit resource requirements. The device drivers 1 56 and other components use the CONFIGMG_Get_First_Log_Conf and CONFIGMG_Get_Next_Log_Conf services to check all logical configurations associated with a device node of the hardware tree 152. A device driver 156 uses the CONFIGMG_Get_Alloc_Log_Conf service to retrieve its assigned (allocated) resources 14.

A resource descriptor describes the resources 14 defined in a logical configuration. There are resource descriptors for each of the resources 14, including memory 22, I/O ports 28, DMA channels 26, and IRQs 24. Other resource descriptors can be created as needed to identify other types of resources 14 that may be available to the devices 20.

Memory resource descriptors identify address ranges of the memory 22. The descriptor contains a MEM_DES structure that describes the memory 22 and an array of MEM_RANGE structures that identify the possible memory configurations.

I/O port resource descriptors identify address ranges for the I/O port 28. The descriptor contains an IO_DES structure that describes the IO port 28 and and array of IO_RANGE structures that identify the possible port configurations.

DMA channel resource descriptors identify a set of DMA channels 26. The descriptor is a DMA_DES structure that identifies the alternative DMA channels 26 that a device 20 can use.

IRQ resource descriptors identify a set of IRQs 24. The descriptor is a IRQ_DES structure that identifies the alternative IRQs 24 that a device 20 can use and whether the IRQ can be shared.

The configuration manager 158 provides services that device drivers 156 and other components can use to examine and these modify resource descriptors. The services can include:
CONFIGMG_Add_Res_Des
CONFIGMG_Free_Res_Des
CONFIGMG_Get_Next_Res_Des
CONFIGMG_Get_Res_Des_Data
CONFIGMG_Get_Res_Des_Data_Size
CONFIGMG_Modify_Res_Des When working with resource descriptors for the I/O port 28, the IOR_Alias and IOR_Decode values specify the port aliases that a device 20 responds to. A port alias is an address that the device 20 responds to as if it were the actual address of an I/O port 28. The alias field also can be set to zero to indicate that no aliases are required; in this case, the decode field is ignored.

A device loader can load and manage the device drivers 156 and enumerators 150 for a given device node of the hardware tree 152. Device loaders are typically used when the devices 20 are managed by various layers of device drivers 156. A device loader is useful for coordinating the work of the various layers and carrying out general configuration tasks that apply to the device drivers 156. The configuration manager 158 provides services that the device loaders can use to complete their tasks, including the following services:

CONFIGMG_Get_DDBs
CONFIGMG_Get_Private_DWord
CONFIGMG_Load_DLVxD
CONFIGMG_Register_DevLoader
CONFIGMG_Set_Private_DWord A device loader may register itself by using the CONFIGMG_Register_DevLoader service. This associates the device loader with the given device node. The device loader can also load an enumerator 150 and device driver 156 for the given device node or any child device nodes by using the CONFIGMG_Load_DLVxD service. It can also retrieve and assign private values to device nodes by using the CONFIGMG_Get_Private_DWord and CONFIGMG_Set_Private_DWord services.

The device descriptor block can be retrieved for a dynamically loaded virtual device associated with a device node by using the CONFIGMG_Get_DDBs service.

The enumerators 150 locate and identify devices 20 adapted for operation with the present invention, i.e., "Plug and Play"-compatible devices, and retrieve information about these devices 20 to construct the hardware tree 152. The configuration manager 158 provides services for registering the enumerators 150, as well as services that these enumerators can use to carry out their enumeration tasks. In particular, an enumerator 150 can register an enumeration handler function by using the CONFIGMG_Register_Enumerator service. The configuration manager 158 sends an enumeration message to this handler whenever it needs the corresponding enumerator 150 to carry out a task.

The enumeration services can include:
CONFIGMG_CallBack_Enumerator
CONFIGMG_Get_Bus_Info
CONFIGMG_Register_Enumerator
CONFIGMG_Set_Bus_Info The enumeration messages can include:
CONFIG_ENUMERATE
CONFIG_FILTER
CONFIG_REMOVE
CONFIG_START
CONFIG_STOP
CONFIG_TEST The enumeration handler preferably returns the message CR_DEFAULT for any messages that it does not process.

As previously described, the enumerators 150 are responsible for creating device identifiers or device identification codes for the devices 20 that they locate or detect within the computer 8. Each device identifier is preferably an unique identifier that is consistently used by each system boot. The character string is preferably constructed so that it can serve to identify a unique entry in the registry 153. This string preferably starts with the enumerator's name, typically the system bus code for the bus associated with this enumerator, followed by a backslash symbol and an identification code. For example, the ISA bus enumerator starts all device identifiers with "ISAPNP\".

A device driver 156 can control and manage hardware components and certain software routines of the computer 8. The device drivers 156 are responsible for identifying the specific resource requirements of the given device 20 and for setting the device to operate with the configuration assigned by the configuration manager 158. The configuration manager 158 provides services and messages that a device 20 can use to carry out its tasks. In particular, a device driver 156 can register a configuration handler function by using the CONFIGMG_Register_Device_Driver service. Once the handler is registered, the configuration manager 158 sends it configuration messages whenever it needs the device driver 156 to carry out a configuration task.

The device driver services can include:
CONFIGMG_CallBack_Device_Driver
CONFIGMG_Get_Device_Driver_Private_DWord
CONFFIGMG_Register_Device_D river
CONFIGMG_Set_Device_Driver_Private_DWord The configuration messages can include:
CONFIG_ENUMERATE
CONFIG_FILTER
CONFIG_REMOVE
CONFIG_START
CONFIG_STOP
CONFIG_TEST A device driver 156 preferably returns the message CR_DEFAULT for any configuration messages it does not process.

The arbitrators 154 support the resolution of resource conflicts between devices 20 in the computer 8. An arbitrator 154 reviews a list of requirements for the devices 20 and finds the best allocation of resources 14 to satisfy the resource needs of these devices. The configuration manager 158 provides services and messages to support the operation of arbitrators 154. In particular, the arbitrators 154 register an arbitrator handler function with the configuration manager 158 by using the CONFIGMG_Register_Arbitrator service. Once registered, this handler receives arbitration messages from the configuration manager 158 whenever resolution of a conflict for the corresponding resource is needed.

These arbitrator services can include:
CONFIGMG_Register_Arbitrator
CONFIGMG_Deregister_Arbitrator
CONFIGMG_Query_Arbitrator_Free_Size
CONFIGMG_Query_Arbitrator_Free_Data The arbitration messages can include:
ARB_FORCE_ALLOC
ARB_QUERY_FREE
ARB_RELEASE_ALLOC
ARB_REMOVE
ARB_RETEST_ALLOC
ARB_SET_ALLOC
ARB_TEST_ALLOC The arbitration handler preferably returns the message CR_DEFAULT for any messages it does not not process.

A range list is a sorted list of I/O port 28 or address ranges for memory 22 (in DWORD form) in which no two ranges overlap. The arbitrators 154 that manage the I/O ports 28 and memory 22 use the range list services to discover whether a given I/O port or memory range conflicts with any other range. These services detect attempts to create range lists containing overlaps and either fail or create merged ranges where there would have been overlaps. Each range must specify a contiguous range of addresses, but the range list itself can contain multiple ranges, none of which necessarily need to be contiguous with any other range in the list.

The range list services can include:
CONFIGMG_Create_Range_List
CONFIGMG_Add_Range CONFIGMG_Delete_Range
CONFIGMG_Test_Range_Available
CONFIGMG_Dup_Range_List
CONFIGMG_Free_Range_List
CONFIGMG_Invert_Range_List
CONFIGMG_Intersect_Range_List
CONFIGMG_First_Range
CONFIGMG_Next_Range
CONFIGMG_Dump_Range_List The device drivers 156 and other components can store information about a given device node of the hardware tree 152 as an entry in the registry 153. In addition, they can retrieve information about a device node stored as an entry in the registry 153 by the configuration manager 158. The registry services can include:

CONFIGMG_Get_DevNode_Key
CONFIGMG_Get_DevNode_Key_Size
CONFIGMG_Read_Registry_Value
CONFIGMG_Write_Registry_Value A hardware profile is a set of information that defines the hardware components present in the computer 8. Hardware profiles are typically used in docking systems in which the number and type of devices may be different with each docking station. The typical docking system has one hardware profile for each docking station and one for when it is not docked.

When the system boots, docks or undocks, each enumerator 150 reenumerates its devices, determining what is available and creating or removing device nodes to reflect that availability. The enumerator 150 uses the hardware-profile services to create and maintain the hardware profiles for the system. These services can include:

CONFIGMG_Fail_Change_HW_Prof
CONFIGMG_Get_HW_Prof_Flags
CONFIGMG_Query_Change_HW_Prof
CONFIGMG_Recompute_HW_Prof
CONFIGMG_Set_HW_Prof
CONFIGMG_Set_HW_Prof_Flags The hardware-profile flags apply to each device node of the hardware tree 152 and identify whether the device node should be created for a given profile. The hardware-profile flags can be obtained and set with the CONFIGMG_Get_HW_Prof_Flags and CONFIGMG_Set_HW_Prof_Flags services.

Device drivers 156 and other components use the miscellaneous services to carry out various support tasks or debugging. These services include:

CONFIGMG_Call_At_Appy_Time
CONFIGMG_Set_Private_Problem
CONFIGMG_Get_CRC_CheckSum
CONFIGMG_Get_Version
CONFIGMG_Lock
CONFIGMG_Process_Events_Now
CONFIGMG_Unlock
CONFIGMG_Yield This following Tables 3-7 respectively describe the services, callback functions, messages, structures, and constants for the configuration manager 158.

Table 3: Configuration Manager Services

Table 3 describes the configuration manager services for the preferred WINDOWS operating system. Each description of a service can include the following information: a function description, a structure, a return value, parameters, comments, and references to other related services.

CONFIGMG_Add_Empty_Log_Conf

Creates an empty logical configuration that has no resource descriptor.
CONFIGRET CONFIGMG_Add_Empty_Log_Conf(PLOG_CONF *plcLogConf,* DEVNODE *dnDevNode,* PRIORITY *Priority,* ULONG *ulFlags)*

Return Value Returns CR_SUCCESS if the function is successful. Otherwise, the return value can be CR_INVALID_DEVNODE, CR_INVALID_FLAG,

73

CR_INVALID_PRIORITY, CR_INVALID_POINTER or
CR_OUT_OF_MEMORY.

Parameters   *plcLogConf*

Address that receives the handle of the logical configuration.

*dnDevNode*

Address of a device node. This address is typically retrieved by a call to
CONFIGMG_Locate_DevNode or CONFIGMG_Create_DevNode.

*Priority*

Priority of the logical configuration. This parameter can be one of the following values:

LCPRI_FORCECONFIG

Coming from a forced configuration (config.).

LCPRI_BOOTCONFIG

Coming from a boot config.

LCPRI_HARDWIRED

Like VPICD's I/O (I/O) range.

LCPRI_DESIRED

Preferable set for better performance.

LCPRI_NORMAL

Workable (acceptable performance).

LCPRI_SUBOPTIMAL

Not desired but will work (like PIO).

LCPRI_RESTART

Need to restart "WINDOWS" operating system.

LCPRI_REBOOT

Need to reboot "WINDOWS" operating system.

LCPRI_POWEROFF

Need to shutdown "WINDOWS" operating system.

LCPRI_HARDRECONFIG

Need to change a jumper block.

*ulFlags*

Either BASIC_LOG_CONF or FILTERED_LOG_CONF, combined with either
PRIORITY_EQUAL_FIRST or PRIORITY_EQUAL_LAST.

74

BASIC_LOG_CONF

Specifies the resource requirements list.

FILTERED_LOG_CONF

Specifies the filtered requirements list.

PRIORITY_EQUAL_FIRST

Same priority, new one is first.

PRIORITY_EQUAL_LAST

Same priority, new one is last.

Comments Note: For calling CONFIGMG_Add_Empty_Log_Conf or CONFIGMG_Free_Log_Conf from within a CONFIGMG_Get_First_Log_Conf/CONFIGMG_Get_Next_Log_Conf, the device drivers 156 should end the loop before adding or freeing a logical configuration and start it again when the operation is finished.

See Also
CONFIGMG_Create_DevNode
CONFIGMG_Free_Log_Conf
CONFIGMG_Get_First_Log_Conf
CONFIGMG_Get_Next_Log_Conf
CONFIGMG_Locate_DevNode

CONFIGMG_Add_ID

Adds an identification code (hardware ID) or a compatible identification code (compatible ID) during CONFIG_SETUP.

CONFIGRET CONFIGMG_Add_ID(DEVNODE *dnDevNode*, PFARCHAR *pszID*, ULONG *ulFlags*)

Return Value Returns CR_SUCCESS if the function is successful. Otherwise, the return value can be CR_INVALID_DEVNODE, CR_INVALID_POINTER or CR_INVALID_FLAG.

Parameters *dnDevNode*

Handle of a device node.

*pszID*

Points to an id to add.

*ulFlags*

Must be CM_ADD_ID_HARDWARE or CM_ADD_ID_COMPATIBLE.

75

CONFIGMG_Add_Range

Adds a memory range to a range list.

CONFIGRET CONFIGMG_Add_Range(ULONG *ulStartValue*,
ULONG *ulEndValue*, RANGE_LIST *rlh*, ULONG *ulFlags*)

Return Value Returns CR_SUCCESS if the function is successful. Otherwise, the return value can be CR_FAILURE, CR_INVALID_FLAG, CR_INVALID_RANGE, CR_INVALID_RANGE_LIST or CR_OUT_OF_MEMORY

Parameters  *ulStartValue*

Low end of the range.

*ulEndValue*

High end of the range.

*rlh*

Handle of a range list.

*ulFlags*

Flags specifying options for memory ranges that conflict with ranges already in the list. This parameter must be one of the following values:

CM_ADD_RANGE_ADDIFCONFLICT

New range is merged with the ranges it conflicts with.

CM_ADD_RANGE_DONOTADDIFCONFLICT

Function returns CR_FAILURE if there is a conflict.

See Also CONFIGMG_Delete_Range

CONFIGMG_Add_Res_Des

Adds a resource descriptor to a logical configuration.

CONFIGRET CONFIGMG_Add_Res_Des(PRES_DES *prdResDes*,
LOG_CONF *lcLogConf*, RESOURCEID *ResourceID*, PFARVOID *ResourceData*, ULONG *ResourceLen*, ULONG *ulFlags*)

Return Value Returns CR_SUCCESS if the function is successful. Otherwise, the return value can be CR_INVALID_FLAG, CR_INVALID_LOG_CONF, CR_INVALID_POINTER, CR_INVALID_RESOURCE_ID or CR_OUT_OF_MEMORY.

| | | |
|---|---|---|
| Parameters | | *prdResDes* |
| | | Address that receives a handle of the resource descriptor. |
| | | *lcLogConf* |
| | | The logical configuration to which the resource descriptor is added. |
| | | *ResourceID* |
| | | The type of the resource. This parameter can be one of the following: |
| | | ResType_DMA |
| | |     DMA channels 0-3 resource |
| | | ResType_IO |
| | |     Physical IO address resource |
| | | ResType_IRQ |
| | |     IRQ 0-15 |
| | | ResType_Mem |
| | | Physical address resource |
| | | *ResourceData* |
| | | Address of a resource data structure. |
| | | *ResourceLen* |
| | | The size, in bytes, of the structure pointed to by *ResourceData*. |
| | | *ulFlags* |
| | | Must be zero. |
| Comments | | The new resource descriptor is added to the beginning of the resource-descriptor list for the logical configuration. A loop using CONFIGMG_Get_Next_Res_Des will not reveal this resource descriptor unless the loop is started after the resource descriptor has been added. |
| | | The logical configuration being modified must be either BASIC_LOG_CONF or FILTERED_LOG_CONF. Typically, BASIC_LOG_CONF is added to during device driver initialization or enumeration, whereas FILTERED_LOG_CONF is added to during a CONFIG_FILTER device-driver configuration function. |
| See Also | | CONFIGMG_Free_Res_Des |

CONFIGMG_Call_At_Appy_Time

CONFIGMG will call back the handler at application ("appy") time.

77

CONFIGRET
CONFIGMG_Call_At_Appy_Time(CMCALLBACKHANDLER
*Handler*, ULONG *ulRefData*, ULONG *ulFlags*)

Return Value Returns CR_SUCCESS if the function is successful. Otherwise, the return value can be CR_INVALID_FLAG.

Parameters *Handler*
is the function to be called at appy time.

*ulRefData*
is the parameter to the function to be called back at appy time.

*ulFlags*
Must be zero.

Comments This function is functionally equivalent to SHELL_CallAtAppyTime, but allows CONFIGMG to know that it is appy time.

This function is asynchronous (that is, callable at interrupt time), reentrant, and fast.

CONFIGMG_Call_Enumerator_Function

Calls the enumerator function about a child devnode.

CONFIGRET CONFIGMG_Call_Enumerator_Function(DEVNODE *dnDevNode*, ENUMFUNC *efFunc*, ULONG *ulRefData*, PFARVOID *pBuffer*, ULONG *ulBufferSize*, ULONG *ulFlags*)

Return Value Returns CR_SUCCESS if the function is successful. Otherwise, the return value can be CR_INVALID_DEVNODE, CR_INVALID_POINTER, CR_INVALID_FLAG or CR_INVALID_API. Furthermore, the enumerator may return the result CR_FAILURE.

Parameters *dnDevNode*
Handle of a device node.

*efFunc*
Is the function number.

*ulRefData*
Is a reference data (can't be a pointer).

*pBuffer*
Points to a buffer for the function.

78

*ulBufferSize*

Is the size of the buffer.

*ulFlags*

Must be zero.

CONFIGMG_CallBack_Device_Driver

Calls back the device driver 156, once per devnode, with a CONFIGMG_Register_Device_Driver.

CONFIGRET
CONFIGMG_CallBack_Device_Driver(CMCONFIGHANDLER *Handler*, ULONG *ulFlags*)

| | |
|---|---|
| Parameters | *Handler* |
| | The configuration handler that was registered in a call to the CONFIGMG_Register_Device_Driver function. |
| | *ulFlags* |
| | Must be zero. |
| Return Value | Returns CR_SUCCESS if the function is successful. Otherwise, the return value can be CR_INVALID_API or CR_INVALID_FLAG. |
| Comments | A device driver 156 calls this function when it needs to be called back once per devnode. |
| See Also | CONFIGMG_Register_Device_Driver |

CONFIGMG_CallBack_Enumerator

Calls back the enumerator 150, once per devnode.
CONFIGRET
CONFIGMG_CallBack_Enumerator(CMENUMHANDLER *Handler*, ULONG *ulFlags*)

| | |
|---|---|
| Parameters | *Handler* |
| | is the routine that was register with a CONFIGMG_Register_Enumerator. |
| | *ulFlags* |
| | must be zero. |
| Return Value | Returns CR_SUCCESS if the function was successful. Otherwise, one of the following errors is returned: |

CR_INVALID_FLAG if ulFlags is not zero.

CR_INVALID_API if called from ring 3.

Comments An enumerator 150 calls this function when it needs to be called back once per devnode.

This function is synchronous and must not be called from within an interrupt handler.

CONFIGMG_Create_DevNode

Adds a device node to the hardware tree 152.

CONFIGRET CONFIGMG_Create_DevNode(PDEVNODE *pdnDevNode*, DEVNODEID *pDeviceID*, DEVNODE *dnParent*, ULONG *ulFlags*)

Return Value Returns CR_SUCCESS if the function is successful. Otherwise, the return value can be CR_ALREADY_SUCH_DEVNODE, CR_INVALID_DEVICE_ID, CR_INVALID_DEVNODE, CR_INVALID_FLAG, CR_INVALID_POINTER, CR_OUT_OF_MEMORY or CR_CREATE_BLOCKED.

Parameters *pdnDevNode*

Address that receives a handle to the new device node. Can be NULL.

*pDeviceID*

Device identifier. If this parameter is NULL, configuration manager 158 does not attempt to find a device loader for the device 20.

*dnParent*

Handle of the device node that is the parent of the device node being created.

*ulFlags*

Must be zero.

Comments Typically, an enumerator 150 calls this function while it is enumerating new devices 20 (during the CONFIG_ENUMERATE event). The configuration manager 158 allocates the device node and puts the device node in the sibling list of the child device node for the dnParent. All fields are initialized to their default values. After this function returns successfully, the enumerator 150 should fill in the fields it can, particularly the resource descriptors. When the enumerator 150 returns from the event, the configuration manager 158 attempts to load a device driver 156 for the new descendant of the enumerator's device node (if *pDeviceID* is not NULL).

This function returns CR_ALREADY_SUCH_DEVNODE if there is already a device node corresponding to *pDeviceID* in the tree. (This error is not returned when *pDeviceID* is NULL, because there can be multiple NULL device identifiers. These cannot be found using CONFIGMG_Locate_DevNode, however.) When this error is returned, the DN_HAS_MARK flag is set, and *pdnDevNode* is updated to the handle of the preexisting device node.

CONFIGMG_Create_Range_List

Creates a list of memory ranges.

CONFIGRET CONFIGMG_Create_Range_List(PRANGE_LIST *prlh*, ULONG *ulFlags*)

Return Value Returns CR_SUCCESS if the function is successful. Otherwise, the return value can be CR_INVALID_FLAG, CR_INVALID_POINTER or CR_OUT_OF_MEMORY.

Parameters *prlh*

Address that receives the handle of a range list.

*ulFlags*

Must be zero.

See Also CONFIGMG_Test_Range_Available

CONFIGMG_Delete_Range

Deletes a memory range from a range list.

CONFIGRET CONFIGMG_Delete_Range(ULONG *ulStartValue*, ULONG *ulEndValue*, RANGE_LIST *rlh*, ULONG *ulFlags*)

Return Value Returns CR_SUCCESS if the function is successful. Otherwise, the return value can be CR_FAILURE, CR_INVALID_FLAG, CR_INVALID_RANGE, CR_INVALID_RANGE_LIST or CR_OUT_OF_MEMORY.

Parameters *ulStartValue*

Low end of the range.

*ulEndValue*

High end of the range.

*rlh*

Handle of a range list.

*ulFlags*

Must be zero.

See Also CONFIGMG_Add_Range

Comments Doing a delete range with [0, ULONG_MAX] is special cased: it will empty the whole range and is guarantied not to run out of memory.

CONFIGMG_Deregister_Arbitrator

Removes an arbitrator 154.

CONFIGRET CONFIGMG_Deregister_Arbitrator(REGISTERID id, ULONG ulFlags)

Return Value Returns CR_SUCCESS if the function is successful. Otherwise, the return value can be CR_INVALID_API, CR_INVALID_ARBITRATOR or CR_INVALID_FLAG.

Parameters *id*

The identifier of an arbitrator 154. This identifier must have been created by a call to the CONFIGMG_Register_Arbitrator function.

*ulFlags*

Must be zero.

Comments This function deregisters an arbitrator 154 and its associated resource 14. If an arbitrator 154 is global and registers with a NULL device node, it typically is never deregistered (for example, for the resources I/O, IRQ, DMA and memory). If the arbitrator 154 is local to a specific device node (for example, a PCMCIA socket), it is called automatically by the ARB_REMOVE arbitrator function when its device node is removed.

See Also CONFIGMG_Register_Arbitrator

CONFIGMG_Disable_DevNode

Disables a device node.

```
CONFIGRET CONFIGMG_Disable_DevNode(DEVNODE
dnDevNode, ULONG ulFlags)
```

Return Value Returns CR_SUCCESS if the function is successful. Otherwise, the return
value can be CR_INVALID_FLAG, CR_NOT_DISABLEABLE,
CR_INVALID_DEVNODE or CR_NOT_SYSTEM_VM.

Parameters *dnDevNode*

Handle of a device node.

*ulFlags*

Must be either CM_DISABLE_POLITE (where we ask the device driver 156 and give it a chance to stop) or CM_DISABLE_ABSOLUTE (where the device driver 156 will be stopped even if it does not support this event).

Comments This function increments a counting semaphore. Any attempt to disable the
device node increments the semaphore. The function return
CR_NOT_DISABLEABLE if the devnode does not have the
DN_DISABLEABLE flag set or failed the
CONFIG_TEST/CONFIG_TEST_CAN_STOP message.

See Also CONFIGMG_Enable_DevNode

CONFIGMG_Dump_Range_List

Dumps a range list on a debugging terminal.
```
CONFIGRET CONFIGMG_Dump_Range_List(RANGE_LIST rlh,
ULONG ulFlags)
```

Return Value The return value for this function is undefined.

Parameters *rlh*

Handle of a range list.

*ulFlags*

Must be zero.

CONFIGMG_Dup_Range_List

Copies a range list.
```
CONFIGRET CONFIGMG_Dup_Range_List(RANGE_LIST rlhOld,
RANGE_LIST rlhNew, ULONG ulFlags)
```

|                | Returns CR_SUCCESS if the function is successful. Otherwise, the return |
| -------------- | ---- |
| Return Value   | value can be CR_INVALID_FLAG, CR_INVALID_RANGE_LIST or CR_OUT_OF_MEMORY. |
| Parameters     | *rlhOld* |
|                | Handle of the range list to copy. |
|                | *rlhNew* |
|                | Handle of a valid range list into which rlhOld is copied. Anything contained in the rlhNew range list is removed by the copy operation. |
|                | *ulFlags* |
|                | Must be zero. |

CONFIGMG_Enable_DevNode

Enables a device node of the hardware tree 152.

CONFIGRET CONFIGMG_Enable_DevNode(DEVNODE *dnDevNode*, ULONG *ulFlags*)

| Return Value | Returns CR_SUCCESS if the function is successful. Otherwise, the return value can be CR_INVALID_FLAG, CR_INVALID_DEVNODE or CR_NOT_SYSTEM_VM. |
| --- | --- |
| Parameters | *dnDevNode* |
|  | Handle of a device node. |
|  | *ulFlags* |
|  | Must be zero. |
| Comments | This function decrements a counting semaphore. The device node is enabled only if the count has returned to zero and the device node does not have any other problem. |
| See Also | CONFIGMG_Disable_DevNode |

CONFIGMG_Fail_Change_Config

Cancel preparation for changing the current hardware profile.

CONFIGRET CONFIGMG_Fail_Change_Config(ULONG *ulFlags*)

| Return Value | Returns CR_SUCCESS, CR_FAILURE, CR_NOT_SYSTEM_VM or CR_INVALID_FLAG. |
| --- | --- |

| | |
|---|---|
| Parameters | *ulFlags* |
| | Must be zero. |
| Comments | This function is preferably called by a "Plug and Play"-compatible BIOS enumerator if it makes a successful call to CONFIGMG_Query_Change_HW_Prof but later finds some other reason to cancel the docking or undocking action. |
| See Also | CONFIGMG_Recompute_HW_Prof |
| | CONFIGMG_Query_Change_HW_Prof |

CONFIGMG_First_Range

Retrieves the first range element in a range list.
CONFIGRET CONFIGMG_First_Range(RANGE_LIST *rlh*,
PULONG *pulStart*, PULONG *pulEnd*, PRANGE_ELEMENT
*preElement*, ULONG *ulFlags*)

| | |
|---|---|
| Return Value | Returns CR_SUCCESS if the function is successful. Otherwise, the return value can be CR_FAILURE, CR_INVALID_FLAG, CR_INVALID_POINTER or CR_INVALID_RANGE_LIST. |
| Parameters | *rlh* |
| | Handle of a range list. |
| | *pulStart* |
| | Address that receives the starting value of the first range element. |
| | *pulEnd* |
| | Address that receives the ending value of the first range element. |
| | *preElement* |
| | Address that receives the handle of the next range element. |
| | *ulFlags* |
| | Must be zero. |
| See Also | CONFIGMG_Next_Range |

CONFIGMG_Free_Log_Conf

Frees a logical configuration and all resource descriptors associated with it.

```
                                    85

CONFIGRET CONFIGMG_Free_Log_Conf(LOG_CONF
                    lcLogConfToBeFreed, ULONG ulFlags)
    Return Value    Returns CR_SUCCESS if the function is successful. Otherwise, the return
                    value can be CR_INVALID_FLAG, CR_INVALID_DEVNODE or
                    CR_INVALID_LOG_CONF.
    Parameters      lcLogConfToBeFreed
                        Handle that was retrieved by a call to the CONFIGMG_Add_Empty_Log_Conf
                        function.
                    ulFlags
                        Must be zero.
    Comments        Note: For a call to CONFIGMG_Add_Empty_Log_Conf or
                    CONFIGMG_Free_Log_Conf from within a
                    CONFIGMG_Get_First_Log_Conf/CONFIGMG_Get_Next_Log_C
                    onf loop, the device drivers 156 should end the loop before adding or freeing a
                    logical configuration and start it again when the operation is finished.
    See Also        CONFIGMG_Add_Empty_Log_Conf
                    CONFIGMG_Get_First_Log_Conf
                    CONFIGMG_Get_Next_Log_Conf
                          CONFIGMG_Free_Range_List

Frees the specified range list and the memory allocated for it.
                    CONFIGRET CONFIGMG_Free_Range_List(RANGE_LIST rlh,
                    ULONG ulFlags)
    Return Value    Returns CR_SUCCESS if the function is successful. Otherwise, the return
                    value can be CR_INVALID_FLAG or CR_INVALID_RANGE_LIST.
    Parameters      rlh
                        Handle of a range list.
                    ulFlags
                        Must be zero.
    See Also        CONFIGMG_Create_Range_List

CONFIGMG_Free_Res_Des

                    Destroys a resource descriptor.
```

86

|  | CONFIGRET CONFIGMG_Free_Res_Des(PRES_DES *prdResDes*, RES_DES *rdResDes*, ULONG *ulFlags*) |
|---|---|
| Return Value | Returns CR_SUCCESS if the function is successful. Otherwise, the return value can be CR_INVALID_FLAG, CR_INVALID_POINTER, CR_INVALID_RES_DES, CR_INVALID_DEVNODE or CR_NO_MORE_RES_DES. |
| Parameters | *prdResDes* |
| | Address that receives the handle of the previous resource descriptor. If *rdResDes* is the handle of the first resource descriptor, this address receives the handle of the logical configuration. |
| | *rdResDes* |
| | Handle of the resource descriptor to be destroyed. |
| | *ulFlags* |
| | Must be zero. |
| Comments | This function returns CR_NO_MORE_RES_DES if *rdResDes* specifies the last resource descriptor. |
| See Also | CONFIGMG_Add_Res_Des |

CONFIGMG_Get_Alloc_Log_Conf

|  | Obtains the allocated (or boot) resources in a table format. |
|---|---|
|  | CONFIGRET CONFIGMG_Get_Alloc_Log_Conf(PCMCONFIG *pccBuffer*, DEVNODE *dnDevNode*, ULONG *ulFlags*) |
| Return Value | Returns CR_SUCCESS if the function is successful. Otherwise, the return value can be CR_INVALID_DEVNODE, CR_INVALID_FLAG, CR_INVALID_POINTER, or CR_NO_MORE_LOG_CONF. |
| Parameters | *pccBuffer* |
| | is a pointer to a CMCONFIG struct (which can be on the stack) to be filled by this function with the currently allocated config. |
| | *dnDevNode* |
| | Device node that a device driver 156 wants to know what are the allocated (or boot) resources. |
| | *ulFlags* |
| | must be one of CM_GET_ALLOC_CONFIG_ALLOC or CM_GET_ALLOC_CONFIG_BOOT_ALLOC. |

| | |
|---|---|
| Return Value | Returns CR_SUCCESS if the function is successful. Otherwise, the return value can be CR_INVALID_POINTER, CR_INVALID_DEVNODE or CR_INVALID_FLAG. |
| Comments | This call is done when a device driver 156 wants to easily know its configuration.<br>This function is synchronous and must not be called from within an interrupt handler. |

CONFIGMG_Get_Bus_Info

Obtains bus information of the devnode.
CONFIGRET CONFIGMG_Get_Bus_Info(DEVNODE *dnDevNode*,
PCMBUSTYPE *pbtBusType*, PFARULONG *pulSizeOfInfo*,
PFARVOID *pInfo*, ULONG *ulFlags*)

| | |
|---|---|
| Return Value | Returns CR_SUCCESS if the function is successful. Otherwise, the return value can be CR_INVALID_FLAG, CR_INVALID_DEVNODE, CR_INVALID_POINTER, CR_BUFFER_SMALL. |
| Parameters | *dnDevNode*<br>    Handle of a device node.<br>*pbtBusType*<br>    Will receive the bus type.<br>*pulSizeOfInfo*<br>    Points to the dword that is originally the size of the info buffer and will return the size of the info put in the buffer (minimum of the real info size and the given value). If this points to a 0, pInfo is not touched and the real info size is put in *pulSizeOfInfo.<br>*pInfo*<br>    A pointer to the bus-specific buffer to be filled.<br>*ulFlags*<br>    Must be zero. |
| Comments | This function appends to the devnode some bus-specific information. This function is to be used solely by the immediate parent enumerator of a devnode. |
| See Also | CONFIGMG_Get_Bus_Info |

CONFIGMG_Get_Child

Retrieves the first child of a given device node.

CONFIGRET CONFIGMG_Get_Child(PDEVNODE *pdnDevNode,* DEVNODE *dnDevNode,* ULONG *ulFlags*)

Return Value  Returns CR_SUCCESS if the function is successful. Otherwise, the return value can be CR_INVALID_DEVNODE, CR_INVALID_FLAG, CR_INVALID_POINTER or CR_NO_SUCH_DEVNODE.

Parameters  *pdnDevNode*

Address that receives the handle of the device node.

*dnDevNode*

Handle of the parent device node.

*ulFlags*

Must be zero.

Comments  This function is called by an device driver 156 that needs to "walk" the hardware tree 152.

See Also  CONFIGMG_Get_Parent
CONFIGMG_Get_Sibling

CONFIGMG_Get_CRC_CheckSum

Computes a CRC for a specific buffer.

CONFIGRET CONFIGMG_Get_CRC_CheckSum(PFARVOID *pBuffer,* ULONG *ulSize,* PFARULONG *pulSeed,* ULONG *ulFlags*)

Return Value  Returns CR_SUCCESS if the function is successful. Otherwise, the return value can be CR_INVALID_FLAG or CR_INVALID_POINTER.

Parameters  *pBuffer*

Address of the buffer buffer to be "CRC"ed.

*ulSize*

Length of pBuffer.

*pulSeed*

As input, it is the seed which should be 0 on the first call. As output, it contains the result which can be used as seed for the next call.

*ulFlags*

Must be zero.

See Also CONFIGMG_Load_DLVxD

CONFIGMG_Get_DDBs

Retrieves the device descriptor blocks (DDBs) of dynamically loadable VxDs for a devnode.

CONFIGRET CONFIGMG_Get_DDBs(PPPVMMDDB *pppDDB*, PFARULONG *pulCount*, LOAD_TYPE *LoadType*, DEVNODE *dnDevNode*, ULONG *ulFlags*)

Return Value Returns CR_SUCCESS if the function is successful. Otherwise, the return value can be CR_INVALID_API, CR_INVALID_DEVNODE, CR_INVALID_FLAG, CR_INVALID_LOAD_TYPE or CR_INVALID_POINTER.

Parameters

*pppDDB*

Address of a pointer that receives the address of the DDBs table. If the pppDDB is NULL when the function returns, the VxD that controls the device node specified in the *dnDevNode* where not loaded via CM_Load_DLVxDsdynamically loadable VxD. Otherwise the DDBs are stored as an array at the given address.

*pulCount*

Returns the number of DDBs in the table.

*LoadType*

Type of the VxD being loaded. This parameter can be one of the values listed for the *LoadType* parameter in the CONFIGMG_Load_DLVxD function.

*dnDevNode*

Device node identifying the dynamically loadable VxD.

*ulFlags*

Must be zero.

See Also CONFIGMG_Load_DLVxD

CONFIGMG_Get_Depth

Retrieves the depth of a device node in the hardware tree 152.

CONFIGRET CONFIGMG_Get_Depth(PFARULONG *pulDepth*, DEVNODE *dnDevNode*, ULONG *ulFlags*)

| | |
|---|---|
| Return Value | Returns CR_SUCCESS if the function is successful. Otherwise, the return value can be CR_INVALID_DEVNODE, CR_INVALID_FLAG or CR_INVALID_POINTER. |
| Parameters | *pulDepth* |
| | Address that receives the depth of the device node. This value is 0 to designate the root of the tree, 1 to designate a child of the root, and so on. |
| | *dnDevNode* |
| | Handle of a device node. |
| | *ulFlags* |
| | Must be zero. |
| Comments | This function can be used to optimize the handling of device nodes. For example, a device driver 156 could determine the relative depths of two device nodes before processing only its immediate children. |

CONFIGMG_Get_Device_Driver_Private_DWord

Retrieves the private value for a device driver in a device node.
CONFIGRET
CONFIGMG_Get_Device_Driver_Private_DWord(DEVNODE *dnDevNode*, PFARULONG *pulDWord*, ULONG *ulFlags*)

| | |
|---|---|
| Return Value | Returns CR_SUCCESS if the function is successful. Otherwise, the return value can be CR_INVALID_DEVNODE, CR_INVALID_FLAG or CR_INVALID_POINTER. |
| Parameters | *dnDevNode* |
| | Handle of the device node in which the private value will be stored. |
| | *pulDWord* |
| | Address that receives the private value. |
| | *ulFlags* |
| | Must be zero. |
| Comments | This function is typically used by a device driver to retrieve information that was cached (usually a pointer to memory). The value is the same as passed when the configuration manager 158 calls the device driver 156. |
| See Also | CONFIGMG_Set_Device_Driver_Private_DWord |

91

CONFIGMG_Get_Device_ID

Retrieves the device identifier for a device node.
CONFIGRET CONFIGMG_Get_Device_ID(DEVNODE *dnDevNode,*
PFARVOID *Buffer,* ULONG *BufferLen,* ULONG *ulFlags)*

Return Value Returns CR_SUCCESS if the function is successful. Otherwise, the return value can be CR_BUFFER_SMALL, CR_INVALID_DEVNODE, CR_INVALID_FLAG or CR_INVALID_POINTER.

Parameters

*dnDevNode*

Handle of a device node we want the device ID of.

*Buffer*

Address of buffer that receives the device identifier. If this buffer is larger than the device identifier, the function appends a null-terminating character to the data. If it is smaller than the device identifier, the function fills it with as much of the device identifier as will fit and returns CR_BUFFER_SMALL.

*BufferLen*

The size, in bytes, of the buffer for the device identifier.

*ulFlags*

Must be zero.

Comments To ensure that the buffer pointed to by the Buffer parameter is large enough to hold the entire device identifier, device drivers can call the CONFIGMG_Get_Device_ID_Size function.

Example Code that retrieves a device identifier might look like the following example:

```
CM_Get_Device_ID_Size(&size, dnDevNode, 0);
if (p=malloc(size+1))
    CM_Get_Device_ID(dnDevNode, p, size+1, 0);
```

See Also CONFIGMG_Get_Device_ID_Size

CONFIGMG_Get_Device_ID_Size

Retrieves the size of a device identifier from a device node.
CONFIGRET CONFIGMG_Get_Device_ID_Size(PFARULONG *pulLen,* DEVNODE *dnDevNode,* ULONG *ulFlags)*

| | |
|---|---|
| Return Value | Returns CR_SUCCESS if the function is successful. Otherwise, the return value can be CR_INVALID_DEVNODE, CR_INVALID_FLAG or CR_INVALID_POINTER. |
| Parameters | *pulLen* |
| | Address that receives the length of the device identifier. This length does not include the null-terminating character. This address is filled with zeroes if there is no identifier. The length is always less than or equal MAX_DEVICE_ID_LEN. |
| | *dnDevNode* |
| | Handle of a device node. |
| | *ulFlags* |
| | Must be zero. |
| Comments | The device identifier, also described as a device identification code or a device ID, for a device 20 represented by a device node is built from the following: the identifier of the enumerator 150 that is located immediately above this device in the hardware tree 152 (i.e., the system bus code associated with the bus for this enumerator), its identifier (i.e., the identification code), and this device's instance number. For example, the device identifier for an Adaptec 1540c adapter card might be \ISAENUM\AHA1540C\1. This string is used as the direct key for access into the registry 153. The device identifier is limited to MAX_DEVICE_ID_LEN bytes. |
| See Also | CONFIGMG_Get_Device_ID |

CONFIGMG_Get_DevNode_Key

Retrieves the the string of registry key from a device node.
CONFIGRET CONFIGMG_Get_DevNode_Key(DEVNODE *dnDevNode*, PFARCHAR *pszSubKey*, PFARVOID *Buffer*, ULONG *BufferLen*, ULONG *ulFlags*)

| | |
|---|---|
| Return Value | Returns CR_SUCCESS if the function is successful. Otherwise, the return value can be CR_INVALID_DEVNODE, CR_INVALID_FLAG, CR_INVALID_POINTER, CR_BUFFER_SMALL or CR_NO_REGISTRY_HANDLE. |
| Parameters | *dnDevNode* |
| | Handle of a device node. |

*pszSubKey*

Name of the subkey. Can be NULL if none.

*Buffer*

Address of the buffer that receives the registry key. The length is always less than or equal MAX_VMM_REG_KEY_LEN.

*BufferLen*

Size of the buffer.

*ulFlags*

Must be a combination of the following:

CM_REGISTRY_HARDWARE

Select the hardware branch.

CM_REGISTRY_SOFTWARE

Select the software branch.

CM_REGISTRY_USER

Use HKEY_CURRENT_USER.

CM_REGISTRY_CONFIG

Use HKEY_CURRENT_CONFIG.

See Also    CONFIGMG_Get_DevNode_Key_Size

CONFIGMG_Get_DevNode_Key_Size

Retrieves the size of the registry key from a device node.

CONFIGRET

CONFIGMG_Get_DevNode_Key_Size(PFARULONG *pulLen*, DEVNODE *dnDevNode*, PFARCHAR *pszSubKey*, ULONG *ulFlags*)

Return Value    Returns CR_SUCCESS if the function is successful. Otherwise, the return value can be CR_INVALID_DEVNODE, CR_INVALID_FLAG, CR_INVALID_POINTER, or CR_NO_REGISTRY_HANDLE.

Parameters    *pulLen*

Address that receives the length of the registry key. This length does not include the null-terminating character. This address is filled with zeroes if there is no identifier. The length is always less than or equal MAX_VMM_REG_KEY_LEN.

*dnDevNode*

Handle of a device node.

*pszSubKey*

Name of the subkey. Can be NULL if none.

*ulFlags*

Must be a combination of the following:

CM_REGISTRY_HARDWARE

Select the hardware branch.

CM_REGISTRY_SOFTWARE

Select the software branch.

CM_REGISTRY_USER

Use HKEY_CURRENT_USER.

CM_REGISTRY_CONFIG

Use HKEY_CURRENT_CONFIG.

See Also   CONFIGMG_Get_DevNode_Key

CONFIGMG_Get_DevNode_Status

Retrieves the status of a device node.

CONFIGRET CONFIGMG_Get_DevNode_Status(PFARULONG *pulStatus*, PFARULONG *pulProblemNumber*, DEVNODE *dnDevNode*, ULONG *ulFlags*)

Return Value   Returns CR_SUCCESS if the function is successful. Otherwise, the return value can be CR_INVALID_DEVNODE, CR_INVALID_FLAG or CR_INVALID_POINTER.

Parameters   *pulStatus*

Address that receives the status flags of the device node. These flags can be a combination of the following values:

DN_DRIVER_LOADED

CONFIGMG_Register_Device_Driver has been called for this device node.

DN_ENUM_LOADED

CONFIGMG_Register_Enumerator has been called for this device node.

DN_HARDWARE_ENUM

Enumeration generates hardware identifier.

95

DN_HAS_MARK

CONFIGMG_Create_DevNode has failed in a call for this device node.

DN_HAS_PROBLEM

The device installer 161a is required to resolve conflicts.

DN_LIAR

Device node reported reconfiguration falsely once.

DN_NEED_TO_CONFIG

Device node may need reconfiguration. This flag can be changed asynchronously.

DN_NEED_TO_ENUM

Device node may need reenumeration. This flag can be changed asynchronously.

DN_NOT_FIRST_TIME

Device node has received a configuration.

DN_ROOT_ENUMERATED

Device node was enumerated by the root.

DN_STARTED

Device node is currently configured.

*pulProblemNumber*

Address that receives an identifier indicating the problem. This identifier can be one of the following:

CM_PROB_BOOT_CONFIG_CONFLICT

Conflict in boot configuration.

CM_PROB_DEVICE_NOT_THERE

Specified device does not exist.

CM_PROB_DEVLOADER_FAILED

Device loader failed.

CM_PROB_DEVLOADER_NOT_READY

Device loader is not ready.

CM_PROB_DISABLED

Device is disabled.

CM_PROB_ENTRY_IS_WRONG_TYPE

Registry value has different type.

CM_PROB_FAILED_FILTER

Filter failed.

CM_PROB_NO_CONFIGURED

No configuration for this device.

CM_PROB_NORMAL_CONFLICT

Configuration conflict.

CM_PROB_OUT_OF_MEMORY

Out of memory.

CM_PROB_REGISTRY

Unable to access the registry.

CM_PROB_VXDLDR

Failure using the VxD loader.

*dnDevNode*

Device node for which the status flags are retrieved.

*ulFlags*

Must be zero.

CONFIGMG_Get_First_Log_Conf

Returns a handle to the first logical configuration of the specified type in a device node.

CONFIGRET CONFIGMG_Get_First_Log_Conf(PLOG_CONF *plcLogConf*, DEVNODE *dnDevNode*, ULONG *ulFlags*)

Return Value Returns CR_SUCCESS if the function is successful. Otherwise, the return value can be CR_INVALID_FLAG, CR_INVALID_POINTER or CR_NO_MORE_LOG_CONF.

Parameters *plcLogConf*

Address that receives the handle of the logical configuration.

*dnDevNode*

Device node for which the logical configuration is retrieved.

*ulFlags*

One of the following values:

ALLOC_LOG_CONF

Specifies the Alloc Element.

|            |                                                                                                                                                                           |
|------------|---------------------------------------------------------------------------------------------------------------------------------------------------------------------------|
|            | BASIC_LOG_CONF                                                                                                                                                            |
|            | Specifies the requirements list.                                                                                                                                          |
|            | BOOT_LOG_CONF                                                                                                                                                             |
|            | Specifies the boot Alloc Element.                                                                                                                                         |
|            | FILTERED_LOG_CONF                                                                                                                                                         |
|            | Specifies the filtered requirements list.                                                                                                                                 |
| Comments   | An initializing device driver 156 typically requests the BASIC_LOG_CONF to verify the work of the enumerator 150. Sometimes this device driver may also check BOOT_LOG_CONF. Device drivers 156 typically check FILTERED_LOG_CONF while processing the CONFIG_FILTER device-driver configuration function. ALLOC_LOG_CONF is typically checked while processing CONFIG_DYNAMIC_START, CONFIG_DYNAMIC_STOP, CONFIG_FIRST_CONFIG and CONFIG_REMOVE. Note: For a call of CONFIGMG_Add_Empty_Log_Conf or CONFIGMG_Free_Log_Conf from within a CONFIGMG_Get_First_Log_Conf/CONFIGMG_Get_Next_Log_Conf loop, the device drivers 156 should end the loop before adding or freeing a logical configuration and start it again when the operation is finished. |
| See Also   | CONFIGMG_Add_Empty_Log_Conf<br>CONFIGMG_Free_Log_Conf<br>CONFIGMG_Get_Next_Log_Conf                                                                                       |

CONFIGMG_Get_Hardware_Profile_Info

|              |                                                                                                                                                                                                                                      |
|--------------|--------------------------------------------------------------------------------------------------------------------------------------------------------------------------------------------------------------------------------------|
|              | Obtains information about a hardware profile.<br>CONFIGRET CONFIGMG_Get_Hardware_Profile_Info(ULONG *ulIndex*, PHWPROFILEINFO *pHWProfileInfo*, ULONG *ulFlags*)                                                          |
| Return Value | Returns CR_SUCCESS if the function is successful, CR_NO_MORE_DEVNODES if ulIndex is larger than the number of hardware profiles on the computer. Otherwise, the return value can be CR_INVALID_POINTER or CR_INVALID_FLAG.           |
| Parameters   | *ulIndex*<br>The index of the hardware profile to examine. Hardware profiles go from 0 to the number of hardware profiles-1. A ulIndex value of 0xFFFFFFFF is the same as the index of the current hardware profile.                |

*pHWProfileInfo*

Structure to be filled.

*ulFlags*

Must be zero.

CONFIGMG_Get_HW_Prof_Flags

Obtains the Config-Specific Config flags for a devnode/hardware profile combination.

CONFIGRET CONFIGMG_Get_HW_Prof_Flags(PCHAR *szDevNodeName*, ULONG *ulConfig*, PULONG *pulValue*, ULONG *ulFlags*)

Return Value Returns CR_SUCCESS if the function is successful. Otherwise, the return value can be CR_INVALID_FLAG, CR_INVALID_POINTER or CR_REGISTRY_ERROR.

Parameters *szDevNodeName*

The name of the devnode to query.

*ulConfig*

The hardware profile number to query. A ulConfig value of 0 indicates the current hardware profile should be queried.

*pulValue*

Points to the location to store the Config-Specific Config flags.

*ulFlags*

Must be zero.

See Also CONFIGMG_Set_HW_Prof_Flags

CONFIGMG_Get_Next_Log_Conf

Returns a handle to the next logical configuration following the given configuration.

CONFIGRET CONFIGMG_Get_Next_Log_Conf(PLOG_CONF *plcLogConf*, LOG_CONF *lcLogConf*, ULONG *ulFlags*)

Return Value Returns CR_SUCCESS if the function is successful. Otherwise, the return value can be CR_INVALID_DEVNODE, CR_INVALID_FLAG, CR_INVALID_LOG_CONF, CR_INVALID_POINTER or
CR_NO_MORE_LOG_CONF.

Parameters  *plcLogConf*

Address receiving the handle of the next logical configuration.

*lcLogConf*

Logical configuration prior to the configuration whose handle is being retrieved. Note that the logical configurations are in priority order.

Parameters  *ulFlags*

Must be zero.

Comments  When this function is called with a logical configuration that was obtained using the CONFIGMG_Get_First_Log_Conf function with either the ALLOC_LOG_CONF or BOOT_LOG_CONF flag, it necessarily returns CR_NO_MORE_LOG_CONF. (There is only one active boot or currently allocated logical configuration.)

Comments  Note: For a call of CONFIGMG_Add_Empty_Log_Conf or CONFIGMG_Free_Log_Conf from within a CONFIGMG_Get_First_Log_Conf/CONFIGMG_Get_Next_Log_Conf loop, the device drivers 156 should end the loop before adding or freeing a logical configuration and start it again when the operation is finished.

See Also  CONFIGMG_Add_Empty_Log_Conf
CONFIGMG_Free_Log_Conf
CONFIGMG_Get_First_Log_Conf

CONFIGMG_Get_Next_Res_Des

Retrieves the handle of the next resource descriptor in a logical configuration.
CONFIGRET CONFIGMG_Get_Next_Res_Des(PRES_DES *prdResDes*, RES_DES *rdResDes*, RESOURCEID *ForResource*, PRESOURCEID *pResourceID*, ULONG *ulFlags*)

Return Value  Returns CR_SUCCESS if the function is successful. Otherwise, the return value can be CR_INVALID_FLAG, CR_INVALID_POINTER, CR_INVALID_LOG_CONF, CR_INVALID_RES_DES or CR_NO_MORE_RES_DES.

Parameters  *prdResDes*

Address that receives the handle of the next resource descriptor.

100

*rdResDes*

Handle of the current resource descriptor or the handle of a logical configuration. (Both are 32-bit numbers; the configuration manager 158 can distinguish between them.)

*ForResource*

One of the resource identifiers listed in the ResourceId parameter of the CONFIGMG_Add_Res_Des function, or ResType_All. If this parameter is ResType_All, the function returns the handle of the next resource descriptor, no matter what its type. Otherwise, the function retrieves the handle of the first resource descriptor of the specified type.

*pResourceID*

Address that receives the resource type, when *ForResource* specifies ResType_All. (When *ForResource* is not ResType_All, this parameter can be NULL.)

*ulFlags*

Must be zero.

See Also CONFIGMG_Get_Res_Des_Data
CONFIGMG_Get_Res_Des_Data_Size

CONFIGMG_Get_Parent

Retrieves the handle of the parent of a device node.
CONFIGRET CONFIGMG_Get_Parent(PDEVNODE *pdnDevNode*,
DEVNODE *dnDevNode*, ULONG *ulFlags*)

Return Value Returns CR_SUCCESS if the function is successful. Otherwise, the return value can be CR_INVALID_DEVNODE, CR_INVALID_FLAG, CR_INVALID_POINTER or CR_NO_SUCH_DEVNODE.

Parameters *pdnDevNode*

Address that receives a handle to the parent device node.

*dnDevNode*

Handle of the child device node.

*ulFlags*

Must be zero.

Comments This function is called by a device driver 156 that needs to walk the hardware tree 152.

See Also CONFIGMG_Get_Child

CONFIGMG_Get_Sibling

CONFIGMG_Get_Performance_Info

This API returns or reset performance information in a buffer.
CONFIGRET
CONFIGMG_Get_Performance_Info(PCMPERFINFO *pPerfInfo*,
ULONG *ulFlags*)

Return Value Returns CR_SUCCESS if the function is successful. Otherwise, the return value can be CR_INVALID_FLAG, CR_FAILURE (CM_PERFORMANCE_INFO was not defined) or CR_INVALID_POINTER.

Parameters *pPerfInfo*
Address that will receive the size (in bytes) of the resource-descriptor header.

*ulFlags*
Must be one of CM_PERFORMANCE_INFO_GET_DATA CM_PERFORMANCE_INFO_RESET, CM_PERFORMANCE_INFO_START or CM_PERFORMANCE_INFO_STOP.

CONFIGMG_Get_Private_DWord

Retrieves the private value a device node has in another device node.
CONFIGRET CONFIGMG_Get_Private_DWord(PFARULONG *pulPrivate*, DEVNODE *dnInDevNode*, DEVNODE *dnForDevNode*, ULONG *ulFlags*)

Return Value Returns CR_SUCCESS if the function is successful. Otherwise, the return value can be CR_INVALID_DEVNODE, CR_INVALID_FLAG or CR_INVALID_POINTER.

Parameters *pulPrivate*
Address that receives the private value.

*dnInDevNode*
Handle of the device node in which the private value will be stored.

*dnForDevNode*
Handle of the device node that will use this information. This device node must be either the same as dnInDevNode or an ancestor of *dnInDevNode*.

102

| | | |
|---|---|---|
| | | *ulFlags* |
| | | Must be zero. |
| Comments | | Neither *dnInDevNode* nor *dnForDevNode* may specify the root of the hardware tree. |
| | | This function is typically used by an enumerator 150 to retrieve information that was cached in a one of their children's device nodes using the CONFIGMG_Set_Private_DWord function. The private double-word value is typically a pointer to a structure. |
| | | Note that the device node specified by the *dnForDevNode* parameter is |
| | | responsible for cleaning up when the device node is removed. |
| See Also | | CONFIGMG_Set_Private_DWord |

CONFIGMG_Get_Res_Des_Data

| | | |
|---|---|---|
| | | Copies the data from a specified resource descriptor into a buffer. |
| | | CONFIGRET CONFIGMG_Get_Res_Des_Data(RES_DES *rdResDes*, PFARVOID *Buffer*, ULONG *BufferLen*, ULONG *ulFlags*) |
| Return Value | | Returns CR_SUCCESS if the function is successful. Otherwise, the return value can be CR_BUFFER_SMALL, CR_INVALID_FLAG, |
| | | CR_INVALID_POINTER or CR_INVALID_RES_DES. |
| Parameters | | *rdResDes* |
| | | Resource descriptor from which data is copied. |
| | | *Buffer* |
| | | Address of buffer that receives the data. |
| | | *BufferLen* |
| | | Size of *Buffer*, in bytes. |
| | | *ulFlags* |
| | | Must be zero. |
| Comments | | Typically the size of the buffer is determined by a previous call to |
| | | CONFIGMG_Get_Res_Des_Data_Size. If the value given in the *BufferLen* parameter is too small, the data is truncated, and the function returns CR_BUFFER_SMALL. |
| See Also | | CONFIGMG_Get_Res_Des_Data_Size |
| | | CONFIGMG_Get_Res_Des_Header_Size |
| | 35 | |

103

CONFIGMG_Get_Res_Des_Data_Size

Retrieves the size of a resource descriptor, not including the resource-descriptor header.

CONFIGRET
CONFIGMG_Get_Res_Des_Data_Size(PFARULONG *pulSize*,
RES_DES *rdResDes*, ULONG *ulFlags*)

Return Value Returns CR_SUCCESS if the function is successful. Otherwise, the return value can be CR_INVALID_FLAG, CR_INVALID_POINTER or CR_INVALID_RES_DES.

Parameters *pulSize*
Address that receives the size, in bytes, of the resource descriptor's data.

*rdResDes*
Handle of the resource descriptor whose size is being queried.

*ulFlags*
Must be zero.

See Also CONFIGMG_Get_Res_Des_Data

CONFIGMG_Get_Sibling

Retrieves the sibling of a device node.
CONFIGRET CONFIGMG_Get_Sibling(PDEVNODE *pdnDevNode*,
DEVNODE *dnDevNode*, ULONG *ulFlags*)

Return Value Returns CR_SUCCESS if the function is successful. Otherwise, the return value can be CR_INVALID_DEVNODE, CR_INVALID_FLAG, CR_INVALID_POINTER or CR_NO_SUCH_DEVNODE.

Parameters *pdnDevNode*
Address that receives a handle to the sibling device node.

*dnDevNode*
Handle of a device node.

*ulFlags*
Must be zero.

|  | 104 |
|---|---|
| Comments | This function can be called in a loop to retrieve all the siblings of a device node. When the function returns CR_NO_SUCH_DEVNODE, the device node has no more siblings. |
| See Also | CONFIGMG_Get_Child |
| | CONFIGMG_Get_Parent |

CONFIGMG_Get_Version

Retrieves version number of the configuration manager 158.

CONFIGRET CONFIGMG_Get_Version()

| Return Value | The high byte of the return value is the major revision number and the low byte is the minor revision number. The high word is not used. This is the only service where the result is not a CR_ something. |
|---|---|
| Comments | For example, version 4.0 of the configuration manager 158 returns 0x0400. This function currently returns 0x0400. |

CONFIGMG_Initialize

Ensures that the configuration manager 158 is ready to accept function calls, by creating the root node of the hardware tree 152 and installing and allocating the required resources 14. This function is typically called only by VMM and VXDLDR. No other VxD should call this function.

**CONFIGRET CONFIGMG_Initialize(ULONG *ulFlags*)**

| Return Value | Returns CR_SUCCESS if the function is successful. Does not return otherwise. |
|---|---|
| Parameters | *ulFlags* |
| | Must be either CM_INITIALIZE_VMM (the VMM is initializing configuration manager prior to Sys_Critical_Init) or CM_INITIALIZE_VXDLDR (VXDLDR is ready). |
| Comments | Only internal components of the "WINDOWS" operating system use this function. |

CONFIGMG_Intersect_Range_List

Creates a range list from the intersection of two specified range lists.

105

CONFIGRET CONFIGMG_Intersect_Range_List(RANGE_LIST *rlhOld1*, RANGE_LIST *rlhOld2*, RANGE_LIST *rlhNew*, ULONG *ulFlags*)

Return Value  Returns CR_SUCCESS if the function is successful. Otherwise, the return value can be CR_INVALID_FLAG, CR_INVALID_RANGE_LIST or CR_OUT_OF_MEMORY.

Parameters  *rlhOld1*

Handle of a range list to be used as part of the intersection.

*rlhOld2*

Handle of a range list to be used as part of the intersection.

*rlhNew*

Handle of a valid range list that represents the intersection of *rlhOld1* and *rlhOld2*. Anything contained in the *rlhNew* range list is removed by the operation.

*ulFlags*

Must be zero.

Comments  If this function returns CR_OUT_OF_MEMORY, *rlhNew* is the handle of a valid but empty range list.

See Also  CONFIGMG_Merge_Range_List

CONFIGMG_Invert_Range_List

Creates a range list that is the inverse of a specified range list; all claimed memory ranges in the new list are specified as free in the old list, and vice-versa.

CONFIGRET CONFIGMG_Invert_Range_List(RANGE_LIST *rlhOld*, RANGE_LIST *rlhNew*, ULONG *ulFlags*, ULONG *ulFlags*)

Return Value  Returns CR_SUCCESS if the function is successful. Otherwise, the return value can be CR_INVALID_FLAG, CR_INVALID_RANGE_LIST or CR_OUT_OF_MEMORY.

Parameters  *rlhOld*

Handle of the range list to be inverted.

*rlhNew*

Handle of a valid range list that receives the inverted copy of *rlhOld*. Anything contained in the *rlhNew* range list is removed by the operation.

*ulFlags*

Uppermost value of the inverted range list.

*ulFlags*

Must be zero.

Comments For example, the inversion of {[2, 4], [6, 8]} when the *ulMaxValue* parameter is 15 is {[0, 1], [5, 5], [9, 15]}.

If this function returns CR_OUT_OF_MEMORY, *rlhNew* is the handle of a valid but empty range list.

CONFIGMG_ISAPNP_To_CM

Converts ISAPNP requirements and adds them to a specified device node.
CONFIGRET CONFIGMG_ISAPNP_To_CM(PBYTE *pBuffer*, DEVNODE *dnDevNode*, ULONG *ulLogDev*, ULONG *ulFlags*)

Return Value Returns CR_SUCCESS if the function is successful. Otherwise, the return value can be CR_DEVNODE_HAS_REQS, CR_INVALID_DATA, CR_INVALID_DEVNODE, CR_OUT_OF_MEMORY, CR_NO_SUCH_LOG_DEV, CR_INVALID_FLAG or CR_INVALID_POINTER.

Parameters *pBuffer*

Address of a buffer that contains the ISAPNP requirement information. This information normally starts with a "Plug and Play" version number tag.

*dnDevNode*

Device node that receives the converted requirements. This device node must not already contain a logical configuration (requirements).

*ulLogDev*

Logical device number starting with 0.

*ulFlags*

Must be either CM_ISAPNP_ADD_RES_DES if using this API to convert resource data into a BASIC_LOG_CONF, CM_ISAPNP_ADD_BOOT_RES_DES if using this API to convert resource data into a BOOT_LOG_CONF. Otherwise it must be CM_ISAPNP_SETUP to do a setup on those values.

CONFIGMG_Load_DLVxDs

106

107

Loads dynamically loadable VxDs for a devnode.

CONFIGRET CONFIGMG_Load_DLVxDs(DEVNODE *dnDevNode,*
PFARCHAR *FileNames,* LOAD_TYPE *LoadType,* ULONG *ulFlags)*

Return Value  Returns CR_SUCCESS if the function is successful. Otherwise, the return value can be CR_INVALID_DEVNODE, CR_INVALID_FLAG, CR_INVALID_LOAD_TYPE, CR_INVALID_POINTER, CR_FAILURE, CR_OUT_OF_MEMORY, CR_NOT_SYSTEM_VM or CR_DLVXD_NOT_FOUND.

Parameters  *dnDevNode*

Device node for which a device driver or enumerator should be loaded.

*FileNames*

Filenames for the dynamically loadable VxD. Note that the .386 extension is required. If no path is specified, the function searches for the files the same way OpenFile does. The files can be space or comma delimited.

*LoadType*

Type of the VxD being loaded. This parameter can be one of the following values:

DLVXD_LOAD_DEVLOADER

Load as a device loader. (This type is rarely used.)

DLVXD_LOAD_DRIVER

Load as a device driver 156.

DLVXD_LOAD_ENUMERATOR

Load as an enumerator 150.

*ulFlags*

Must be zero.

CONFIGMG_Locate_DevNode

Retrieves a pointer to the device node corresponding to a specified device identifier.

CONFIGRET CONFIGMG_Locate_DevNode(PDEVNODE *pdnDevNode,* DEVNODEID *pDeviceID,* ULONG *ulFlags)*

Return Value  Returns CR_SUCCESS if the function is successful. Otherwise, the return value can be CR_INVALID_DEVICE_ID, CR_INVALID_FLAG, CR_INVALID_POINTER or CR_NO_SUCH_DEVNODE.

108

Parameters  *pdnDevNode*

Address that receives the handle of a device node.

*pDeviceID*

Address of a null-terminated string specifying a device identifier. This string is also the name of the corresponding registry key. If this parameter is NULL, the function retrieves a handle to the device node at the root of the hardware tree.

*ulFlags*

Must be zero.

CONFIGMG_Lock

Prevents the configuration manager 158 from sending events.

**CONFIGRET CONFIGMG_Lock(ULONG *ulFlags*)**

Return Value Returns CR_SUCCESS if the function is successful. Otherwise, the return value can be CR_INVALID_FLAG.

Parameters *ulFlags*

Must be zero.

Comments This function increments a counting semaphore that prevents the configuration manager 158 from sending events. Because the configuration manager 158 processes events during the system task time but with interrupts disabled at the critical places, there is little need to bracket a linear piece of VxD code or an interrupt handler.

Comments This function is asynchronous (that is, callable at interrupt time), reentrant, and fast.

See Also CONFIGMG_Process_Events_Now
CONFIGMG_Unlock

CONFIGMG_Merge_Range_List

Creates a range list from the union of two specified range lists.

**CONFIGRET CONFIGMG_Merge_Range_List(RANGE_LIST *rlhOld1*, RANGE_LIST *rlhOld2*, RANGE_LIST *rlhNew*, ULONG *ulFlags*)**

| | |
|---|---|
| Return Value | Returns CR_SUCCESS if the function is successful. Otherwise, the return value can be CR_INVALID_FLAG, CR_INVALID_RANGE_LIST or CR_OUT_OF_MEMORY. |
| Parameters | *rlhOld1* |
| | Handle of a range list to be used as part of the union. |
| | *rlhOld2* |
| | Handle of a range list to be used as part of the union. |
| | *rlhNew* |
| | Handle of a valid range list that represents the union of *rlhOld1* and *rlhOld2*. Anything contained in the *rlhNew* range list is removed by the operation. |
| | *ulFlags* |
| | Must be zero. |
| Comments | If this function returns CR_OUT_OF_MEMORY, *rlhNew* is the handle of a valid but empty range list. |
| See Also | CONFIGMG_Intersect_Range_List |

CONFIGMG_Modify_Res_Des

Modifies a resource descriptor.

CONFIGRET CONFIGMG_Modify_Res_Des(PRES_DES prdResDes, RES_DES rdResDes, RESOURCEID ResourceID, PFARVOID ResourceData, ULONG ResourceLen, ULONG ulFlags)

| | |
|---|---|
| Return Value | Returns CR_SUCCESS if the function is successful. Otherwise, the return value can be CR_INVALID_FLAG, CR_INVALID_POINTER, CR_INVALID_RES_DES, CR_INVALID_DEVNODE or CR_OUT_OF_MEMORY. |
| Parameters | *prdResDes* |
| | Address that receives the handle of the modified resource descriptor. |
| | *rdResDes* |
| | Handle of the resource descriptor to be modified. |
| Parameters | *ResourceID* |
| | One of the resource identifiers given in the *ResourceId* parameter of the CONFIGMG_Add_Res_Des function, ResType_All, or ResType_None. If this parameter is a resource type, the resource descriptor changes to have this type. If it is |

110

ResType_All, the previous resource type is preserved. If it is ResType_None, the resource descriptor is ignored, because arbitrators 154 for ResType_None always succeed.

Parameters   *ResourceData*

Address of a resource data structure.

*ResourceLen*

The size, in bytes, of the new resource data structure. (The new size can be different from the size before the modifications were made.)

*ulFlags*

Must be zero.

Comments   This function retrieves a handle to the new resource descriptor. This may or may not be the handle of the unmodified resource descriptor. The previous resource descriptor is invalid after calling this function.

See Also   CONFIGMG_Add_Res_Des

CONFIGMG_Move_DevNode

Replaces a root enumerated devnode by the valid non-root enumerated devnode.
CONFIGRET CONFIGMG_Move_DevNode(DEVNODE *dnFromDevNode*, DEVNODE *dnToDevNode*, ULONG *ulFlags*)

Return Value   Returns CR_SUCCESS if the function is successful. Otherwise, the return value can be CR_INVALID_FLAG, CR_INVALID_DEVNODE, CR_OUT_OF_MEMORY or CR_NOT_SYSTEM_VM.

Parameters   *dnFromDevNode*

Handle of the device node that has been root enumerated.

*dnToDevNode*

Handle of the device node that is a reenumeration of a root devnode.

*ulFlags*

Must be zero.

Comments   This function is used by the device installer 161a when it detects that a non-root enumerated devnode is really the same as its root enumerated counterpart. This function renames the root-enumerated devnode with the new name (so that for the current session, use of the CONFIGMG_Read/Write_Registry is directed to the appropriate place) and marks the root enumerated devnode as having a problem.

111

CONFIGMG_Next_Range

Returns the next range element in a range list.

CONFIGRET CONFIGMG_Next_Range(PRANGE_ELEMENT *preElement*, PULONG *pulStart*, PULONG *pulEnd*, ULONG *ulFlags*)

Return Value Returns CR_SUCCESS if the function is successful. Otherwise, the return value can be CR_FAILURE, CR_INVALID_FLAG, CR_INVALID_POINTER or CR_INVALID_RANGE.

Parameters  *preElement*
   Address of the handle of a range element. If this function is successful, this parameter points to the handle of the next range element when the function returns.

*pulStart*
   Address that receives the starting value of the first range.

*pulEnd*
   Address that receives the ending value of the first range.

*ulFlags*
   Must be zero.

Comments This function returns CR_FAILURE if there are no more elements in the range list.

See Also CONFIGMG_First_Range

CONFIGMG_Process_Events_Now

Forces event processing to occur immediately.

CONFIGRET CONFIGMG_Process_Events_Now(ULONG *ulFlags*)

Return Value Returns CR_SUCCESS if the function is successful. Otherwise, the return value can be CR_INVALID_FLAG or CR_NOT_SYSTEM_VM.

Parameters *ulFlags*
   Must be zero.

Comments In general, a standard device driver 156 should not need to call this function. It is meant to localize the event processing when debugging the configuration manager 158 by using an application program compatible with the "WINDOWS" operating system. The application would call CONFIGMG_Lock, any required configuration manager functions, CONFIGMG_Process_Events_Now, and CONFIGMG_Unlock. Note that this function overides the locking mechanism.

See Also CONFIGMG_Lock
CONFIGMG_Unlock

CONFIGMG_Query_Arbitrator_Free_Data

Returns arbitrator-specific free information.

**CONFIGRET
CONFIGMG_Query_Arbitrator_Free_Data(PFARVOID** *pData,*
ULONG *DataLen,* DEVNODE *dnDevNode,* RESOURCEID *ResourceID,*
ULONG *ulFlags)*

Return Value Returns CR_SUCCESS if the function is successful. Otherwise, the return value can be CR_BUFFER_SMALL, CR_FAILURE, CR_INVALID_DEVNODE, CR_INVALID_FLAG, CR_INVALID_POINTER, CR_INVALID_RESOURCEID or CR_NO_ARBITRATOR.

Parameters *pData*

Address of a buffer that receives the free information. This information is arbitrator specific.

*DataLen*

The size (in bytes) of the data buffer.

*dnDevNode*

Device node associated with the arbitrator 154. This is most meaningful for local arbitrators. (Although any device node can be used for global arbitrators, this parameter should specify the root or NULL in that case.)

*ResourceID*

One of the resource identifiers listed in the *ResourceId* parameter of the CONFIGMG_Add_Res_Des function. This function returns CR_INVALID_RESOURCEID if this value is ResType_All or ResType_None.

*ulFlags*

Must be zero.

| | | 113 |
|---|---|---|
| Comments | | This function succeeds even when it returns CR_BUFFER_SMALL. To avoid this error, call CONFIGMG_Query_Arbitrator_Free_Size before calling this function. |
| See Also | | CONFIGMG_Add_Res_Des<br>CONFIGMG_Query_Arbitrator_Free_Size |

CONFIGMG_Query_Arbitrator_Free_Size

Retrieves the size of the free information that the arbitrator 154 would return in a call to the CONFIGMG_Query_Arbitrator_Free_Data function.

CONFIGRET
CONFIGMG_Query_Arbitrator_Free_Size(PFARULONG *pulSize*,
DEVNODE *dnDevNode*, RESOURCEID *ResourceID*, ULONG *ulFlags*)

Return Value  Returns CR_SUCCESS if the function is successful. Otherwise, the return value can be CR_FAILURE, CR_INVALID_DEVNODE, CR_INVALID_FLAG, CR_INVALID_POINTER, CR_INVALID_RESOURCEID, CR_FAILURE or CR_NO_ARBITRATOR.

Parameters  *pulSize*
   Address that receives the size information.

*dnDevNode*
   Device node associated with the arbitrator 154. This is most meaningful for local arbitrators. (Although any device node can be used for global arbitrators, this parameter should specify the root or NULL in that case.)

*ResourceID*
   One of the resource identifiers listed in the *ResourceId* parameter of the CONFIGMG_Add_Res_Des function. This function returns CR_INVALID_RESOURCEID if this value is ResType_All or ResType_None.

*ulFlags*
   Must be zero.

See Also  CONFIGMG_Add_Res_Des
CONFIGMG_Query_Arbitrator_Free_Data

CONFIGMG_Query_Change_Config

Determines if it is appropriate to change the current Hardware Profile.

114

```
CONFIGRET CONFIGMG_Query_Change_Config(ULONG
ulDock, ULONG ulSerialNo, ULONG ulFlags)
```

Return Value   Returns CR_SUCCESS if it is okay to change the hardware profile,
CR_FAILURE if it is not okay. Otherwise, the return value can be
CR_INVALID_FLAG, CR_NOT_SYSTEM_VM or
CR_REGISTRY_ERROR.

Parameters   *ulDock*

The Docking Station Identifier of the dock that the computer 8 is attempting to connect to, 0 if unknown or if this is a request to undock.

*ulSerialNo*

The Docking Station Serial Number of the dock that the computer 8 is attempting to connect to, 0 if unknown or if this is a request to undock.

*ulFlags*

Must be one of the following:

CM_HW_PROF_UNDOCK

The computer 8 is attempting to undock.

CM_HW_PROF_DOCK

The computer 8 is attempting to dock to an unidentified dock.

CM_HW_PROF_DOCK_KNOWN

The computer 8 is attempting to dock to a known dock, which is identified by the ulDock and ulSerialNo paramters.

Comments   This function is preferably called by a "Plug and Play"-compatible BIOS enumerator. This function leaves some Root-enumerated devnodes in an inactive state. After calling this function, either CONFIGMG_Recompute_HW_Prof or CM_Fail_Change_HW_Prof should be called to return the Root enumerated devnodes to a normal state.

See Also   CONFIGMG_Recompute_HW_Prof
CONFIGMG_Fail_Change_HW_Prof

CONFIGMG_Query_Remove_SubTree

Checks whether a device node and its progeny can be removed.
```
CONFIGRET CONFIGMG_Query_Remove_SubTree(DEVNODE
dnAncestor, ULONG ulFlags)
```

| | |
|---|---|
| Return Value | Returns CR_SUCCESS if the function is successful. Otherwise, the return value can be CR_INVALID_DEVNODE, CR_INVALID_FLAG, CR_REMOVE_VETOED, or CR_NOT_SYSTEM_VM. |
| Parameters | *dnAncestor* |
| | The root of the subtree whose removal is being queried. |
| | *ulFlags* |
| | Must be zero. |
| Example | If the hardware can only detect removal, the enumerator 150 should call CONFIGMG_Remove_SubTree; however, this does not give application programs the opportunity to close their files. If the hardware has an indication that the user wants to remove it (that is, if it is software-eject capable), the enumerator 150 should follow the steps shown in this example: |
| | if ( CM_Query_Remove_SubTree(dnDevNode, 0)==CR_SUCCESS) |
| | CM_Remove_SubTree(dnDevNode, 0); |
| See Also | CONFIGMG_Remove_Subtree |

CONFIGMG_Read_Registry_Log_Confs

Retrieves logical configuarations from the registry 153.

CONFIGRET CONFIGMG_Read_Registry_Log_Confs(DEVNODE *dnDevNode*, ULONG *ulFlags*)

| | |
|---|---|
| Return Value | Returns CR_SUCCESS if the function is successful. Otherwise, the return value can be CR_INVALID_DEVNODE, CR_INVALID_FLAG, CR_OUT_OF_MEMORY, CR_INVALID_DATA, or CR_REGITRY_ERROR. |
| Parameters | *dnDevNode* |
| | Handle of a device node. |
| | *ulFlags* |
| | Must be zero. |
| Comments | This API is for use by the root enumerator, MCA bus enumerator, and the EISA enumerator. Instead of a hardware detection of the possible logical configurations, these enumerators rely on this API to read logical configurations from the hardware LogConfig subkey into the BASIC_LOG_CONF list. |

116

CONFIGMG_Read_Registry_Value

Retrieves a value in the registry 153.

CONFIGRET CONFIGMG_Read_Registry_Value(DEVNODE
dnDevNode, PFARCHAR pszSubKey, PFARCHAR pszValueName,
ULONG ulExpectedType, PFARVOID Buffer, PFARULONG
pulLength, ULONG ulFlags)

Return Value  Returns CR_SUCCESS if the function is successful. Otherwise, the return value can be CR_INVALID_DEVNODE, CR_INVALID_FLAG, CR_INVALID_POINTER, CR_NO_SUCH_VALUE, CR_WRONG_TYPE, CR_REGITRY_ERROR or CR_BUFFER_SMALL.

Parameters

*dnDevNode*

Handle of a device node. The devnode can have a NULL device ID, but in this case, CR_NO_SUCH_VALUE is returned.

*pszSubKey*

Name of the subkey. Can be NULL if none.

*pszValueName*

Name of the value.

*ulExpectedType*

Either REG_SZ if a string is wanted or REG_BINARY if a binary value is wanted.

*Buffer*

Address of the buffer that receives the registry data. This can be NULL if you just want to get the size of the value.

*pulLength*

The length of the buffer (both input and output).

*ulFlags*

Must be a combination of the following:

CM_REGISTRY_HARDWARE

Select the hardware branch.

CM_REGISTRY_SOFTWARE

Select the software branch.

CM_REGISTRY_USER

Use HKEY_CURRENT_USER.

117

| | CM_REGISTRY_CONFIG |
|---|---|
| | Use HKEY_CURRENT_CONFIG. |
| See Also | CONFIGMG_Write_Registry_Value |

CONFIGMG_Recompute_HW_Prof

Calculates the current hardware profile based on the Docking Station Identifier and the Docking Station Serial ID.

CONFIGRET CONFIGMG_Recompute_HW_Prof(ULONG *ulDock*, ULONG *ulSerialNo*, ULONG *ulFlags*)

Return Value
Returns CR_SUCCESS if the function is successful. Otherwise, the return value can be CR_INVALID_FLAG, CR_FAILURE, CR_NOT_SYSTEM_VM or CR_REGISTRY_ERROR.

Parameters

*ulDock*

The Docking Station Identifier if the computer is docked, 0 if the computer is undocked.

*ulSerialNo*

The Docking Station Serial Number if the computer is docked, 0 if the computer is undocked.

*ulFlags*

Must be one of the following:

CM_HW_PROF_UNDOCK

The computer is undocked.

CM_HW_PROF_DOCK

The computer is docked.

Comments This function is preferably called by a "Plug and Play"-compatible BIOS enumerator, after a successful dock change.

See Also
CONFIGMG_Set_HW_Prof
CONFIGMG_Query_Change_HW_Prof
CONFIGMG_Fail_Change_HW_Prof

CONFIGMG_Reenumerate_DevNode

Causes the enumerator of the specified device node to receive the CONFIG_ENUMERATE enumerator function.

118

```
CONFIGRET CONFIGMG_Reenumerate_DevNode(DEVNODE
dnDevNode, ULONG ulFlags)
```

Return Value Returns CR_SUCCESS if the function is successful. Otherwise, the return value can be CR_INVALID_FLAG. There is no checking of a valid devnode until later.

Parameters *dnDevNode*

The device node whose enumerator 150 will be called.

*ulFlags*

Must be zero.

Comments This function is asynchronous (that is, callable at interrupt time), reentrant, and fast.

CONFIGMG_Register_Arbitrator

Registers an arbitrator 154 for a resource 14.

```
CONFIGRET CONFIGMG_Register_Arbitrator(PREGISTERID
pRid, RESOURCEID id, CMARBHANDLER Handler, ULONG
ulDWordToBePassed, DEVNODE dnArbitratorNode, ULONG ulFlags)
```

Return Value Returns CR_SUCCESS if the function is successful. Otherwise, the return value can be CR_INVALID_API, CR_INVALID_DEVNODE, CR_INVALID_FLAG, CR_INVALID_POINTER, CR_INVALID_RESOURCEID, CR_INVALID_ARBITRATOR or CR_OUT_OF_MEMORY.

Parameters *pRid*

Address that receives the registration identifier of the arbitrator 154.

*id*

The unique resource number as given or defined by Microsoft Corporation, the assignee for the present invention.

*Handler*

Arbitrator entry point. This is the routine that will handle all arbitrator functions. This parameter cannot be NULL.

Parameters *ulDWordToBePassed*

The value that is passed when calling the arbitrator 154.

119

*dnArbitratorNode*

Handle of the device node that owns this resource. This value is important for local arbitrators, but it can be NULL for a global arbitrator. This value is passed when calling the arbitrator 154.

*ulFlags*

Specifies whether the resource is global. If it is ARB_LOCAL, the resource is local to only the children of *dnArbitratorNode*. Otherwise, it is ARB_GLOBAL.

Comments This function returns CR_INVALID_RESOURCEID if the ResType_Ignored_Bit set in the device identifier.

See Also CONFIGMG_Deregister_Arbitrator

CONFIGMG_Register_Device_Driver

Registers a configuration handler for a device node, thereby registering a device driver 156.

CONFIGRET CONFIGMG_Register_Device_Driver(DEVNODE *dnDevNode*, CMCONFIGHANDLER *Handler*, ULONG *ulRefData*, ULONG *ulFlags*)

Return Value Returns CR_SUCCESS if the function is successful. Otherwise, the return value can be CR_INVALID_DEVNODE, CR_INVALID_FLAG or CR_NOT_SYSTEM_VM.

Parameters *dnDevNode*

Handle of a device node. This handle must have been created by a call to the CONFIGMG_Locate_DevNode or CONFIGMG_Create_DevNode function.

*Handler*

Device-driver entry point. This is the routine that will handle all device-driver configuration functions. This parameter can be NULL if the device driver does not need to monitor configuration events.

*ulRefData*

Data that will be passed back to the Handler.

*ulFlags*

Must be either CM_REGISTER_DEVICE_DRIVER_STATIC or a combination of CM_REGISTER_DEVICE_DRIVER_DISABLEABLE and/or CM_REGISTER_DEVICE_DRIVER_REMOVABLE.

| | 120 | |
|---|---|---|
| Comments | | This function is preferably called by a "Plug and Play"-compatible device that "owns" or is otherwise associated with a device node within the hardware tree 152. It is typically called when the initializing device driver 156 is ready to start handling the device 20 represented by the device node. |
| See Also | | CONFIGMG_Create_DevNode<br>CONFIGMG_Locate_DevNode |

CONFIGMG_Register_DevLoader

| | | Specifies that a static VxD has reached the device initialization stage and is ready to function as a device loader to load a device driver 156 or an enumerator 150.<br>CONFIGRET CONFIGMG_Register_DevLoader(PVMMDDB *pDDB*, ULONG *ulFlags*) |
|---|---|---|
| Return Value | | Returns CR_SUCCESS if the function is successful. Otherwise, the return value can be CR_INVALID_API or CR_INVALID_FLAG. |
| Parameters | | *pDDB*<br>    The static VxD which is ready to be a device loader.<br>*ulFlags*<br>    Must be zero. |
| Comments | | If the *DDB* parameter is NULL or not valid, the function returns CR_SUCCESS but takes no action. Also, any PNP_NEW_DEVNODE will necessarily occur after this function returns (ie, on the next appy time). |

CONFIGMG_Register_Enumerator

| | | |
|---|---|---|
| | | Registers the enumerator handler for a device node, thereby registering an enumerator 150.<br>CONFIGRET CONFIGMG_Register_Enumerator(DEVNODE *dnDevNode*, CMENUMHANDLER *Handler*, ULONG *ulFlags*) |
| Return Value | | Returns CR_SUCCESS if the function is successful. Otherwise, the return value can be CR_INVALID_API, CR_INVALID_DEVNODE or CR_INVALID_FLAG. |
| Parameters | | *dnDevNode* |
| | | Handle of a device node. This handle must have been created by a call to the CONFIGMG_Locate_DevNode or CONFIGMG_Create_DevNode function. |

121

*Handler*

Enumerator entry point. This is the routine that will handle all enumerator calls. If this parameter is NULL, no enumerator 150 is loaded.

*ulFlags*

CM_REGISTER_ENUMERATOR_HARDWARE if the enumerator 150 conducts hardware detection (ie know for sure the device is there or not. Otherwise, must be CM_REGISTER_ENUMERATOR_SOFWARE.)

Comments This function is preferably called when a device driver 156 also operates as an enumerator 150. This function is typically called near the end of the initialization of an enumerator 150.

The *Handler* parameter is NULL when the device cannot be enumerated (as with VPICD, for example).

See Also CONFIGMG_Create_DevNode
CONFIGMG_Locate_DevNode

CONFIGMG_Register_Enumerator_Function

Register a handler to handle enumerator-specific functions.
CONFIGRET
CONFIGMG_Register_Enumerator_Function(DEVNODE *dnDevNode*, CMENUMFUNCTION *Handler*, ULONG *ulFlags*)

Return Value Returns CR_SUCCESS if the function is successful. Otherwise, the return value can be CR_INVALID_DEVNODE, CR_INVALID_API or CR_INVALID_FLAG.

Parameters *dnDevNode*

Handle of a device node.

*Handler*

The callback address.

*ulFlags*

Must be zero.

CONFIGMG_Remove_SubTree

Removes a device node and its children.

```
CONFIGRET CONFIGMG_Remove_SubTree(DEVNODE
dnAncestor, ULONG ulFlags)
```

Return Value Returns CR_SUCCESS if the function is successful. Otherwise, the return value can be CR_INVALID_DEVNODE, CR_INVALID_FLAG or CR_NOT_SYSTEM_VM.

Parameters *dnAncestor*

Handle of the device node that is being removed.

*ulFlags*

Must be zero.

Comments The configuration manager 158 notifies each device node in the subtree of the *dnAncestor* parameter of its imminent termination and then, if possible, frees the device nodes. If a PCMCIA card was removed, for example, the PCMCIA driver would use this function to remove the entire subtree from the hardware tree 152.

See Also CONFIGMG_Query_Remove_SubTree

CONFIGMG_Remove_Unmarked_Children

Removes any children of a device node for which the DN_HAS_MARK flag is cleared.

```
CONFIGRET
CONFIGMG_Remove_Unmarked_Children(DEVNODE dnDevNode,
ULONG ulFlags)
```

Return Value Returns CR_SUCCESS if the function is successful. Otherwise, the return value can be CR_INVALID_DEVNODE, CR_NOT_SYSTEM_VM or CR_INVALID_FLAG.

Parameters *dnDevNode*

Device node that is the parent of the device nodes which are removed if their DN_HAS_MARK flag is cleared.

*ulFlags*

Must be zero.

See Also CONFIGMG_Reset_Children_Marks

CONFIGMG_Reset_Children_Marks

Resets the DN_HAS_MARK flag in the children of a specified device node.
CONFIGRET CONFIGMG_Reset_Children_Marks(DEVNODE *dnDevNode,* ULONG *ulFlags)*

Return Value Returns CR_SUCCESS if the function is successful. Otherwise, the return value can be CR_INVALID_DEVNODE or CR_INVALID_FLAG.

Parameters *dnDevNode*
Device node that is the parent of the device nodes whose DN_HAS_MARK flags are reset.

*ulFlags*
Must be zero.

See Also CONFIGMG_Remove_Unmarked_Children

CONFIGMG_Run_Detection

Requests the configuration manager 158 ("CONFIGMG") to spawn the detection DLL and to run it.
CONFIGRET CONFIGMG_Run_Detection(ULONG *ulFlags)*

Return Value Returns CR_SUCCESS if the function is successful. Otherwise, the return value can be CR_INVALID_FLAG.

Parameters *ulFlags*
Must be zero.

Comments This API is preferably used by a device loader ("devloader") that detects a legacy card has been inserted in the computer 8.

CONFIGMG_Set_Bus_Info

Sets bus information in the devnode.
CONFIGRET CONFIGMG_Set_Bus_Info(DEVNODE *dnDevNode,* CMBUSTYPE *btBusType,* ULONG *ulSizeOfInfo,* PFARVOID *pInfo,* ULONG *ulFlags)*

Return Value Returns CR_SUCCESS if the function is successful. Otherwise, the return value can be CR_INVALID_FLAG, CR_INVALID_DEVNODE, CR_INVALID_POINTER, CR_OUT_OF_MEMORY.

Parameters *dnDevNode*
Handle of a device node.

124

*htBusType*

The bus valud (one of BusType*).

*ulSizeOfInfo*

The size of the info buffer pointed by pInfo.

*pInfo*

A pointer to the bus-specific information.

*ulFlags*

Must be zero.

Comments This function appends to the devnode some bus-specific information. This function is preferably used by the immediate parent enumerator of a devnode.

See Also CONFIGMG_Get_Bus_Info

CONFIGMG_Set_Device_Driver_Private_DWord

Retrieves the private value for a device driver 156 in a device node.
CONFIGRET
CONFIGMG_Set_Device_Driver_Private_DWord(DEVNODE *dnDevNode*, PFARULONG *pulDWord*, ULONG *ulFlags*)

Return Value Returns CR_SUCCESS if the function is successful. Otherwise, the return value can be CR_INVALID_DEVNODE or CR_INVALID_FLAG.

Parameters *dnDevNode*

Handle of the device node in which the private value will be stored.

*pulDWord*

Address that receives the private value.

*ulFlags*

Must be zero.

Comments This function is typically used by a device driver 156 to set information in this devnode cached (usually a pointer to memory).
Note that the initial value is set by the parameter on the CONFIGMG_Register_Device_Driver (the value is zero before that call).

See Also CONFIGMG_Get_Device_Driver_Private_DWord

CONFIGMG_Set_HW_Prof

Set the current hardware profile.

CONFIGRET CONFIGMG_Set_HW_Prof(ULONG *ulConfig,* ULONG *ulFlags)*

| | |
|---|---|
| Return Value | Returns CR_SUCCESS if the function is successful. Otherwise, the return value can be CR_INVALID_FLAG CR_FAILURE, CR_NOT_SYSTEM_VM or CR_REGISTRY_ERROR. |
| Parameters | *ulConfig*<br>The current hardware profile number.<br><br>*ulFlags*<br>Must be zero. |
| Comments | This function updates the HKEY_CURRENT_CONFIG predefined key in the registry 153, broadcasts a DBT_CONFIGCHANGED message, and reenumerates the Root devnode. It is preferably called by the configuration manager 158 and the control panel of the operating system 10. |
| See Also | CONFIGMG_Recompute_HW_Prof |

CONFIGMG_Set_HW_Prof_Flags

Sets the configuration-specific "Config" flags for a devnode/hardware profile combination.

CONFIGRET CONFIGMG_Set_HW_Prof_Flags(PCHAR *szDevNodeName,* ULONG *ulConfig,* ULONG *ulValue,* ULONG *ulFlags)*

| | |
|---|---|
| Return Value | Returns CR_SUCCESS if the function is successful. Otherwise, the return value can be CR_INVALID_FLAG, CR_NOT_SYSTEM_VM, CR_INVALID_POINTER or CR_REGISTRY_ERROR. |
| Parameters | *szDevNodeName*<br>The name of the devnode to modify.<br><br>*ulConfig*<br>The hardware profile number to modify. A ulConfig value of 0 indicates the current hardware profile should be modified.<br><br>*ulValue*<br>The new CSConfigFlags value. It may contain the following flags:<br><br>CSCONFIGFLAG_DISABLE<br>Disable the devnode in this hardware profile. |

126

CSCONFIGFLAG_DO_NOT_CREATE

Do not allow this devnode to be created in this hardware profile.

*ulFlags*

Must be zero.

Comments If the CONFIGFLAG_DO_NOT_CREATE bit is set for an existing devnode in the current hardware profile, it will be removed. If the CSCONFIGFLAG_DO_NOT_CREATE bit is cleared in the current hardware profile, the entire hardware tree 152 will be reenumerated, so that the devnode's parent has the chance to create the devnode if necessary.

See Also CONFIGMG_Set_HW_Prof_Flags

CONFIGMG_Set_Private_DWord

Sets the private value a device node has in another device node.

CONFIGRET CONFIGMG_Set_Private_DWord(DEVNODE *dnInDevNode*, DEVNODE *dnForDevNode*, ULONG *ulValue*, ULONG *ulFlags*)

Return Value Returns CR_SUCCESS if the function is successful. Otherwise, the return value can be CR_INVALID_DEVNODE or CR_INVALID_FLAG.

Parameters *dnInDevNode*

Handle of the device node in which the private value will be stored.

*dnForDevNode*

Handle of the device node that will use this information. This device node must be either the same as dnInDevNode or an ancestor of *dnInDevNode*.

*ulValue*

The private value to be stored. is the value to store.

*ulFlags*

Must be zero.

Comments Neither *dnInDevNode* nor *dnForDevNode* may specify the root of the hardware tree 152.

This function is typically used by an enumerator 150 to set information that will be retrieved using the CONFIGMG_Get_Private_DWord function. The private double-word value is typically a pointer to a structure.

127

The device node specified by the *dnForDevNode* parameter is responsible for cleaning up when the device node is removed.

See Also     CONFIGMG_Get_Private_DWord

CONFIGMG_Set_Private_Problem

Make CONFIGMG call the Private API with that devnode and the reference data.

CONFIGRET CONFIGMG_Set_Private_Problem(DEVNODE *dnDevNode*, ULONG *ulRefData*, ULONG *ulFlags*)

Return Value   Returns CR_SUCCESS if the function is successful. Otherwise, the return value can be CR_INVALID_DEVNODE or CR_INVALID_FLAG.

Parameters

*dnDevNode*

Handle of a device node.

*ulRefData*

Reference data to pass to the class installer.

*ulFlags*

Must be zero.

Comments   This API does not disable the devnode.

CONFIGMG_Setup_DevNode

Reenables and configures a specified device node, or asks the enumerator to download information.

CONFIGRET CONFIGMG_Setup_DevNode(DEVNODE *dnDevNode*, ULONG *ulFlags*)

Return Value   Returns CR_SUCCESS if the function is successful. Otherwise, the return value can be CR_INVALID_FLAG, CR_INVALID_DEVNODE, CR_NOT_SYSTEM_VM, CR_OUT_OF_MEMORY or CR_FAILURE.

Parameters

*dnDevNode*

Device node which may be reconfigured.

*ulFlags*

Must be either CM_SETUP_DEVNODE_READY (for reenabling a devnode that had a problem) or CM_SETUP_DOWNLOAD (to ask the enumerator to download information).

128

CONFIGMG_Sort_NodeList

Sorts a list of nodes that has been passed to the handler of an arbitrator 154.
CONFIGRET CONFIGMG_Sort_NodeList(NODELIST_HEADER *nlhNodeListHeader*, ULONG *ulFlags*)

Return Value Returns CR_SUCCESS if the function is successful. Otherwise, the return value can be CR_INVALID_API, CR_INVALID_FLAG or CR_INVALID_NODELIST.

Parameters *nlhNodeListHeader*

Address of a NODELISTHEADER_S structure containing the elements to sort.

*ulFlags*

Must be zero.

Comments This function is normally used by an arbitrator 154 to sort the nodelist it is given during a call to the arbitrator's handler. Normally, an arbitrator 154 sorts the nodelist by increasing ease of configuration; for example, an element that had only one possible IRQ would come before an element with 2 possible IRQs, and so on. The arbitrator 154 must first do a linear scan of the nodelist initializing nl_ulSortDWord (the lower the value, the more at the begining the element will be).

CONFIGMG_Test_Range_Available

Checks a memory range against a range list to ensure that no conflicts exist.
CONFIGRET CONFIGMG_Test_Range_Available(ULONG *ulStartValue*, ULONG *ulEndValue*, RANGE_LIST *rlh*, ULONG *ulFlags*)

Return Value Returns CR_SUCCESS if the function is successful. Otherwise, the return value can be CR_FAILURE, CR_INVALID_FLAG, CR_INVALID_RANGE or CR_INVALID_RANGE_LIST.

Parameters *ulStartValue*

Low end of the range.

*ulEndValue*

High end of the range.

*rlh*

Handle of a range list.

129

*ulFlags*

Must be zero.

CONFIGMG_Unlock

Reenables configuration manager events after a call to the CONFIGMG_Lock function.

CONFIGRET CONFIGMG_Unlock(ULONG *ulFlags*)

Return Value    Returns CR_SUCCESS if the function is successful. Otherwise, the return value can be CR_INVALID_FLAG.

Parameters    *ulFlags*

Must be zero.

Comments    This function decrements the counting semaphore that prevents the configuration manager 158 from sending events. If the count is zero, the configuration manager 158 begins sending events again. This function is asynchronous (that is, callable at interrupt time), reentrant, and fast.

See Also    CONFIGMG_Lock

CONFIGMG_Process_Events_Now

CONFIGMG_Write_Registry_Value

Sets a value in the registry 153.

CONFIGRET CONFIGMG_Write_Registry_Value(DEVNODE *dnDevNode*, PFARCHAR *pszSubKey*, PFARCHAR *pszValueName*, ULONG *ulType*, PFARVOID *Buffer*, ULONG *ulLength*, ULONG *ulFlags*)

Return Value    Returns CR_SUCCESS if the function is successful. Otherwise, the return value can be CR_INVALID_DEVNODE, CR_INVALID_FLAG, CR_INVALID_POINTER or CR_REGITRY_ERROR.

Parameters    *dnDevNode*

Handle of a device node. The devnode cannot have a NULL device ID.

*pszSubKey*

Name of the subkey. Can be NULL if none.

130

*pszValueName*

Name of the value.

*ulType*

Either REG_SZ if a string is to be written or REG_BINARY if a binary value is to be written.

*Buffer*

Address of the buffer that contains the registry data to write.

*ulLength*

The length of the buffer.

*ulFlags*

Must be a combination of the following:

CM_REGISTRY_HARDWARE

Select the hardware branch.

CM_REGISTRY_SOFTWARE

Select the software branch

CM_REGISTRY_USER

Use HKEY_CURRENT_USER.

CM_REGISTRY_CONFIG

Use HKEY_CURRENT_CONFIG.

See Also CONFIGMG_Read_Registry_Value

CONFIGMG_Yield

Waits a specified number of microseconds.

CONFIGRET CONFIGMG_Yield(ULONG *ulMicroseconds*, ULONG *ulFlags*)

Return Value Returns CR_SUCCESS if the function is successful. Otherwise, the return value can be CR_INTERRUPTS_DISABLED or CR_INVALID_FLAG.

Parameters *ulMicroseconds*

The number of microseconds to wait. This value cannot be larger than 60000000L (60 seconds).

131

*ulFlags*

Flags controlling the resumption of execution. This parameter can be one of the following:

CM_YIELD_RESUME_EXEC

Enable software simulation of interrupts.

CM_YIELD_NO_RESUME_EXEC

Ensures no other VxD gets control (other than hardware interrupts).

Comments     A device driver 156 calls this function during any configuration-handler function in which the adapter card needs a delay. For example, some PCMCIA
       I/O cards require a delay of several seconds before being configured or reconfigured to a specified I/O space.\

Table 4 describes the callback functions of the configuration manager 158. Referring now to Table 4, as shown below:

Table 4: Configuration Manager Callback Functions

ArbitrationHandler

CONFIGRET ArbitrationHandler(ARBFUNC afcFunc, ULONG ulRefData,

DEVNODE dnDevNode, NODELIST_HEADER pnlhNodeListHeader);

An arbitrator-supplied function that processes arbitration messages for a device node.

- Returns CR_SUCCESS if successful, or one of the error values given in

<CONFIGRET_table>.

*afcFunc*

Arbitration message. Can be one of these values:

| | |
|---|---|
| ARB_TEST_ALLOC | Check if requested allocation works. |
| ARB_RETEST_ALLOC | Check if previous allocation works. |
| ARB_SET_ALLOC | Set the tested allocation. |
| ARB_RELEASE_ALLOC | Release the tested allocation. |
| ARB_QUERY_FREE | Return free resource. |

132

| ARB_REMOVE | Device node is gone. |
| ARB_FORCE_ALLOC | Force previous TEST_ALLOC |

*ulRefData*

32-bit reference data value. This is the 32-bit value specified in the call to the CONFIGMG_Register_Arbitrator service when the handler was registered.

*dnDevNode*

Handle of the device node associated with this arbitrator.

*pnlhNodeListHeader*

Address of a NODELIST_HEADER structure that contains information about the logical configurations of all devices to be be configured.

ConfigHandler

```
CONFIGRET ConfigHandler(CONFIGFUNC cfFunc,
    SUBCONFIGFUNC scfSubFunc, DEVNODE dnDevNode,
    DWORD dwRefData, ULONG ulFlags);
```

A device driver-supplied function that processes configuration messages for a device node.

- Returns CR_SUCCESS if successful, or one of the error values given in <CONFIGRET_table>.

*cfFunc*

Function identifier. Can be one of these values:

| CONFIG_APM | APM functions. |
| CONFIG_CALLBACK | Devnode is being called back. |
| CONFIG_ENUMERATE | Devnode must enumerated. |
| CONFIG_FILTER | Ancestors must filter requirements. |
| CONFIG_PREREMOVE | Devnode must stop using config. |
| CONFIG_PREREMOVE2 | Devnode must stop using config. |
| CONFIG_READY | The devnode has been setup. |

133

| | |
|---|---|
| CONFIG_REMOVE | Devnode must stop using config. |
| CONFIG_SETUP | Devnode should download driver. |
| CONFIG_SHUTDOWN | We are shutting down. |
| CONFIG_START | Devnode dynamic initialization. |
| CONFIG_STOP | Devnode must stop using config. |
| CONFIG_TEST | Can devnode change state now. |
| CONFIG_TEST_FAILED | Continue as before after a TEST. |
| CONFIG_TEST_SUCCEEDED | Prepare for the STOP/REMOVE. |
| CONFIG_VERIFY_DEVICE | Insure the legacy card is there. |

*scfSubFunc*

Subfunction identifier.

*dnDevNode*

Handle of the device node to process messages for.

*dwRefData*

32-bit reference data value. This is the 32-bit value passed to the CONFIGMG_Register_Device_Driver service when the handler was registered.

*ulFlags*

Reserved; must be 0.

EnumerationHandler

```
CONFIGRET EnumerationHandler(CONFIGFUNC cfFunc,
    SUBCONFIGFUNC scfSubFunc, DEVNODE dnToDevNode,
    DEVNODE dnAboutDevNode, ULONG ulFlags);
```

An enumerator-supplied function that processes enumeration messages for a device node.

- Returns CR_SUCCESS if successful, or one of the error values given in <CONFIGRET_table>.

134

*cfFunc*

Function identifier. Can be one of these values:

| | |
|---|---|
| CONFIG_APM | APM functions. |
| CONFIG_CALLBACK | Devnode is being called back. |
| CONFIG_ENUMERATE | Devnode must enumerated. |
| CONFIG_FILTER | Ancestors must filter requirements. |
| CONFIG_PREREMOVE | Devnode must stop using config. |
| CONFIG_PREREMOVE2 | Devnode must stop using config. |
| CONFIG_READY | The devnode has been setup. |
| CONFIG_REMOVE | Devnode must stop using config. |
| CONFIG_SETUP | Devnode should download driver. |
| CONFIG_SHUTDOWN | We are shutting down. |
| CONFIG_START | Devnode dynamic initialization. |
| CONFIG_STOP | Devnode must stop using config. |
| CONFIG_TEST | Can devnode change state now. |
| CONFIG_TEST_FAILED | Continue as before after a TEST. |
| CONFIG_TEST_SUCCEEDED | Prepare for the STOP/REMOVE. |
| CONFIG_VERIFY_DEVICE | Insure the legacy card is there. |

*scfSubFunc*

Subfunction identifier.

*dnToDevNode*

Handle of the device node to process messages for.

*dnAboutDevNode*

Handle of the device node to which processing applies. This is typically a child of the device node specified by *dnToDevNode*.

*ulFlags*

Reserved; must be 0.

135

Table 5 describes the messages for the configuration manager 158. Referring now to Table 5, the messages include:

Table 5: Configuration Manager Messages

ARB_TEST_ALLOC

Sent to direct the arbitrator 154 to test the given resource allocations. The arbitrator 154 should attempt to satisfy all allocation requests contained in the nodelist for the resource 14. Depending on the result, the configuration manager 158 subsequently sends either a ARB_SET_ALLOC or ARB_RELEASE_ALLOC message.

- Returns CR_SUCCESS if allocation requests are satisfied, CR_FAILURE if not, or CR_OUT_OF_MEMORY if not enough memory to complete the test.

Generally, the arbitrator 154 sorts the list according to most likely successful allocation order, makes a copy of the current allocation structure(s), releases all resources 14 currently allocated to device nodes on the list, then attempts to satisfy allocation requests by passing through the entire list. The arbitrator 154 tries all possible combinations of allocations and saves the successful allocations in both the node list for the device and the copy of the allocation data structure.

ARB_RETEST_ALLOC

Sent to direct the arbitrator 154 to retest the given resource allocations. The arbitrator 154 attempts to satisfy all allocation requests contained in the nodelist for the resource 14. Depending on the result, the configuration manager 158 subsequently sends either a ARB_SET_ALLOC or ARB_RELEASE_ALLOC message.

- Returns CR_SUCCESS if successful allocation, CR_FAILURE if unsuccessful allocation, or CR_OUT_OF_MEMORY if not enough memory.

The arbitrator 154 starts with the result of a previous ARB_TEST_ALLOC message. Without sorting the node list, the arbitrator 154 makes a copy of the current allocation structure(s), releases all resources 14 currently allocated to device nodes on the nodelist, then attempts to satisfy the allocations from the previous ARB_TEST_ALLOC message. The arbitrator 154 saves the successful allocations in the allocation data structure.

ARB_FORCE_ALLOC

Sent to direct the arbitrator 154 to retest, without failure, the given resource allocations. The arbitrator 154 must satisfy all allocation requests contained in the nodelist for the resource 14. The configuration manager 158 subsequently sends either a ARB_SET_ALLOC or ARB_RELEASE_ALLOC message.

- Returns CR_SUCCESS or CR_OUT_OF_MEMORY if not enough memory to complete the test.

The arbitrator 154 starts with the result of a previous ARB_TEST_ALLOC message. Without sorting the nodelist, the arbitrator 154 makes a copy of the current allocation structure(s), releases all resources currently allocated to device nodes on the nodelist, then attempts to satisfy the allocations from the previous ARB_TEST_ALLOC message. The arbitrator 154 saves the successful allocations in the allocation data structure.

ARB_SET_ALLOC

Sent to direct the arbitrator 154 to make a test allocation the real allocation. The arbitrator 154 makes the copy of the allocation data structure the current valid allocation.

- Returns CR_SUCCESS.

ARB_RELEASE_ALLOC

Sent to direct the arbitrator 154 to clean up after a failed test allocation. The arbitrator 154 should free all allocations made during the previous ARB_TEST_ALLOC message.

- Returns CR_SUCCESS.

137

ARB_QUERY_FREE

Sent to request information about free resources for a logical configuration. The arbitrator 154 should return resource-specific data on the free element.

- Returns CR_SUCCESS if successful, CR_FAILURE if the request makes no sense, or CR_OUT_OF_MEMORY if not enough memory.

*pnlhNodeListHeader*
    Address of an arbitfree_s structure.

ARB_REMOVE

Sent when the device node associated with the arbitration handler is being removed. The arbitrator 154 should carry out appropriate clean up.

- Returns CR_SUCCESS.

CONFIG_APM

Sent to notify a driver of a power management event. The driver should determine the type of event and take appropriate action.

- Return CR_SUCCESS. On a request for permission, return CR_SUCCESS to grant permission, CR_FAILURE to deny it.

*scfSubFunc*
    APM subfunction number. Can be one of these values:

CONFIG_APM_STANDBY_SUSPEND
        System is changing to standby or suspending operation.

CONFIG_APM_RESUME
        Operation resuming.

CONFIG_APM_TEST_STANDBY_SUSPEND
        Request for permission to changeto standby or suspend operation.

CONFIG_APM_STANDBY_SUSPEND_FAILED

138

Standby or suspend request denied.

The CONFIG_APM_UI_ALLOWED value can be combined with CONFIG_APM_STANDBY_SUSPEND to indicate that the driver can prompt the user for instruction on how to respond to the request.

CONFIG_CALLBACK

Sent to a device driver 156 in a response to a request to be called back. The device driver 156 can carry out appropriate tasks.
- Return CR_SUCCESS.

CONFIG_ENUMERATE

Sent to direct an enumerator 150 to enumerate its immediate children. This message is sent in response to the insertion or removal of a device 20. An enumerator 150 should create a device node for each child by using the CONFIGMG_Create_DevNode service or remove children by using the CONFIGMG_Remove_SubTree service as appropriate.
- Return CR_SUCCESS.

The enumerator 150 preferably adds logical configuration data or logical configurations for each newly created device node.

CONFIG_FILTER

Sent to direct an enumerator 150 to process a new device 20 or changes to the configuration of the computer 8. The enumerator 150 should retrieve the filtered logical configuration for the indicated device node and modify the requirements as needed. For example, the PCMCIA device driver removes unsupported IRQs and pre-allocates I/O port and memory ranges.
- Return CR_SUCCESS.

139

Initially, the filtered requirements are identical to the basic requirements. An enumerator 150 may alter the requirements of its own device node as well those of the indicated device node. When a device driver 156 processes this message, it should look only at the filtered requirements list only.

Use the CONFIGMG_Get_First_Log_Conf or CONFIGMG_Get_Alloc_Log_Conf to retrieve the filtered logical configuration (FILTERED_LOG_CONF) for this device node.

CONFIG_PREREMOVE

Sent to direct the device driver 156 to stop using its allocated configuration. This message is intended to give the device driver 156 the chance to prepare for the removal of its device 20.

- Return CR_SUCCESS.

CONFIG_PREREMOVE2

Sent to direct the device driver 156 to stop using its allocated configuration. This message is intended to give the device driver 156 the chance to prepare for the removal of its device 20.

- Return CR_SUCCESS.

CONFIG_READY

Sent to notify the device driver 156 that the associated device node has been set up.

- Return CR_SUCCESS.

CONFIG_REMOVE

Sent to notify the device driver 156 that the associated device node is being removed from the hardware tree. The device driver 156 should deallocate any instance data for the device node and take whatever other measures are necessary to stop using the device node, the associated hardware, and the
allocated configuration.

140

- Return CR_SUCCESS.

*scfSubFunc*

Subfunction number. Can be one of these values:

| | |
|---|---|
| CONFIG_REMOVE_DYNAMIC | Removes a dynamically-loaded driver. |
| CONFIG_REMOVE_SHUTDOWN | Removes a driver as part of system shutdown. |

This message is not always preceded by the CONFIG_TEST_CAN_REMOVE message.

Use the CONFIGMG_Get_First_Log_Conf or CONFIGMG_Get_Alloc_Log_Conf to retrieve the allocated logical configuration (ALLOC_LOG_CONF) for this device node.

CONFIG_SETUP

Sent to notify the device driver 156 that the device node has been setup. The device driver 156 should load additional device drivers if possible. For example, the device driver 156 could load appropriate device drivers from device ROM, such as for ISA_RTR, PCI and PCMCIA devices.

- Return CR_SUCCESS.

CONFIG_SHUTDOWN

Sent when the system is shutting down. The device driver 156 should free the resources 14 and shutdown its device 20.

- Return CR_SUCCESS.

CONFIG_START

Sent when a configuration has been allocated for the device node. The device driver 156 can retrieve the allocated configuration and begin to use it.

| | |
|---|---|
| CONFIG_START_DYNAMIC_START | Starting dynamically-loaded driver. |
| CONFIG_START_FIRST_START | Starting system for the first time. |

141

Use the CONFIGMG_Get_First_Log_Conf or
CONFIGMG_Get_Alloc_Log_Conf to retrieve the allocated logical
configuration (ALLOC_LOG_CONF) for this device node.

CONFIG_STOP

Sent to direct the device driver 156 to stop using its current allocated
configuration. The device driver 156 should stop using the resources 14 in its
allocated configuration until it receives a subsequent CONFIG_START
message.

- Return CR_SUCCESS.

*scfSubFunc*

Subfunction number. Can be one of these values:

| | |
|---|---|
| CONFIG_STOP_DYNAMIC_STOP | Directs the driver to stop using the allocated configuration. |
| CONFIG_STOP_CHILD_FAILED_START | Driver for child device node failed to start. |
| CONFIG_STOP_HAS_PROBLEM | Driver has a driver-specific problem. |

Use the CONFIGMG_Get_First_Log_Conf or
CONFIGMG_Get_Alloc_Log_Conf to retrieve the allocated logical
configuration data (ALLOC_LOG_CONF) for this device node.

CONFIG_TEST

Sent to request permission to invalidate the assigned configuration or to remove
the given device node. The device driver 156 should not grant permission if it
cannot stop using its current configuration or is not prepared for the device 20
to be removed from the computer 8.

- Return CR_SUCCESS to grant permission, CR_FAILURE otherwise.

*scfSubFunc*

Subfunction number. Can be one of these values:

142

| | |
|---|---|
| CONFIG_TEST_CAN_STOP | Request for permission to invalidate the configuration currently assigned to the driver. |
| CONFIG_TEST_CAN_REMOVE | Request for permission to remove the given device node. |

CONFIG_TEST_FAILED

Sent to notify device driver 156 that the previous CONFIG_TEST message was canceled by a device driver156 . The device driver 156 should continue operation as before receiving the CONFIG_TEST message.
- Return CR_SUCCESS.

CONFIG_TEST_SUCCEEDED

Sent to notify device driver 156 that the previous CONFIG_TEST message succeeded. This gives the device driver 156 an opportunity to prepare for the subsequent CONFIG_STOP or CONFIG_REMOVE message.
- Return CR_SUCCESS.

CONFIG_VERIFY_DEVICE

Sent to verify that the given legacy card is present.
- Return CR_SUCCESS if the card is present, CR_DEVICE_NOT_THERE otherwise.

Table 6 describes the structures used with services of the configuration manager 158. Referring now to the structure of Table 6, as shown below:

Table 6: Configuration Manager Structures arbitfree_s

```
struct arbitfree_s {
    PVOID *af_PointerToInfo;   // the arbitrator info
```

143

```
DLORD AI_SizeOfInfo;      // size of the info
};
```

Contains information about a free resource element.

CMCONFIG

```
struct Config_Buff_s {
    WORD wNumMemWindows;              // Num memory windows
    DWORD dMemBase[MAX_MEM_REGISTERS];  // memory window base
    DWORD dMemLength[MAX_MEM_REGISTERS]; // memory window length
    WORD wMemAttrib[MAX_MEM_REGISTERS];  // memory window attrib
    WORD wNumIOPorts;                  // num IO ports
    WORD wIOPortBase[MAX_IO_PORTS];    // IO port base
    WORD wIOPortLength[MAX_IO_PORTS];  // IO port length
    WORD wNumIRQs;                     // num IRQ info
    BYTE bIRQRegisters[MAX_IRQS];      // IRQ list
    BYTE bIRQAttrib[MAX_IRQS];         // IRQ attrib list
    WORD wNumDMAs;                     // num DMA channels
    BYTE bDMAList[MAX_DMA_CHANNELS];   // DMA list
    WORD wDMAAttrib[MAX_DMA_CHANNELS]; // DMA Attrib list
    BYTE bReserved1[3];                // reserved
};
typedef struct Config_Buff_s CMCONFIG;
```

Contains information about an allocated configuration of resources 14.

CMPERFINFO

```
struct cm_performance_info_s {
    CMTIME ctBoot;
    CMTIME ctAPI[NUM_CM_SERVICES];
    CMTIME ctRing3;
    CMTIME ctProcessTree;
    CMTIME ctAssignResources;
    CMTIME ctSort;
```

144

```
         CMTIME    ctRegistry;
         CMTIME    ctVxDLdr;
         CMTIME    ctNewDevNode;
         CMTIME    ctSendMessage;
         CMTIME    ctShell;
         CMTIME    ctConfigMessage[NUM_CONFIG_COMMANDS];
         CMTIME    ctArbTime[ResType_Max-1][NUM_ARB_COMMANDS];
         DWORD     dwStackSize;
         DWORD     dwMaxProcessTreePasses;
     };

typedef struct cm_performance_info_s CMPERFINFO;
     typedef CMPERFINFO   CMFAR *PCMPERFINFO;
```

Contains performance information that may be used for debugging of the operating system 10.

CMTIME

```
     struct cmtime_s {
20        DWORD     vtAPICount;
           VMMTIME  vtAPITime;
     };
     typedef struct cmtime_s CMTIME;
     typedef CMTIME *PCMTIME;
```

Contains time information used for performance monitoring of the operating
system 10.

DMA_DES

```
     struct DMA_Des_s {
          BYTE DD_Flags;            // channel width; see below
          BYTE DD_Alloc_Chan;       // allocated channel number
          BYTE DD_Req_Mask;         // mask of requested channels; see below
          BYTE DD_Reserved;         // reserved; do not use
35   };
```

145

```
typedef struct DMA_Des_s DMA_DES;
```

Contains information about resource descriptors for the DMA channels 26.

DD_Flags

Channel width flags. Can be one of these values:

| | |
|---|---|
| fDD_BYTE | 8-bit channel |
| fDD_WORD | 16-bit channel |
| fDD_DWORD | 32-bit channel |

DD_Req_Mask

Mask of requested DMA channels. Bit 0 is set to request channel 0, bit 1 to request channel 1, and so on. More than one bit is set to indicate alternative channel allocations.

DMA_RESOURCE

```
struct DMA_Resource_s {
    DMA_DES DMA_Header;
};
typedef struct DMA_Resource_s DMA_RESOURCE;
```

Contains information about a DMA channel 26.

IO_DES

```
struct IO_Des_s {
    WORD IOD_Count;            // count of IO_RANGE structures
    WORD IOD_Type;             // size of IO_RANGE structures
    WORD IOD_Alloc_Base;       // allocated base port address
    WORD IOD_Alloc_End;        // allocated end port address
    WORD IOD_DesFlags;         // descriptor flags
    BYTE IOD_Alloc_Alias;      // allocated port aliases
    BYTE IOD_Alloc_Decode;     // allocated alias decode key
};
typedef struct IO_Des_s IO_DES;
```

Contains information about the resource descriptors for the I/O port 28. The full descriptor consists of this structure and an array of IO_RANGE structures.

IOD_Count

Number of IO_RANGE structures in this resource descriptor.

IOD_Type

Size, in bytes, of each IO_RANGE structure in this resource descriptor.

IOD_Alloc_Base

Allocated base port address.

IOD_Alloc_End

Allocated end port address.

IO_RANGE

```
struct IO_Range_s {
    WORD IOR_Align;        // mask for base alignment
    WORD IOR_nPorts;       // number of ports
    WORD IOR_Min;          // min port address
    WORD IOR_Max;          // max port address
    WORD IOR_Range_Flags;  // flags
    BYTE IOR_Alias;        // alias offset
    BYTE IOR_Decode;       // alias decode key
};
typedef struct IO_Range_s IO_RANGE;
```

Contains information about a range of addresses for the I/O port 28.

IO_RESOURCE

```
struct IO_Resource_s {
    IO_DES   IO_Header;
    IO_RANGE IO_Data[];
};
typedef struct IO_Resource_s IO_RESOURCE;
```

Contains information about an I/O port 28.

147

IRQ_DES

```
     struct IRQ_Des_s {
         WORD IRQD_Flags;        // flags; see below
         WORD IRQD_Alloc_Num;    // allocated IRQ number
         WORD IRQD_Req_Mask;     // mask for requested IRQs
         WORD IRQD_Alloc_Mask;   // allocated IRQ mask
     };
     typedef struct IRQ_Des_s IRQ_DES;
```

Contains information about a resource descriptor for an IRQ 24.

IRQD_Flags

Flags. Can be fIRQD_Share to indicate IRQ can be shared.

IRQ_RESOURCE

```
     struct IRQ_Resource_s {
         IRQ_DES    IRQ_Header;
     };
     typedef struct IRQ_Resource_s IRQ_RESOURCE;
```

Contains information about an IRQ 24.

MEM_DES

```
     struct Mem_Des_s {
         WORD    MD_Count;          // count of MEM_RANGE structures
         WORD    MD_Type;           // size of MEM_RANGE structures
         ULONG   MD_Alloc_Base;     // allocated start address
         ULONG   MD_Alloc_End;      // allocated end address
         WORD    MD_Flags;          // descriptor flags
         WORD    MD_Reserved;       // reserved; do not use
     };
     typedef struct Mem_Des_s MEM_DES;
```

Contains information about a resource descriptor for the memory 22. The full descriptor consists of this structure and an array of MEM_RANGE structures.

MD_Count

Number of MEM_RANGE structures in this resource descriptor.

MD_Type

Size, in bytes, of each MEM_RANGE structure in this resource descriptor.

MEM_RANGE

```
struct Mem_Range_s {
    ULONG MR_Align;      // mask for base alignment
    ULONG MR_nBytes;     // count of bytes
    ULONG MR_Min;        // min Address
    ULONG MR_Max;        // max Address
    WORD  MR_Flags;      // flags
    WORD  MR_Reserved;   // reserved; do not use
};
typedef struct Mem_Range_s MEM_RANGE;
```

Contains information about a range of addresses for the memory 22.

MEM_RESOURCE

```
struct MEM_Resource_s {
    MEM_DES   MEM_Header;
    MEM_RANGE MEM_Data[];
};
typedef struct MEM_Resource_s MEM_RESOURCE;
```

Contains information about the memory 22.

NODELIST

```
struct nodelist_s {
    struct nodelist_s *nl_Next;    // next node element
```

```
    struct nodelist_s   *nl_Previous;     // previous node element
    struct devnode_s    *nl_ItsDevNode;   // device node this nl refers to
    struct Req_Conf     *nl_Test_Req;     // test resource list request
    DWORD   nl_dwSortWord;                // sort order
```

Contains information about an element in a node list. Although additional members can be appended to this structure, the first three members should not be changed.

NODELIST_HEADER

```
struct nodelistheader_s {
    struct nodelist_s *nlh_Head;   // First node element
    struct nodelist_s *nlh_Tail;   // Last node element
};
```

Contains information about the elements in a node list.

VMMTIME

```
struct vmmtime_s {
    DWORD vmmtime_lo;
    DWORD vmmtime_hi;
};

typedef struct vmmtime_s VMMTIME;
typedef VMMTIME *PVMMTIME;
```

Contains time information used for performance montoring for the operating system 10.

Table 7 describes certain constants used with services of the configuration manager 158. The functions of the configuration manager 158 return a CONFIGRET value. CONFIGRET is defined as either 16- or 32-bit, depending on the compiler option; 16-bit code returns a 16-bit value and 32-bit code returns a 32-bit value.

150

The functions of the configuration manager 158 return CR_SUCCESS when they are successful. Otherwise, they return one of the following values in Table 7:

Table 7: Configuration Manager Constants

| Value | Meaning |
| --- | --- |
| CR_ALREADY_SUCH_DEVNODE | Specified device node already exists |
| CR_BUFFER_SMALL | The operation succeeded, but the specified buffer was too small |
| CR_CREATE_BLOCKED | Flags specifies that the devnode should not be created |
| CR_DEFAULT | Return the default result |
| CR_DEVICE_NOT_THERE | Driver could not find device |
| CR_DEVLOADER_NOT_READY | Device loader was not ready |
| CR_DEVNODE_HAS_REQS | Device node already has requirements |
| CR_DLVXD_NOT_FOUND | Dynamically loadable VxD was not found |
| CR_FAILURE | Failure (Arbitrator/Enumerator) |
| CR_INTERRUPTS_DISABLED | Interrupts were disabled |
| CR_INVALID_API | The function cannot be called from ring 3 |
| CR_INVALID_ARBITRATOR | Arbitrator's registration identifier is invalid or there is already such a global arbitrator |
| CR_INVALID_DATA | ISA data is invalid |
| CR_INVALID_DEVICE_ID | Length of device identifier is greater than MAX_DEVICE_ID_LEN |
| CR_INVALID_DEVNODE | Device node is invalid |
| CR_INVALID_FLAG | Flags parameter is invalid |
| CR_INVALID_LOAD_TYPE | Load type is greater than MAX_DLVXD_LOAD_TYPE |
| CR_INVALID_LOG_CONF | Logical configuration is invalid |

| | |
|---|---|
| CR_INVALID_NODELIST | Nodelist header is invalid |
| CR_INVALID_POINTER | Specified pointer is invalid |
| CR_INVALID_PRIORITY | Priority number>MAX_LCPRI |
| CR_INVALID_RANGE | End range less than start range |
| CR_INVALID_RANGE_LIST | Range list not valid |
| CR_INVALID_RES_DES | Resource descriptor is invalid |
| CR_INVALID_RESOURCEID | The resource identifier is ResType_All |
| CR_NEED_RESTART | The config handler could not dynamically start the device, but will be able too the next boot |
| CR_NO_ARBITRATOR | Resource has no arbitrator |
| CR_NO_MORE_HW_PROFILES | No more hardware profiles |
| CR_NO_MORE_LOG_CONF | No more logical configurations |
| CR_NO_MORE_RES_DES | No more resource descriptors |
| CR_NO_REGISTRY_HANDLE | Operation will not produce registry entry |
| CR_NO_SUCH_DEVNODE | Device node could not be located |
| CR_NO_SUCH_LOGICAL_DEV | Logical device not found in ISAPNP conversion |
| CR_NO_SUCH_VALUE | Registry value does not exist |
| CR_NOT_DISABLEABLE | That devnode cannot be disable right now |
| CR_NOT_SYSTEM_VM | The service must be coming from the system VM |
| CR_OUT_OF_MEMORY | Out of memory |
| CR_REGISTRY_ERROR | Registry failed |
| CR_REMOVE_VETOED | The hardware tree should not be removed |
| CR_WRONG_TYPE | Registry value is of other type |

Messaging Architecture

The present embodiment of the operating system 10 is generally based on the messaging architecture for the Microsoft "WINDOWS" operating system. This messaging architecture permits the passing of event-related information between various components of the operating system 10, inlcuding

152 the configuration manager 158, the device nodes of the hardware tree 152, and the device drivers 156, as well as application programs. Messages are preferably based on the message WM_DEVICECHANGE, where a wParam is set to the particular sub-message being sent and the lParam is set with a value appropriate to the particular message.

Typically, events are generated in response to items such as changes in power management status, dock or undock requests, or insertion/removal of a device 20 within the computer 8. The initial messages generated by the operating system 10 in response to an event are typically of use only to a particular device node that represents the affected device 20. However, these initial messages also can cause individual subsystems to generate additional messages which may be used by application programs.

On a call to the SendMessage API, a message can be sent to the following components in the following order:

1. MsgSrv32.EXE: This component acts as an application on behalf of the VxD's in the operating system 10. MsgSrv32 takes the message from the SendMessage function, makes a transition to protected mode, and broadcasts the message in turn to each VxD who has registered a message handler via the SHELL_Hook_System_Broadcast service.
2. Network drivers
3. Ring 3 .DRV drivers
4. Applications Any of the above classes of message handlers can be excluded or included depending on a flag set in the SendMessage call.

VxD's can send messages to the other components using the SHELL_Broadcast_Message service. Although it is possible for VxD's to send messages to other VxD's using this mechanism, it is preferable to place a direct call to the appropriate VxD.

*WParam* is to be an ordinal containing one of the following message types in Table 8:

Table 8: WM_DEVICE CHANGE submessages

| | |
|---|---|
| *DBT_DeviceArrival* | System has detected a new device. |
| *DBT_DeviceQueryRemove* | System wants to remove a specified device, recipients may fail this message to abort the removal. |

| | |
|---|---|
| *DBT_DeviceQueryRemoveFailed* | System has aborted the removal of the device. |
| *DBT_DeviceRemovePending* | System is about to remove specified device, not failable |
| *DBT_DeviceRemoveComplete* | System has removed the specified device. |
| *DBT_DeviceTypeSpecific* | Device-specific event not listed above. |

Other submessages not directly related to device removal/insertion are as follows:

| | |
|---|---|
| *DBT_ConfigChanged* | This message indicates a change in the current configu "Current Config" due to a dock or undock event. applications or device drivers which store data in the re based on the predefined key HKEY_CURRENT_CO should refresh this data upon receiving this message |
| *DBT_DevnodesChanged* | lParam in this case points to the root device node ( hardware tree. This message is sent after device nodes been modified, added, or removed. This messa intended as a high level notification for a comp requiring information about the state of a device node resources associated with a particular devnode. |

A device driver 156 can prepare for an impending removal of its device upon receiving the *DeviceRemovePending* message. However, *DeviceRemoveComplete* events may be generated at any time with no prior warning via a corresponding *DeviceQueryRemove* or *DeviceRemovePending* message. Typically, a device 20 which is capable of software-controllable ejection or locking will first generate the *DeviceRemovePending* message, thereby allowing applications and device drivers 156 to gracefully terminate their use of this device 20. However, in some cases, *DeviceQueryRemove* messages may not be issued prior to the device removal if this event is forced by the operating system 10.

Removable media events are facilitated by a flag associated with the logical volume device type, as described below:

*LParam* contains a pointer to a packet containing information about the device in question along with specifics depending on the class of device.

154

Device Broadcast Packet Structure:
The packet is in the following form:

| | | |
|---|---|---|
| DWORD | *Size* | Size of packet in bytes |
| DWORD | *Reserved* | undefined |
| DWORD | *DeviceType* | (as listed in the Table 9 below) |

Table 9

| Device Type ordinal: | Device Type: |
|---|---|
| 0x00000000: | OEM/IHV defined device type |
| 0x00000002: | Logical volumes |
| 0x00000004: | Network adapter |

Σ If *DeviceType* is 0, there are two additional fields:

| | | |
|---|---|---|
| DWORD1-4 | *OemIdentifier* | 16 byte Globally Unique ID |
| DWORD | *OemSuppFunc* | Describes the OEM-specific device ID. |

An application preferably calls the GetResourceID API (below) after opening a file or a pipe in order to get the resource ID for the network system. Then, if the application should receive a WM_DEVICECHANGE message indicating that a network system may be going or has gone down, the application can quickly determine if its files or pipes will be or were affected by this event. If this message has a *wParam* of DBT_DEVQUERYREMOVE, the application may have the opportunity to query the user as to whether the disappearance of the device is acceptable.

The API GetResourceID allows an application to determine if a given file or pipe depends upon the presence of a network system.

```
DWORD GetResourceID(
    USHORT    hNetHandle
);
```

155

Registry APIs

Still referring to FIGS. 1 and 6, it will be appreciated that virtual devices can open, read, write, create, and delete keys and values of the registry 153 by using registry services. These registry services include:

- _GetRegistryKey
- _GetRegistryPath
- _RegCloseKey
- _RegCreateKey
- _RegDeleteKey
- _RegDeleteValue
- _RegEnumKey
- _RegEnumValue
- _RegFlushKey
- _RegOpenKey
- _RegQueryValue
- _RegQueryValueEx
- _RegSetValue
- _RegSetValueEx
     During the protected-mode initialization phases, the registry 153 may be written to but the data will not be flushed to a mass storage device until the end of the Device_Init phase. Until the end of this phase, virtual devices may only access the HKEY_LOCAL_MACHINE key.

The registry services can be called from either an assembly-language or a C-language source in a VxD. Assembly-language calls typically have this form:

```
include vmmreg.inc

VMMCall _RegCloseKey  <phKey>
cmp     eax,ERROR_SUCCESS
jnz     CreateFail
```

C-language calls typically have this from:

```
include <vmmreg.h>
```

35

156

```
if (VMM_RegCloseKey(phKey) != ERROR_SUCCESS) {
    MyErrorHandler("RegCloseKey Failed");
}
```

Static virtual devices can open and retrieve values from the registry 153 during real-mode initialization. During this time, the registry 153 is read-only and only the keys and values under the HKEY_LOCAL_MACHINE key are accessible. Virtual devices can call these functions by filling registers of the computer 8 and calling the loader services function, or can use one of these real-mode registry function macros:

LDR_RegCloseKey
LDR_RegEnumKey
LDR_RegEnumValue
LDR_RegOpenKey
LDR_RegQueryValue
LDR_RegQueryValueEx

Tables 10-12 describes the registry services, real-mode functions, and constants.

Table 10 describes registry services. Referring to Table 10, all services have corresponding C-callable virtual machine manager (VMM) functions.

Table 10: Registry Services

_GetRegistryKey

```
DWORD _GetRegistryKey(DWORD dwType, LPSTR lpszDevName,
    DWORD dwFlags, LPHKEY lphKey);
```

Gets a registry key handle for the given device name under the given branch of the HKEY_LOCAL_MACHINE key.
- Returns ERROR_SUCCESS if successful; otherwise, one of the error values given in <ERROR_table>.

157

*dwType*
Parent registry branch in which to open the key. Can be one of these values:

REGTYPE_CLASS     \System\CurrentControlSet\Services\Class
REGTYPE_ENUM      \ENUM lpszDevName
Address of a null-terminated string specifying the device-name subkey.

*dwFlags*
Action flags. Can be 0 or REGKEY_CREATE_IFNOTEXIST to indicate the key should be created if it does not already exist.

*lphKey*
Address of the variable that receives the handle of the opened key.

_GetRegistryPath

```
DWORD _GetRegistryPath(DDB ddb, LPSTR lpszPath, DWORD
cbPath);
```

Gets the path of the registry 153 for the device driver 156 associated with the given virtual device descriptor block (DDB).

- Returns the number of bytes copied to the buffer or the buffer size, in bytes, needed to receive the complete path. This service returns 0 if no registry path exists.

*ddb*
Device descriptor block for the virtual device for which to retrieve the registry path.

*lpszPath*
Address of the buffer that receives the null-terminated registry path. This buffer receives the path only if buffer is large enough to hold the complete path.

*cbPath*
Size, in bytes, of the *lpszPath* buffer.

158

_RegCloseKey

```
DWORD _RegCloseKey(HKEY hKey)
```

Closes a previously opened key.
- Returns ERROR_SUCCESS if successful; otherwise, ERROR_BADKEY, ERROR_KEY_DELETED, or other errors indicating the given *hKey* is invalid.

*hKey*

Handle of a previously opened key.

_RegCreateKey

```
DWORD _RegCreateKey(HKEY hKey, LPSTR lpszSubKey,
LPHKEY                          lphKey)
```

Creates or opens the registry key for the given registry path.
- Returns ERROR_SUCCESS if successful; otherwise, one of the error values given in <ERROR_table>.

*hKey*

Handle of a previously opened key or one of the predefined root keys given in <PREKEY_table>.

*lpszSubKey*

Subkey string to be opened. Can be NULL. Can also be NULL-string only if *hKey* is a predefined key.

*lphKey*

Address of the returned HKEY for a successful open/create.

_RegDeleteKey

159

```
DWORD _RegDeleteKey(HKEY hKey, LPSTR lpszSubKey)
```

Deletes the given registry key including its subkeys from the registry 153.
- Returns ERROR_SUCCESS if successful; otherwise, one of the error values given in <ERROR_table>.

*hKey*

Handle of a previously opened key.

*lpszSubKey*

Address of a null-terminated string specifying the subkey to delete.

This service also can mark all other open references to the key being deleted as deleted, so that accesses through these other open references will fail with an ERROR_KEY_DELETED error.

_RegDeleteValue

```
DWORD _RegDeleteValue(HKEY hKey, LPSTR lpszValue)
```

Deletes the value for the given registry key and the given value name.
- Returns ERROR_SUCCESS if successful; otherwise, one of the error values given in <ERROR_table>.

*hKey*

Handle of a previously opened key or one of the predefined root keys given in <PREKEY_table>.

*lpszValue*

Address of a null-terminated string specifying the value name to delete. Can be NULL or an empty string.

Each key can have one value for which the value name is NULL. This is treated as the value for the key itself. This value can be deleted by passing a NULL or a null string for *lpszValue* parameter.

_RegEnumKey

160

```
DWORD _RegEnumKey(HKEY hKey, DWORD iSubKey, LPSTR
lpszBuffer, DWORD cbBuffer)
```

Enumerates the subkeys of a given registry key.

- Returns ERROR_SUCCESS if successful; otherwise, one of the error values given in <ERROR_table>.

*hKey*

Handle of a previously opened key or one of the predefined root keys given in <PREKEY_table>.

*iSubKey*

Index of the subkey to retrieve. This should be zero for the first call to this service.

*lpszBuffer*

Address of a buffer that receives the name of the subkey.

*cbBuffer*

Size, in bytes, of the *lpszBuffer* buffer.

The virtual device should initially set *iSubKey* to zero, then increment it on successive calls.

_RegEnumValue

```
DWORD _RegEnumValue(HKEY hKey, DWORD iValue, LPSTR
lpszValue,
    LPDWORD lpcbValueName, LPDWORD lpdwReserved,
LPDWORD lpdwType,
    LPBYTE lpbData, LPDWORD lpcbData)
```

Enumerates the value names and values of a given registry key.

- Returns ERROR_SUCCESS if successful; otherwise, one of the error values given in <ERROR_table>.

161

*hKey*

Handle of a previously opened key or one of the predefined root keys given in <PREKEY_table>.

*iValue*

Index of the value name to retrieve. This should be zero for the first call to this service.

*lpszValue*

Address of a buffer that receives the name of the value. Can be NULL if value name is not required.

*lpcbValueName*

Address of a 32-bit variable that contains the size, in bytes, of the *lpszValue* buffer. The variable receives the size, in bytes, of the retrieved value name. Can be NULL only if *lpszValue* is NULL.

*lpdwReserved*

Reserved; should be set to NULL by the caller.

*lpdwType*

Address of a 32-bit variable that receives the data type for the given value name. Can be NULL if data type is not needed.

*lpbData*

Address of a buffer that receives the value data for the given value name. Can be NULL if value data is not required.

*lpcbData*

Address of a 32-bit variable that contains the size, in bytes, of the *lpbData* buffer. This variable receives the size, in bytes, of the retrieved value data. Can be NULL only if *lpbData* parameter is also NULL.

The virtual device should initially set *iValue* to zero, then increment it on successive calls.

_RegFlushKey

```
DWORD _RegFlushKey(HKEY hKey)
```

Flushes the data for the given Registry Key.

162

- Returns ERROR_SUCCESS if successful; otherwise, one of the error values given in <ERROR_table>.

*hKey*

Handle of a previously opened key or one of the predefined root keys given in <PREKEY_table>.

This is a time consuming operation and should not be used under normal circumstances. This service returns only after the registry file is flushed to the mass storage device, such as the hard disk. This may also flush data for other keys in the same registry file. The registry 153 is preferably periodically flushed to the hard disk by the VMM.

_RegOpenKey

```
DWORD _RegOpenKey(HKEY hKey, LPSTR lpszSubKey, LPHKEY lphKey)
```

Opens the registry key for the given registry path.

- Returns ERROR_SUCCESS if successful; otherwise, one of the error values given in <ERROR_table>.

*hKey*

Handle of a previously opened key or one of the predefined root keys given in <PREKEY_table>.

*lpszSubKey*

Address of a null-terminated string specifying the subkey to be open. May also be NULL or NULL-string.

*lphKey*

Address of the variable that receives the handle of the opened key.

_RegQueryValue

```
DWORD _RegQueryValue(HKEY hKey, LPSTR lpszSubKey,
LPBYTE lpbData,
```

163

```
LPDWORD lpcbData)
```

Retrieves the value for the given registry key.
- Returns ERROR_SUCCESS if successful; otherwise, one of the error values given in <ERROR_table>.

*hKey*
Handle of a previously opened key or one of the predefined root keys given in <PREKEY_table>.

*lpszSubKey*
Address of a null-terminated string specifying the subkey for which to retrieve the value. Can be NULL or point to a NULL-string.

*lpbData*
Address of a buffer that receives the value data for given registry key.

*lpcbData*
Address of a 32-bit variable that contains the size, in bytes, of the *lpbData* buffer. This variable receives the size, in bytes, of the retrieved data.

_RegQueryValueEx

```
DWORD _RegQueryValueEx(HKEY hKey, LPSTR lpszValueName,
    LPDWORD lpdwReserved, LPDWORD lpdwType, LPBYTE lpbData,
    LPDWORD lpcbData)
```

Retrieves the value for the given registry key for the given value name.
- Returns ERROR_SUCCESS if successful; otherwise, one of the error values given in <ERROR_table>.

*hKey*
Handle of a previously opened key or one of the predefined root keys given in <PREKEY_table>.

164

*lpszValueName*

Address of a null-terminated string specifying the value name to for which to retrieve the value. Can be NULL or point to a NULL-string.

*lpdwReserved*

Reserved; set to NULL.

*lpdwType*

Address of a 32-bit variable that receives the data type for the given value. Can be NULL if data type is not needed.

*lpbData*

Address of a buffer that receives the value data for given registry key.

*lpcbData*

Address of a 32-bit variable that contains the size, in bytes, of the *lpbData* buffer. This variable receives the size, in bytes, of the retrieved data.

_RegSetValue

```
DWORD _RegSetValue(HKEY hKey, LPSTR lpszSubKey, DWORD fdwType,
     LPBYTE lpbData, DWORD cbData)
```

Sets the value for the given registry key.

- Returns ERROR_SUCCESS if successful; otherwise, one of the error values given in <ERROR_table>.

*hKey*

Handle of a previously opened key or one of the predefined root keys given in <PREKEY_table>.

*lpszSubKey*

Address of a null-terminated string specifying the subkey for which to set the value. Can be NULL.

*fdwType*

Value data type to set. Must be REG_SZ.

*lpbData*

Address of a buffer that contains the value data to set.

165

*cbData*

Size in bytes of the value data buffer (*lpbData*). Can be zero, in which case, the value length is automatically calculated.

_RegSetValueEx

```
DWORD _RegSetValueEx(HKEY hKey, LPSTR lpszValueName,
DWORD dwReserved,
    DWORD fdwType, LPBYTE lpbData, DWORD cbData)
```

Sets the value for the given registry key and the given value name.
- Returns ERROR_SUCCESS if successful; otherwise, one of the error values given in <ERROR_table>.

*hKey*

Handle of a previously opened key or one of the predefined root keys given in <PREKEY_table>.

*lpszValueName*

Address of a null-terminated string specifying the value name for which to
set the value. Can be NULL or point to a NULL-string.

*dwReserved*

Reserved; set to NULL.

*fdwType*

Value data type to set. Must be one of REG_SZ or REG_BINARY. Must be
REG_SZ if *lpszValueName* is NULL or points to a NULL-string. See <REG_table>.

*lpbData*

Address of a buffer that contains the value data to set.

*cbData*

Size in bytes of the value data buffer (*lpbData*). Can be zero for REG_SZ, in which case, the value length is automatically calculated.

166

Table 11 describes the real-mode registry functions. Referring to Table 11, these macros expand to calls to the loader service function. Access is restricted to the HKEY_LOCAL_MACHINE key and is read-only.

Table 11: Registry Real-mode Functions

LDR_RegCloseKey

```
DWORD LDR_RegCloseKey(HKEY hKey)
```

Closes a previously opened key.
- Returns ERROR_SUCCESS if successful; otherwise, ERROR_KEY_DELETED, ERROR_BADKEY, or other errors to indicate the given *hKey* is invalid.

*hKey*
Handle of a previously opened key.

LDR_RegEnumKey

```
DWORD LDR_RegEnumKey(HKEY hKey, DWORD iSubKey, LPSTR lpszBuffer,
    DWORD cbBuffer)
```

Enumerates the subkeys of a given registry key.
- Returns ERROR_SUCCESS if successful; otherwise, one of the error values given in <ERROR_table>.

*hKey*
Handle of a previously opened key or is the HKEY_LOCAL_MACHINE key.

*iSubKey*
Index of the subkey to retrieve. This should be zero for the first call to this API.

167

*lpszBuffer*

Address of a buffer that receives the name of the subkey.

*cbBuffer*

Specifies the size, in bytes, of *lpszBuffer*.

The virtual device should initially set the *iSubKey* to zero, then increment it on successive calls.

LDR_RegEnumValue

```
DWORD LDR_RegEnumValue(HKEY hKey, DWORD iValue, LPSTR
lpszValue,
     LPDWORD lpcbValueName, LPDWORD lpdwReserved,
LPDWORD lpdwType,
     LPBYTE lpbData, LPDWORD lpcbData)
```

Enumerates the value names and values of a given registry key.
- Returns ERROR_SUCCESS if successful; otherwise, one of the error values given in <ERROR_table>.

*hKey*

Handle of a previously opened key or is the HKEY_LOCAL_MACHINE key.

*iValue*

Index of the value name to retrieve. This should be zero for the first call to this function.

*lpszValue*

Address of a buffer that receives the name of the value. Can be NULL if value names are not required.

*lpcbValueName*

Address of a variable that contains the size, in bytes, of buffer. This variable receives the size, in bytes, of the retrieved value name. Can be NULL only if *lpszValue* is NULL.

*lpdwReserved*

Reserved; set to NULL.

168

*lpdwType*

Address of a 32-bit variable that receives the data type of the given value name. Can be NULL if data type is not needed.

*lpbData*

Address of a buffer that receives the value of the given value name. Can be NULL if value data is not required.

*lpcbData*

Address of a 32-bit variable buffer that contains the size, in bytes, of the *lpbData* buffer. This variable receives the size, in bytes, of the retrieved data. Can be NULL only if *lpbData* parameter is also NULL.

The virtual device should initially set *iValue* to zero, then increment it on successive calls.

LDR_RegOpenKey

```
DWORD LDR_RegOpenKey(HKEY hKey, LPSTR lpszSubKey,
LPHKEY lphKey)
```

Open the registry key for the given registry path.
- Returns ERROR_SUCCESS if successful; otherwise, one of the error values given in <ERROR_table>.

*hKey*

Handle of a previously opened key or is the HKEY_LOCAL_MACHINE key.

*lpszSubKey*

Address of a null-terminated string specifying the subkey to open. May be NULL or point a Null-string.

*lphKey*

Address of a variable that receives the handle to the open key.

LDR_RegQueryValue

169

```
DWORD LDR_RegQueryValue(HKEY hKey, LPSTR lpszSubKey,
LPBYTE lpbData,
     LPDWORD lpcbData)
```

Retrieves the value for the given registry key.
- Returns ERROR_SUCCESS if successful; otherwise, one of the error values given in <ERROR_table>.

*hKey*

Handle of a previously opened key or is the HKEY_LOCAL_MACHINE key.

*lpszSubKey*

Address of a null-terminated string specifying the subkey to retrieve the value from. Can be NULL or point to a NULL-string.

*lpbData*

Address of a buffer that receives the value data for given registry key.

*lpcbData*

Address of a 43-bit variable that contains the size, in bytes, of the *lpbData* buffer. This variable receives the size, in bytes, of the retrieved data.

LDR_RegQueryValueEx

```
DWORD LDR_RegQueryValueEx(HKEY hKey, LPSTR
lpszValueName,
        LPDWORD lpdwReserved, LPDWORD lpdwType, LPBYTE
lpbData,
     LPDWORD lpcbData)
```

Retrieves the value for the given registry key for the given value name.

30   - Returns ERROR_SUCCESS if successful; otherwise, one of the error values given in <ERROR_table>.

170

*hKey*

Handle of a previously opened key or is the HKEY_LOCAL_MACHINE key.

*lpszValueName*

Address of a null-terminated string specifying the value name for which to retrieve value data. Can be NULL or point to a NULL-string.

*lpdwReserved*

Reserved; set to NULL.

*lpdwType*

Address of a 32-bit variable that receives the data type for the value. Can be NULL if data type is not needed.

*lpbData*

Address of a buffer that receives the value data for given value name.

*lpcbData*

Address of a 32-bit variable that contains the size, in bytes, of the *lpbData* buffer. This variable receives the size, in bytes, of the retrieved data.

Table 12 describes the constants used with the registry services. Referring now to Table 12 for these registry constants, as follows below:

Table 12: Registry Constants

Predefined Keys

| | |
|---|---|
| HKEY_LOCAL_MACHINE | Contains information about the hardware and software on the computer. |
| HKEY_USERS | Contains information about the users of the computer. In particular, this contains any user-specific information associated with hardware or software is stored. |
| HKEY_CURRENT_USER | Contains information about the current user. This is mapped to the default user branch under the HKEY_USERS key. |

[71]

| | |
|---|---|
| HKEY_CURRENT_CONFIG | Contains information about the hardware configuration of the computer. This typically |
| HKEY_CLASSES_ROOT | Contains information about OLE classes. |
| HKEY_PERFORMANCE_DATA | Contains information about system performance. |
| HKEY_DYN_DATA | Contains information about dynamic data. |

Registry Value Types

| | |
|---|---|
| REG_SZ | Null-terminated string |
| REG_BINARY | Binary data consisting of a specified number of bytes. |
| All other types | Valid, but treated as binary internally. |

Error Values

| | |
|---|---|
| ERROR_SUCCESS | Completed successfully. |
| ERROR_CANNOT_OPEN_REGFILE | Cannot find the required registry hive file or possibly the file is kept open by another application. |
| ERROR_INSUFFICIENT_MEMORY | Not enough memory to open this registry key or not enough memory to load the required data from the registry file, or the given buffer is not enough to hold the data. |
| ERROR_INVALID_PARAMETER | *lpszDevName* is an invalid address, or *dwFlags* is incorrect. |
| ERROR_REGFILE_READERROR | Error reading the registry file. Possibly, the file is corrupt. |

172

| | |
|---|---|
| ERROR_REGFILE_WRITEERROR | Error writing the registry file. Possibly, the file is corrupt. |
| ERROR_REGKEY_INVALIDKEY | The *lpszSubKey* string contains an invalid character or the given *hKey* is invalid. |
| ERROR_FILE_NOT_FOUND | No more subkeys, or the key specified is not found in the registry database. |
| ERROR_VALUE_NOT_FOUND | No more values to enumerate, or the given value name is not present for the given registry key. |

Device Manager APIs

The device manager 159 dynamically links to and calls the ClassInstall function whenever it needs a device installer 161a to carry out a specific installation task.

ClassInstall can receive two arguments: an integer that identifies the installation task to carry out, and the address of a DEVICE_INFO structure that contains information about the device 20 to install. This function either carries out the requested task, using the information in the structure, or directs the device manager 159 to carry out the task on its behalf.

To direct the device manager 159 to carry out the task, the function must return the "ERR_DI_DO_DEFAULT" value. The device manager 159 has default actions for each request.

If the function carries out its own tasks, it must return the value "OK" to notify the device manager 159 that the task completed successfully. If an error occurs while carrying out a task, the function must return an "RETERR" value.

The device manager 159 sends requests to the device installer 161a whenever it needs the device installer 161a to carry out installation tasks, such as determining whether to install a detected device 20, selecting a device 20 to install, and installing a selected device 20.

A DIF_SELECTDEVICE request directs the device installer 161a to choose a device driver 156 for a new device 20 or a new device driver 156 for an existing device 20. The device installer 161a either makes the selection, prompts the user to make the selection, or directs the device manager 159 to prompt the user (the default action).

A DIF_INSTALLDEVICE request directs the device installer 161a to install the given device driver 156. The device installer 161a either installs the device driver 156 or directs the device manager 159 to do it (the default action). In some cases, a device installer 161a may carry out pre-processing, such as copying device drivers and prompting for user input, before requesting the default action.

A DIF_PROPERTIES request directs the device installer 161a to display the properties sheet for the selected device 20. The device manager 159 sends this request when the user presses the "Properties..." button. The device installer 161a can display the property sheet or direct the device manager 159 to display the default property sheet (the default action).

The device manager 159 sends a DIF_REMOVE request to direct the device installer 161a to remove the given device 20. The device installer 161a typically removes the corresponding entries in the registry 153 for the device 20.

A DIF_FIRSTTIMESETUP request directs the device installer 161a to carry out any class-specific installation tasks that need to be completed during initial installation of the operating system 10. The device manager 159 preferably sends this request only when the user installs the operating system 10 for the first time.

A DIF_CALCDISKSPACE request directs the device installer 161a to calculate the disk space requirements for installing a device driver 156 for the given device 20. By default action, the device manager 159 calculates the disk requirements based on the contents of the .INF file.

A DIF_DESTROYPRIVATEDATA request directs the device installer 161a to free any ranges of the memory 22 or resources 14 it has allocated and stored in the private data portion of the DEVICE_INFO structure. The device manager 159 sends this function just before destroying that structure.

The device manager 159 provides a set of requests (DIF_SELECTCLASSDRIVERS, DIF_VALIDATECLASSDRIVERS, AND DIF_INSTALLCLASSDRIVERS) that a class installer 161b can use to install a multiple set of device drivers 156 instead of a single device driver 156. For example, a network installer may process these requests so that it can install the many different layers of drivers needed to support a network system.

The DIF_SELECTCLASSDRIVERS request directs the class installer 161b to select the device driver(s) 156 to install for the given class; DIF_VALIDATECLASSDRIVERS directs the class installer 161b to validate all settings for the given devices 20; and DIF_INSTALLCLASSDRIVERS directs the class installer 161b to install the selected and validated device drivers 156. The default action for these requests is preferably to do nothing.

The installers 161a and 161b can use the device installation functions, provided by the SetupX dynamic-link library, to carry out installation tasks. The device installation functions allow device installers 161 or class installers 161b to search .INF files for compatible device drivers 156, display choices of device drivers 156 to the user through selection dialogs, and perform the actual device driver installation.

Nearly all the device installation function rely on the information in the DEVICE_INFO structure to carry out the request tasks. A linked list of these structures for the devices 20 in a given class can be obtained by using the DiGetClassDevs function. This function fills each structure with information about the individual devices 20. A single copy of a structure can be copied by using the DiCreateDeviceInfo function. This function explicitly defines the content of the structure and is useful for adding the devices 20 to the list that the DiGetClassDevs function may not have found. The DEVICE_INFO structures can be freed in a list by using the DiDestroyDeviceInfoList function. This function also can free compatible device and class device lists that may have been added to the structure.

A list of selections can be generated by the DiBuildCompatDrvList and DiBuildClassDeviceList functions. This selections list can be used by the device installer 161a or the user to choose the device drivers 156 or the devices 20 for installation. DiBuildCompatDrvList creates a list of compatible device drivers 156 and DiBuildClassDeviceList creates a list of all devices 20 for a given class. These functions create linked lists of DRIVER_NODE structures that contain information about the device drivers 156 and devices 20.

Based upon a list of compatible device drivers 156 or devices 20, the user can be prompted to select from the list by using the DiSelectDevice function. This function displays a dialog box that contains

175 information about each device 20 in the linked list of structures. A selected device driver 156 can be installed by using the DiInstallDevice function. This function uses information in a given .INF file to create any new entries in the regsitry 153 for the device 20, set the configuration of the device hardware, and copy device driver files to the appropriate directories.

A compatible device driver and class device lists can be built by using the DiCreateDriverNode and DiMergeDriverNode functions. The DRIVER_NODE structures can be created and filled by using the DiCreateDriverNode function, and then merging the structures into an existing list by using the DiMergeDriverNode function. When creating lists, the user can be prompted for the location of additional device driver files by using the DiAskForOEMDisk function. When a list is no longer needed, the DRIVER_NODE structures can be freed in the list by using the DiDestroyDriverNodeList function.

A device installer 161a may need to examine and set values under the registry key for a device 20 that is about to be installed. Te appropriate registry key can be created for the given device 20 (if it does not already exist) by using the DiCreateDevRegKey function. The hardware or driver key for a device 20 can be opened by using the DiOpenRegKey function.

A new class of devices 20 can be installed in the registry 153 by using the DiInstallClass function. This function requires an .INF file that contains a valid [ClassInstall] section.

Some device installation functions are intended to be used by the operating system 10 and may not be useful for the device installers 161. For example, the DiInstallDrvSection function forces the installation of a device driver 156. This is used by a setup routine to force installation of a set of device drivers 156 on a first-time setup. The class installer 161b can be called for a given class by using the DiCallClassInstaller function. This function is useful if a device installer 161a needs support from the corresponding class installer 161b to complete installation. The function uses the class name to locate, load, and call the appropriate class installer 161b.

A device entry can be removed from the registry 153 by using the DiRemoveDevice function.

The device manager 159 requires registration of class or device installers 161 by adding Installer and Icon entries to the registry 153 for the

176 given class. The system maintains a "System\CurrentControlSet\Services\Class" branch under "HKEY_LOCAL_MACHINE" for information about each class. The value of the key in the registry 153 contains the localized description of the class.

The Installer and Icon entries can have the following form:

Installer=*installer DLL-name[,Installer Entry Point]*

Icon=*index [, icon-DLL-name]*

The device manager 159 uses an icon to represent a device installer 161a on the display screen to the user. If an Installer entry is not registered, the device manager 159 takes a default action.

When an enumerator 150 detects a new device, it relies on the configuration manager 158 and the device manager 159 to locate the device installer 161a for the given device 20 and to install the appropriate device drivers 156. Typically, the device manager 159 generates a list of compatible device drivers 156 for the device 20 and sends a DIF_SELECTDEVICE, followed by a DIF_INSTALLDEVICE request, to the device installer 161a. If the device manager 159 is in silent mode of operation, it may only send a DIF_INSTALLDEVICE request.

Tables 13 - 15 describes the functions and structures that support the device installer 161a. Referring niow to Table 13, this table describes the functions that support the device/class installers 161.

Table 13: Device/Class Installer Functions bIsFileInVMM32

This API will determine if a specified file is part of the combined VMM32 VxD real mode loader.

BOOL bIsFileInVMM32(LPSTR *lpszFileName*)

Return Value — Returns TRUE if the file is part of the real mode loader, FALSE otherwise.

Parameters — *lpszFileName*

Name of file to check. This can be a fully qualified path, or just the root file name.

bShouldDevBeExcluded

Determines if a device ID is in the ExludeFromSelect list.

BOOL bShouldDevBeExcluded(LPSTR *lpszDevID*, HINF *hInf*)

|   |   |
|---|---|
| Return Value | Returns TRUE if the device ID is in the list, FALSE if it is not. |
| Parameters | *lpszDevID* |
| | Pointer to the device ID. |
| | *hInf* |
| | Handle to an open .INF file. |

CreateDriverNodeFromDrvIdx

Creates a driver node using the infomation contained in the passed in Driver Index structure.

RETERR CreateDriverNodeFromDrvIdx(LPIDXENTRY *lpIdxEntry*, LPLPDRIVER_NODE *lplpdn*, WORD *wIDRank*)

|   |   |
|---|---|
| Return Value | Returns OK if successful, otherwise an ERR_DI_xxx error code will be returned. |
| Parameters | *lpIdxEntry* |
| | Pointer to the index entry that will be used to generate the device driver node. |
| | *lplpdn* |
| | Pointer to a pointer to a DRIVER_NODE struct. This pointer will be filled with the address of the created device drive node. |
| | *wIDRank* |
| | This is the Rank of the device ID that was used to find this index entry in the event of a DiBuildCompatDrvList. This rank is added to the rank of the index entry to compute the overall rank of the device drive node being created. |

DiAddSingleInftoDrvIdx

This API will add the contents of a specific .INF file to the current device drive index.

BOOL DiAddSingleInftoDrvIdx(LPSTR *lpszInfName*, WORD *InfType*, BOOL *bCreate*)

|   |   |
|---|---|
| Return Value | Returns TRUE if the index is successfully updated. |
| Parameters | *lpszInfName* |
| | The name of the .INF file to be added to the index |
| | *InfType* |
| | The type of .INF file being added. This should be INFTYEP_TEXT or INFTYPE_EXECUTABLE. |

*bCreate*
: Indicates that an index should be created. If TRUE, the index will be created with only the content of the specified .INF file.

See Also
: DiBuildDriverIndex

DiAskForOEMDisk

This API will display a dialog asking for the path to an OEM install disk.

RETERR DiAskForOEMDisk(LPDEVICE_INFO *lpdi*)

Return Value
: OK if a valid path is specificed. ERR_DI_USER_CANCEL will be returned if the user cancels the dialog.

Parameters
: *lpdi*
: A device info struct for a device that is being installed.

Comments
: This function will allow browsing of local and network drives for OEM install files.

DiBuildClassDrvInfoList

Builds a list of all device drivers 156 for a specificed class of devices 20. This list contains only the info needed to select the device 20 in the user interface (UI).

RETERR DiBuildClassDrvInfoList(LPDEVICE_INFO *lpdi*)

Return Value
: Returns "OK" if successful, otherwise an ERR_DI_xxx error code will be returned. If the return is "OK", the lpdi->lpClassDrvInfoList field will point to a list of supported device drivers 156 for the class. If there are no class drivers, this pointer will be NULL.

Parameters
: *lpdi*
: Pointer to the device 20 for which a class driver list should be built.

Comments
: The lpdi->szClassName field should be filled in with the class name to be used when building the class driver list. If this field is not filled in, DiBuildClassDrvInfoList will build a list of device drivers 156 for all classes.

See Also
: DiBuildClassDrvList

DiBuildClassDrvList

Builds a list of device drivers 156 for a specificed class of devices 20.

RETERR DiBuildClassDrvList(LPDEVICE_INFO *lpdi*)

Return Value
: Returns "OK" if successful, otherwise an ERR_DI_xxx error code will be returned. If the return is "OK", the lpdi->lpClassDrvList field will point to a list of supported device drivers 156 for the class. If there are no class drivers, this pointer will be NULL.

| | |
|---|---|
| Parameters | *lpdi* |
| | Pointer to the device for which a class driver list should be built. |
| Comments | The lpdi->szClassName field should be filled in with the class name to be used when building the class driver list. If this field is not filled in, DiBuildClassDrvList will build a list of device drivers 156 for all classes. This API preferably builds a full DRIVER_NODE structure for each device driver 156 in the class. However, building full DRIVER_NODES requires memory overhead for each DRIVER_NODE and can be slow, especially if the list of device drivers 156 is large. The DiBuildClassDrvInfoList function will build a list of DRIVER_INFO, which may require very little memory, and is may be optimal, especially on large lists. |
| See Also | DiBuildClassDrvInfoList |

DiBuildClassDrvListFromOldInf

Builds a class driver list from an existing "legacy"-type .INF file.

RETERR DiBuildClassDrvListFromOldInf(LPDEVICE_INFO *lpdi*, LPCSTR *lpszSection*, OLDINFPROC *lpfnOldInfProc*, LPARAM *lParam*)

| | |
|---|---|
| Return Value | Returns OK. |
| Parameters | *lpdi* |
| | Pointer to a device information structure for a device 20 that is being installed. |

*lpszSection*

The install section in the legacy .INF file to be converted

*lpfnOldInfProc*

Callback function to fill in content of .INF file.

*lParam*

Reference data passed to the callback process.

| | |
|---|---|
| Comments | The atDriverPath field of the lpdi must be set to a valid OEM .INF file, which is type INF_TEXT. This function will generate an approprate .INF file header, and then call the supplied callback process to convert the specified section into data. After the new .INF file is generated, this function can build a class driver list much like the DiBuildClassDrvList API does. |

DiBuildClassInfoList

This API will build a list of CLASS_INFO structs. There will be one CLASS_INFO structure added to the list for each installed class in the operating system 10.

RETERR DiBuildClassInfoList(LPLPCLASS_INFO *lplpci*)

| | |
|---|---|
| Return Value | This function returns OK if the list is built successfully. |
| Parameters | *lplpci* |
| | A buffer to receive a pointer to a list of CLASS_INFO structures. |
| Comments | This function will return "OK", even if the list is empty. The call preferably changes the content of the buffer to determine if the list is empty. If the value NoUseClass is present in the class's registry branch, the class will automatically be excluded from the list. This behavior cannot be overriden. |
| See Also | DiBuildClassInfoListEx |
| | DiDestroyClassInfoList |

DiBuildClassInfoListEx

This API will build a list of CLASS_INFO structures.

RETERR DiBuildClassInfoListEx(LPLPCLASS_INFO *lplpci*, DWORD *dwFlags*)

| | |
|---|---|
| Return Value | This function returns OK if the list is build successfully. |
| Parameters | *lplpci* |
| | A buffer to receive a pointer to a list of CLASS_INFO structures. |
| | *dwFlags* |
| | Flags used to control exclusion of classes from the list. The following flags are defined: |
| | DIBCI_NOINSTALLCLASS |
| |     Exclude a class if it has the value NoInstallClass present in its registry branch. |
| | DIBCI_NODISPLAYCLASS |
| |     Exclude a class if it has the value NoDisplayClass present in its registry branch. |
| Comments | This API is similiar to DiBuildClassInfoList, except it allows more control over the particular classes that will be included in the list. |
| See Also | DiBuildClassInfoList |
| | DiDestroyClassInfoList |

DiBuildCompatDrvInfoList

181

Builds a compatible device driver list for a specificed device, 20 returning Driver INFO structures.

RETERR DiBuildCompatDrvInfoList(LPDEVICE_INFO lpdi)

Return Value — Returns "OK" if successful, otherwise an ERR_DI_xxx error code will be returned. If the return is "OK", the lpdi->lpCompatDrvInfoList field will point to a list of compatible device drivers 156. If compatible device drivers 156 are not available, this pointer will be NULL.

Parameters — *lpdi*
Pointer to the device 20 for which a compatible device driver list should be built.

Comments — The device 20 specified must have a Hardware registry key (i.e. an entry in HKLM\ENUM), and should have either, or both, a REGSTR_VAL_HARDWAREID and REGSTR_VAL_COMPATIBLEIDS value. The values should contain comma delimited lists of device IDs.

See Also — DiBuildCompatDrvList

DiBuildCompatDrvList

Builds a Compatible Driver list for a specificed device.

RETERR DiBuildCompatDrvList(LPDEVICE_INFO lpdi)

Return Value — Returns OK if successful, otherwise an ERR_DI_xxx error code will be returned. If the return is OK, the lpdi->lpCompatDrvList field will point to a list of compatible device drivers 156. If there are no compatible device drivers 156, this pointer will be NULL.

Parameters — *lpdi*
Pointer to the device 20 for which a compatible device driver list should be built.

Comments — The device specified must have a Hardware registry key (i.e. an entry in HKLM\ENUM), and should have either, or both, a REGSTR_VAL_HARDWAREID and REGSTR_VAL_COMPATIBLEIDS value. The values should contain comma delimited lists of device ID's. Note the device ID's cannot contain comma's themselves.

See Also — DiBuildCompatDrvList

DiBuildDriverIndex

This API will cause the .INF device driver index to be built.

BOOL DiBuildDriverIndex(BOOL bUI)

Return Value — Returns TRUE if the index is successfully built.

| | |
|---|---|
| Parameters | *bUI*<br>Boolean to indicate if a "gas gauge" user interface should be presented while building the index. If TRUE, the gas gauge will be shown. |
| Comments | This API is generally used by device manager 159 to initially create the device driver index. Since the device drive index is automatically maintained, and rebuilt when necessary, class installers 161b should not need to explicitly rebuild it. |
| See Also | DiAddSingleInfToDrvIdx |

DiBuildPotentialDuplicateList

This API will build a list of potential duplicate device IDs for a specified device.

BOOL DiBuildPotentialDuplicateList(LPDEVICE_INFO *lpdi*, LPSTR *lpDuplicateList*, DWORD *cbSize*, LPDWORD *lpcbData*, LPSTR *lpstrDupType*)

| | |
|---|---|
| Return Value | OK if successful. |
| Parameters | *lpdi*<br>Pointer to the device 20 to build the potential duplicate list for.<br><br>*lpDuplicateList*<br>Pointer to a buffer to receive the list of duplicate device IDs.<br><br>*cbSize*<br>Size of the duplicate ID list buffer.<br><br>*lpcbData*<br>Address of a buffer to receive the number of bytes stored in the buffer.<br><br>*lpstrDupType*<br>Type of Duplicate ID list to build.<br><br>INFSTR_SUBKEY_POSSIBLEDUPS<br>If this string is used then the list of duplicates defined by [section.PosDup] .INF section is built.<br><br>INFSTR_SUBKEY_NORESOURCEDUPS<br>If this string is used then the list of duplicates defined by the [section.NoResDup] .INF section is built. For both cases, section refers to the .INF install section specfied in the lpdi. |
| Comments | This API is preferably used by the device manager 159 to resolve a duplicate enumeration problem. |

DiCallClassInstaller

183

Call the appropriate class installer 161b with the specifed installer function.
RETERR DiCallClassInstaller(DI_FUNCTIONS *diFctn*,
LPDEVICE_INFO *lpdi*)

Return Value  Returns OK if successful, otherwise an ERR_DI_xxx error code will be returned.

Parameters  *diFctn*

Class installer function to call. This can be one of the following:

DIF_SELECTDEVICE

Select a device drive 156 to be installed for the device 20.

DIF_INSTALLDEVICE

Install the device drive 156 for the device 20.

DIF_PROPERTIES

Display a properties dialog for the device 20.

DIF_REMOVE

Remove the device.

DIF_FIRSTTIMESETUP

Perform first time setup initialization. This message is sent during the first boot of the operating system 10 and contains only class information.

DIF_SELECTCLASSDRIVERS

Select device drivers 156 for all devices 20 of the class specified by the lpdi.

DIF_VALIDATECLASSDRIVERS

Ensure all devices 20 of the class specified by the lpdi are ready to be installed.

DIF_INSTALLCLASSDRIVERS

Install device drivers 156 for all devices 20 of the class specified by the lpdi.

DIF_CALCDISKSPACE

Compute the amount of disk space required by device drivers 156 for the device 20.

DIF_DESTROYPRIVATEDATA

Destroy any private date referenced by the lpdi->dwClassInstallReserved.

184

DIF_MOVEDEVICE

The device 20 is being moved to a new location in HKLM\ENUM.

DIF_DETECT

Detect any devices 20 of class specificed by the lpdi.

DIF_INSTALLWIZARD

Add any pages necessary to the New Device "wizard" for the class specified by the lpdi.

DIF_DESTROYWIZARDDATA

Destroy any private data allocated due to a DIF_INSTALLWIZARD message.

DIF_PROPERTYCHANGE

The properties of the device 20 are changing. The device 20 is being enabled, disabled, or has had a resource change.

*lpdi*

Pointer to a DEVICE_INFO struct for the device associated with a class installer 161b that is to be called.

Comments This function will attempt to load and call the class installer 161b for the class listed in the lpdi->szClassName field. If there is no class installer 161b, or the class installer 161b returns ERR_DI_DO_DEFAULT, then this function will call a default procedure for the specified class installer function.

DiChangeState

This API is used to change the state of an installed device. It is the default handler for the DIF_PROPERTYCHANGE class installer message.

**RETERR DiChangeState(LPDEVICE_INFO *lpdi*, DWORD *dwStateChange*, DWORD *dwFlags*, LPARAM *lParam*)**

Return Value This function returns "OK" if that are files that need to be copied. ERR_DI_NOFILECOPY will be returned if no files need to be copied.

Parameters *lpdi*

Device Info for device 20 who's properties are being changed.

*dwStateChange*

Flag indicating which state is being changed.

DICS_ENABLE

The device 20 is being enabled.

185

DICS_DISABLE
The device 20 is being disabled.

DICS_PROPCHANGE
The properties of the device 20 have changed, i.e. it is getting a new resource assignment.

DICS_START
The device 20 is being started. If the device 20 isalso disabled, then it will be enabled as well.

DICS_STOP
The device 20 is being stopped.

*dwFlags*
Flags specific to the action specified by dwChangeState.

DICS_FLAG_GLOBAL
The action should be applied globally to all configurations.

DICS_FLAG_CONFIGSPECIFIC
The action should be applied ony to the configuration specified by lParam.

*lParam*
If dwFlags has the DICS_FLAG_CONFIGSPECIFIC bit set then this parameter contains the configuration number which the changes should be applied to. Specifying "0" indicates that the current config should be used.

DiConvertDriverInfoToDriverNode
Converts a DRIVER_INFO struct into a DRIVER_NODE struct.
LPDRIVER_NODE
DiConvertDriverInfoToDriverNode(LPDEVICE_INFO *lpdi*,
LPDRIVER_INFO *lpInfo*)

Return Value Returns a pointer to the new DRIVER_NODE struct if successful, otherwise NULL is returned.

Parameters *lpdi*
Pointer to the device the DRIVER_INFO belogs to

*lpInfo*
Pointer to the DRIVER_INFO to be converted.

| | |
|---|---|
| Comments | This API will create a DRIVER_NODE struct and fill it in from the information in the DRIVER_INFO. If DRIVER_INFOs have been used for device driver selection, this must be done before calling any other Device Installer APIs, since other APIs will require lpdi->lpSelectedDriver to contain a pointer to a DRIVER_NODE. |
| See Also | DiBuildCompatDrvInfoList<br>DiBuildClassDrvInfoList |

DiCopyRegSubKeyValue

This API will copy a specific registry value from one subkey to another.

RETERR DiCopyRegSubKeyValue(HKEY *hkKey*, LPSTR *lpszFromSubKey*, LPSTR *lpszToSubKey*, LPSTR *lpszValueToCopy*)

| | |
|---|---|
| Return Value | Returns OK if successful. |
| Parameters | *hkKey* |
| | On opend registry key which the specified subkeys are rooted at. |
| | *lpszFromSubKey* |
| | Name of the subkey from which the value is to be copied. This subkey must be rooted at hkKey. |
| | *lpszToSubKey* |
| | Name of the subkey where the value is to be copied. This subkey must be rooted at hkKey. |
| | *lpszValueToCopy* |
| | Subkey value in lpszFromSubKey which is to be copied to lpszToSubKey. |
| Comments | This function will open the specified subkey, and copy the specified value. |

DiCreateDeviceInfo

Creates a DEVICE_INFO struct and initializes it with specified information.

RETERR DiCreateDeviceInfo(LPLPDEVICE_INFO *lplpdi*, LPCSTR *lpszDescription*, DWORD *dnDevnode*, HKEY *hkey*, LPCSTR *lpszRegsubkey*, LPCSTR *lpszClassName*, HWND *hwndParent*)

| | |
|---|---|
| Return Value | Returns OK if successful, otherwise an ERR_DI_xxx error code will be returned. |
| Parameters | *lplpdi* |
| | Pointer to a pointer to a DEVICE_INFO struct. This pointer receives the pointer to the allocated DEVICE_INFO struct created by this function. |

*lpszDescription*
    If non-null, the description of the device 20.

*dnDevnode*
    If non-zero, the the value of the device node of the device 20.

*hkey*
    The registry "HKEY" which the lpszRegsubkey is located in. This is usually "HKEY_LOCAL_MACHINE".

*lpszRegsubkey*
    If non-null, the registry subkey string where the hardware information of the device is stored. This subkey is related to the "HKEY".

*lpszClassName*
    If non-null, the class name of the device 20.

*hwndParent*
    If non-null, the window handle of the top level window use for any user interface related to installing the device 20.

Comments    The DEVICE_INFO struct is allocated zero-init in SETUPX's private heap, and so must be destroyed using DiDestroyDeviceInfoList

See Also    DiDestroyDeviceInfoList

DiCreateDevRegKey

This API will create either of the registry keys associated with a device 20.

RETERR DiCreateDevRegKey(LPDEVICE_INFO *lpdi*, LPHKEY *lphk*, HINF *hinf*, LPCSTR *lpszInfSection*, int *iFlags*)

Return Value    OK if the registry key is created sucessfully.

Parameters    *lpdi*
    A device info struct for a device that is being installed.

*lphk*
    Buffer to receive the new registry key.

*hinf*
    Handle to an opened .INF file.

*lpszInfSection*
    Section of the .INF file to be executed using the newly created reg key.

*iFlags*
    Flags indicating which type of regkey to create.

188

DIREG_DEV

Create a Hardware registry key for the device 20. This is a key that exists in the "\ENUM\ROOT" branch of the registry 153.

DIREG_DRV

Create a software, or Driver, registry key for the device 20. This is a key that is in the "HKLM\System\CurrentControlSet\Services\Class" registry subkey.

Comments  The hinf, and lpszInfSection parameters are typically not required, and are rarely used. These would only be needed if special information is needed to be added to the registry 153 when the key is first created. It is the caller's responsibility to close the returned registry key when it is finished with this key.

DiCreateDriverNode

Creates a DriverNode structure and initializes it with passed in information

RETERR DiCreateDriverNode(LPLPDRIVER_NODE *lplpdn*, UINT *Rank*, UINT *InfType*, unsigned *InfDate*, LPCSTR *lpszDevDescription*, LPCSTR *lpszDrvDescription*, LPCSTR *lpszProviderName*, LPCSTR *lpszMfgName*, LPCSTR *lpszInfFileName*, LPCSTR *lpszSectionName*, DWORD *dwPrivateData*)

Return Value  Returns OK.

Parameters  *lplpdn*

Pointer to a pointer to receive the allocated device driver node.

*Rank*

The rank match of the device driver node being created. This is a value in [0..n], where a lower number indicates a higher level of compatability between the device driver 156 represented by the node, and the device 20 being installed.

*InfType*

The type of .INF file the device driver 156 represented by node came from. Can be either INFTYPE_TEXT or INFTYPE_EXECUTABLE

*InfDate*

The DOS time and date stamp of the .INF file.

189

*lpszDevDescription*

A description of the device 20 that will be supported by this device driver 156.

*lpszDrvDescription*

A description of this device driver 156.

*lpszProviderName*

The provider of the device driver 156.

*lpszMfgName*

The manufacture of the device 20 that will be supported by this device driver 156.

*lpszInfFileName*

The name of the .INF file this device driver 156 came from.

*lpszSectionName*

The install section within the .INF file that would be used to install this device driver 156.

*dwPrivateData*

Reserved for future use.

Comments This function will allocate a structure to hold the device node and will make local copies of all passed in strings. This function will also reserve enough space to store the device's ID(s) and compatible device ID(s).

DiDeleteDevRegKey

This API will delete one or both to the registry keys for the sepecified device 20.

RETERR DiDeleteDevRegKey(LPDEVICE_INFO *lpdi,* int *iFlags)*

Return Value OK if the registry key(s) are deleted

Parameters *lpdi*

A device info struct for device 20 that is being removed.

*iFlags*

Flags indicating which registry key(s) to remove.

DIREG_DEV

Delete the Hardware registry key for the device 20. This is a key that exists in the "\ENUM\ROOT" branch of the registry 153.

190

DIREG_DRV

> Delete the Software, or Driver, registry key for the device. This is a key that is in the "HKLM\System\CurrentControlSet\Services\Class" registry subkey.

DIREG_BOTH

> Delete both registry keys for the device.

DiDestroyClassInfoList

This API will delete a single, or list of, CLASS_INFO struct(s).

RETERR DiDestroyClassInfoList(LPCLASS_INFO *lpci*)

| | |
|---|---|
| Return Value | This function returns OK. |
| Parameters | *lpci* |
| | A pointer to a single or list of CLASS_INFO struct(s). |
| Comments | This function will free any memory associated with the passed in lpci. This function will free any DEVICE_INFO structs also associated with this CLASS_INFO. |
| See Also | DiBuildClassInfoList |
| | DiBuildClassInfoListEx |
| | DiGetDeviceClassInfo |

DiDestroyDeviceInfoList

Destroys a list of DEVICE_INFO structures.

RETERR DiDestroyDeviceInfoList(LPDEVICE_INFO *lpdi*)

| | |
|---|---|
| Return Value | Returns OK. |
| Parameters | *lpdi* |
| | Pinter to a list of DEVICE_INFO structs. |
| Comments | The list can contain only 1 structure or "struct". This function will free any compatible and/or class driver lists created using the lpdi(s). Any class installer DLL's or property providor DLL's associated with the lpdi(s) list will also be freed. |
| See Also | DiCreateDeviceInfo |
| | DiGetClassDevs |
| | DiGetClassDevsEx |

DiDestroyDriverNodeList

Destroys all of the device driver nodes in the given node list.

RETERR DiDestroyDriverNodeList(LPDRIVER_NODE *lpDNList*)

Return Value  Returns OK.

|            | |
|---|---|
| Parameters | *lpDNList* |
|            | Pointer to the device driver node list which is to be destroyed. |

DiDestroyDriverNodeList

Destroys all of the device driver info structs in the given info list.

RETERR DiDestroyDriverNodeList(LPDRIVER_INFO *lpInfoList*)

| | |
|---|---|
| Return Value | Returns OK. |
| Parameters | *lpInfoList* |
|            | Pointer to the device driver info list which is to be destroyed. |

DiDrawMiniIcon

Draw the appropriate mini-icon. The icon is centered vertically and butted against the left corner of the rectangle.

int DiDrawMiniIcon(HDC *hdc*, RECT *rc*, int *iDevice*, DWORD *flags*)

| | |
|---|---|
| Return Value | Offset from left of rcItem where the string should start |
| Parameters | *hdc* |
|            | The device context in which the mini-icon will be drawn. |

*rc*
    The rectangle in the specified HDC to draw the mini-icon in.

*iDevice*
    The number of the device class, used as an index to the appropriate mini-icon. The DiGetClassBitmapIndex API can be used to map a class name to a mini-icon index. The following are pre-defined class numbers:

192

| | |
|---|---|
| 0 | Computer |
| 2 | display |
| 5 | mouse |
| 6 | keyboard |
| 9 | fdc |
| 9 | hdc |
| 10 | ports |
| 15 | net |
| 0 | system |
| 8 | sound |
| 14 | printer |
| 2 | monitor |
| 3 | nettrans |
| 16 | netclient |
| 17 | netservice |
| 18 | unknown |

*flags*

Controls the drawing operation. The LOWORD contains the actual flags defined as follows:

DMI_MASK

Draw the mini icon's mask into HDC.

DMI_BKCOLOR

Use the system color index specified in the HIWORD of flags as the background color. If not specificed, COLOR_WINDOW is used.

See Also    DiGetClassBitmapIndex

DiGetClassBitmapIndex

Returns the index if the mini-icon for the specificed class.

BOOL DiGetClassBitmapIndex(LPCSTR *lpszClass*, LPINT *lpiMiniIconIndex*)

Return Value    TRUE if the mini-icon index is known, FALSE otherwise

193

| | | |
|---|---|---|
| Parameters | | *lpszClass* |
| | | The name of the class to get the mini-icon index for. |
| | | *lpiMiniIconIndex* |
| | | Pointer to a buffer to receive the mini-icon index. This buffer is always filled in, and receives the index of the unknown mini-icon if the return value is FALSE. |
| See Also | | DiDrawMiniIcon |

DiGetClassDevs

Returns a list of DEVICE_INFO structs for all of the installed devices 20 of a specified class.

RETERR DiGetClassDevs(LPLPDEVICE_INFO *lplpdi*, LPCSTR *lpszClassName*, HWND *hwndParent*, int *iFlags*)

| | | |
|---|---|---|
| Return Value | | Returns OK if successful, otherwise an ERR_DI_xxx error code will be returned. |
| Parameters | | *lplpdi* |
| | | Pointer to a pointer to a DEVICE_INFO struct. This pointer receives the pointer to the beginning of the list of DEVICE_INFO structs created by this function. |
| | | *lpszClassName* |
| | | If non-null, the class name to use when creating the list of devices 20. |
| | | *hwndParent* |
| | | If non-null, the window handle of the top level window use for any user interface using the resulting DEVICE_INFO structs. |
| | | *iFlags* |
| | | Control options for building the device list. |
| | | DIGCF_PRESENT |
| | |     Return only devices which are present. This flag is only valid if configuration manager 158 is running and has created device nodes for the installed devices 20. |
| | | DIGCF_ALLCLASSES |
| | |     Return a list of installed devices 20 for all classes. If set, this flags will cause lpszClassName to be ignored. |
| | | DIGCF_PROFILE |
| | |     Return only devices 20 which are present in the current configuration. |

194

| | |
|---|---|
| Comments | This function build a list of devices 20 that have been previsouly installed in the computer 8. This function uses the "HKLM\ENUM" branch of the registry 153 to build its list. |
| See Also | DiGetClassDevEx |

DiGetClassDevsEx

Returns a list of DEVICE_INFO structs for all of the installed devices 20 of a specified class.

RETERR DiGetClassDevsEx(LPLPDEVICE_INFO *lplpdi*, LPCSTR *lpszClassName*, LPSTR *lpszEnumerator*, HWND *hwndParent*, int *iFlags*)

| | |
|---|---|
| Return Value | Returns OK if successful, otherwise an ERR_DI_xxx error code will be returned. |
| Parameters | *lplpdi* |

Pointer to a pointer to a DEVICE_INFO struct. This pointer receives the pointer to the beginning of the list of DEVICE_INFO structs created by this function.

*lpszClassName*

If non-null, the class name to use when creating the list of devices 20.

*lpszEnumerator*

If specified this API will retrieve devices 20 created by the specified enumerator 150. If NULL then this functions works like DiGetClassDevs. For example, this parameter could specify ROOT, and only the device 20 in the "ENUM\ROOT" branch of the registry 153 would be returned.

*hwndParent*

If non-null, the window handle of the top level window use for any user interface using the resulting DEVICE_INFO structs.

*iFlags*

Control options for building the device list.

DIGCF_PRESENT

Return only devices which are present. This flag is only valid if the configuration manager 158 is running and has created device nodes for the installed devices 20.

DIGCF_ALLCLASSES

Return a list of installed devices for all classes. If set, this flags will cause lpszClassName to be ignored.

195

DIGCF_PROFILE

Return only devices 20 which are present in the current configuration.

Comments    This function build a list of devices 20 that have been previsouly installed. This function uses the HKLM\ENUM branch of the registry 153 to build its list.

See Also    DiGetClassDev

DiGetDeviceClassInfo

This API will build a single CLASS_INFO struct for the class specificed in the lpdi.

RETERR DiGetDeviceClassInfo(LPLPCLASS_INFO *lplpci*, LPDEVICE_INFO *lpdi*)

Return Value    This function returns OK if the CLASS_INFO struct build.

Parameters    *lplpci*

A buffer to receive a pointer to a CLASS_INFO struct.

*lpdi*

A pointer to a DEVICE_INFO struct which contains the name of the class to build a CLASS_INFO struct for.

See Also    DiDestroyClassInfoList

DiGetINFClass

This API will return the class of a specfied .INF file.

RETERR DiGetINFClass(LPSTR *lpszMWDPath*, UINT *InfType*, LPSTR *lpszClassName*, DWORD *dwcbClassName*)

Return Value    OK if the class can be determined.

Parameters    *lpszMWDPath*

Path to the .INF file.

*InfType*

Type of .INF file. This can be either INFTYPE_TEXT or INFTYPE_EXECUTABLE.

*lpszClassName*

A buffer to receive the class name of the .INF.

*dwcbClassName*

The size of of the lpszClassName buffer.

DiInstallClass

Install the [ClassInstall] section of the specified .INF file.

RETERR DiInstallClass(LPCSTR *lpszInfFileName*, DWORD *dwFlags*)

196

| | |
|---|---|
| Return Value | Returns OK if successful, otherwise an ERR_DI_xxx error code will be returned. |
| Parameters | *lpszInfFileName* |
| | The name of the .INF file containing a [ClassInstall] section. |
| | *dwFlags* |
| | Flags to control the geninstall operation. |
| | DI_NOVCP |
| | This flag should be specificed if a VCP queue is allready opened. |
| | DI_NOBROWSE |
| | This flag should be specificed if no file browsing should be allowed in the event a copy operation cannot find a specificed file. |
| Comments | This API is generally called the the device manager 159 when it installs a device 20 of a new class. |

DiInstallDevice

Install the device specified by lpdi.

RETERR DiInstallDevice(LPDEVICE_.INFO *lpdi*)

| | |
|---|---|
| Return Value | Returns OK if successful, otherwise an ERR_DI_xxx error code will be returned. lpdi->Flags will be set to indicate if the operating system 10 needs to be rebooted or restarted for the device 20 to be started. |
| Parameters | *lpdi* |
| | Pointer to a DEVICE_.INFO struct for the device 20 being installed. If lpdi->lpSelectedDriver is NULL this function will install a NULL device driver for the device, otherwise it installs the device driver 156 specified in the device driver node. |
| Comments | This API is the default handler for the DIF_INSTALLDEVICE class installer function. This API will install a device 20 by GenInstalling the install section specificed by the lpid->lpSelectedDriver DRIVER_NODE. If the configuration manager 158 is running, this API will attempt to dynamically start the device 20. |

DiInstallDriverFile

This API will perform a geninstall on the install section of the specified device, where on the file copy operations will be done.

RETERR DiInstallDriverFile(LPDEVICE_.INFO *lpdi*)

| | |
|---|---|
| Return Value | Returns OK if successful. |

| | | 197 |
|---|---|---|
| Parameters | *lpdi* | |
| | A pointer to the DEVICE_INFO struct of the device who's device driver files are to be copied. The lpSelectedDriver member of this lpdi must be pointing to a valid DRIVER_NODE prior to calling this API. | |
| Comments | This API is similiar to DiInstallDevice, but it only performs the file copy commands in the install sections, and will not attempt to configure the device in any way. This API is usefull for pre-copying a device's device driver files. | |

DiInstallDrvSection

Install the specified section of an .INF file.

RETERR DiInstallDrvSection(LPCSTR *lpszInfFileName,* LPCSTR *lpszSection,* LPCSTR *lpszClassName,* LPCSTR *lpszDescription,* DWORD *dwFlags)*

| | |
|---|---|
| Return Value | Returns OK if successful, otherwise an ERR_DI_xxx error code will be returned. |
| Parameters | *lpszInfFileName* |
| | The .INF file containing the section to be installed. |
| | *lpszSection* |
| | The section of the .INF file to install |
| | *lpszClassName* |
| | The class name of the device supported by the install section. |
| | *lpszDescription* |
| | The description of the device supported by the install section. |
| | *dwFlags* |
| | Flags to be ORed into the lpdi flags that are passed to DiInstallDevice. |
| Comments | This API creates a LPDI, and a LPDRIVER_NODE based in the suppied information, and sends a DIF_INSTALLDEVICE message to the appropriate class installer 161b. The DI_NOVCP flags is always specificed by this function, so no file operations listed in the specified install section will be executed. This function is considered obsolete since the same results can be obtained by calling DiInstallDevice directly, or DiCallClassInstaller. |

DiIsThereNeedToCopy

Determines if there is any need to carry out the copy operation specified by a device's install section.

RETERR DiIsThereNeedToCopy(HWND *hwnd,* DWORD *dwFlags)*

| | |
|---|---|
| Return Value | This function returns OK if that are files that need to be copied. ERR_DI_NOFILECOPY will be returned if no files need to be copied. |
| Parameters | *hwnd* |
| | Unused. This paramenter should be NULL. |
| | *dwFlags* |
| | Unused. This paramenter should be 0. |
| Comments | This function determines if the copy needs to be performed by examining each file that is to be copied, and checking to see if a current version of that file allready exists on the user's system. The verion check is done be looking to see if the file has been previoulsy installed on this verion of the operating system. If the file has not been previsouly installed (i.e. it is not in our list of installed files), then the files verion stamp is compared to the current version. Note that any files copied as a result of a call to DiInstallDevice will be automatically added to the installed files list. The installed files list is contained in the registry 153 under: "HKLM\System\CurrentControlSet\Control\InstalledFile". |

DiLoadClassIcon

This API is used to load both the large mini icons of a specified class.

RETERR DiLoadClassIcon(LPCSTR *szClassName*, HICON FAR *\*lphiLargeIcon*, int FAR *\*lpiMiniIconIndex*)

| | |
|---|---|
| Return Value | OK if a specificed icon(s) are loaded successfully. |
| Parameters | *szClassName* |
| | The name of the class for which the icon(s) should be loaded |
| | *\*lphiLargeIcon* |
| | Buffer that will receive the loaded large icon for the specificed class. If this parameter is NULL, the large icon will not be loaded. |
| | *\*lpiMiniIconIndex* |
| | Buffer that will receive the index of the mini-icon of the specificed class. The mini icon is stored in the mini-icon cache of the device installer 161a, and it's index is returned. |
| Comments | The icons of the class are either pre-defined, and loaded from the internal cache of the class installer 161b, or they are loaded directly from the class installer's executable. This function will query the registry value ICON in the specificed class's section. If this value is specificed then it indicates what mini-icon to | load. If the icon value is negative the absolute value represents a predefined icon. See DiDrawMiniIcon for a list of pre-defined mini-icons. If the icon value is positive it reperesents an icon in the class installer's executable, and will be extracted. This function also uses the INSTALLER value to determine what class installer executable to extract the icon(s) from.

DiMergeDriverInfo

Merges a DRIVER_INFO into an existing DRIVER_INFO linked list.

RETERR DiMergeDriverInfo(LPLPDRIVER_INFO *lplpInfoList*, LPDRIVER_INFO *lpInfo*)

Return Value   Returns "OK".

Parameters   *lplpInfoList*
   Pointer to the list to merge the new DRIVER_INFO into.

*lpInfo*
   Pointer to the DRIVER_INFO to be merged

Comments   This function will merge a DRIVER_INFO into an existing list. If the list is empty the passed in DRIVER_INFO will be inserted at the head of the list. If the list contains any DRIVER_INFOs, new DRIVER_INFO will be merged as follows: The new DRIVER_INFO will be inserted in front of any nodes with a higher rank. If the rank is the same, then new DRIVER_INFO will be grouped with other DRIVER_INFOs having the same manufacture. The new DRIVER_INFO will be inserted at the end of the group. If the DRIVER_INFO is an exact duplicate of an existing DRIVER_INFO, meaning that its rank, description, manufacturer, and provider are all the same, then the DRIVER_INFO will be deleted. This implies that only the first node in a duplicate set will be added to the list.

See Also   DiMergeDriverNode

DiMergeDriverNode

Merges a DRIVER_NODE into an existing DRIVER_NODE linked list.

RETERR DiMergeDriverNode(LPLPDRIVER_NODE *lplpdnList*, LPDRIVER_NODE *lpdn*)

Return Value   Returns OK.

Parameters   *lplpdnList*
   Pointer to the list to merge the new node into.

*lpdn*
   Pointer to the DRIVER_NODE to be merged

200

| | |
|---|---|
| Comments | This function will merge a DRIVER_NODE into an existing list. If the list is empty the passed in DRIVER_NODE will be inserted at the head of the list. If the list contains any DRIVER_NODEs, the new node will be merged as follows: The new node will be inserted in front of any nodes with a higher rank. If the rank is the same, then new node will be grouped with other nodes having the same manufacture. The new node will be inserted at the end of the group. If the node is an exact duplicate of an existing node, meaning that its rank, description, manufacture, and provider are all the same, then the node will be deleted. This implies that only the first node in a duplicate set will be added to the list. |
| See Also | DiMergeDriverInfo |

DiOpenClassRegKey

Open the class registry key, and optionally a specific class's subkey.

RETERR DiOpenClassRegKey(LPHKEY *lphk*, LPCSTR *lpszClassName*)

| | |
|---|---|
| Return Value | Returns "OK" if successful, otherwise an ERR_DI_xxx error code will be returned. |
| Parameters | *lphk* |
| | Buffer to receive the opened registry key. |
| | *lpszClassName* |
| | The name of a specific class. If non NULL the specificed class's subkey will be opened are retured if it exists. If this parameter is NULL, the registry key of the class branch (HKLM\System\CurrentControlSet\Services\Class) will be returned. |

DiOpenDevRegKey

This API will open either of the registry keys associated with a device 20.

RETERR DiOpenDevRegKey(LPDEVICE_INFO *lpdi*, LPHKEY *lphk*, int *iFlags*)

| | |
|---|---|
| Return Value | OK. |
| Parameters | *lpdi* |
| | A device info struct for device 20 who's registry key is being opened. |
| | *lphk* |
| | Buffer to receive the opened registry key. |
| | *iFlags* |
| | Flags indicating which type of regkey to create. |

201

DIREG_DEV
Open the hardware registry key for the device 20. This is a key that exists in the \ENUM\ROOT branch of the regisrty 153.

DIREG_DRV
Open the Software, or Driver, registry key for the device. This is a key that is in the HKLM\System\CurrentControlSet\Services\Class registry subkey.

Comments Note that it is the callers responsibility to close the returned registry key when it is finished with it.

DiReadRegConf

This API will read either a BOOT or FORCED configuration from the specified device's hardware registry key.

RETERR DiReadRegConf(LPDEVICE_INFO *lpdi*, LPBYTE FAR \* *lplpbLogConf*, LPDWORD *lpdwSize*, DWORD *dwFlags*)

Return Value Returns "OK" if successful. ERR_DI_REG_API if the configuration asked for does not exist, or some other registry access error occured.

Parameters *lpdi*
Pointer to the device to read the BOOT or FORCED logical configuration from.

*lplpbLogConf*
Address of a pointer which will receive the pointer to the logical configuration data.

*lpdwSize*
Address of a buffer to receive the size of the logical config that was read.

*dwFlags*
Flags indicating which configuration to read.

DIREGLC_FORCEDCONFIG
If set, then the device's FORCED configuration is read.

DIREGLC_BOOTCONFIG
If set then the device's BOOT config is is read if it has one. If both flags are specified, then the FORCED config is read.

Comments This API will allocate enough space to store the entire BOOT or FORCED logical configuration, and will read the BOOT or FORCED logical configuration into the allocated buffer. It is the caller's responsibility to free the allocated buffer. The buffer is allocated using the GlobalAllocPtr macro, and should be freed using the GlobalFreePtr macro.

DiReadRegLogConf

This API will read a named logical configuration from the registry 153.

RETERR DiReadRegLogConf(LPDEVICE_INFO *lpdi*, LPSTR *lpszConfigName*, LPBYTE FAR \* *lplpbLogConf*, LPDWORD *lpdwSize*)

Return Value  Returns "OK" if successful.

Parameters  *lpdi*

Pointer to the device 20 for reading its logical configuration data.

*lpszConfigName*

The name of the logical configuration. This is the registry value in the logconfig registry key for the device 20.

*lplpbLogConf*

Address of a pointer which will receive the pointer to the logical configuration data.

*lpdwSize*

Address of a buffer to receive the size of the logical configuration data that was read.

Comments  This API will allocate enough space to store the entire logical configuration data, and will read the logical configuration into the allocated buffer. It is the caller's responsibility to free the allocated buffer. The buffer is allocated using the GlobalAllocPtr macro, and should be freed using the GlobalFreePtr macro.

DiRemoveDevice

Removes a device 20 from the computer 8.

RETERR DiRemoveDevice(LPDEVICE_INFO *lpdi*)

Return Value  Returns OK.

Parameters  *lpdi*

Pointer to a DEVICE_INFO struct for the device to be removed.

Comments  This function will remove the the device 20 from the computer 8, deleting both of its registry keys, and dynamically stopping the device 20 if it has a device node. If the device 20 cannot be dynamically stopped, then flags will be set in the lpdi->Flags field which will eventually cause the user to be prompted to shut the computer down. The removal is either global to all configurations, or specific to one configuration depending on the content of the lpdi->lpClassInstallParams field.

DiSelectDevice

This is the default handle for the DIF_SELECTDEVICE class installer message.

RETERR DiSelectDevice(LPDEVICE_INFO *lpdi*)

Return Value
OK if a device driver 156 is selected successfully, otherwise one of the ERR_DI_ error codes will be returned Parameters
*lpdi*
A device info struct for the device that is having a device driver 156 selected.

Comments
This routine will handle the user interface (UI) for allowing a user to select a device driver 156 for the device 20 defined by the passed in lpdi. By using the Flags field of the lpdi struct, the caller can specify special handling of the UI, such as allowing selecting from OEM disks.

DiSelectOEMDrv

This API will select a device driver 156 for a device 20 using an OEM path supplied by the user.

RETERR DiSelectOEMDrv(HWND *hDlg*, LPDEVICE_INFO *lpdi*)

Return Value
OK if a device driver 156 is selected successfully.

Parameters
*hDlg*
The window handle of the window that will be the parent of any dialogs created during this API.

*lpdi*
A device info struct for a device that is being installed.

Comments
This function will first ask the user for the OEM path, and will then call the class installer to select a device driver 156 from that OEM path.

FCEAddResDes

This API will add a resource descriptor to the end of an existing logical configuration.

FCERET FCEAddResDes(LPREGLOGCONF *pLogConf*, LPBYTE *lpResDes*, ULONG *ulResDesSize*, RESOURCEID *ResType*)

Return Value
FCE_OK. FCE_ERROR if there is a problem

Parameters
*pLogConf*
Pointer to a buffer containing a logical configuration.

*lpResDes*
Pointer to a buffer containing the resource descriptor to be added.

*ulResDesSize*

The size of the resource descriptor being added.

*ResType*

The type of resource descriptor being added.

See Also    FCEDeleteResDes

FCEDeleteResDes

This API will delete a resource descriptor from an existing logical configuration.

FCERET FCEDeleteResDes(LPREGLOGCONF *pLogConf,* WORD *wResNumber,* ULONG *ulOldSize,* PULONG *pulNewSize*)

Return Value    FCE_OK. FCE_ERROR if there is a problem

Parameters    *pLogConf*

Pointer to a buffer containing a logical configuration.

*wResNumber*

The number of the resource descriptor to be deleted.

*ulOldSize*

The current size of the logical configuration data.

*pulNewSize*

Address of a buffer to receive the new size of the logical configuration, after the resource descriptor has been deleted.

See Also    FCEAddResDes

FCEGetAllocValue

This API will return the allocated value of the specified resource descriptor.

FCERET FCEGetAllocValue(LPREGLOGCONF *pLogConf,* WORD *wResNumber,* LPULONG *pulValue,* LPULONG *pulLen*)

Return Value    FCE_OK if the resource descriptor value can be determined. FCE_ERROR if there is a problem Parameters    *pLogConf*

Pointer to a buffer containing a logical configuration.

*wResNumber*

The number of the resource descriptor.

*pulValue*

Address of a buffer to receive the allocated value.

205

*pulLen*
    Address of a buffer to receive the length of the allocate value.

Comments This FCE function is usefull for determining the allocated value of a resource descriptor in a FORCED or BOOT logical config. This funcion will retured undefined results if called with a BASIC logical config, since BASIC logical configs do not have set allocated value.

See Also
FCEGetFirstValue
FCEGetOtherValue
FCEGetValidateValue
FCEGetFlags

FCEGetFirstValue

This API will return the first possible setting for the specified resource descriptor.

FCERET FCEGetFirstValue(DEVNODE *dnDevNode,* LPREGLOGCONF *pLogConf,* WORD *wResNumber,* LPULONG *pulValue,* LPULONG *pulLen)*

Return Value FCE_OK. FCE_OK_IS_ALLOC if the value returned is the currently allocated value for the specified devnode. FCE_ERROR if there is a problem

Parameters *dnDevNode*
    A pointer to the devnode that is using this passed in logical configuration. If this is specified, this API will determine if the returned setting is the currently allocated setting.

*pLogConf*
    Pointer to a buffer containing a logical configuration.

*wResNumber*
    The number of the resource descriptor.

*pulValue*
    Address of a buffer to receive the first value.

*pulLen*
    Address of a buffer to receive the first length.

Comments This API must be called before calling FCEGetOtherValue on a given resource descriptor, since it serves to initalize the resource descriptor to a known value.

See Also
FCEGetAllocValue
FCEGetFirstValue

206

FCEGetFlags
FCEGetValidateValue

FCEGetFlags

This API will return the flags for a specified resource descriptor.

FCERET FCEGetFlags(LPREGLOGCONF *pLogConf*, WORD *wResNumber*, LPWORD *pwFlags*)

Return Value  FCE_OK if the resource descriptor flags can be determined. FCE_ERROR if there is a problem

Parameters  *pLogConf*

Pointer to a buffer containing a logical configuration.

*wResNumber*

The number of the resource descriptor.

*pwFlags*

Address of a buffer to receive the flags.

Comments  This FCE function is usefull for determining the flags associated with a resource descriptor.

See Also  FCEGetAllocValue
FCEGetFirstValue
FCEGetOtherValue
FCEGetValidateValue

FCEGetOtherValue

This API will return the next or previous possible setting for a specified resource descriptor.

FCERET FCEGetOtherValue(DEVNODE *dnDevNode*, LPREGLOGCONF *pLogConf*, WORD *wResNumber*, BOOL *bNext*, LPULONG *pulValue*, LPULONG *pulLen*)

Return Value  FCE_OK. FCE_OK_IS_ALLOC if the value returned is the currently allocated value for the specified devnode. FCE_ERROR if there is a problem

Parameters  *dnDevNode*

A pointer to the devnode that is using this passed in logical config. If this is specified, this API will determine if the returned setting is the currently allocated setting.

*pLogConf*

Pointer to a buffer containing a logical configuration.

207

*wResNumber*

The number of the resource descriptor.

*bNext*

TRUE if the next value should be returned, FALSE is the previous value should be returned.

*pulValue*

Address of a buffer to receive the next or previous value.

*pulLen*

Address of a buffer to receive the length of the next or previous value.

See Also    FCEGetAllocValue
FCEGetFirstValue
FCEGetFlags
FCEGetValidateValue

FCEGetResDes

This API will return the resource type of the specified resource descirptor.

FCERET FCEGetResDes(LPREGLOGCONF *pLogConf*, WORD *wResNumber*, PRESOURCEID *PResType*)

Return Value    FCE_OK if the resource descriptor is valid. FCE_NO_MORE if the specified resource descriptor cannot be located. FCE_ERROR if there is a problem

Parameters    *pLogConf*

Pointer to a buffer containing a logical configuration.

*wResNumber*

The number of the resource descriptor. Resource descriptor are numbered starting at "0".

*PResType*

Address of a buffer which receive the type of the selected resource descriptor. This will be filled in as long as the return value is not FCE_NO_MORE. This type will be one of the following:

ResType_Mem

The resource descriptor is for an address range of memory 22.

ResType_IO

The resource descriptor is for an range of I/O Port 28.

ResType_DMA

The resource descriptor is for a DMA channel 26.

208

ResType_IRQ

The resource descriptor is for an IRQ 22.

Comments    This FCE function is usually called to loop through all resource descriptors in a logical configuration, applying some function based on the resource type.

See Also    FCEGetAllocValue

FCEGetFirstValue

FCEGetOtherValue

FCEGetValidateValue

FCEGetResDesOffset

This API will return a pointer to the starting byte of the specified resource descriptor in logical configuration buffer.

LPBYTE FCEGetResDesOffset(LPREGLOGCONF *pLogConf*, WORD *wResNumber*, DWORD *dwFlags*)

Return Value    FCE_OK. FCE_ERROR if there is a problem.

Parameters    *pLogConf*

Pointer to a buffer containing a logical configuration.

*wResNumber*

The number of the resource descriptor.

*dwFlags*

Controls validation of the resource descriptor.

FCE_GRDO_VALIDATE

If set, this API will validate the resource descriptor prior to returning.

Comments    This function is usefull for direct manipulation of a resource descriptor.

FCEGetValidateValue

This API will validate a specified value and return that value or the next possible valid value of a resource descriptor.

FCERET FCEGetValidateValue(DEVNODE *dnDevNode*, LPREGLOGCONF *pLogConf*, WORD *wResNumber*, ULONG *ulValue*, ULONG *ulLen*, LPULONG *pulValue*, LPULONG *pulLen*)

Return Value    FCE_OK. FCE_OK_IS_ALLOC if the value returned is the currently allocated value for the specified devnode. FCE_ERROR if there is a problem

209

| | |
|---|---|
| Parameters | *dnDevNode* |
| | A pointer to the device node that is using this passed in the logical configuration. If this is specified, this API will determine if the returned setting is the currently allocated setting. |
| | *pLogConf* |
| | Pointer to a buffer containing a logical configuration. |
| | *wResNumber* |
| | The number of the resource descriptor. |
| | *ulValue* |
| | The value to be validated |
| | *ulLen* |
| | The length to be validated. |
| | *pulValue* |
| | Address of a buffer to receive the valid value. |
| | *pulLen* |
| | Address of a buffer to receive the valid length. |
| Comments | This FCE function can be used to determine if a specified value and length can work for the specified resource descriptor. If they can, then the passed in value and length will be copied to the return buffers. If they cannot, the next possible value and length will be returned. When a value is automatically selected it is the next possible value from the current position in the resource descriptor (i.e. it is dependant on previous calls to FCEGetFirstValue and FCEGetOtherValue.) |
| See Also | FCEGetAllocValue |
| | FCEGetFirstValue |
| | FCEGetFlags |
| | FCEGetOtherValue |

FCEInit

This API will initialize the FCE functions for use.

FCERET FCEInit(DWORD *dwFlags*)

| | |
|---|---|
| Return Value | FCE_OK. |
| Parameters | *dwFlags* |
| | Indicates if the FCE functions should use the configuration manager for validating values. |

210

FCE_FLAGS_USECONFIGMG
    If set this flag indicates the configuration manager should be used.

Comments This function must be called at least once before any of the FCE functions can be used. Failure to call this function can result in unpredictable results from other FCE APIs.

FCEWriteThisForcedConfigNow

This API will write the current logical configuration as a forced configuration in the specificed registry location.

FCERET FCEWriteThisForcedConfigNow(LPREGLOGCONF *pLogConf*, HKEY *hkey*)

Return Value FCE_OK. FCE_ERROR if there is a problem.

Parameters *pLogConf*
    Pointer to a buffer containing a logical configuration.

*hkey*
    An opened registry key.

Comments This FCE function will write the logical config as a forced config using the current position for each resource descriptor.

GenInfLCToDevNode

This API will gen install a logical configuration section of an .INF file setting up the logconfig on a device node, rather than in the registry 153.

RETERR GenInfLCToDevNode(ATOM *atInfFileName*, LPSTR *lpszSectionName*, BOOL *bInstallSec*, UINT *InfType*, DEVNODE *dnDevNode*)

Return Value OK if successful.

Parameters *atInfFileName*
    A global atom specifing the .INF file to use.

*lpszSectionName*
    A logconfig section in the .INF file.

*bInstallSec*
    TRUE if the section specified by lpszSectionName is an install section, containing LogConfig= entries. FALSE if the section is a logconfig section.

*InfType*
    The type of .INF file. This >INF file type is preferably INFTYPE_TEXT or INFTYPE_EXECUTABLE.

211

|  | *dnDevNode* |
|---|---|
| | The device node that is to receive the logical configuration data. |
| Comments | This API is useful to determine if one of the logical configurations for a device 20 can be made to work in the computer 8 with no conflicts. |

GetFctn

This API is used to retrieve the procedure address of a specified function in a specified DLL.

RETERR GetFctn(HKEY *hk*, LPSTR *lpszRegVal*, LPSTR *lpszDefProcName*, HINSTANCE FAR *\*lphinst*, FARPROC FAR *\*lplpfn)*

| Return Value | This function returns "OK" if successfull. |
|---|---|
| Parameters | *hk* |
| | An open registry key that will contain a value the specifies the DLL containing the function to be called. |

*lpszRegVal*

A value in the registry 153 the contain the name of a DLL, and optionally an entry point in that DLL.

*lpszDefProcName*

The name of a default procedure to load if one is not specified in the registry
153.

*\*lphinst*

A buffer to receive the instance of the specificed DLL if it is successfully loaded, and the procedure address is located.

*\*lplpfn*

A buffer to receive a the specified procedure address.

| Comments | This function is usefull for loading a class installer, or property provider, and receiving the procedure address specificied. The syntax of the registry entry is: value=dll[,proc name] where dll is the name of the DLL to load, and process name is an optional procedure to search for. If a process name is not specified, |
|---|---|
| | the procedure specified by lpszDefProcName will be used. |

GetFirstSubstr

This API will return the first substring in a substring list.

BOOL GetFirstSubstr(LPSUBSTR_DATA *lpssd*)

| Return Value | Returns TRUE if successful. |
|---|---|

| | |
|---|---|
| Parameters | *lpssd* |
| | Pointer to an initialized SUBSTR_DATA buffer. |
| Comments | This function will locate the first substring, and set the lpCurSubstr member of lpssd to point to that substring. |

GetNextSubstr

This API will return the next substring in a substring list.

**BOOL GetNextSubstr(LPSUBSTR_DATA *lpssd*)**

| | |
|---|---|
| Return Value | Returns TRUE if successful. |
| Parameters | *lpssd* |
| | Pointer to an initialized SUBSTR_DATA buffer. |
| Comments | This function will locate the next substring, and set the lpCurSubstr member of lpssd to point to that substring. |

InitSubstrData

This API will convert a comma delimited list into a series of NULL terminated strings with API's for getting each NULL terminated string.

**BOOL InitSubstrData(LPSUBSTR_DATA *lpssd*, LPSTR *lpString*)**

| | |
|---|---|
| Return Value | Returns TRUE if successful. |
| Parameters | *lpssd* |
| | Address of a SUBSTR_DATA buffer. This buffer will be filled in with information about the generated substring list. |
| | *lpString* |
| | Pointer to a comma delimited, NULL terminated list. |
| Comments | This function "tokenizes" the given string into a series of substrings. The original list is preferably comma delimited and leading and trailing spaces are removed. After this function has been called, the Substr_DATA structure can be passed to GetFirstSubstr and GetNextSubstr to retrieve the NULL terminated substrings. |
| | This function DOES MODIFY lpString and assumes that this string will still be valid during calls to GetFirstSubstr and GetNextSubstr. |

InsertCompatNode

Inserts a DRIVER_NODE or DRIVER_INFO into an existing CompatDrvList or CompatDrvInfoList.

**BOOL InsertCompatNode(HDPA *hdpa*, LPDEVICE_INFO *lpdi*, LPCOMPATENTRY *lpNewNode*, BOOL *bExcludeDupes*, DWORD *dwFlags*)**

213

| | |
|---|---|
| Return Value | Returns TRUE if the NODE was added, or FALSE it is was not. |
| Parameters | *hdpa* |
| | Handle to a Dynamic Pointer Array that contains the current compatible device driver list. |

*lpdi*
  DEVICE_INFO for the device 20 that is having a CompatDrv or CompatDrvInfo list built.

*lpNewNode*
  Pointer to a COMPATENTRY struct for the node that is being added to the list.

*bExcludeDupes*
  If TRUE, then duplicate nodes will not be inserted into the list.

*dwFlags*
  Indicates what type of list is being built.

BUILD_INFO_LIST
    If set, then a DRIVER_INFO list is being built, otherwise a DRIVER_NODE list is being built.

lpGetVersionString

This API will retrieve a string from the [VERSION] section of a specified .INF file.

RETERR lpGetVersionString(LPSTR *lpszInfFile*, LPSTR *lpszValue*, LPSTR *lpszBuf*, int *cbBuf*, LPSTR *lpszDefaultVal*)

| | |
|---|---|
| Return Value | Returns OK if successful. |
| Parameters | *lpszInfFile* |
| | Pointer to the name of the .INF file who's [VERSION] section is to be read from. |

*lpszValue*
  Pointer to the value to be read from the [VERSION] section.

*lpszBuf*
  Address of the buffer to receive the read string.

*cbBuf*
  Size of the buffer pointed to by lpszBuf.

214

*lpszDefaultVal*

Pointer to a default value to use if the asked for value does not exist.

RemoveDeviceTreeWalk

Recursivly deletes a subtree from the hardware tree 152.

RETERR RemoveDeviceTreeWalk(DEVNODE *dnDevNode*, LPDEVICE_INFO *lpdi*)

| | |
|---|---|
| Return Value | Returns OK if no errors, otherwize an ERR_DI_xxx error code will be returned |
| Parameters | *dnDevNode* | initial device node for starting the walk of the hardware tree 152. The walk is performed depth first, deleting as we reach leaf nodes.

*lpdi*

Pointer to the parent of the device 20, also called the parent device. The parent device's flags and remove device parameters are used for the children of the parent device, i.e., child devices.

Table 14 describes the functions that support the device/class installers 161a and b. Referring now to Table 14, as follows:

Table 14: Device/Class Installer Structures

DEVICE_INFO

This is the basic data structure for most device installation APIs. A DEVICE_INFO represents a device 20 that is being installed on the computer 8, or an installed device 20 that is being modified in some way.

```
typedef struct {
    UINT cbSize;
    struct _DEVICE_INFO FAR *lpNextDi;
    char szDescription[LINE_LEN];
    DWORD dnDevnode;
    HKEY hRegKey;
    char szRegSubkey[MAX_DEVNODE_ID_LEN];
    char szClassName[MAX_CLASS_NAME_LEN];
    DWORD Flags;
    HWND hwndParent;
    LPDRIVER_NODE lpCompatDrvList;
    LPDRIVER_NODE lpClassDrvList;
```

215

```
        LPDRIVER_NODE lpSelectedDriver;
        ATOM atDriverPath;
        ATOM atTempInfFile;
        HINSTANCE hinstClassInstaller;
        HINSTANCE hinstClassPropProvidor;
        HINSTANCE hinstDevicePropProvidor;
        HINSTANCE hinstBasicPropProvidor;
        FARPROC fpClassInstaller;
        FARPROC fpClassEnumPropPages;
        FARPROC fpDeviceEnumPropPages;
        FARPROC fpEnumBasicProperties;
        DWORD dwSetupReserved;
        DWORD dwClassInstallReserved;
        GENCALLBACKPROC gicpGenInstallCallBack;
        LPARAM gicplParam;
        UINT InfType;
        HINSTANCE hinstPrivateProblemHandler;
        FARPROC fpPrivateProblemHandler;
        LPARAM lpClassInstallParams;
        struct _DEVICE_INFO FAR *lpdiChildList;
        DWORD dwFlagsEx;
        LPDRIVER_INFO lpCompatDrvInfoList;
        LPDRIVER_INFO lpClassDrvInfoList;
        } DEVICE_INFO;
```

Members   cbSize
   Size of the DEVICE_INFO struct.

*lpNextDi
   Pointer to the next DEVICE_INFO struct in a linked list.

szDescription[LINE_LEN]
   Buffer containing the description of the device 20.

dnDevnode
   If set, this contains the address of the device node associated with the device 20.

216 hRegKey

An opened registry key that contains the device's registry subkey. This is usually HKEY_LOCAL_MACHINE.

szRegSubkey[MAX_DEVNODE_ID_LEN]

Buffer containing the device's hardware registry subkey. This is key is rooted in hRegKey, and is ususally some place in the \ENUM branch.

szClassName[MAX_CLASS_NAME_LEN]

Buffer containing the device's class name.

Flags

Flags for controlling installation and user interface functions. Some flags can be set prior to calling the APIs for the device installer 161a, and other are set automatically during the processing of some APIs.

DI_SHOWOEM

Set if OEM disk support should be allowed.

DI_SHOWCOMPAT

Will be set if only a compatible device driver list is being displayed by DiSelectDevice.

DI_SHOWCLASS

Will be set if only a class driver list is is being displayed by DiSelectDevice.

DI_SHOWALL

Will be set if both a compatible device driver list and a class driver list are being shown by DiSelectDevice.

DI_NOVCP

Set if no VCP (Virtual Copy Procedure) is desired during DiInstallDevice.

DI_DIDCOMPAT

Will be set if DiBuildCompatDrvList has been done, and lpCompatDrvList points to this device's compatible device driver list.

DI_DIDCLASS

Will be set if DiBuildClassDrvList has been done, and lpClassDrvList points to this device's class driver list.

DI_AUTOASSIGNRES

Unused.

217

DI_NEEDRESTART
   Will be set if the device 20 requires a restart of operating system 10 after installation or a state change.

DI_NEEDREBOOT
   Will be set if the device 20 requires a reboot of the computer 8 after installation or a state change.

DI_NOBROWSE
   Set to disable browsing when selecting an OEM disk path.

DI_MULTMFGS
   Will be set if a class driver list, or class info list contains multiple manufactures.

DI_DISABLED
   Unused.

DI_GENERALPAGE_ADDED
   Set by a property page provider if a general properties page has been added to the device's property sheet.

DI_RESOURCEPAGE_ADDED
   Set by a property page provider if a resource properties page has been added to the device's property sheet.

DI_PROPERTIES_CHANGE
   Set if a device's properties have been changed and require an update of the user interface for the device manager 159.

DI_INF_IS_SORTED
   Set if the .INF file containing device drivers 156 for this device 20 is in sorted order.

DI_ENUMSINGLEINF
   Set if DiBuildCompatDrvList and DiBuildlassDrvList should only search the .INF file specificed by atDriverPath.

DI_DONOTCALLCONFIGMG
   Set if the configuration manager 158 should not be called during DiInstallDevice.

DI_INSTALLDISABLED
   Set if the device 20 should be installed in a disabled state by default.

218

DI_CLASSONLY
Set if this DEVICE_INFO struct contains only a class name.

DI_CLASSINSTALLPARAMS
Set if the lpClassIntallParams field points to a class install parameter block.

DI_NODI_DEFAULTACTION
Set if DiCallClassInstaller should not perform a default action, if the class installer 161b returns ERR_DI_DO_DEFAULT, or if there is no class installer 161b.

DI_QUIETINSTALL
Set if device install API should be as silent as possible using default choices whereever possible.

DI_NOFILECOPY
Set if DiInstallDevice should skip file copying.

DI_FORCECOPY
Set if DiInstallDevice should always copy file, even if they are present on the system.

DI_DRIVERPAGE_ADDED
Set by a property page provider if a device driver properties page has been added to the device's property sheet.

DI_USECI_SELECTSTRINGS
Set if class installer provided strings should be used during DiSelectDevice.

DI_OVERRIDE_INFFLAGS
Unused.

DI_PROPS_NOCHANGEUSAGE
Set if there should be no Enable/Disable capability on the device's general property page.

DI_NOSELECTICONS
Set if no small icons should be used during DiSelectDevice.

DI_NOWRITE_IDS
Set if DiInstallDevice should not write the device's device and compatible device IDs to the registry 153.

219 hwndParent
   Window handle that will own U/I dialogs related to this device.

lpCompatDrvList
   Pointer to a linked list of DRIVER_NODES representing the compatible
   device drivers 156 for this device 20.

lpClassDrvList
   Pointer to a linked list of DRIVER_NODES representing all device drivers
   156 of this device's class.

lpSelectedDriver
   Pointer to a single DRIVER_NODE that has been selected as the device
   driver 156 for this device 20.

atDriverPath
   Global ATOM containing the path to this device's .INF file. This is set only
   of the device driver 156 came from an OEM .INF file.

   atTempInfFile
   Global ATOM containing the name of a temporary .INF file for this device's
   drivers. This is set if the device drivers 156 were provided by a legacy .INF
   file and have been converted.

hinstClassInstaller Class installer module instance.

hinstClassPropProvidor
   Class Property Providor module instance.

hinstDevicePropProvidor
   Device Property Providor module instance.

   hinstBasicPropProvidor
   Basic Property Providor module instance.

fpClassInstaller
   Procedure address of class install function.

fpClassEnumPropPages Procedure address of the Class property provider page enumeration function.

fpDeviceEnumPropPages
   Procedure address of the Device property provider page enumeration
   function.

220 fpEnumBasicProperties

Procedure address of the Basic device property provider page enumeration function.

dwSetupReserved

Reserved for use by Setup.

dwClassInstallReserved

Reserved for use by Class Installers.

gicpGenInstallCallBack

Procedure address of a GenInstall call back function. This would be set if the class installer 161b wanted to handle GenInstall callbacks during DiInstallDevice.

gicplParam lParam for the GenInstall Callback.

InfType

The type of .INF file being used. This will be INFTYPE_TEXT or INFTYPE_EXECUTABLE.

hinstPrivateProblemHandler

Module handle for the device's private problem procedure.

fpPrivateProblemHandler

Procedure address of the device's private problem handler.

lpClassInstallParams

Pointer to a class install parameter block. Class installer parameters are specific to the class install functions.

**\*lpdiChildList**

Pointer to a linked list of DRIVER_INFO structs representing children of the particular device 20.

dwFlagsEx

Additional control flags.

DI_FLAGSEX_USEOLDINFSEARCH

Set if .INF file Search functions should not use indexed searching.

DI_FLAGSEX_AUTOSELECTRANK0

Set if DiSelectDevice should automatically select rank "0" if match device drivers 156.

221

DI_FLAGSEX_CI_FAILED
   Will be set internally if there was a failure to load or call a class installer 161b.

DI_FLAGSEX_NOLOGCONFIGS
   Set if DiInstallDevice shouldn't install a device's LogConfigs.

DI_FLAGSEX_DIDINFOLIST
   Will be set if DiBuildCompatDrvInfoList has been called, and the Info list for this device's compatible device driver has been built.

DI_FLAGSEX_DIDCOMPATINFO
   Will be set if DiBuildClassDrvInfoList has been called, and this device's class driver Info list has been built.

lpCompatDrvInfoList
   Pointer to a linked list of DRIVER_INFO structs that are compatible with the particular device 20.

lpClassDrvInfoList
   Pointer to a linked list of DRIVER_INFO structs representing all device drivers 156 for this device's class.

DRIVER_INFO

This structure contains the information necessary to present the user with a select device dialog.

```
typedef struct {
    WORD cbSize;
    struct _DRIVER_INFO FAR *lpNextInfo;
    LPSTR lpszDescription;
    LPSTR lpszMfgName;
    LPSTR lpszProviderName;
    WORD Rank;
    DWORD dwFlags;
    LPARAM lpReserved;
    DWORD dwPrivateData;
} DRIVER_INFO;
```

Members  cbSize
   Size of this structure in bytes.

222

**\*lpNextInfo**

Pointer to the next DRIVER_INFO struct in a linked list.

lpszDescription

Pointer to the description of the device being supported by this device driver 156.

lpszMfgName

Pointer to the name of the manufacture of this device driver 156.

lpszProviderName

Pointer to provider of this device driver 156 if the lpdi->Flags has the DI_MULTMFGS flag set.

Rank

The Rank match of this device driver 156. Ranks go from 0 to n, where 0 is the most compatible.

dwFlags

Flags that control the use of this device driver node. These are the same as the flags defined for a DRIVER_NODE.

DNF_DUPDESC

This device driver 156 has the same device description from more than one provider.

DNF_OLDDRIVER

Device driver node specifies old/current device driver 156

DNF_EXCLUDEFROMLIST

If set, this device driver node will not be displayed in any device driver select dialogs.

DNF_NODRIVER

Set if no device driver 156 is to be installed.

lpReserved

Reserved for use by the device installer 161a.

dwPrivateData

Reserved for use by the device installer 161a.

DRIVER_NODE

This strucure represents a device driver 156 which can be installed for a specific device 20.

223

```
        typedef struct {
            struct _DRIVER_NODE FAR* lpNextDN;
            UINT Rank;
            UINT InfType;
            unsigned InfDate;
            LPSTR lpszDescription;
            LPSTR lpszSectionName;
            ATOM atInfFileName;
            ATOM atMfgName;
            ATOM atProviderName;
            DWORD Flags;
            DWORD dwPrivateData;
            LPSTR lpszDrvDescription;
            LPSTR lpszHardwareID;
            LPSTR lpszCompatIDs;
        } DRIVER_NODE;
```

Members   lpNextDN
    Pointer to the next device driver node in a list.

    Rank
    The Rank match of this device driver 156. Ranks go from 0 to n, where 0 is the most compatible.

InfType
    Type of .INF file that is the source for the device driver 156. This will be
    either INFTYPE_TEXT or INFTYPE_EXECUTABLE

InfDate
    DOS date stamp of the .INF file.

lpszDescription
    Pointer to a the description of the device 20 being supported by this device
    driver 156.

lpszSectionName
    Pointer to the name of .INF file install section for this device driver 156.

atInfFileName
    Global ATOM containing the name of the .INF file.

224 atMfgName

Global ATOM containing the name of the manufacturer for the device driver 156.

atProviderName

Global ATOM containing the name of the provider for the device driver 156.

Flags

Flags that control functions using this DRIVER_NODE

DNF_DUPDESC

The device driver 156 has the same device description from more than one provider.

DNF_OLDDRIVER

Driver node specifies old/current device driver 156

DNF_EXCLUDEFROMLIST

If set, this device driver node will not be displayed in any device driver select dialogs.

DNF_NODRIVER

Set if no device driver 156 is to be installed dwPrivateData

Reserved lpszDrvDescription

Pointer to a device driver description.

lpszHardwareID

Pointer to a list of "Plug and Play" device IDs for the device driver 156.

lpszCompatIDs

Pointer to a list of "Plug and Play"-compatible IDs for this device driver 156.

INSTALLWIZARDDATA

DIF_INSTALLWIZARD class install parameters. This struct is used by class installers to extend the operation of the hardware installation "wizard" by adding custom pages.

```
typedef struct {
    UINT cbSize;
    LPDEVICE_INFO lpdiOriginal;
    LPDEVICE_INFO lpdiSelected;
```

225

```
            DWORD dwFlags;
            LPVOID lpConfigData;
            WORD wAnalyzeResult;
            HPROPSHEETPAGE
            hpsDynamicPages[MAX_INSTALLWIZARD_DYNAPAGES];
            WORD wNumDynaPages;
            DWORD dwDynaWizFlags;
            DWORD dwPrivateFlags;
            LPARAM lpPrivateData;
            LPSTR lpExtraRunDllParams;
            HWND hwndWizardDlg;
        } INSTALLWIZARDDATA;
```

Members   cbSize
Size of the INSTALLWIZARDDATA struct.

lpdiOriginal
Pointer to the Original DEVICE_INFO struct at the start of the manual installation.

lpdiSelected
Pointer to the current DEVICE_INFO struct that is being manually selected.

dwFlags
Flags that control the operation of the hardware installation "wizard".

lpConfigData
Pointer to configuration data for analysis to determine if the selected device
20 can be installed without resource conflicts.

wAnalyzeResult
Results of analysis to determine if the device 20 can be installed without problems. The following values are defined:

ANALYZE_FACTDEF_OK
The device 20 can be installed using its factory default settings.

ANALYZE_STDCFG_OK
The device 20 can be installed using a configuration specified in one if its basic logical configurations. The user will probably have to set jumpers

226 or switches on the hardware component to match the settings determined by the install "wizard".

ANALYZE_CONFLICT

The device 20 cannot be installed without causing a conflict with another device.

ANALYZE_NORESOURCES

The device 20 does not require any resources 14, so it can be installed witth no conflicts.

ANALYZE_ERROR

There was an error during analysis.

ANALYZE_PNP_DEV

The device 20 has a least one software-settable logical configurations, allowing it to be automatically configured. Additionally the device 20 will be enumerated by one of the standard enumerators 150, so it does not require manual installation, except to pre-copy device driver files.

hpsDynamicPages[MAX_INSTALLWIZARD_DYNAPAGES]

An array of property sheet page handles. The class installer 161b would use this array to create custom "wizard" pages, and insert their handles into this array.

wNumDynaPages

The number of pages inserted into the hpsDynamicPages array.

dwDynaWizFlags

Flags that control the behavior of the installation "wizard" when dynamic pages have been added.

DYNAWIZ_FLAG_PAGESADDED

Will be set by the install "wizard" if the class installer adds custom pages.

DYNAWIZ_FLAG_INSTALLDET_NEXT

If set, the install "wizard" will allow going forward from the detected devices page, otherwise finish will be the default option for the detected devices page.

DYNAWIZ_FLAG_INSTALLDET_PREV

If set, the install "wizard" will allow going back from the detected devices page.

227

DYNAWIZ_FLAG_ANALYZE_HANDLECONFLICT
If set, the class installer 161b will handle the case where the selected device 20 cannot be installed because of a conflict.

dwPrivateFlags
Flags that may be defined and used by the class installer 161b.

lpPrivateData
Pointer to private reference data defined and set by the class installer 161b.

lpExtraRunDllParams
Pointer to a string containing extra parameters passed to the hardware install rundll function.

hwndWizardDlg
Window handle of the install "wizard" top level window.

MOVEDEV_PARAMS
DIF_MOVEDEVICE class install parameters

```
typedef struct {
    UINT cbSize;
    LPDEVICE_INFO lpdiOldDev;
} MOVEDEV_PARAMS;
```

Members  cbSize
Size of the MOVDEV_PARAMS struct.

lpdiOldDev
Pointer to the device 20 that is being moved.

PROPCHANGE_PARAMS
DIF_PROPCHANGE class install parameters

```
typedef struct {
    UINT cbSize;
    DWORD dwStateChange;
    DWORD dwFlags;
    DWORD dwConfigID;
} PROPCHANGE_PARAMS;
```

Members  cbSize
Size of the PROPCHANGE_PARAMS struct.

228 dwStateChange

State change action. See DiChangeState for details.

dwFlags

Flags specific to the type of state change.

dwConfigID

Configuration ID for config specific changes.

See Also  DiChangeState.

REMOVEDEVICE_PARAMS

DIF_REMOVE class install parameters

```
typedef struct {
    UINT cbSize;
    DWORD dwFlags;
    DWORD dwConfigID;
} REMOVEDEVICE_PARAMS;
```

Members  cbSize

Size of the REMOVEDEVICE_PARAMS struct.

dwFlags

Flags indicating the type of removal to perform.

DI_REMOVEDEVICE_GLOBAL

The device 20 will be removed globally.

DI_REMOVEDEVICE_CONFIGSPECIFIC

The device 20 will be removed from only the specified configuration.

dwConfigID

If DI_REMOVEDEVICE_CONFIGSPECIFIC is set, then this is the configuration that the device 20 will be removed from. The value "0" means the current configuration.

SELECTDEVICE_PARAMS

DIF_SELECTDEVICE class install parameters

```
typedef struct {
    UINT cbSize;
    char szTitle[MAX_TITLE_LEN];
    char szInstructions[MAX_INSTRUCTION_LEN];
    char szListLabel[MAX_LABEL_LEN];
```

229

} SELECTDEVICE_PARAMS;

Members  cbSize

Size of the SELECTDEVICE_PARAMS struct.

szTitle[MAX_TITLE_LEN]

Buffer containing a class installer-provided title for the Select Device dialogs.

szInstructions[MAX_INSTRUCTION_LEN]

Buffer containing class installer- provided Select Device instructions.

szListLabel[MAX_LABEL_LEN]

Buffer containing a label of the Select Device list of device drivers 156.

SUBSTR_DATA

Data structure used to manage substrings. This structure is used by class installers 161b to extend the operation of the hardware installation "wizard" by adding custom pages.

```
typedef struct {
    LPSTR lpFirstSubstr;
    LPSTR lpCurSubstr;
    LPSTR lpLastSubstr;
} SUBSTR_DATA;
```

Members  lpFirstSubstr

Pointer to the first substring in the list.

lpCurSubstr

Pointer to the current substring in the list.

lpLastSubstr

Pointer to the last substring in the list.

See Also  InitSubstrData
GetFirstSubstr
GetNextSubstr

Table 15 describes the constants used to support device installation by the device manager 159.

230

Table 15: Device/Class Installer Constants

Error Values

```
typedef enum {
    ERR_DI_INVALID_DEVICE_ID,
    ERR_DI_INVALID_COMPATIBLE_DEVICE_LIST,
    ERR_DI_REG_API,
    ERR_DI_LOW_MEM,
    ERR_DI_BAD_DEV_INFO,
    ERR_DI_INVALID_CLASS_INSTALLER,
    ERR_DI_DO_DEFAULT,
    ERR_DI_USER_CANCEL,
    ERR_DI_NOFILECOPY,
    ERR_DI_BAD_CLASS_INFO,
    ERR_DI_BAD_INF,
    ERR_DI_BAD_MOVEDEV_PARAMS,
    ERR_DI_NO_INF,
    ERR_DI_BAD_PROPCHANGE_PARAMS,
    ERR_DI_BAD_SELECTDEVICE_PARAMS,
    ERR_DI_BAD_REMOVEDEVICE_PARAMS,
    ERR_DI_API_ERROR,
    ERR_DI_BAD_PATH
} _ERR_DEVICE_INSTALL;
```

Members

ERR_DI_INVALID_DEVICE_ID
Incorrectly formed device ID.

ERR_DI_INVALID_COMPATIBLE_DEVICE_LIST
Invalid compatible device list.

ERR_DI_REG_API
Error returned by one of the registry APIs.

ERR_DI_LOW_MEM
Insufficient memory to complete.

ERR_DI_BAD_DEV_INFO
A passed in DEVICE_INFO struct is invalid.

231

ERR_DI_INVALID_CLASS_INSTALLER
The class installer 161b is listed incorrectly in the registry 153, or points to an invalid class installer 161b.

ERR_DI_DO_DEFAULT
Do the default action for the requested operation.

ERR_DI_USER_CANCEL
The user cancelled the operation.

ERR_DI_NOFILECOPY
No need to copy files (in install).

ERR_DI_BAD_CLASS_INFO
A passed in CLASS_INFO struct is invalid.

ERR_DI_BAD_INF
An invalid .INF file was encountered.

ERR_DI_BAD_MOVEDEV_PARAMS
A passed in MOVEDEVICE_PARAMS struct was invalid.

ERR_DI_NO_INF
No .INF file found on supplied OEM path.

ERR_DI_BAD_PROPCHANGE_PARAMS
A passed in PROPCHANGE_PARMS struct was invalid.

ERR_DI_BAD_SELECTDEVICE_PARAMS
A passed in SELECTEDEVICE_PARAMS struct was invalid.

ERR_DI_BAD_REMOVEDEVICE_PARAMS
A passed in REMOVEDEVICE_PARAMS struct was invalid.

ERR_DI_API_ERROR
One of the device installation APIs was called incorrectly or with invalid parameters.

ERR_DI_BAD_PATH
An OEM path was specified incorrectly

Enumerators

Figure 9:
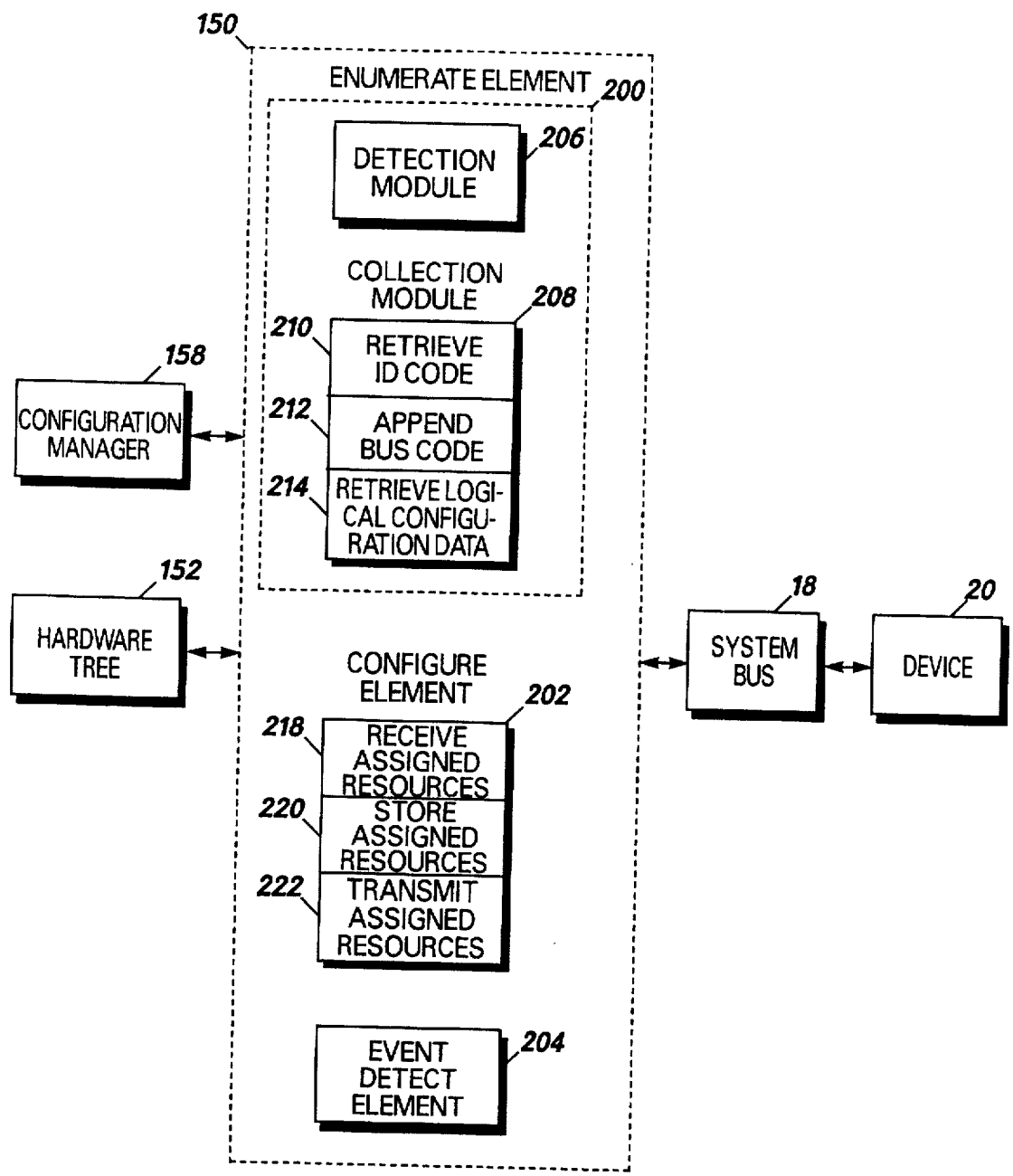
FIG. 9 is a block diagram that illustrates the elements of a component of the preferred embodiment of the present invention, specifically an enumerator.

In view of the foregoing, it will be useful to revisit the subject of the enumerators 150 and to review the structure of and the tasks conducted by the enumerators 150, as described below with respect to FIGS. 9–11. Those skilled in the art will appreciate that each standard bus architecture typically requires a unique process for configuring connected devices based upon the characteristics for the system bus. Accordingly, each enumerator 150 is assigned to a corresponding system bus 18 (or the modified BIOS program of the computer control system 21) and operates to support device configuration tasks in view of the characteristics of its assigned component. Although the operations of the enumerator 150 have been described in general terms, the actual implementation of those operations by each enumerator 150 is specific to the architecture for its assigned component. Thus, the enumerators 150 facilitate the development of an operating system that is independent of the characteristics of computer bus architectures because the enumerators 150 support the bus-specific tasks for device configuration.

Enumerator Elements

As required by the characteristics of its assigned system bus 18, each enumerator 150 can conduct up to three separate tasks, specifically enumeration, device configuration, and detection of dynamic events affecting the operating state for the computer 8. To facilitate a review of the operations by the enumerators 150, these functions are shown in FIG. 9 as separate elements, specifically an enumerate element 200, a configure element 202, and an event detect element 204. Referring to FIGS. 1, 6, and 9, the enumerator 150 communicates with its assigned component, such as the system bus 18, and the configuration manager 158 during the operations conducted by the elements 200, 202, and 204. In addition, the enumerator 150 communicates with the hardware tree 152, which is stored in the computer memory 22, to store device information and assigned resource data. As shown in FIG. 9, the enumerator 150 is assigned to one of the system busses 18.

In response to an enumerate instruction from the configuration manager 158, the enumerate element 200 begins to enumerate each of the devices 20 directly connected to its system bus 18. A detection module 206 detects a selected device on the system bus 18. For example, for the ISA bus enumerator, the detection module 206 instructs each device 20 to enter an inactive state and thereafter isolates a particular device 20 from the remaining devices on the system bus 18. A collection module 208 can thereafter obtain the device information from the detected device. In this manner, the detection module 206 and the collection module 208 operate in tandem to enable the enumerate element 200 to collect device information from each of the devices 20 on its assigned system bus.

The collection module 208 can include submodules 210, 212, and 214 to support the acquisition of device information from the devices 20. Specifically, the submodule 210 supports the retrieval of the identification code for the device 20 and the submodule 212 appends to the retrieved identification code the bus code for the assigned system bus 18, thereby forming the device identification code for that device. The submodule 214 supports the retrieval of logical configuration data to complete the acquisition of device information from the particular device 20. An additional submodule (not shown) can support the storage of the device identification code and the logical configuration data within a common device node of the hardware tree 152.

The configure element 202 responds to a data packet containing assigned resources by storing the assigned resource information within the appropriate device nodes of the hardware tree 152. The configure element 202 includes modules 218, 220, and 222 to support this communication of assigned resources between the configuration manager 158, the hardware tree 152, and, as required, the devices 20. Specifically, the module 218 receives the data packet of assigned resources 14 from the configuration manager 158. In response, the module 218 supplies the data packet containing the assigned resources to the modules 220 and 222. The module 222 can supply the assigned resources to the appropriate devices 20 whereas, in contrast, the module 220 stores the assigned resources within the appropriate device nodes of the hardware tree 152.

The event detect element 204 is responsive to the detection of a dynamic event that causes a change in the operating state of the assigned system bus 18. As described in more detail with respect to FIGS. 11A and B, the dynamic events can include connecting another device 20 to the assigned system bus 18 or removing one of the detected devices 20 from the system bus 18. The connection or removal of a device for certain system busses, such as the ISA bus and the PCMCIA bus, is represented by an interrupt signal supplied to the event detect element 204. In contrast, the event of powering the computer 8 is represented by a command signal issued by the configuration manager 158 to the event detect element 204. Accordingly, the event detection operation by the event detect element 204 represents the reception of the interrupt signal or the command signal and the resulting detection signal output in response to the reception of these signals. In response to a detection signal output by the event detect element 204, the configuration manager 158 typically initiates enumeration operations by outputting the enumeration instruction to the enumeration element 200.

The event detect element 204 also responds to commands contained in certain instruction signals from the configuration manager 158. These commands typically instruct the event detect element 204 to conduct specified query-type operations, including deletion of device information stored within a particular device node and to start or to terminate designated tasks.

Identification of Devices Connected to a System Bus

Figure 10:
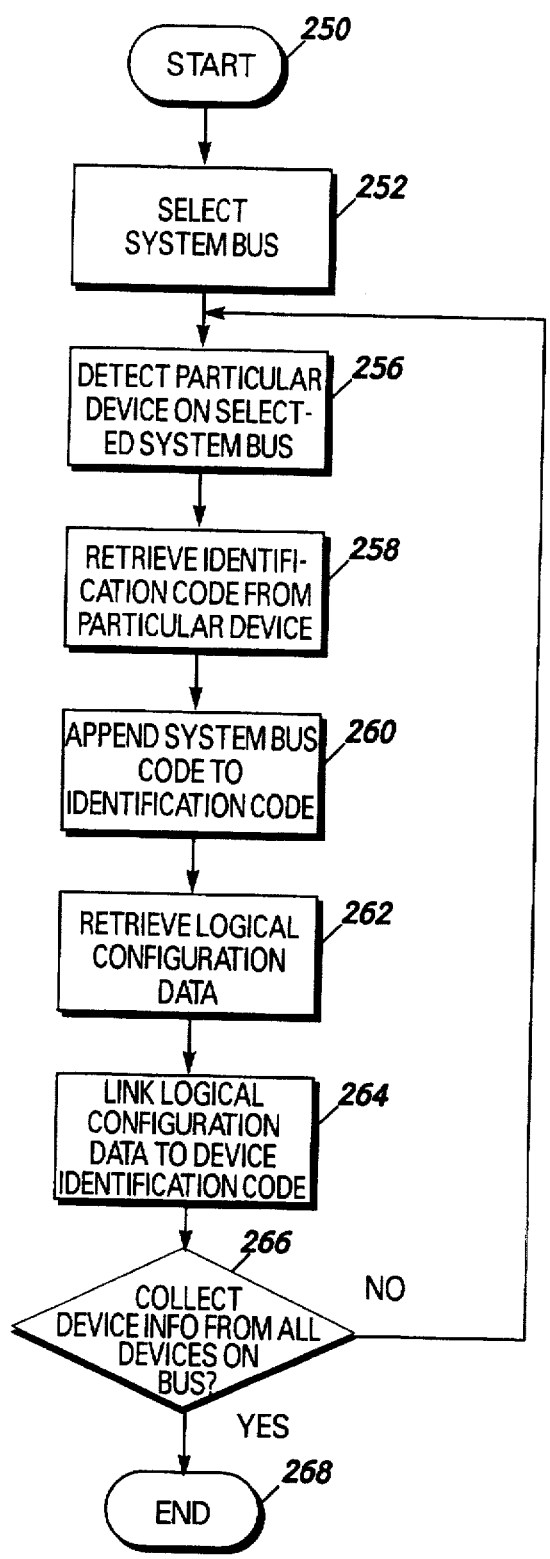
FIG. 10 is a flow chart diagram that illustrates the preferred steps for a method for enumerating devices of a computer.

FIG. 10 is a flow chart diagram illustrating the preferred steps for the enumeration process that identifies the devices on a system bus of a computer. Referring to FIGS. 6 and 10, the enumeration process starts at step 250 in response to an event that effects an asynchronous change in the operating state of the computer 8. Specifically, the enumeration process starts in response to powering the computer 8, adding a new device 20 to the computer 8, removing an existing device 20 from the computer 8 or, inserting the computer 8 into or removing the computer 8 from a docking station or expansion unit. In response to any of these events, the enumeration process starts at step 250 and proceeds to step 252 for the selection of a system bus 18. In step 256, a particular device 20 is then detected on the selected system bus 18 to enable the collection of device information.

To acquire the device information, in step 258 an identification code is retrieved from the particular device 20. In step 260, the system bus code, which is associated with the enumerator 150 assigned to the selected system bus 18, is appended to the retrieved identification code. This combination of the identification code and the system bus code forms the device identification code.

In similar fashion, the logical configuration data is retrieved from the particular device 20 during the step 262. Both resource requirement information and resource dependency information are accessed in the step 262. This completes the collection of device information from the particular device 20. To associate or link the logical configuration data with the particular device 20, the logical configuration data is added to the device identification code in the step 264. This completes the process of collecting device information for the particular device 20.

To acquire device information from the remaining devices 20, it is necessary for the enumeration process to continue. In step 266, an inquiry is conducted to determine if device information has been collected from the remaining devices 20 on the selected bus 18. If the response to this inquiry is negative, then the "NO" branch is followed to the step 256 and the collection process continues. However, if the answer is positive, then the "YES" branch is followed to the step 268 and the enumeration process for the selected system bus 18 is concluded.

For the selected system bus 18, it will be understood that the enumerator 150 assigned to this bus operates to detect each of the directly connected devices 20 and stores the collected device information within device nodes in the hardware tree 152. The enumerators 150 assigned to the remaining system busses 18 conduct similar data collection operations to complete the data entries in the hardware tree 152. In this manner, device nodes for the detected devices are constructed and stored in the hardware tree 152. As a result of this enumeration process, each device node in the hardware tree 152 contains at least (1) the combination of the system bus code and the identification code and (2) the logical configuration data for the corresponding devices.

During the enumeration process, certain information, including the device identification code and the logical configuration data, are obtained for the devices 20 of the computer 8. As previously described, the device identification code includes an identification code that uniquely identifies the associated device 20 and the logical configuration data preferably includes both resource requirement and resource dependency information. For example, for ISA-compatible devices, the identification code, also described as a serial identifier, is retrieved from the device by reading the serial data in a bit-wise manner. It will be useful to review the representative device-related information for devices compatible with the widely used ISA bus architecture. Nevertheless, it will be appreciated that the data structures for the identification code and logical configuration data associated with devices compatible with other bus architectures can be different from the data structures for ISA-compatible devices. Accordingly, the data structures for the device-related information may be defined by the corresponding bus architecture. In view of the foregoing, Table 2 shows the preferred data structure for an identification code of an ISA-compatible device.

TABLE 16

| Field Name | Length | Definition |
|---|---|---|
| Vendor ID Byte 0 | 8 bits | Bit[7] - 0<br>Bits[6:2] - First character in compressed ASCII<br>Bits[1:0] - Second character in compressed ASCII bits[4:3] |
| Vendor ID Byte 1 | 8 bits | Bits[7:5] - Second character in compressed ASCII bits[2:0]<br>Bits[4:0] - Third character in compressed ASCII |
| Vendor ID Byte 2 | 8 bits | Product Number (Vendor Assigned) |
| Vendor ID Byte 3 | 8 bits | Product Number (Vendor Assigned) |

TABLE 16-continued

| Field Name | Length | Definition |
|---|---|---|
| Serial/Unique Number Byte 0 | 8 bits | Unique device number so the system can differentiate between multiple cards of the same type in one system. Bits[07:00] |
| Serial Number Byte 1 | 8 bits | Serial Number Bits[15:08] |
| Serial Number Byte 2 | 8 bits | Serial Number Bits[23:16] |
| Serial Number Byte 3 | 8 bits | Serial Number Bits[31:24] |
| Checksum | 8 bits | Checksum of ID and serial number verifies that the information has been correctly read from the device. |

Referring to Table 16 and FIG. 1, the data structure for the identification code preferably includes three separate data fields for data representing a vendor identification number, also described as a Vendor ID, a serial number, and a checksum.

The Vendor ID comprises two 8-bit bytes containing a three character compressed ASCII identification of the vendor or manufacturer and two 8-bit bytes for a manufacturer-specific device code. The first portion of the Vendor ID identifies the vendor or manufacturer for the peripheral device or adapter board. The second portion of the Vendor ID is used by the vendor or manufacturer to identify the particular type of devise. For example, the manufacturer may develop and market a variety of peripheral devices and adapter boards. Thus, the second portion allows the manufacturer to distinguish a first device type from a second device type. Similarly, if the peripheral device or adapter board contains more than one of the devices 20, such as a parallel interface and a serial port interface, then the manufacture can use the second portion of the Vendor ID to indicate that the particular model of board contains two separate interfaces or devices. It will be appreciated that the Vendor ID serves as a unique identifier for the associated device.

The serial/unique number is a 32-bit serial number which is useful for differentiating between multiple devices 20 having the same Vendor ID when such devices are connected to the same bus system 18. For this reason, the serial number is preferably used as an instance number during the enumeration process for the ISA-compatible components. Similar to the Vendor ID field, the serial number field comprises four 8-bit length bytes. Collectively, the Vendor ID and the serial number fields supply 64 bits to permit the unique identification of the manufacturer, the board or device type, and the serial number.

The checksum field is used to insure that no conflicts have occurred while reading the identification code from the board containing the device(s) 20. A checksum verification operation is conducted when the serial data is acquired from the device 20 by the computer 8. The use of a checksum is a conventional technique for detecting data transfer errors and will not be described in detail herein.

Continuing with the representative example of the ISA-compatible device, logistical configuration data is retrieved from this device one byte at a time in a sequential fashion. The logical configuration data is preferably read in serial fashion from the device 20 almost immediately after reading the checksum field of the identification code. The data structures for the logical configuration data support both small and large information items to minimize the amount of storage needed on the ISA-compatible component. The small and large information items are distinguished by "tagged" data structures. Tables 3A–B show the preferred data structure and the information for the small information items of an ISA-compatible device.

TABLE 17A

| Offset | Field | | |
|---|---|---|---|
| | Tag Bit [7] | Tag Bits [6:3] | Tag Bits [2:0] |
| Byte 0 | Type = 0 | Small item name | Length = n bytes |
| Bytes 1 to n | | Actual information | |

TABLE 17B

| Small Item Name | Value |
|---|---|
| Version number | 0x1 |
| Logical device ID | 0x2 |
| Compatible device ID | 0x3 |
| IRQ format | 0x4 |
| DMA format | 0x5 |
| Start dependent function | 0x6 |
| End dependent function | 0x7 |
| I/O port descriptor | 0x8 |
| Fixed location I/O port descriptor | 0x9 |
| Reserved | 0xA-0XD |
| Vendor defined | 0XE |
| End tag | 0xF |

Referring to Table 17A, the data structure for the small item data has a size of 2–8 bytes. The first byte defines the type and size for most information and is followed by one or more bytes of actual information. Bit 7 of the first byte is used as the tag identifier to differentiate between a small item or a large item data type. Bits 3–6 define the small item name and bits 0–2 define the variable length of the small item data as "n" bytes. The remaining bytes within the small data type structure define the small data items for the logical configuration data.

Referring now to Table 17B and FIG. 1, the small information items are defined for the ISA-compatible devices. Specifically, the small information items can include a version number, a logical device ID, a compatible device ID, an IRQ format, a DMA format, a start dependent function, an end dependent function, an I/O port descriptor, a fixed location I/O port descriptor, a vendor-defined field, and an end tag. These data items describe the resource configuration information for the associated peripheral device or adapter board.

The version number identifies the version of the configuration specification with which the associated board or device is compatible. The version number includes a vendor-specific version number and information about optional commands supported by the device.

The logical device ID field comprises a 32-bit identifier for the associated device 20. It will be understood that certain interface boards or peripheral devices may contain more than one function, such as controlling both video and disk functions. Thus, each function is identified as a logical device 20 that is associated with separate logical configuration data. This identifier also supports the selection of a device driver for the device 20. The field also includes a bit that can be set if the device 20 should be activated by the computer control system 21 when the computer 8 is booted.

The compatible device ID field provides the identification codes of other devices with which the associated device 20 is compatible. As previously described with respect to FIG. 4, the operating system 10 uses the compatible device ID code to support the loading of a compatible device driver if the primary device driver for the associated device is not available. It will be appreciated that there can be several compatible device IDs for each logical device. The order of these device IDs within the compatible device ID field may be used as a criteria for determining which of the compatible device drivers should be searched for and loaded first.

The IRQ data field defines that the associated device uses an interrupt level and supplies a mask with certain bits set to indicate the levels implemented by the device. It will be appreciated that there are 16 possible interrupt levels for an ISA-compatible device.

The DMA data field indicates that the associated device uses a DMA channel and supplies a mask with certain bits set to indicate the channels actually implemented for the device.

The start and end dependent function fields express the interdependencies of the set of resources required by the associated device. The arbitrators 154 use the defined interdependencies to make resource allocation decisions for the logical device.

The I/O port descriptor field includes a full function descriptor for programmable ISA-compatible cards whereas, in contrast, the fixed location I/O port descriptor field supplies a minimal descriptor for existing ISA-compatible devices with fixed I/O requirements.

The Vendor defined field is an optional resource that may be defined for vendor-specific use.

The end tag identifies the conclusion of the resource data and includes a checksum covering all resource data presented after the serial identifier.

For the logical configuration data, Tables 18A–B show the preferred data structure and the information for the large information items of an ISA-compatible device.

TABLE 18A

| Offset | Field Name |
|---|---|
| Byte 0 | Value = 1xxxxxxxB (Type = 1, Large item name = xxxxxx) |
| Byte 1 | Length of data items bits [7:0] |
| Byte 2 | Length of data items bits [15:8] |
| Bytes 3 to n | Actual data items |

TABLE 18B

| Large Item Name | Value |
|---|---|
| Memory range descriptor | 0x1 |
| Identifier string (ANSI) | 0x2 |
| Identifier string (Unicode) | 0x3 |
| Vendor defined | 0x4 |
| Reserved | 0x5–0x7F |

Turning now to Table 18A, the large configuration data type structure permits larger amounts of data to be included within the configuration data. Bit 7 of the first byte is set to one to differentiate the large item information from small item information. Bytes 1 and 2 define a 16-bit length field for data items, thereby enabling up to 64 kilobytes of actual data items. Bytes 3 through n include actual large item data, including fields for a memory range descriptor, an identifier string (ANSI), an identifier string (Unicode), and Vendor-defined data, as shown in Table 4B.

Referring to Table 18B and FIG. 1, the memory range descriptor field contains additional information about the characteristics of the memory on the device 20, such as memory control parameters, decode parameters, cache support, and write status. The memory range descriptor field further finds the minimum and maximum ranges for the base memory addresses, the base alignment bits, and the memory range length.

The ANSI identifier string field defines an 8-bit ANSI data string and the Unicode identifier string field defines a Unicode data string. The Vendor-defined data field is an optional data field for vendor use.

Detection of Dynamics Events

Figures 11A, 11B:
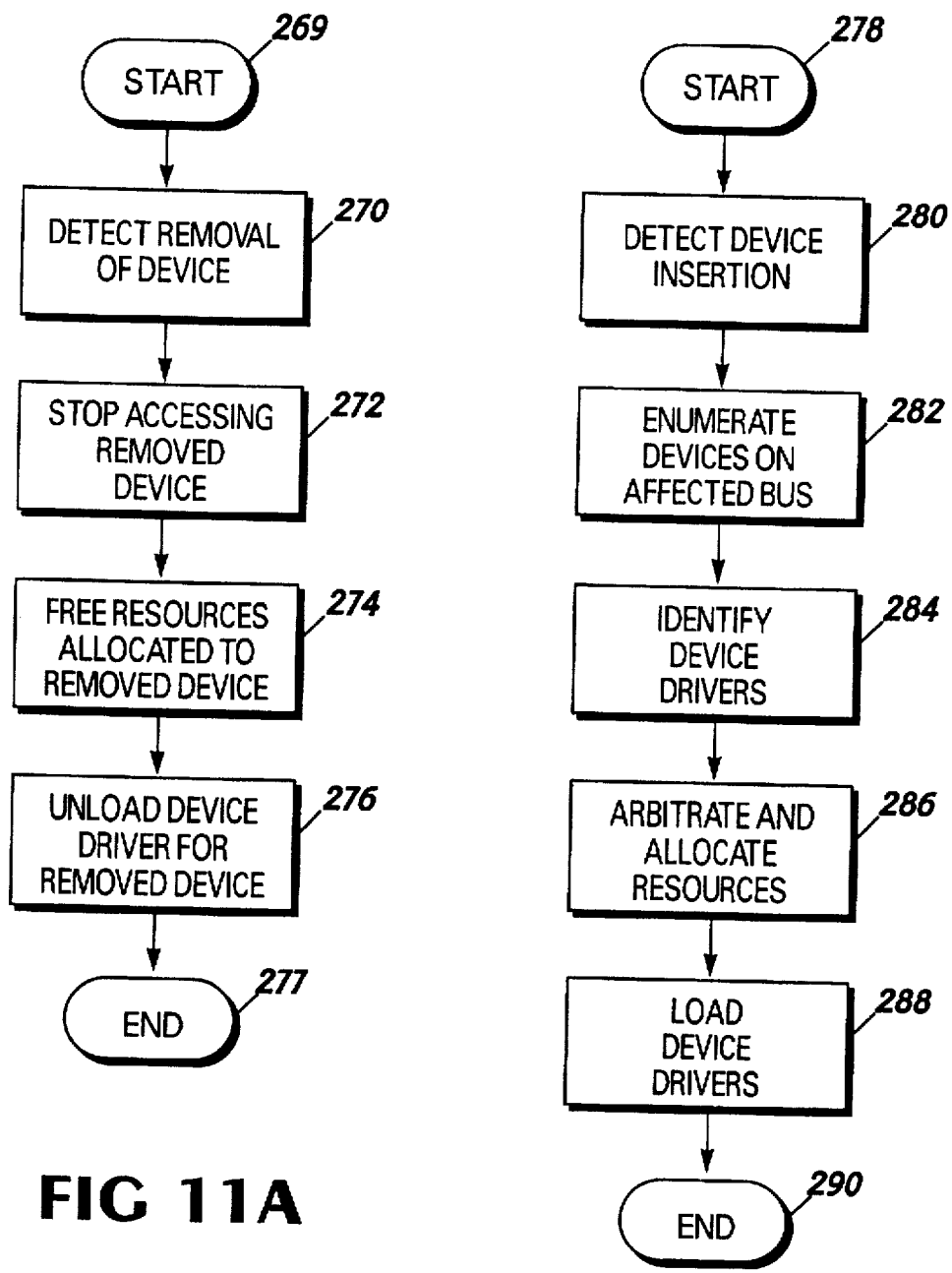
FIGS. 11A and 11B are flow chart diagrams that illustrate the preferred steps for responding to dynamic events that affect the operating state of a computer.

FIGS. 11A and 11B are logic flow charts illustrating tasks conducted by the configuration system in response to certain events affecting the operating state of a computer. FIG. 11A shows the configuration steps completed in response to the removal of an installed device from a system bus 18. In contrast, FIG. 11B shows the configuration steps taken in response to detection of the insertion of a new device on a system bus 18.

Referring now to FIGS. 6 and 11A, the process starts at step 269 in response to the enumerator 150 receiving an interrupt signal indicating the removal of one of the devices 20 on its assigned system bus 18. The enumerator 150 responds to detection of the device removal by reporting this dynamic event to the configuration manager 158 in step 270. The configuration manager 158 subsequently instructs the device driver 156 for this device in step 272 to terminate access for the removed device. In step 274, the configuration manager 158 instructs the arbitrators 154 to free the resource elements assigned to the removed device. In this manner, the resource elements previously assigned for use by the removed device become available for use by other devices 20 of the computer 8 as required by future configuration operations. In step 276, the configuration manager 158 unloads the device driver 156 corresponding to the removed device and this device driver 156 becomes available for use by other compatible devices. The process ends at step 277.

Turning now to FIGS. 6 and 11B, the process starts at step 278 and the enumerator 150 detects the connection of a new device to its assigned system bus 18 in step 280. The detection of this event is reported to the configuration manager 158 and, in response, the configuration manager 158 instructs the reporting enumerator 150 to enumerate the devices 20 on this affected system bus 18. In step 282, this enumerator 150 responds to the enumerate instruction by collecting device information from each of the devices 20 on the affected system bus 18. For the newly installed device, a device node corresponding to this device 20 is added to the hardware tree 152. In addition, if the new device represents a component which has not been previously installed with the computer 8, this new device information is stored in the registry 153.

Upon completion of the enumeration task, appropriate device drivers 156 are identified for use with the detected devices in step 284. The elements for the resources 14 are subsequently allocated in step 286 and the identified device drivers 156 are loaded in step 288. The process concludes at step 290. Thus, it will be appreciated that the above-described process enables the installation of a new device within the computer 8 without substantial intervention by the user.

In general, the enumerator 150 detects the insertion into or the removal of a device 20 from a socket or post of its assigned system bus 18 by either receiving an interrupt signal generated by the computer 8 or by polling the system bus 18 on a systematic basis to determine the connected devices 20. For the ISA, PCMCIA, and certain docking busses, the associated enumerator receives an interrupt signal that signifies a change of device connections for the affected system bus 18. In contrast, for the SCSI bus and certain infrared link bus structures, it is necessary for the enumerator 150 to poll the associated system bus to determine whether a new device has been installed or an existing device removed from the polled bus.

Referring to FIGS. 1 and 6 and Table 3, it will be understood that the present invention permits components to be loaded dynamically after the operating system 10 is running on the computer 8. An enumerator 150 can detect the addition of a device 20 to the computer 8 and then calls the configuration manger 158 to reenumerate its device node, using CONFIGMG_Reenumerate_DevNode as follows:

CM_Reenumerate_DevNode(DevNode, 0);

The function CONFIGMG_Reenumerate_DevNode causes the configuration manager 158 to call back this enumerator 150 at application time. When called back, the enumerator 150 detects the new device 20 and constructs a device identification code (for example, "PCMCIA\3C08AF\0"). For this example, the newly installed device is a network adapter card connected to the PCMCIA bus. The enumerator 150, specifically the PCMCIA bus enumerator, creates a new "child" device node in the hardware tree 152 with this device ID and then returns from the enumeration function.

The configuration manager 158 uses the device identification code to determine which key in the registry 153 to inspect. In this example, the configuration manager 158 will look in the registry 153 at the key "HARDWARE\ENUM\PCMCIA\3C08AF\0\DRV\", where it will find "DEVLOADER=NetWrap.386". If this virtual device driver is not already loaded, then the configuration manager 158 dynamically loads the NetWrap.386, which is also described as a "network wrapper".

Once this device loader becomes available, the configuration manager 158 sends a system control call to it and passes an entry for the device node in the hardware tree 152, as follows:

DirectedSysCtrl("NetWrap",PNP_NEW_DEVNODE,DEVLOADER, pdnNew)

The NetWrap.386 VxD registers as the enumerator for this device node, and then examines the registry 153 to find the appropriate NDIS driver to load. In our example, the NetWrap.386 VxD would find SYSTEM\CurrentControlSet\Services\Class\PCMCIA NdisDriver= XYZ VXD Once loaded, the XYZ.VXD driver registers as the device driver for the device node, forcing the configuration manager 158 to assign resources 14 to it. The configuration manager 158 informs the NDIS driver of the assigned configuration, thereby enabling the network adapter card.

Arbitrators

Arbitrator Elements

Figure 12:
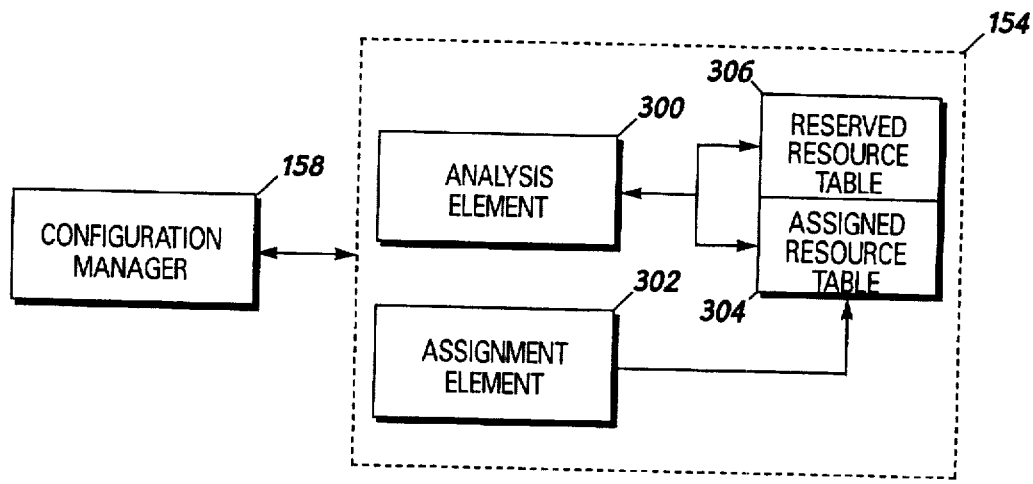
FIG. 12 is a block diagram that illustrates the elements of a component of the preferred embodiment of the present invention, specifically an arbitrator.
Figure 13:
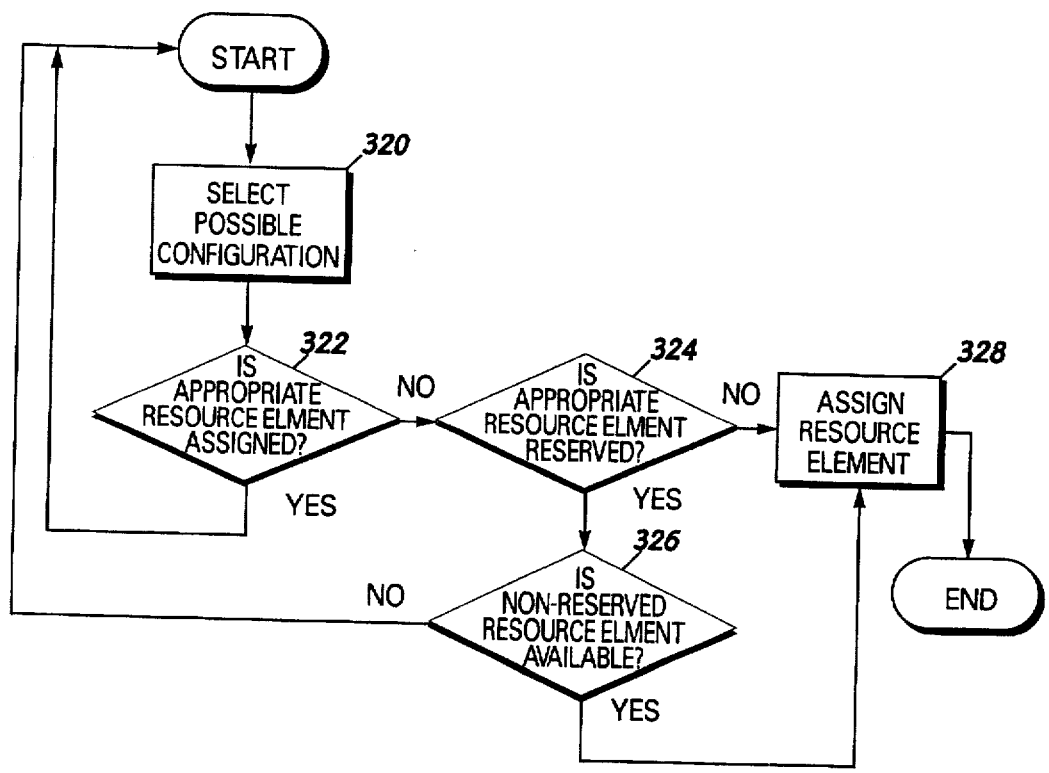
FIG. 13 is a flow chart diagram that illustrates the preferred steps for a method for assigning a resource for conflict-free use by a device of a computer.

Turning now to a more detailed review of the tasks conducted by the arbitrators 154, FIGS. 12 and 13 respectively show the elements for a selected arbitrator 154 and the preferred steps for the arbitration process. Referring now to FIGS. 6 and 12, each arbitrator 154 is responsible for one of the resources 14 of the computer 8 and communicates with the configuration manager 158 via a bi-directional communications link to assign the elements of its particular resource 14.

During device configuration, the configuration manager 158 develops a possible working configuration based upon the device information for the devices 20 connected to the computer 8. For each resource 14, this possible configuration defines resource elements that have been defined as being necessary for operating the devices 20 with the computer 8.

For some of the devices 20, this possible configuration defines specific resource elements and, for others, the configuration describes general resource requirements. For example, if the arbitrator 154 is responsible for interrupts, a possible configuration for a modem defines specific interrupt elements, namely IRQ2 and IRQ3, whereas the configuration for another peripheral device may define a more general requirement for one of the set of interrupts supplied by the interrupt resource. Because the resource requirements for many of the devices 20 are general in nature, the configuration manager 158 often can supply alternative possible configurations as required to support the resource assignment activities of the arbitrator 154. Possible configurations are device dependent because they are developed by the configuration manager 158 in response to the resource requirements and resource dependencies for the identified devices of the computer 8. Thus, it will be appreciated that these possible configurations can be ordered by priority based upon the ranges for the specified resource requirements and the specific combinations of required resource elements.

The configuration manager 158 supplies a possible configuration to the selected arbitrator 154 to initiate the allocation of resource elements for a selected device. This possible configuration can be represented as an Assigntype instruction that defines the quantity and the range of resource elements for the designated device. For example, a typical instruction for the interrupt arbitrator is Assign (single IRQ, range=1-3, 5, and 9), which directs the assignment for a single interrupt within the range of a set of possible interrupts 1-3, 5, and 9. Another representative instruction for the memory arbitrator is Assign (start=2000h, end=6000h, size=32K, alignment=1), which directs the allocation of a 32 k block of memory in the range of 2000h to 6000h.

To support the resource assignment tasks, each arbitrator 154 includes an analysis element 300 and an assignment element 302. In response to a possible configuration from the configuration manager 158, the analysis element 300 conducts an examination of the resource elements required by the designated device 20 to determine whether appropriate resource elements are available for use by that device. This analysis process is completed for each device 20 until the analysis element 300 locates appropriate resource elements for that device. However, in the event that the analysis element 300 determines that appropriate resource elements are not available for a selected device 20, then the analysis element 300 outputs an error flag to the configuration manager 158. In response, the configuration manager 158 supplies an alternative possible configuration to the analysis element 300 to support the allocation of the required resource elements for that device 20. This iterative analysis process will continue until resource elements are located by the analysis element 300 for each of the devices 20.

Upon identifying available resource elements, the arbitrator 154 supplies this resource element information to the assignment element 302. In response, the assignment element 302 assigns each resource element for use by the associated devices 20.

Each arbitrator 154 also maintains a table 304 defining assigned resource elements and a table 306 defining reserved resource elements. Upon the assignment of a resource element for a particular device 20, the assignment element 302 adds the assigned resource element as an entry to the assignment table. Thus, the assigned resource table 304 represents a list of the present resource element assignments for the installed devices 20 and each assigned resource element is matched to a corresponding device 20. These assignment entries are modified in response to the removal of an existing device or the insertion of a new device 20 for the computer 8. In addition, the assigned resource table 304 is rebuilt with new entries in response to powering the computer 8.

The reserved resource elements defined in the reserved resource table 306 represent resource elements that are reserved for assignment to certain known devices 20 that require selected resource elements. It is well known that certain devices 20 are designed to use particular elements of one or more of the resources 14. For example, a modem typically requires the use of the interrupts IRQ2 and IRQ3 and many printers are typically designed to use the interrupt IRQ7. Thus, it can be anticipated that certain devices 20 will require access to particular resource elements. Accordingly, for such known devices 20, particular resource elements are held in reserve for use if such devices are actually installed for use with the computer 8. The reserved resource table 306 contains the listing of such devices and their corresponding required resource elements. The initial entries for the reserved resource table 306 are preferably constructed and stored prior to the delivery of the operating system 10 to the end user.

The analysis element 300 preferably accesses the tables 304 and 306 during the determination of whether a particular resource element is available for use by one of the installed devices 20. This enables the analysis element 300 to determine whether a particular element of the resource 14 has been assigned or reserved for use by another device 20. For reserved elements defined in the reserved resource table 306, the analysis element 300 will generally assign those elements for use by only those devices 20 designated as rigidly requiring a specific resource element. Nevertheless, if the analysis element 300 has no other resource option, it may decide to assign a reserved element to a selected device 20 that is not designated as requiring a reserved resource.

The assigned resource table 304 can be stored within volatile memory because resource element assignments may change each time the computer 8 is powered. In contrast, the reserved resource table 306 is preferably stored within nonvolatile memory to maintain an archival list of known devices 20 requiring the use of certain resource elements.

The assignment element 302 is also responsible for removing one or more entries from the assigned resource table 304. The assignment element 302 typically deletes a resource element assignment when an installed device 20 has been removed from the computer 8. In response to a "deallocate" instruction by the configuration manager 158, the assignment element deletes the resource assignments in the assigned resource table 304 for the designated device 20. This permits those resource elements to be assigned for use by other devices 20. A representative instruction for the memory arbitrator is the command Free (start=2000h, end=2200h), which clears the assignment for the allocated memory extending between 2000h and 2200h.

The steps for the arbitration process for a selected arbitrator 154 and its associated resource 14 are shown in FIG. 13. Referring now to FIGS. 6, 12, and 13, the arbitration process is started in step 320 in response to the analysis element 300 receiving a possible configuration from the configuration manager 158. In step 322, an inquiry is conducted by the analysis element 300 to determine for a selected device 20 whether a particular appropriate resource element has been assigned for use by another device 20. The analysis element 300 checks the resource assignments stored in the assigned resource table 304 to complete this inquiry.

If the particular resource element is represented by an entry in the assigned resource table 304, then the "YES" branch is followed to the step 320 and the analysis process is initiated again based upon another possible configuration. In contrast, if the particular resource element has not been assigned, then the "NO" branch is followed from the step 322 to step 324.

In step 324, an inquiry is conducted to determine if the particular resource element has been reserved for use by another device 20. The analysis element 300 checks the reserved resource elements stored in the reserved resource table 306 to complete this inquiry. If the particular resource element is not reserved, then the "NO" branch is followed to step 328 and this element is assigned by the assignment element 302 for use by the selected device 20. This resource element assignment is stored in the assigned resource table 304 and supplied to the configuration manager 158. Upon assigning the appropriate resource element for the selected device 20, the arbitration process can then be started again for yet another device 20 based upon a new possible configuration for that device. This new possible configuration is supplied to the analysis element 300 by the configuration manager 158. However, in the event that the particular resource element has been reserved, then the "YES" branch is followed from step 324 to step 326.

The analysis process continues through step 326 by conducting an inquiry whether another appropriate resource element is available and is not reserved for use by another device 20. If so, the "YES" branch is followed from step 326 to step 328 and this element is assigned for use by the selected device 20. In contrast, if the response to this inquiry is negative, the "NO" branch is followed to the step 320 and another possible configuration is obtained from the configuration manager 158.

For the preferred configuration system, each arbitrator 154 is assigned to one of the resources 14 for the computer 8. As previously described, the resources 14 for a conventional personal computer include addresses for the memory 22, interrupts 24, DMA channels 26, and I/O ports 28. Nevertheless, it will be appreciated that the resources 14 also can represent any type of resource having a finite quantity of resource elements which can be assigned for use by multiple consumers.

For example, power consumption represents another type of resource because the power supply for a conventional personal computer is capable of supplying a finite amount of electrical power for use by the components of that computer. Thus, power consumption can be divided among multiple power consumers, specifically the active components of the computer. It will therefore be appreciated that an arbitrator 154 can be developed and used for the allocation and assignment of electrical power to the components of a computer to conserve power consumption.

Other examples of resources 14 include SCSI identification codes, device identification codes, and logical drive designations. Similar to the example for the power consumption arbitrator, it will be appreciated that the resource allocation concept of the arbitrators 154 can be extended to these type of resources.

Network System Configuration

A network system for a conventional general purpose computer is typically implemented by both hardware and software components. The hardware component is generally supplied by a peripheral device connected to a system bus of the computer. In general, the selected device is a network adapter card, commonly described as a network adapter, which is installed within the computer and connected via a wired or wireless communications link to the network system. The software component is generally supplied by an operating system adapted to supply network capabilities or by software routines supplied by the vendor of the associated network adapter. The adapted operating system can include multiple software routines, including protocols, redirectors, and servers, for implementing various network architectures. Similar to the hardware components of the computer, the network configuration routines also should be initialized and configured to support networking operations by the computer.

The network adapter, in combination with network configuration routines, operates on the computer to support the connection of the computer to a computer network. It will be appreciated that this combination of network hardware and software components enables the computer to accept a request from an application program running on the computer and to pass this request to another computer on the computer network. In turn, the remote computer can execute the request and return the results to the originating computer. Within this network environment, each computer is physically separate, runs its own operating system, and is connected to other computers of the network system via a wired or wireless communications link.

Figure 14:
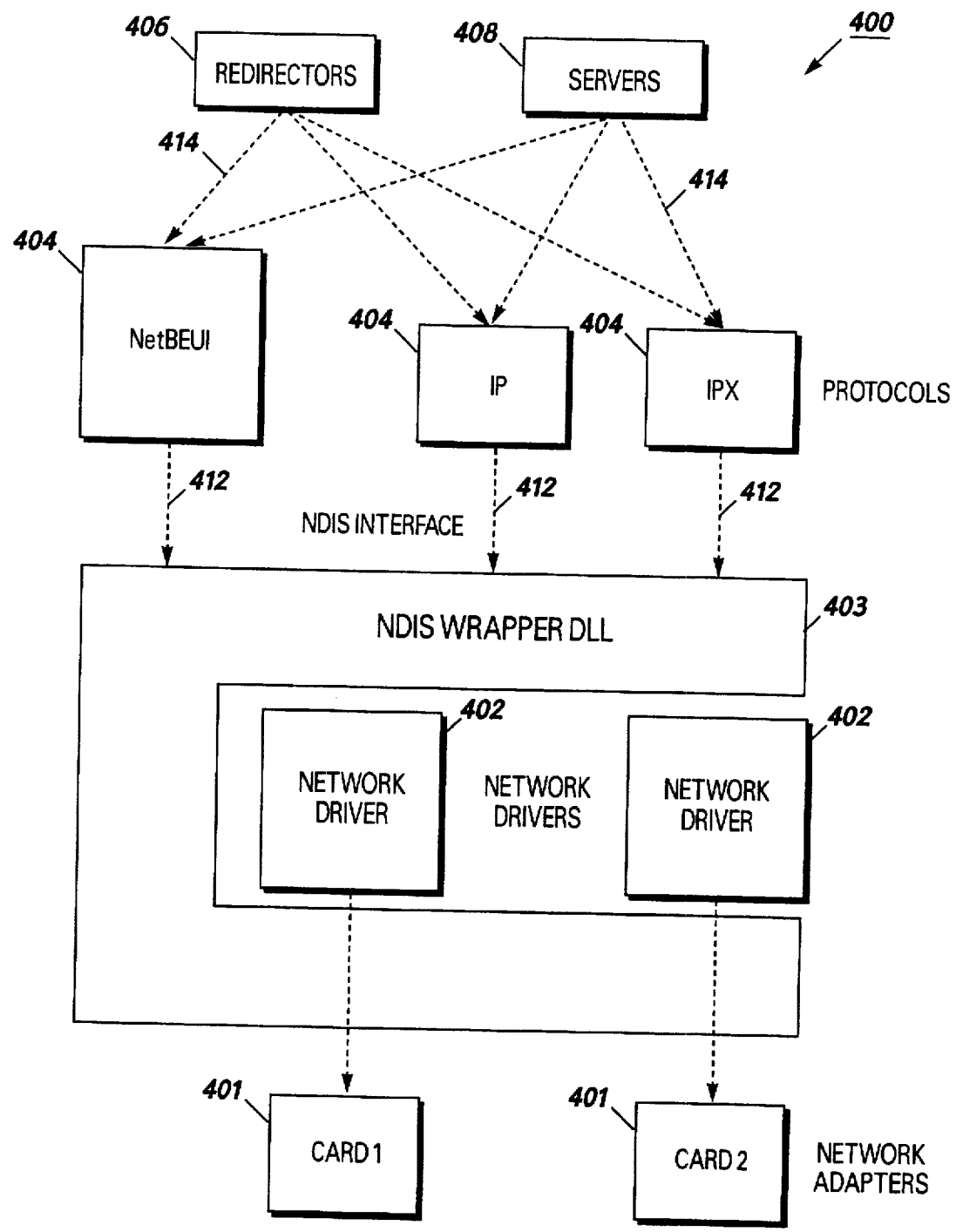
FIG. 14 is an overall block diagram of a network system in which the preferred embodiment of the present invention is operative.

FIG. 14 is a block diagram that illustrates the hardware and software components for the preferred network system. Referring now to FIGS. 1 and 14, a network system 400 operates within the computing environment of the computer 8 and includes both network hardware and software components. The network hardware component is a selected device 20, specifically a network adapter 401, which is connected to the computer 8 via one of the system busses 18. For the described embodiment, the network adapter 401 is connected to an ISA bus supplied by the integrated bus 15. Nevertheless, it will be appreciated that the network adapter card 401 can be connected to other system busses 18, including one of the interface busses 17 or 17', such as the SCSI bus or the PCMCIA bus.

For the preferred operating system 10, each network adapter 401 is associated with one or more device drivers commonly described as network drivers 402 that operate within the shell of a network driver interface 403. A selected network driver 402, in combination with the network driver interface 403, enables the network adapter card 401 to communicate with the computer 8 and the operating system 10. Each network driver 402 can communicate directly with each network adapter 401 that it services by using the network driver interface 403 to access the driver's assigned cards. In addition, each network driver 402 can communicate with network configuration routines of the preferred operating system 10, specifically the protocols 404, via the network driver interface 403 to indicate data reception or completion of an outbound data transfer. Network drivers 402 are responsible for sending and receiving data packets over their respective network connection and for managing one or more network adapter cards on behalf of the operating system 10. This allows a selected network driver 402 to start I/O operations for its assigned network adapter 401 and to receive interrupts on behalf of this card.

The network driver interface 403 supports the design and implementation of network drivers 402 that are not dependent upon embedded knowledge of the CPU 12 or the operating system 10. In other words, the network driver interface 403 includes this platform-specific information to enable the network drivers 402 to be used with more than one operating system In this manner, a single network adapter 401 and its corresponding network driver 402 is capable of communicating over multiple network configurations. For the preferred "WINDOWS" operating system, the network driver interface 403 is defined by a Network Driver Interface Specification (NDIS). Both network drivers 402 and the network driver interface 403 are generally known to those skilled in the art.

To implement one or more network configurations, the operating system 10 also includes network configuration routines, such as protocols 404, redirectors 406, and servers 408. Each of the protocols 404, the redirectors 406, and the servers 408 is implemented as one or more software routines that support selected communications services for the network system 400. A selected set of one or more protocols 404, redirectories 406, and/or servers 408 form a network architecture or configuration that is "bound" to a corresponding network adapter 401.

The protocols 404 operate to format messages for transmission via the network system 400 and communicate with (1) the network adapter 401 via the interface 412 and with (2) the redirectors 406 and the servers 408 via interfaces 414. Typical protocols 404, which are also described as transports or transport protocols, include the Net BIOS Extended User Interface (NetBEUI), Transmission Control Protocol/Internet Protocol (TCP/IP) (the "IP protocol"), Internet Packet Exchange/Sequenced Packet Exchange (IPX/SPX) (the "IPX" protocol), DECnet, AppleTalk, and Xerox Network Systems (XNS).

The redirectors 406 generally operate to direct I/O requests to remote file systems or devices and supply the facilities necessary for the computer 8 to access resources on other computers via the network system 400. For example, when an user or application program issues an I/O request destined for a remote file, directory, or machine, this request is supplied to a selected redirector 406 which, in turn, "redirects" the request to a remote server via the communications link network system 400. For the preferred operating system 10, each redirector 406 is preferably implemented as a file system driver and communicates with one or more of the protocols 404 via an interface 414. Redirectors 406 include the Service Message Block (SMB) redirector and the Netware Core Protocol (NCP) redirector, which are supplied by Microsoft Corporation for its "WINDOWS" operating system.

Each server 408 operates to accept requests from a process on another machine connected to the network system 400 rather than from a process on the computer 8. In other words, the servers 408 allow other computers or machines on the computer network to access a file or a directory on the computer 8. Similar to the redirectors 406, each server 408 communicates with one or more of the protocols 404 via an interface 414. Servers 408 include the SMB server offered by Microsoft Corporation for its "WINDOWS" operating system.

For the Open Systems Interconnections (OSI) reference model for network systems, it will be appreciated that the protocols 404 generally correspond to the data link, network, and transport layers on a client machine, the redirectors 406 correspond to the session, presentation, and application layers on the client machine, and the servers 408 correspond to the session, presentation, and application layers on the server machine.

Figure 15:
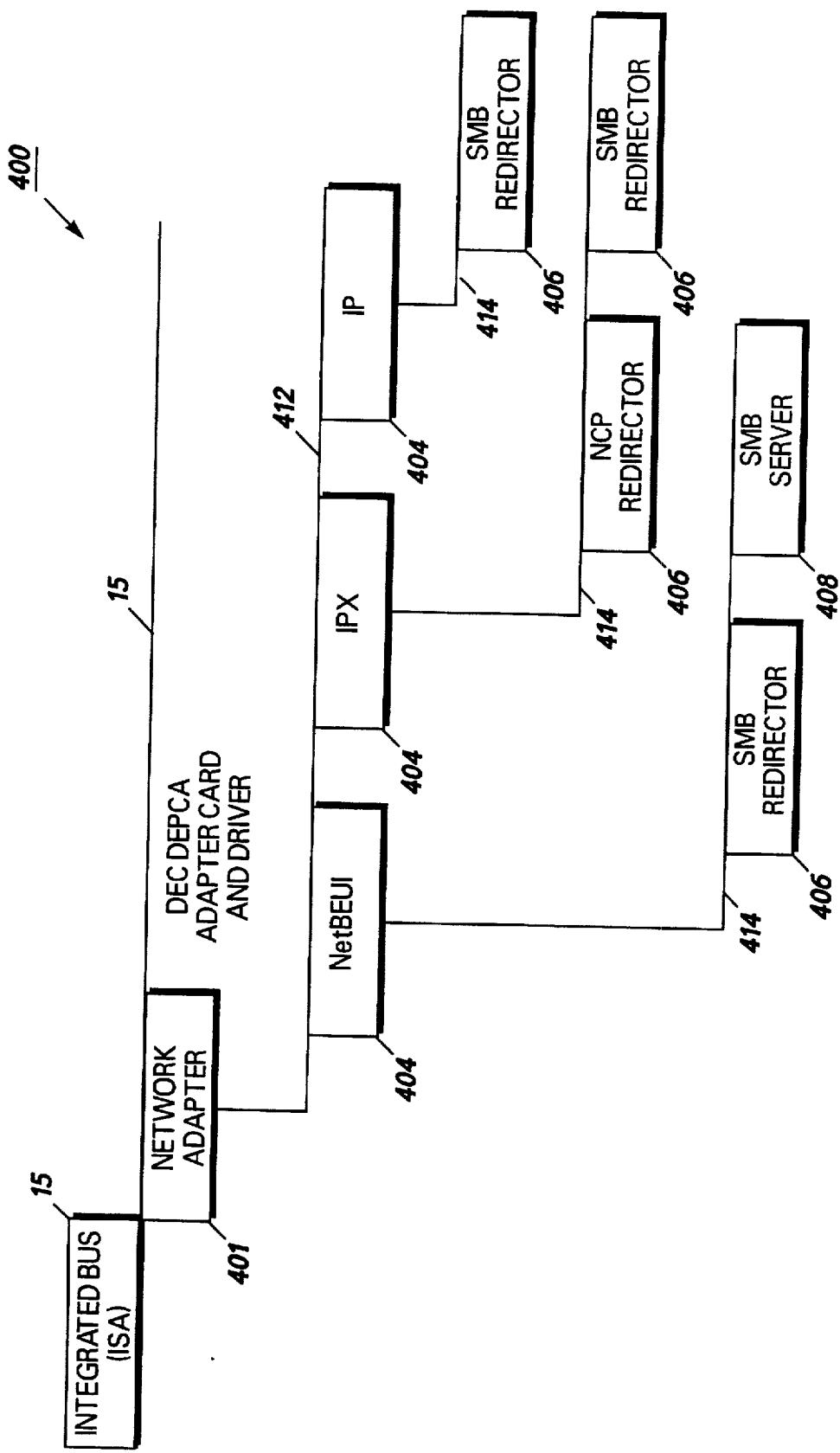
FIG. 15 is a block diagram of a hierarchical architecture for hardware and software components of a network system.

FIG. 15 is a simplified block diagram supplying a hierarchical view of certain hardware and software components of a network system. Referring now to FIGS. 1 and 15, the network adapter 401 represents a selected device 20 that is connected to one of the system busses 18, namely, the integrated bus 15. For the network architecture shown in FIG. 15, the network adapter 401 is configured for operation with three separate protocols 404, the IP, IPX, and NetBEUI protocols. The NetBEUI protocol operates in conjunction with a single redirector 406 and server 408, namely the SMB redirector and the SMB server. The IPX protocol operates with a pair of redirectors 406, specifically the SMB and NCP redirectors, and the IP protocol operates with a single redirector 406, the SMB redirector. It will be appreciated that the network architecture of FIG. 15 is merely one example of numerous possible network architectures and that the present invention is not limited to this specific example. However, the network architecture shown in FIG. 15 will be used to illustrate the novel features of the present invention.

The connection of the network adapter 401 to the integrated bus 15 forms a physical electrical connection between these hardware components. In contrast, data communications between the network adapter 401 and the protocols 404 compatible with this card are carried via a communications link implemented by one or more software routines, specifically the interface 412. Likewise, data communications between the protocols 404 and the redirectors 406 and servers 408 are conducted via software-implemented communications links, specifically the interfaces 414. To emphasize the hierarchical architecture of the network configuration routines, the communications links supplied by the interfaces 412 and 414 have been simplified in the illustration of FIG. 15 by showing a "direct" connection between the network adapter 401 and the protocols 404 and "directs" connections between the protocols 404 and the associated sets of redirectors 406 and servers 408. It will be understood that the interface 412 can include the assigned network driver 402 (FIG. 14) and the network device interface 403 (FIG. 14).

Specifically, the hierarchical architecture of the network system 400 in FIG. 15 illustrates logical connections that must be implemented for the network system 400 to operate within the computer 8 (FIG. 1). The interface 412 represents communications between the protocols 404 and a network driver 402 (FIG. 14) supporting a network adapter 401. For example, the network driver 402 can use network driver interface 403, such as NDIS 2.0 or NDIS 3.1, or an ODI interface, to communicate with the protocols 404. For the preferred embodiment, the logical connection between the network adapter 401 and the protocols 404 is implemented by a network driver 402 and the network driver interface 403 (NDIS 3.1). Each protocol 404 can communicate with a selected set of the redirectors 406 and the servers 408 via a dedicated interface 414. For the network architecture in FIG. 15, the IP, the IPX, and the NetBEUI protocols are associated with the same interface, the interface 412, for communication with the network adapter 401. In contrast, a separate interface 414 can extend between each of the protocols 404 and their respective redirectors 406 and servers 408. In particular, the protocol to redirector and/or server interfaces, i.e., the interfaces 414, vary according to the components connected by these logical connections. For example, the SMB redirector preferably uses the NetBIOS interface to communicate with the NetBEUI and IP protocols, and can communicate with the IPX protocol via the NWLink interface or the NetBIOS interface. The NCP redirector preferably uses the NWLink interface to communicate with the IPX protocol. Accordingly, it will be understood that a single interface 412 extends between a selected network adapter 401 and the protocols 404, whereas multiple interfaces 414 are used for communications between the protocols 404 and their respective set of redirectors 406 and servers 408.

To extend the "plug and play" concept from the hardware domain to the network software domain, the protocols 404, the redirectors 406, and the servers 408 can be viewed as software layers or "virtual devices" and the interfaces 412 and 414 can be viewed as "virtual busses." The protocols 404 represent a first set of layers "connected" to the network adapter 401 via the interface 412. In turn, each of the protocols 404 is "connected" via one of the interfaces 414 to a second set of layers comprising the redirectors 406 and the servers 408. For the purposes of this application, the term "layer" is used interchangeably with the term "virtual device" as a general term describing the network configuration routines of the protocols 404, redirectors 406, and servers 408. Thus, it will be understood that each of the protocols 404, the redirectors 406, and the servers 408 represent individual layers of the network system 400.

Based upon this hierarchical view of the network software components, a software configuration system analogous to the previously described device configuration system is supplied by the present invention. The device configuration system detects the presence of the devices 20 on each of the system busses 18, allocates resources to each of the detected devices, and directs the automated loading of device drivers for the detected devices. Likewise, the software configuration system can identify the virtual devices for each of the virtual busses of the network system 400 and automatically load the drivers that support the identified virtual devices.

It will be appreciated that the network configuration routines for the virtual devices or layers of the network system 400 require configuration to support their proper operation with a selected network adapter 401. Automation of the configuration process supplies the advantage of removing the user from these configuration tasks. In general, this configuration process includes identifying the appropriate protocols 404, redirectors 406, and servers 408 for use with the selected network adapter 401 and, in turn, loading these software routines. The loading process can be viewed as a two-step process of loading the drivers for these routines within the memory 22 (FIG. 1) and thereafter configuring the drivers by supplying configuration parameters.

Referring now to FIGS. 6, 14, and 15, the configuration system for the network system 400 is based upon the assignment of an enumerator to each of the system busses 18 and to the interfaces 412 and 414. However, in contrast to the system busses 18, the same network enumerator is assigned to both the interface 412 and the interface 414. Specifically, the network driver interface 403 preferably operates as an enumerator and is responsible for the identification of each of the network configuration routines associated with these interfaces.

In response to a command from the configuration manager 158, the network driver interface 403 operates as an enumerator for the interface 412 and identifies each of the protocols 404 on that interface. This identification process is conducted by locating in the registry 153 information that defines the protocols 404 for use with the network adapter 401. To maintain a current record of installed network configuration routines, the identities of the defined protocols are thereafter stored within device nodes of the hardware tree 152. In response to the identification of the protocols 404, software drivers are loaded by the network driver interface 403 and configured to enable the operation of these layers within the network system 400. In turn, the network driver interface 403 operates as an enumerator for each of the interfaces 414 and locates within the registry 153 information that defines the identities of the corresponding redirectors 406 and servers 408. The identities of the detected redirectors 406 and servers 408 for the interfaces 414 are then stored within the hardware tree 152. In turn, drivers for the identified redirectors 406 and servers 408 are loaded and configured based upon entries stored within the registry 153.

Although the entries within the registry 153 for the network configuration routines will be described in more detail below with respect to FIG. 17, it will be appreciated that these entries are based upon a priori knowledge about the appropriate network software configurations for selected network adapters. In other words, these registry entries can be created and stored prior to starting the configuration of the network system 400. The network setup/control panel program, also referred to as the Net Setup routine, is responsible for creating and maintaining the information stored within the registry 153. In particular, the Net Setup routine supplies the capability for the user to create and modify the registry entries for network configurations.

For the preferred embodiment, upon powering the computer 8, the devices 20, including each network adapter 401, are detected and allocated resource elements. The device drivers 156 are then loaded for the detected devices. In response to loading a particular type of device driver, specifically one of the network drivers 402, the network software configuration process is initiated by the configuration manager 158 issuing an enumerate command to the enumerator for the interface 412, the network driver interface 403. Accordingly, the installation of a network adapter card as one of the devices 20 within the computer 8 serves as the catalyst for configuring the network software routines at boot time. Likewise, the network software configuration process can be initiated as a result of the insertion of a network adapter card 401 when the computer is powered or upon the docking of the computer to its docking station.

In addition, it will be appreciated that the network adapter 401 can be removed during operation of the computer 8, thereby affecting the configuration of the network system 400. For example, a network adapter 401 compatible with the PCMCIA bus is designed for easy insertion and removal by the user. The removal of this type of network adapter card supplies no advance warning of card removal to the operating system 10. Instead, the connection between the network adapter 401 and the PCMCIA bus is broken and the configuration manager 158 thereafter receives an interrupt indicating a change in status for that bus slot. For this "surprise style" card removal, the network driver 402 for this network adapter 401 is preferably unloaded by the operating system 10 if there are no other network adapter cards of this model in use by the computer 8. In addition, the protocols 404, redirectors 406, and servers 408 configured for operation with this network adapter 401 can receive failure codes or error messages whenever these software components attempt to access the removed adapter. In addition, the user interface for the preferred operating system 10 can supply a text-based message or audible warning upon detection of this surprise style card removal.

In contrast, for a docking-type computer, the user typically can warn the operating system 10 about an impending change in the status of the network adapter 401 prior to the removal of the computer from its docking station. Accordingly, this type of computer 8 can be released from the docking station upon the acquiescence of this event by all networking software components. This type of removal is described as a "VCR style" removal. In response to notice of an impending undocking operation, each network software component can close remote files, flush any caches, and close connections prior to the release of the computer from the docking station. Each of the protocols 404, redirectors 406, and servers 408 represented by device nodes in the hardware tree 152 receives this notice. After each network software component responds to this notice, these network software components and the network driver 402 can be unloaded.

Figure 16:
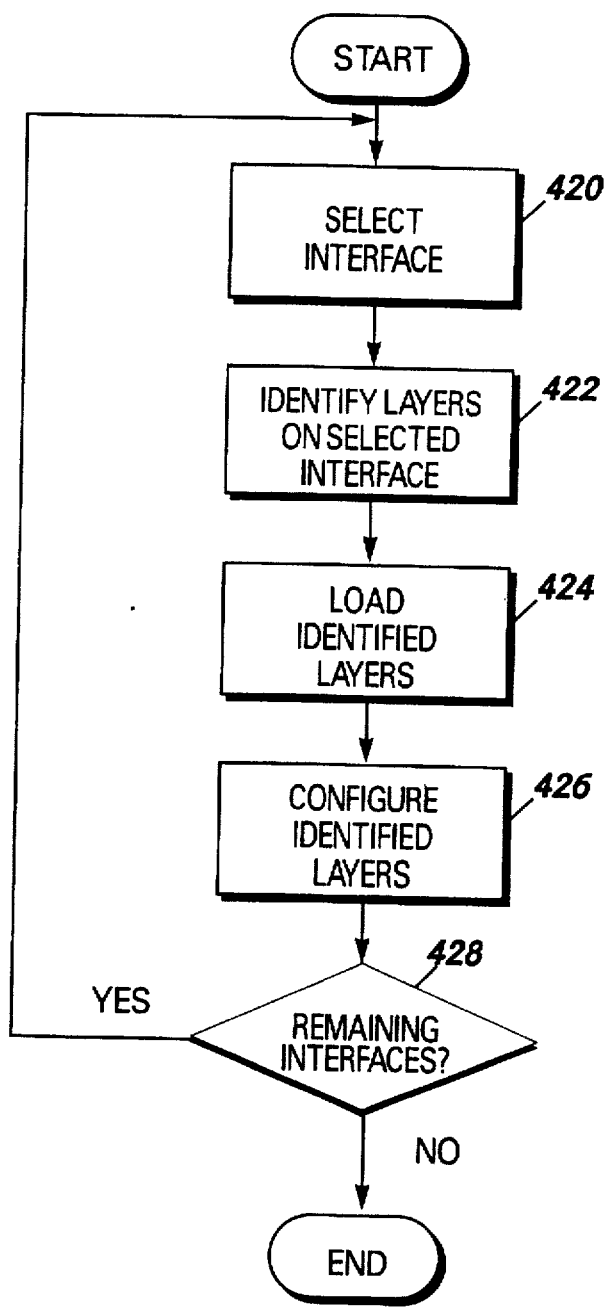
FIG. 16 is a flow chart diagram that illustrates the steps of a method for configuring the network adapter of a computer.

In view of the foregoing, it will be useful to review the steps of the network configuration process. FIG. 16 is a logical flow diagram that illustrates the steps for a process of configuring the network software components of a network system. Referring now to FIGS. 6, 15, and 16, the process is initiated at the START step and proceeds to step 420 to select an interface for a selected network adapter 401 configured for operation with the computer 8. For the preferred embodiment, this network adapter card has received an allocation of the appropriate resources 14 and a device driver, namely a network driver 402, has been loaded to support communications between the card and the computer 8. For the initial pass through the steps of this iterative process, the interface 412 between the network adapter 401 and the protocols 404 is selected.

In step 422, the layers for the interface 412 are identified based upon information stored within the registry 153. Entries within the registry 153 define various configurations of the protocols 404, the redirectors 406, and the servers 408 that are compatible with the selected network adapter 401. These entries will be described in more detail below with respect to FIG. 17. For this initial pass, the protocols 404 associated with the interface 412 are identified based upon the registry entry for the network adapter 401.

In response to the identification of the layers, in step 424, the drivers for these identified layers are loaded within the memory 22. To complete the loading of the identified layers, configuration parameters stored in the registry 153 are supplied to the loaded drivers in step 426. In this manner, the identified layers are loaded to support the operations of the selected network adapter 401 in the network system 400. Entries within the registry 153 identify the driver for the identified layers and define the configuration parameters for these drivers. Configuration parameters are assigned based upon the corresponding drivers. For this initial pass, the drivers for the protocols 404 are loaded in step 424 and the configuration parameters for these drivers are supplied in step 426.

In step 428, an inquiry is conducted to determine whether the configuration for the selected network adapter 401 includes additional interfaces. If so, the "YES" branch is followed to step 420 and another interface is selected. Because each of the protocols 404 uses a separate interface 414 to communicate with the upper layers of the redirectors 406 and the servers 408, this loop will be repeated until all of the interfaces 414 are selected and the associated upper layers are identified, loaded, and configured. In contrast, if the response in step 428 is negative, the "NO" branch is followed from step 428 to the END step and the process is terminated. This network configuration process will be described in more detail below with respect to FIG. 19.

Although the process has been described with respect to the network architecture of FIGS. 14 and 15, it will be appreciated that this process can be extended for configuring other network architectures. Specifically, the present invention is not limited to the illustrated example of protocols 404, redirectors 406, servers 408, or interfaces 412 and 414. Accordingly, it will be appreciated that the present invention is also applicable to a network configuration including a variety of network configuration routines and their associated software implemented communications links.

However, regardless of the network configuration, the same enumerator, i.e., the network driver interface 403, is preferably used to enumerate all interfaces.

Figure 17:
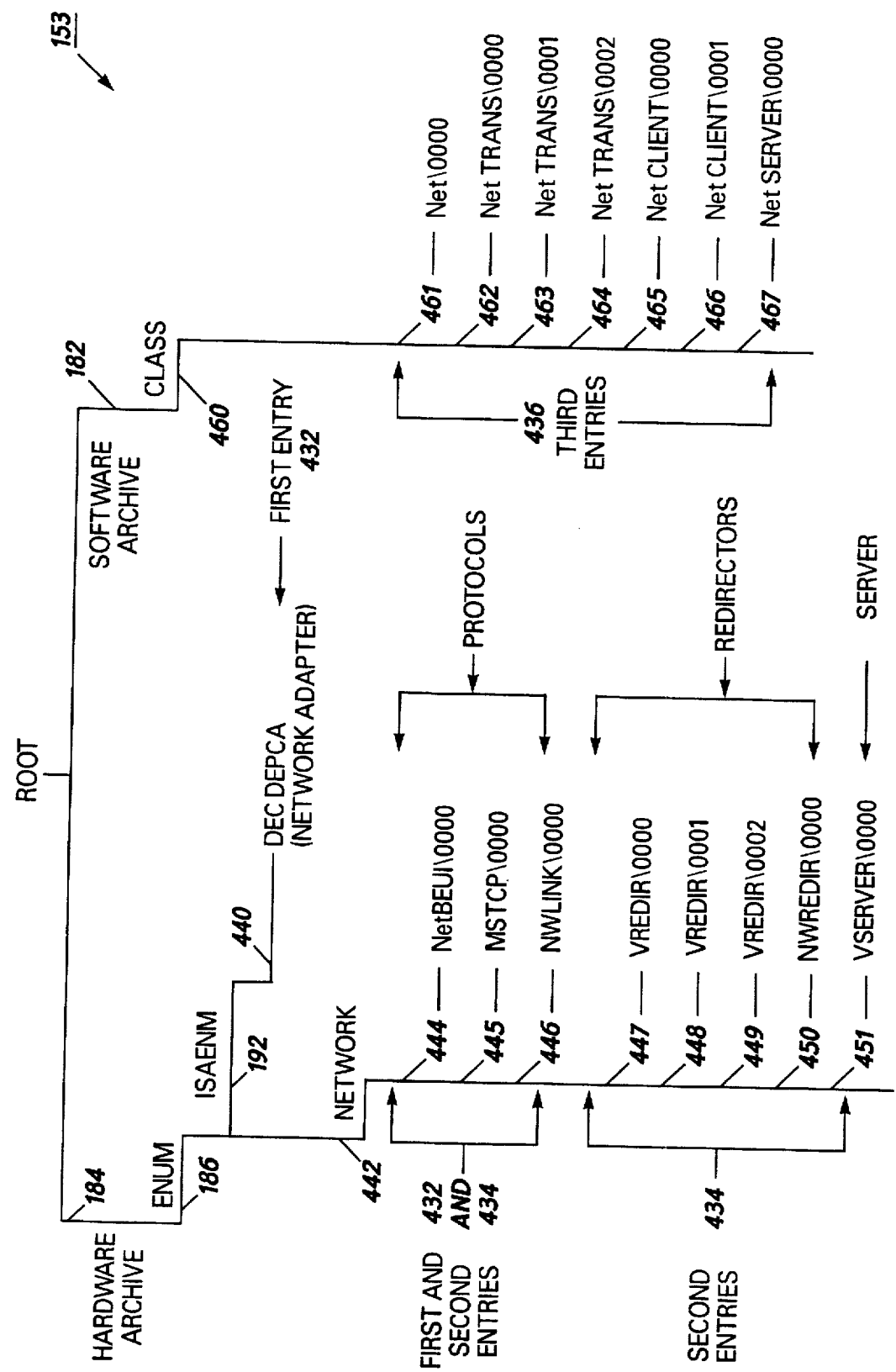
FIG. 17 is a diagram that illustrates entries stored within a registry for the network architecture shown in FIG. 15.

FIG. 17 is a diagram that supplies a high level view of the network system-related entries stored within the archival memory of the registry 153 for the network configuration shown in FIG. 15. Referring now to FIGS. 6, 15, and 17, the registry 153 contains entries that define network configurations of the software components for various types or models of network adapters 401. To support configuration operations for the network configuration routines, the registry 153 preferably contains three types of entries, first and second entries 432 and 434 stored under the hardware archive 184, and a third entry 436 stored within the software archive 182. Although the registry 153 shown in FIG. 17 contains only network-related entries, it will be understood that the registry 153 also includes entries for other hardware and software components that have been or are presently installed for operation with the computer 8. In addition, although FIG. 17 supplies a representative example of registry entries for a network system, it will be understood that the present invention is not limited to this described example and can support numerous network configurations.

The first entry 432 is directed to one of the interfaces 412 and 414 of the network system 400 and is identified by an interface identification code that is uniquely associated with the corresponding interface. The interface identification code comprises (1) an interface name which uniquely identifies the interface and (2) an instance number. For the interface 412, the first entry 432 is identified by an interface identification code having an interface name that identifies a selected network adapter 401 and an instance number useful for distinguishing between multiple cards of the same model for this network adapter. Preferably, this interface identification code for the interface 412 is identical to the identification code assigned to the selected network adapter 401. As previously described, the identification code for a device 20 can represent the manufacturer's identity, the model of the corresponding device, and the instance number.

If the network system 400 includes more than one interface 414, then each of these interfaces has a corresponding first entry 432 within the registry 153. For each interface 414, the first entry 432 includes (1) an interface identification code having an interface name that identifies one of the protocols 404 which is compatible with the selected network adapter 401 and (2) an instance number to distinguish between multiple versions of this protocol.

In addition, the first entry 432 can include at least one layer identification code that defines the identity of a corresponding layer. The layer identification code comprises (1) a layer name that uniquely identifies the corresponding layer and (2) an instance number. For the interface 412, the layer identification code can include a layer name which identifies one of the protocols 404 that is compatible with the network adapter 401. In contrast, for the interface 414, the first entry 432 can include a layer identification code having a layer name identifying one of the redirectors 406 or the servers 408 required for the network configuration. Each layer identification code in a first entry 432 can be used as a key to locate a corresponding second entry 434 in the registry 153.

In view of the foregoing, it will be appreciated that the interface 412 is associated with a network adapter 401, whereas each interface 414 is associated with a corresponding protocol 404. In addition, each protocol 404 can operate as a software layer of the network system 400. Thus, a protocol 404 can operate both as a virtual bus and as a virtual device. Specifically, the protocol 404 operates as a virtual device connected to a network adapter 401 via the interface 412 and, in addition, operates as a virtual bus providing a connection for one or more redirectors 406 and servers 408 via an interface 414.

Each of the second entries 434 is directed to one of the layers of the network system 400 and is identified by the layer identification code corresponding to its associated layer. Accordingly, each of the protocols 404, redirectors 406, and servers 408 is assigned a unique layer identification code. Each second entry 434 also can include a driver identification code that defines a driver for the associated layer. The driver identification code comprises a driver name that uniquely identifies the corresponding driver and an instance number to distinguish between multiple drivers of the same model or type. This driver identification code within a second entry 434 serves as a pointer to one of the third entries 436, which are located within the software archive 182.

Each third entry 436 is identified by a corresponding driver identification code. A portion of each third entry 436 typically contains configuration parameters for the driver of the associated layer. For example, the driver for the IP protocol can include a configuration parameter for the IP Address, while the driver for the IPX protocol has a configuration parameter for the FrameType. These configuration parameters are dependent upon the corresponding drivers.

In view of the foregoing, it will be understood that the hardware archive 184 of the registry 153 includes additional tree-like device branches for each network adapter 401 that has been installed for past or present operations of the computer 8. Each device branch for a network adapter card extends from one of the enumerator branches connected to the ENUM branch 186 within the hardware archive 184. The hardware archive 184 also can include a NETWORK branch 442, which extends from the ENUM branch 186. This branch represents the enumerator 150 assigned to the interfaces 412 and 414, namely the network device interface 403. The NETWORK branch 442 can include layer branches representing layer-related information for the network configuration routines.

For the network architecture shown in FIG. 15, the registry 153 includes a device branch 440 representing the detected network adapter 401 (DEC DEPCA) and extending from the ISAENM enumerator branch 192. The device branch 440 represents a first entry 432 and indicates that a selected network adapter 401 has operated in the past or is presently installed on the ISA bus of the computer 8. It will be understood that the registry 153 can include additional device branches representing other network adapter cards installed for operation on the ISA bus or on one of the remaining system busses 18. Table 19 supplies an example of the registry entry for the network adapter 401, specifically the DEC DEPCA network adapter card.

TABLE 19

```
*PNP80E7
 0000
  DeviceDesc = DEC DEPCA
  Class = Net
  Driver = Net 0000
  Bindings
   NETBEUI 0000 =
   MSTCP 0000 =
   NWLINK 0000 =
```

Referring to Table 19, which represents the network adapterrelated information stored under the device branch 440 of the registry 153, the network adapter 401 is identified by the identification code *PNP80E7\0000," wherein "*PNP80E7" represents the name of the device and the appended "\0000" is the instance number for this device. Thus, this registry entry represents the first instance of the DEC DEPCA card for the computer 8. The registry entry for the network adapter 401 includes at least four data fields or values, including "DeviceDesc," "Class," "Driver," and "Bindings." The first three data fields generally describe operating characteristics for the selected device 20, in this case the network adapter 401, by identifying the model name (DEC DEPCA), the primary operating function (Net, i.e., Network), and Driver (Net\0000). In addition, the registry entry includes the Bindings subkey which identifies the protocols 404 that are bound to this card and support its network configuration. For this example, the protocols 404 include the NetBEU protocol (NETBEUI\0000), the IP protocol (MSTCP\0000), and the IPX protocol (NWLINK\0000). Each entry below the Bindings subkey represents a layer identification code for one of the protocols 404 associated with the identified network adapter card. Thus, the network configuration for this card includes the protocols 404 identified by the layer identification codes of the Bindings subkey.

Layer branches 444–451, which extend from the NETWORK branch 442, are examples of typical layer branches and represent the protocols 404, redirectors 406, and servers 408 that support possible configurations of the network system 400. For the network configuration in FIG. 15, the registry 153 includes at least eight layer branches, specifically the layer branches 444, 445, and 446 for protocols 404, layer branches 447, 448, 449, and 450 for redirectors 406, and layer branch 451 for a server 408. The layer branches 444, 445, and 446 represent both first entries 432 and second entries 434 because protocols 404 can implement both virtual devices and virtual busses. In contrast, the layer branches 447, 448, 449, 450, and 451 represent second entries 434.

The layer branches 444, 445, and 446 respectively contain information about the NetBEUI, IP, and IPX protocols. For each of the protocols 404, the information supplied by its corresponding layer branch generally (1) describes the identified protocol, (2) identifies the driver for this protocol, and (3) defines the specific redirectors 406 and servers 408 required to complete the network configuration. Tables 20–22 supply examples of the registry entries for the NetBEUI, IP, and IPX protocols.

TABLE 20

```
NETBEUI
 0000
  DeviceDesc = Microsoft NetBEUI
  CompatibleIDs = NETBEUI
  Class = NetTrans
  Driver = NetTrans 0000
  ConfigFlags = 00 00 00 00
  Bindings
   VREDIR 0000
   VSERVER 0000
```

TABLE 21

```
MSTCP
 0000
  DeviceDesc = Microsoft TCP/IP
  CompatibleIDs = MSTCP
  Class = NetTrans
  Driver = NetTrans 0001
  ConfigFlags = 00 00 00 00
  Bindings
   VREDIR 0001
```

TABLE 22

```
NWLINK
  0000
    DeviceDesc = Microsoft IPX/SPX-compatible
    CompatibleIDs = NWLINK
    Class = NetTrans
    Driver = NetTrans 0002
    ConfigFlags = 00 00 00 00
    Bindings
      NWREDIR 0000
      VREDIR 0002
```

Reviewing the registry entry for a protocol 404 (NetBEUI protocol) shown in Table 20, the interface identification code, as well as the layer identification code, for the NetBEUI protocol is "NETBEUI\0000," wherein the layer name is "NETBEUI" and the instance number is "0000." This entry represents the first instance of the NetBEUI protocol within the registry 153. The data field "DeviceDesc" describes the type of device and, in this case, defines the layer as a Microsoft NetBEUI protocol. The "CompatibleIDs" data field identifies the compatible identification code as "NETBEUI." The "Class" data field indicates that the NetBEUI protocol is classified as a protocol 404, specifically a "NetTrans"-type layer. The driver for this instance of the NetBEUI protocol is defined by the "Driver" data field and is identified by the driver identification code "NetTrans\0000." The configuration flags in the "ConfigFlags" data field are set to zero. The configuration flags are indicators for the present operating state of the device. For example, the configuration flags can be set to designate the following states: (1) the device is present and running; (2) the device is present but not to be used; or (3) the device was once configured, but is now removed from the computer. The "Bindings" subkey can supply one or more additional layer identification codes to identify the redirectors 406 and the servers 408 required to complete the network configuration. In this example, the SMB redirector is identified by the layer identification code "VREDIR\0000" and the SMB server is identified by the layer identification code "VSERVER\0000."

The data structure for the registry entries shown in Tables 21 and 22 are similar to the data structure of the NetBEUI protocol in Table 20.

The layer branches 447, 448 and 449, which are respectively identified by the layer identification codes "VREDIR\0000", "VREDIR\0001," and "VREDIR\0002" contain information about three instances in the registry 153 of the SMB redirector. The layer branch 450, which is identified by the layer identification code "NWREDIR\0000," contains information about the NCP redirector. This stored information generally describes each identified redirector and identifies the driver for this network configuration routine. Tables 23 and 24 supply examples of registry entries for the SMB and NCP redirectors.

TABLE 23

```
VREDIR
  0000
    DeviceDesc = Microsoft SMB Redirector
    CompatibleIDs = VREDIR
    Class = NetClient
    Driver = NetClient 0000
    ConfigFlags = 00 00 00 00
    Bindings
```

TABLE 24

```
NWREDIR
  0000
    DeviceDesc = Microsoft NCP Redirector
    CompatibleIDs = NWREDIR
    Class = NetClient
    Driver = NetClient 0001
    ConfigFlags = 00 00 00 00
    Bindings
```

Reviewing the registry entry for a redirector 406 (SMB redirector) in Table 23, the interface identification code for the SMB redirector is "VREDIR\0000," wherein the layer name is "VREDIR" and the instance number is "\0000." This entry represents the first instance of the SMB redirector within the registry 153. The data field "DeviceDesc" defines the layer as a Microsoft SMB redirector. The "Compatible IDs" data field identifies the compatible identification code as "VREDIR." The "Class" data field indicates that the SMB redirector is classified as a redirector 406, specifically a "NetClient"-layer. The driver for the SMB redirector is defined by the "Driver" data field and is identified by the driver identification code "NetClient\0000." The configuration flags in the "ConfigFlags" data field are set to zero. The "Bindings" subkey does not list additional layers that are associated with this instance of the SMB redirector.

The data structure for the registry entry shown in Table 24 is similar to the data structure of the SMB redirector in Table 23.

The layer branch 451 identified by the layer identification code "VSERVER\0000" contains information about the SMB server in the registry 153. This branch contains information that generally describes the identified server and defines the driver for this network configuration routine. Table 25 supplies an example of a registry entry for a SMB server.

TABLE 25

```
VSERVER
  0000
    DeviceDesc = Microsoft SMB Server
    CompatibleIDs = VSERVER
    Class = NetServer
    Driver = NetServer 0000
    ConfigFlags = 00 00 00 00
    Bindings
```

As shown in Table 25, the data fields for the registry entry for a server 408 are similar to the data fields for registry entries associated with redirectors 406 (Tables 23 and 24). In view of the foregoing, Table 25 represents a registry entry containing information about the first instance of a SMB server. The driver for this server is identified by the driver identification code "NetServer\0000." Similar to the registry entries for the redirectors, the Bindings subkey for this entry does not define additional layers connected to this server. This is in contrast to the registry entries for protocols 404, which typically list one or more layer identification codes below the Bindings subkey to identify associated layers.

Focusing now on the software archive 182 in FIG. 17, a CLASS branch 460, specifically the "SYSTEM\CurrentControlSet\Services\Class" branch, which represents the classes of device drivers and drivers for the operating system 10, extends from the software archive 182. The CLASS branch 460 also can include driver branches representing driver-related information for the network configuration routines. As previously described, the driver identification codes supplied by the device branches extending from the NETWORK branch 442 operate as pointers to associated driver branches on the CLASS branch 460. Each of the driver branches extending from the CLASS branch 460 represent third entries 436 for the registry 153.

For the network architecture shown in FIG. 15, the registry 153 includes a driver branch 461, which represents the driver for the network adapter 401 identified by the device branch 440 of the hardware archive 184. The driver branch 461 is identified by the device identification code "Net\0000" and contains configuration parameters for a network driver 402. It will be understood that the registry 153 can include additional driver branches representing device drivers for other network adapter cards on the ISA bus or on one of the remaining system busses 18. Table 26 supplies an example of the registry entry for the network driver 402 that supports a selected network adapter 401, i.e., the DEC DEPCA card for the network configuration of FIG. 15.

TABLE 26

```
SYSTEM CurrentControlSet Services Class
Net
    = Network Adapter
    Installer = netdi.dll
    Icon = 0
    0000
        DeviceDesc = DEC DEPCA
        DevLoader = ndis.386
        DeviceVxDs = declan.386
        MaxMulticast = 8
        MaxTransmits = 16
        AdapterName = DEPCA
        NDIS
            LogDriverName = LANCE
            MajorNdisVersion = 03
            MinorNdisVersion = 0A
            NDIS2
                DriverName = DEPAS
                FileName = depca.dos
            ODI
                DriverName = DEPCAODI
                FileName = depcaodi.com
```

Referring to the Table 26, a registry entry is shown for the network driver 402 that supports the DEC DEPCA network adapter card. The driver identification code for the driver is "Net\0000," the driver name is "Net" and the instance number is "0000." This entry represents the first instance of a driver for a particular network adapter 401, namely, the DEC DEPCA network adapter card. The data field "Installer" defines the routine that is to be used when installing or removing this device from the computer. The "Icon" data field defines an index of an icon that represents the device on a display screen. The data field "DeviceDesc" indicates that the driver is intended for primary use with the DEC DEPCA network adapter card. The "DevLoader" data field defines the device loader for this driver, specifically the network driver interface 403, which is also described as the "ndis.386" device loader. The "Device VxDs" data field describes the actual file name(s) of the driver for this device. The "MaxMulticast" data field defines the number of multicast addresses that will be maintained for the device. The "MaxTransmits" data field defines the maximum number of simultaneous transmissions that can be attempted by the device. The "AdapterName" field defines a label for the device and is used internally within the NDIS interface.

The NDIS subkey within the registry entry of Table 26 provides information that is specific to configuring different variants for the device driver of this device, specifically the network adapter card 401. These variants include the NDIS 3.1 and NDIS 2.0 interfaces and the ODI interface. The data field "LogDriverName" defines a label for use internally by the NDIS interface to identify the driver the for the network adapter card. The "MajorNdisVersion" and the "MinorNdisVersion" data fields in combination define the supported NDIS interface level. ("03" and "0A" define the level 3.1). The NDIS2 subkey provides specific information for configuring the NDIS 2.0 device driver. Likewise, the ODI subkey provides specific information for configuring the ODI device driver. The "DriverName" data field defines a label that is used internally by the corresponding interface to indicate the device driver. The "FileName" data field defines the actual file name(s) of the corresponding device driver.

Driver branches 462–467, which extend from the CLASS branch 460 of the software entries 182, are examples of typical driver branches and represent drivers for the protocols 404, redirectors 406, and servers 408 that support possible configurations of the network system 400. For the network configuration in FIG. 15, the registry 153 includes at least six driver branches, specifically the driver branches 462, 463, and 464 for protocols 404, driver branches 465 and 466 for redirectors 406, and driver branch 467 for server 408. Each of these driver branches 462–467 represent third entries of the registry 153.

The driver branches 462, 463, and 464 respectively contain information about the drivers for the NetBEUI, IP, and IPX protocols represented by the device branches 444, 445, and 446. For example, for the device branch 444, the registry entry for the NetBEUI protocol (Table 6) includes a "Driver" data field containing the device identification code "NetTrans\0000," which serves as a pointer to the driver branch 462 identified by that driver identification code. Tables 27, 28, and 29 supply examples of the registry entries for the drivers for the NetBEUI, IP, and IPX protocols.

TABLE 27

```
NetTrans
    = Network Transport
    Installer = netdi.dll
    Icon = 1
    0000
        DeviceDesc = Microsoft NetBEUI
        DevLoader = ndis.386
        DeviceVxDs = netbeui.386
        NDIS
            LogDriverName = NETBEUI
            MajorNdisVersion = 03
            MinorNdisVersion = 0a
            NDIS2
                DriverName = NETBEUI
                FileName = *netbeui
```

TABLE 28

```
NetTrans 0001
    DeviceDesc = Microsoft TCP/IP
    DevLoader = ndis.386
    DeviceVxDs = vtdi.386, vip.386, vtcp.386, vnbt.386
    IP Address = 101.2.0.2
    NDIS
        LogDriverName = MSTCP
        MajorNdisVersion = 03
        MinorNdisVersion = 0a
```

TABLE 29

```
NetTrans 0002
    DeviceDesc = Microsoft IPX/SPX-compatible
    DevLoader = ndis.386
    DeviceVxDs = nwlink.386
    NetAddress = 11111111
    FrameType = 0
    NDIS
        LogDriverName = NWLINK
        MajorNdisVersion = 03
        MinorNdisVersion = 0a
    NDIS2
        DriverName = nwlink$
        FileName = nwlink
```

Reviewing the registry entry shown in Table 27, the driver identification code for the driver for the NetBEUI protocol is "NetTrans\0000," wherein the driver name is "NetTrans" and the instance number is "0000." This entry represents the first instance of a driver for the NetBEUI protocol. The data field "Installer" defines the routine for installing or removing the device. The "Icon" data field defines the index of an icon for representing the device on a screen display. The data field "DeviceDesc" indicates that the driver is intended for primary use with the Microsoft NetBEUI protocol. The "DevLoader" data field defines the device loader for this driver, the ndis.386 device loader. The data field "DeviceVxDs" defines the actual file name(s) of the driver for this device. The NDIS subkey provides information that is specific to configuring different variants of the device driver. The "LogDriverName" data field defines a label used internally by the NDIS interface to identify the driver for the associated layer, i.e., the NetBEUI protocol. The "MajorNDISVersion" and "MinorNDISVersion" data fields in combination define the level of supported NDIS interface. ("03" and "0A" define level 3.1). The NDIS 2 subkey provides specific information for the driver of the NDIS 2.0 interface. The "DriverName" data field defines a label that is used internally within the NDIS 2 interface to define the device driver. The "FileName" data field defines the actual file name(s) of the device driver for the NDIS 2.0 interface.

The data structures for the registry entries shown in Tables 28 and 29 are generally similar to the data structure of the driver for the NetBEUI protocol in Table 27. However, the registry entry in Table 28 for the data structure of the driver for the IP protocol includes the configuration parameter IP Address. In addition, the registry entry in Table 29 for the data structure of the driver for the IPX protocol includes configuration parameters for "NetAddress" and "NameType" data fields.

The driver branches 465 and 466, which are respectively identified by the driver identification codes "NetClient\0000" and "NetClient\0001," respectively contain information about drivers for the SMB redirector and the NCP redirector. Tables 30 and 31 supply examples of the registry entries for these drivers.

TABLE 30

```
NetClient
    = Network Client
    Installer = netdi.dll
    Icon = 2
    0000
        DeviceDesc = Microsoft SMB Redir
        DevLoader = ndis.386
        DeviceVxDs = vredir.386
```

TABLE 31

```
NetClient 0001
    DeviceDesc = Microsoft NCP Redir
    DevLoader = ndis.386
    DeviceVxDs = nwredir.386
```

The driver branch 467, which is identified by the driver identification code "NetServer\0000" contains information about the driver for a server 408, the SMB server. Table 32 supplies an example of a registry entry for the driver for this server.

TABLE 32

```
NetServer
    = Network Server
    Installer = netdi.dll
    Icon = 3
    0000
        DeviceDesc = Microsoft SMB Server
        DevLoader = ndis.386
        DeviceVxDs = vserver.386
```

Tables 19–32 illustrate examples of network system-related information stored within the registry 153 for the network configuration shown in FIG. 15. In view of these representative entries, it will be recognized that the first entries 432 support the identification of layers for the associated interface, the second entries 434 define the driver for the identified layer, and the third entries 436 include configuration parameters for the identified driver. Accordingly, each of these entries contains information relevant to the tasks of identifying and loading layers for each interface of the network system 400. Nevertheless, it will be understood that the present invention is not limited to the examples of the registry entries shown in Tables 19–32, nor is the present invention limited to the network architecture shown in FIG. 15.

Still referring to FIGS. 6, 15, and 17, a one-to-one correspondence between the device branches 444–451 and driver branches 461–467 is not available because at least one of the network drivers 402 represented by a registry entry in the software archive 182 is useful for supporting two or more of the network configuration routines represented by the registry entries stored within the hardware archive 184. Those skilled in the art will recognize that a device driver can be used to support both a primary device and compatible devices. For the example of the network configuration in FIG. 15, the driver for the "SMB redirector," which is represented by the driver branch 465, is useful for supporting the SMB redirectors represented by the device branches 447, 448, and 449.

For the preferred operating system 10, the registry 153 includes first, second and third entries 432, 434, and 436 to support the installation of a default network configuration for a network adapter 401 installed within the computer 8. A "default" network configuration includes the NetBEUI protocol associated with the SMB redirector and the IPX protocol associated with both the NCP and SMB redirectors. Accordingly, the registry 153 typically will contain certain entries for network configuration routines that are defined and stored prior to the shipment of the operating system 10 to the purchasing public.

The creation of the first, second, and third entries 432, 434, and 436 can be triggered either by automatic device detection at installation, boot, dock/undock, or PCMCIA card insertion/removal time, or at any time when the user explicitly uses the network control panel to create these registry entries. To add network configuration routine-related entries to the registry 153, a "Net Setup" routine (not shown) of the operating system 10 can access a .INF file corresponding to the selected network adapter 401. The .INF file, which is preferably stored within nonvolatile memory of the computer 8, is identified by the interface identification code assigned a selected network adapter card 401 and contains information describing this card, including the network configuration routines. The Net Setup routine can transfer this information to the archival memory of the registry 153 to add the new registry entries.

As previously described, the hardware tree 152 contains a set of device nodes that represent the present configuration of the devices 20 operating with the computer 8. For the devices 20, each device node represents one of the devices presently installed for operation with the computer 8 and contains device attributes, including device identity, resource usage requirements, and resource assignments. In addition, the hardware tree 152 supplies a hierarchical representation of the identities for the present network configuration routines operating with the computer 8. However, unlike the device nodes for the devices 20, such as the network adapter 401, each device node for a network configuration routine contains a single attribute, specifically the identity of the corresponding network configuration routine. This identity information is obtained from the registry 153 by the network driver interface 403, which operates as an enumerator 150 during the enumeration process and is used to populate the device nodes for each network configuration routine. Thus, it will be appreciated that the device nodes associated with network configuration routines include the layer identification codes for the corresponding routines.

Figures 18A, 18B:
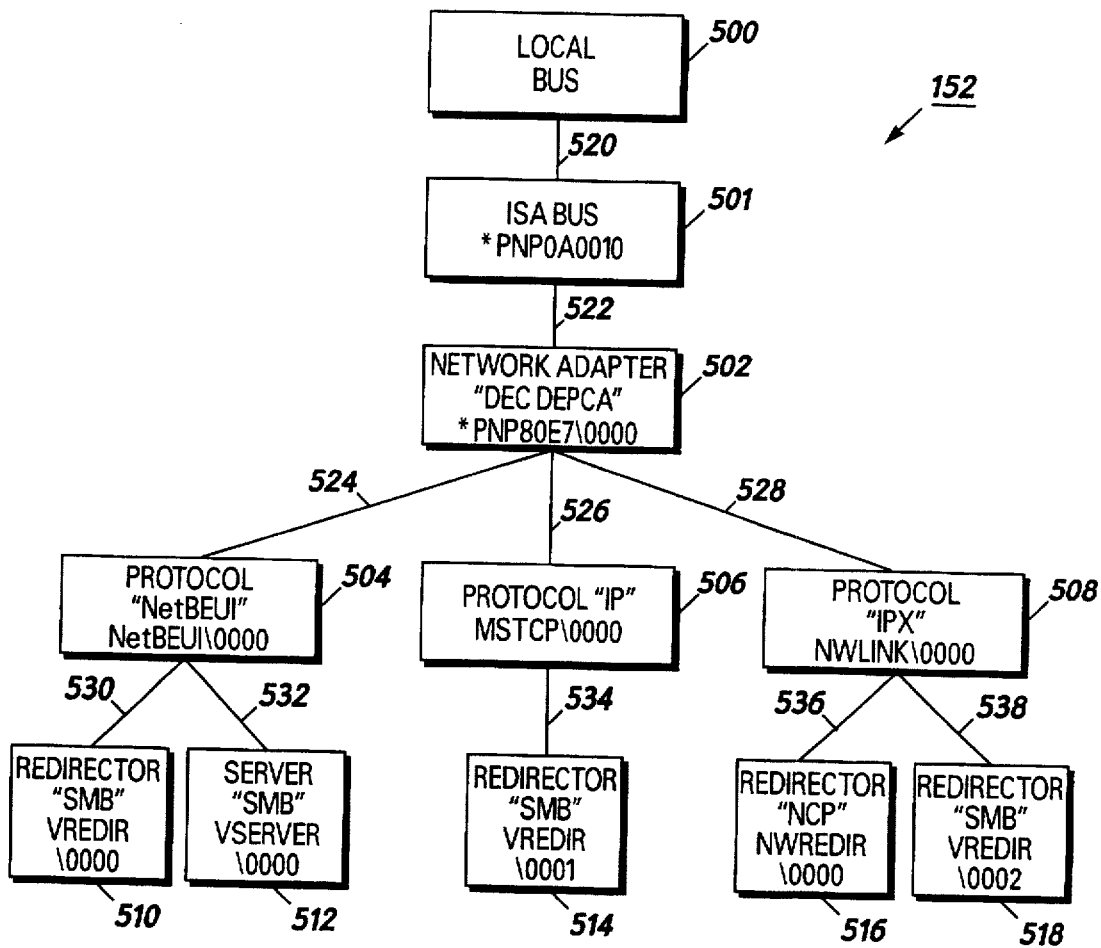
FIGS. 18A and 18B are diagrams that illustrate device nodes of a hardware tree for the network architecture shown in FIG. 15.

Referring now to FIGS. 6 and 15 and to FIG. 18A, which illustrates the tree-like data structure of the hardware tree 152 for the network configuration shown in FIG. 15, the hardware tree 152 contains a set of device nodes, including a device node 500 for the local bus, a device node 501 for the ISA bus, and a device node 502 for the network adapter 401. These device nodes represent certain hardware components of the computer 8. For the network configuration routines of the network adapter 401, the hardware tree 152 includes device nodes representing the protocols 404, redirectors 406, and servers 408 of the network system 400. In particular, for the network architecture of FIG. 15, device nodes 504, 506, and 508 respectively represent the NetBEUI, IP, and IPX protocols. The device nodes 510 and 512 respectively represent a SMB redirector and SMB server, device node 514 represents a SMB redirector and device nodes 516 and 518 respectively represent a NCP redirector and a SMB redirector.

A branch between any pair of the device nodes of the hardware tree 152 indicates that the connected device nodes share a common link. For example, upon entering the hardware tree 152, the device node 501 for the ISA bus can be reached only by first passing through the local bus device node 500 and a branch 520. This defines an interconnection between those system busses 18 (FIG. 1), thereby supplying an indication that the ISA bus is connected to the local bus. Likewise, the network adapter 401 is connected to the ISA bus because a branch 522 extends from the ISA bus device node 501 to the device node 502. In similar fashion, the branches 524, 526, and 528 represent the interface 412 supplying a communications link between the protocols 404 and the network adapter 401. In addition, branches 530, 532, 534, 536, and 538 represent individual interfaces 414 connecting the protocols 404 to their respective redirectors 406 and servers 408.

To emphasize the construction of the hardware tree 152 for a computer having an installed network adapter card, the hardware tree 152 shown in FIG. 18A represents the network configuration in FIG. 15 and does not include device nodes for the remaining system busses 18 and devices 20 of the computing system 8. Nevertheless, it will be understood that the hardware tree 152 for the computing system 8 typically can include device nodes for both hardware and software components.

FIG. 18B illustrates the data structure for a representative device node for a network configuration routine, in this case, the device node 504 for the NetBEUI protocol. Referring to FIGS. 18A and 18B, the device node 504 preferably includes the layer identification code for the NetBEUI protocol, specifically "NetBEUI\0000." A review of this layer identification code indicates that the NetBEUI protocol is assigned a name "NetBEUI" and is the first identified protocol of its type for the network adapter 401, as evidenced by the instance number "0000."

Figure 19A:
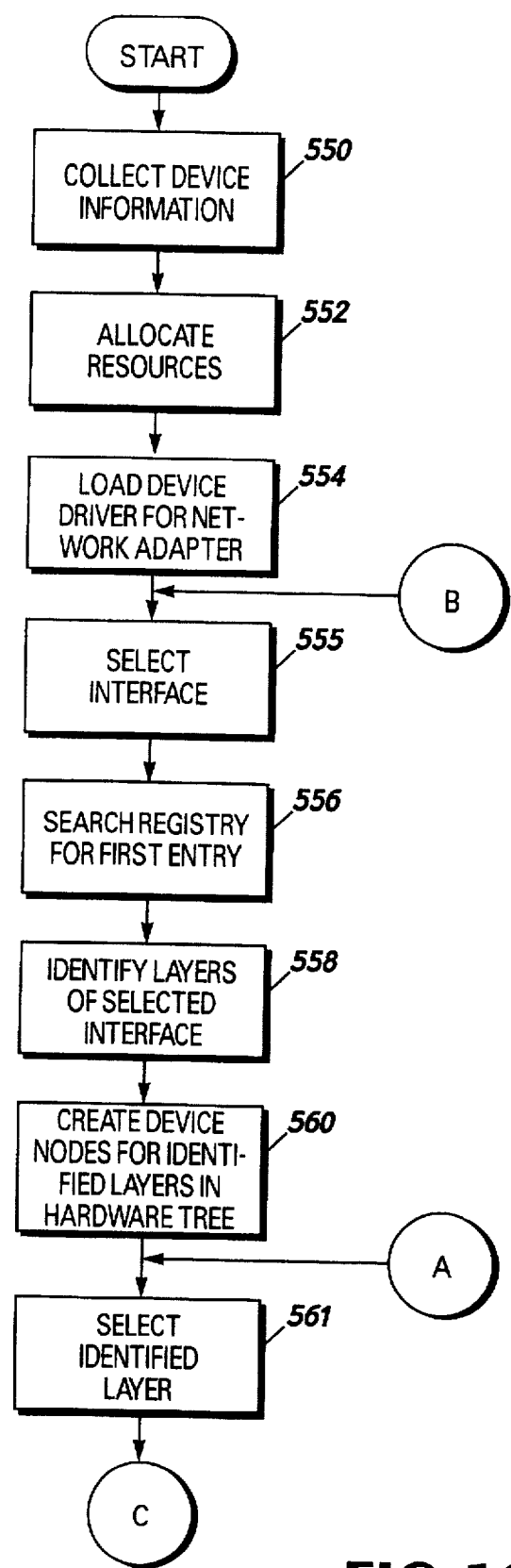
FIGS. 19A and 19B are flow chart diagrams that illustrate the preferred steps of a method for configuring a network adapter of a computer.
Figure 19B:
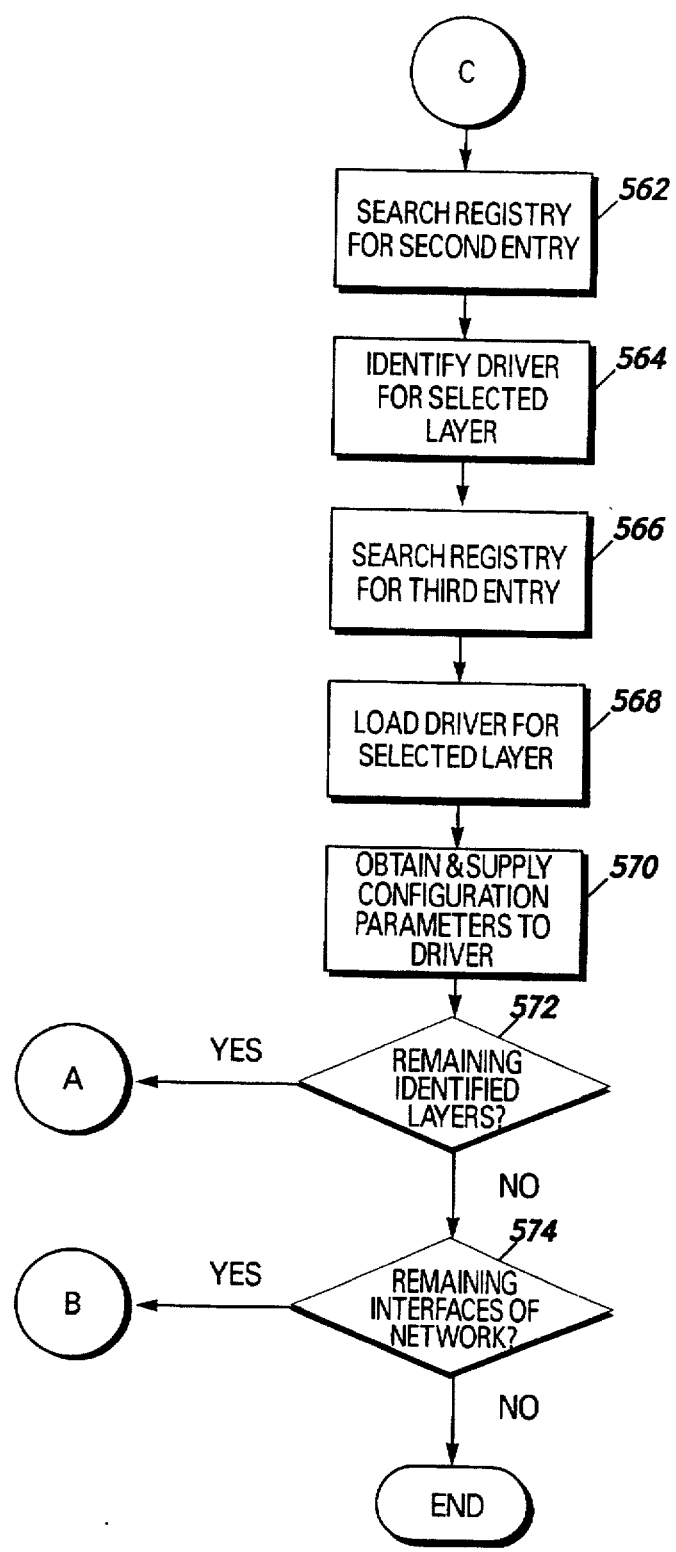

FIGS. 19A and 19B are flow chart diagrams that illustrate in detail the preferred steps for a method for configuring the network configuration routines for a network adapter card operating with a computer. This configuration method will be described by applying the steps illustrated in FIGS. 19A and 19B to the network configuration shown in FIG. 15. Although this application serves to illustrate the iterative nature of the configuration process, it will be understood that the present invention is not limited to operation with this specific network configuration and is useful for numerous other network configurations.

Referring now to FIGS. 6, 14, 15, 17, and 19A and 19B, the network software configuration process is initiated at the START step and proceeds to step 550, in which device information is collected from each of the devices 20 on the system busses 18, including the network adapter 401 on the integrated bus 15. A device node is then created in the hardware tree 152 for each of the detected devices, including the network adapter 401. In turn, based upon the collected device information, resource elements of the resources 14 are allocated in step 552 to each of the detected devices. In step 554, the device drivers 156 are loaded for the detected devices to enable these configured devices to operate with the computer 8.

For the network adapter 401, the selected device driver 156 is one of the network drivers 402 that is compatible with the detected network adapter 401. The network driver is identified by searching the hardware archive 184 of the registry 153 for an entry having the identification code for the particular network adapter 401. For the network adapter 401 shown in FIG. 15 and described in Table 19, the DEC DEPCA card has the identification code "*PNP80E7\0000." This registry entry identifies the corresponding device driver for the network adapter card, the network driver 402 ("Net\0000"). In turn, the configuration manager 158 calls the network driver interface 403, which operates as a device loader or "DevLoader." The network driver interface 403 responds by calling a VxDynaloader (not shown) to load identified network driver 402 into memory 22 (FIG. 1). The loaded network driver 402 subsequently calls the network driver interface 403 to obtain driver configuration parameters. The network driver interface 403 responds to this call by locating the driver configuration parameters in the software archive 182 under the network driver entry ("Net\0000") for the detected network adapter 401 (Table 26). The network driver 402 calls for each desired configuration parameter by name and, in turn, the network driver interface 403 reads the configuration parameter from the registry entry and returns the values to the network driver 402. To insure that the network driver interface 403 receives all configuration messages on behalf of the loaded network driver 402, the network driver interface 403 registers with the configuration manager 158 by sending a system message "CONFIG Register Driver."

Proceeding now to step 555, one of the interfaces 412 or 414 of the network system 400 is selected. For this initial pass, the interface 412 associated with the network adapter 401 is selected and responds to the loading and configuration of the network driver 402 that supports this device. For the DEC DEPCA card of FIG. 15, the interface identification code is identical to the identification code for this device, specifically "*PNP80E7\0000."

In step 556, the layers for the selected interface are identified by using the corresponding interface identification code as a key to search the hardware archive 184 of the registry 153 for an associated first entry 432. This search is supported by the network driver interface 403, which operates as an enumerator in response to a call from the configuration manager 158 to enumerate the "virtual devices" or layers connected to a particular "virtual bus" or interface. For this initial pass through the steps of the configuration process, the network driver interface 403 is instructed to enumerate the layers oil the interface of the network adapter 401, i.e., the interface 412. The network driver interface 403 uses the interface identification code for the network adapter 401 (*PNP80E7\0000) as a key to locate the registry entry for the network adapter card (Table 19).

In step 558, the layers associated with the particular interface are identified by examining one or more layer identification codes stored within the first entry. Specifically, the registry entry for the network adapter 401 contains a Bindings subkey, which includes one or more layer identification codes that identify the protocols 404 which are bound to the network adapter card. For the network architecture in FIG. 15, the layer identification codes include NETBEUI/0000, MSTCP/0000, and NWLINK/0000, which respectively designate the NetBEUI, IP, and IPX protocols.

In step 560, device nodes for the identified layers on the selected interface are created within the hardware tree 152. For this example, the network driver interface 403 calls the configuration manager 158 to create in the hardware tree 152 a device node for each of the protocols 404 listed by the Binding subkey of the first entry 432. The configuration manager 158 subsequently calls the device loader to load the driver for each or the protocols identified by the newly created device nodes. The network driver interface 403 preferably operates as the device loader for the protocols 404 of the network system 400. The drivers for the identified layers are loaded in a sequential manner by the device loader. Accordingly, in step 561, a layer is selected to initiate the loading operation for its corresponding driver. For the purposes of this illustration, the NetBEUI protocol is selected.

In step 562, the device loader searches the registry 153 to locate a second entry 434 containing information for the selected layer. This search is conducted by using a key to screen the registry entries, specifically the layer identification code for the layer selected in step 561. Thus, one of the layer identification codes supplied by the first entry 432 for the network adapter 401 is used to locate the second entry 434 associated with the identified layer. For the selected NetBEUI protocol, the layer identification code is "NETBEUI\0000" (Tables 19 and 20).

The second entry also includes a driver identification code that identifies the driver for the selected layer. Accordingly, in step 564, the driver for the selected layer is identified by reading the driver identification code in this registry entry. For the NetBEUI protocol, the second entry 434 includes a Driver data field which identifies its driver by the driver identification code "NetTrans\0000" (Table 20).

In step 566, the registry 153 is searched for a third entry 436 by using a key based upon the driver identification code supplied by the associated second entry 434. This third entry 436 is preferably located within the software archive 182 of the registry 153, which generally contains registry entries directed to device drivers 156 (including network drivers 402) and drivers for network configuration routines. The driver identification code of the second entry 434 operates as a pointer to the corresponding third entry 436, which can include one or more data fields that define the configuration parameters for the identified driver. For the third entry 436 identified by the key "NetTrans\0000," no configuration parameters are listed because the driver for the NetBEUI protocol does not require these parameters (Table 27).

In step 568, the driver identified in this third entry 436 is loaded within the memory 22 (FIG. 1). In particular, this "NetTrans\0000" driver for the NetBEUI protocol is loaded by a VxDynaloader (not shown), which is called by the network driver interface 403. At this time, the network driver interface 403 also registers with the configuration manager 158 as the driver for the selected layer, in this case, the NetBEUI protocol. This allows the network driver interface 403, which operates as the enumerator for the network configuration routines, to receive all configuration messages destined for the NetBEUI protocol.

In step 570, the configuration parameters stored in the third entry 436, if any, are supplied to the loaded driver for the selected protocol 404, thereby completing the driver loading operation for a selected layer. For the example of a protocol layer, if configuration parameters are listed within the third entry 436, the network driver interface 403 instructs the protocol 404 to bind to the network adapter 401. The protocol 404 then issues a request for the network driver interface 403 to access the third entry 436 to obtain configuration parameters for the driver of the protocol 404. Specifically, the protocol 404 asks for each desired configuration parameter by name, one at a time, and, in turn, the network driver interface 403 locates the configuration parameters in the third entry 436 and returns the values to the driver.

In step 572, an inquiry is conducted to determine whether a driver has been loaded and configured for each of the remaining identified layers of the selected interface. If the response is negative, then the "NO" branch is followed to step 561 to continue the driver loading operations. For this example, both the IP and IPX protocols identified in step 558 require appropriate drivers. By completing in sequential fashion the loop formed by the steps 561–572, the drivers for these remaining protocols are loaded and configured in a manner similar to the NetBEUI protocol.

If the response to the query in step 572 is positive, then the "YES" branch is followed to step 574. In step 574, an inquiry is conducted to determine whether layers are associated with other interfaces of the network system 400. If the answer is positive, the "YES" branch is followed to step 555. In contrast, the "NO" branch is followed to the END step if the response in step 574 is negative.

For the network configuration shown in FIG. 15, it will be appreciated that the remaining layers connected to the NetBEUI, IP, and IPX protocols via the interfaces 414 also require configuration. Accordingly, the loop formed by the steps 555–574 is followed until all remaining network configuration routines, including the assigned redirectors 406 and servers 408, are configured. The configuration process for these layers is similar to the above-described process for the protocols 404, with the exception that the first entry 432 is now identified by the interface identification code for the selected protocol. The protocols 404 operate as both "virtual devices" and "virtual busses" because the protocols 404 can be "connected" to the network adapter 401 and, in turn, redirectors 406 and servers 408 can be "connected" to one or more of the protocols 404. Thus, for an interface 414 selected in step 555, such as the interface between the NetBEUI protocol and the SMB redirector and SMB server, the interface identification code is identical to the layer identification code for the NetBEUI protocol, namely "NetBEUI\0000" (Table 20).

In response to loading each of the protocols 404 on the interface 412, the network driver interface 403 registers with the configuration manager 158 as the enumerator for each of the interfaces associated with those routines, namely, the interfaces 414. Thus, the configuration manager 158 calls the network driver interface 403 to operate as an enumerator and to identify the layers associated with each of these remaining interfaces. In step 556, for a selected interface 414, namely the NetBEUI protocol, the network driver interface 403 searches the registry 153 to determine the layers associated with this selected interface. Specifically, the network device 403, operating as an enumerator, uses the interface identification code for the NetBEUI protocol as a key to locate the appropriate first entry 432 in the registry 153.

In step 558, the network driver interface 403 identifies the layers for the selected interface 414 by reviewing each layer identification code contained in the first entry 432. The Bindings subkey within this registry entry contains one or more layer identification codes that uniquely identify the remaining network configuration routines for this interface. For the NetBEUI protocol, the Bindings subkey includes the interface identification codes "VREDIR\0000" and "VSERVER\0000," which respectively identify the SMB redirector and the SMB server (Table 20).

In step 560, device nodes are created in the hardware tree 152 for each layer associated with the selected interface 414. Specifically, for each identified layer associated with the selected interface 414, the network driver interface 403 calls the configuration manager 158 to create a device node in the hardware tree 152. For the interface 414 associated with the NetBEUI protocol, device nodes for the SMB redirector and the SMB server are added for the hardware tree. As shown in FIG. 17A, these device nodes are connected to the device node for the NetBEUI protocol and are identified by their respective layer identification codes. In turn, the network driver interface 403 calls the configuration manager 158 and registers as the device loader for the layers identified by the new device nodes.

To initiate the sequential loading of drivers for the layers associated with the selected interface 414, one of these layers is selected in step 561. For this example, the SMB redirector associated with the NetBEUI protocol is selected to illustrate this loading operation.

In step 562, the layer identification code associated with one of the identified layers is used as a key to search the hardware archive 184 of the registry 153 for a second entry 434. For the SMB redirector, the layer identification code "VREDIR\0000" is used as a key to locate the appropriate second entry 434 (Table 23). This search is conducted by the VxDynaloader (not shown) in response to a command from the network driver interface 403, which is operating as a device loader.

In step 564, the driver for the selected layer is identified by locating the driver identification code in the second entry 434. For the SMB redirector, the driver is identified within the "Driver" data field by the driver identification code "NetClient\0000" (Table 23).

In step 566, the driver identification code is used as a key to search the software archive 182 of the registry 153 for a third entry 436 for the selected layer. For the example of the SMB redirector, the third entry 436 identified by the driver identification code "NetClient\0000" is located in the registry 153 (Table 30). The identified driver is loaded within the system memory 22 by the VxDynaloader in step 566.

In step 570, the configuration parameters for the driver of the selected layer are supplied to this driver. Because both the redirectors 406 and the servers 408 operate as device drivers, these network configuration routines search the third entry 436 in the registry 153 to read their configuration parameters. Thus, for the example of the SMB redirector, this network configuration routine accesses the third entry 436 identified by the driver identification code "NetClient\0000" to read its configuration parameters in sequential fashion (Table 30).

Upon loading the driver for the SMB redirector, this layer registers with the configuration manager 158. The redirectors 406 and the servers 408 of the network system 400 register with the configuration manager 158 as a device driver, thereby allowing these network configuration routines to receive all configuration messages for these layers. In contrast, for each of the protocols 404, the network driver interface 403 registers with the configuration manager 158.

Upon completing the loading operation for the driver for the selected layer, an inquiry is conducted in step 572 to determine whether a driver has been loaded and configured for each of the remaining identified layers of the selected interface 414. If the response is negative, the "NO" branch is followed to the step 562 to continue the loading of these remaining identified layers. However, if the response is positive, the "YES" branch is followed from step 572 to step 574. In step 574, an inquiry is completed to determine whether there are additional interfaces within the network system 400. If so, the "YES" branch is followed to the step 556 to continue the process. In contrast, if the response is negative, the "NO" branch is followed to the END step.

For the network configuration shown in FIG. 15, the process continues for the SMB server associated with the NetBEUI protocol and for the remaining redirectors and/or servers for the remaining protocols, specifically the IP and the IPX protocols.

Although the preferred steps of the network configuration method have been described with respect to a specific network system 400, i.e., the network configuration of FIG. 15, it will be understood that the invention is equally applicable to other network configurations and is not limited to this representative configuration. Furthermore, this network configuration system can support the automated configuration of more than one network adapter card installed within a computer. Accordingly, those skilled in the art will recognize that the principles of the present invention can be extended to other network architectures and are not limited to the software layers or interfaces of the OSI model described herein. In particular, the inventors believe that the present invention is extendible to present and future network architectures and network adapter-type devices.

In view of the foregoing, those skilled in the art will appreciate that the present invention offers the following advantages over prior device configuration systems:

Easy installation and configuration of new devices:

Devices adapted for operation with the present invention will be capable of identifying themselves and declaring their services and resource requirements to the operating system. This information will enable the operating system to determine and set a working configuration and load the appropriate device drivers with minimal user intervention. Installing a new device within the computer will be as easy as "plugging" the device within an expansion slot or port and copying a file to the driver directory maintained on the hard disk of the computer.

Seamless dynamic configuration changes.

The present invention allows hot docking of portable computers, and hot insertion of devices. When an insertion event occurs, the operating system will recognize the new device, its services, and its requirements, and load the necessary drivers. The operating system will notify application programs about such dynamic events so they can take advantage of the functionality offered by the newly installed devices or stop using unavailable devices. The user is preferably prompted only when required resources are not available to the new device.

Compatibility with the installed base of computers and existing peripherals.

Specific components in the present invention hide the lack of a device reporting mechanism for devices that have not been adapted for specific use with the present invention. Information about these devices is kept in the registry. Devices which cannot be configured using software preferably receive first priority in resource allocation. For the preferred embodiment, when unresolvable conflicts occur, the configuration manager may be accessed via a "smart" user interface which leverages information such as .INF-format files to guide the user through device configuration options.

Operating system and hardware independence.

The present invention defines several base components which can be implemented in any operating environment. Buses, devices, and resources are abstracted from the base components via hardware-specific enumerators, arbitrators and device drivers. This ensures that this framework is extensible not only to other computer environments but also to future bus and device architectures.

The present invention defines new software components for an operating system, including a configuration manager, enumerators, and resource arbitrators. The present invention also defines a single object that has several attributes. i.e., a device node. One of its attributes identifies devices that provide resources, such as busses. A hardware tree or "devnode tree" represents the collection of device nodes that describes the present device configuration of a computer. Enumerators build the devnode tree and may participate in configuring the devices on their bus. The enumeration process takes place every time the computer starts. There are two phases of enumeration in the current implementation of the operating system: BIOS POST, and protected-mode. At the end of the enumeration process, the devnode tree includes information about available system resources, required device drivers, and resource requirements. The configuration manager uses resource arbitrators to find a working resource allocation which satisfies the overall requirements of currently enumerated devices. Device drivers are then notified of their assigned configuration.

The operating system accommodates dynamic system events by broadcasting system messages to applications and device drivers. When an event such as the insertion or removal of a device occurs, applications and device drivers are notified. They can then take any required action or, in some cases, veto the configuration change The present invention also can use and extend the registry and device information files (with the .INF filename extension). The registry can store information about past and present devices installed on a particular machine, including: devices that are not adapted for use with the present invention (but detected when the operating system was installed); devices compatible with the present invention which have been located by an enumerator; device-specific state information; bindings of devices to device drivers; and data about the last known configuration, which is used to accelerate the allocation of resources.

Device information files can contain information about known devices and their configurations. The operating system provides some class-information files (for example, SCSI.INF and MODEM.INF); others can be provided for specific devices by device manufacturers. When a new device is detected or enumerated, all known .INF files are preferably searched for entries matching the device identification code or device ID. When a match is found, the appropriate files are copied and the required data is copied into a newly created registry entry.

For configuration of network adapter devices, the present invention further includes (1) the identification of "virtual devices" or layers connected to "virtual busses" or interfaces, and (2) the loading of the identified virtual devices for each of the virtual busses. In response to loading the driver for the network adapter device, each of the virtual devices configured for connection to the network adapter are enumerated and, in turn, drivers for these virtual devices are loaded. This process continues for each virtual device until no new virtual busses are identified.

To identify virtual devices "logically" connected to a particular virtual bus, a database of the computer is searched to locate a first entry having an interface identification code that is associated with the particular virtual bus. This first entry can also include one or more layer identification codes that uniquely define the identity of the virtual devices for this virtual bus.

To load an identified virtual device, a second entry having the layer identification code for this virtual device is located within the computer database. The second entry also can include a driver identification code that uniquely defines a driver for this virtual device. A third entry within the database is then located by using the driver identification code as a key to search the database. The third entry can contain configuration parameters for the driver of the identified virtual device In response to this driver-related information, the driver for the identified virtual device is loaded within system memory of the computer. The configuration parameters, if any, are supplied to the driver to complete this loading operation. This process is repeated until all virtual devices associated with the virtual busses are loaded and configured.

Although the preferred environment for the present invention is a personal computer, it will be appreciated that the invention is also applicable to other types of data processing systems having resources that support the processing operations of the data processing system. Indeed, those skilled in the art will recognize that the principles of the present invention can be extended to other computer architectures and operating systems and are not limited to standard computer architectures or the preferred operating system described herein. Specifically, the inventors envision that the present invention is extendible to present and future bus architectures, device types, and network configuration routines.

It will be understood that the present invention provides a system for automatically configuring devices for operation with a computer. For devices that are capable of identifying themselves and declaring their services and resource requirements, the configuration system supports installation and configuration of such devices without user intervention. Devices of the computer are configured by identifying the devices, determining the resource usage of those devices, detecting and resolving potential conflicting uses of the resources, and allocating the resources for use by the devices.

Device information can be collected from the presently installed devices and stored within computer memory. This device information identifies the installed devices and supplies the resource requirements for those devices. Furthermore, the computer memory can maintain the assigned resource elements for the identified devices of the computer. Accordingly, the present invention supplies a database containing the device identities, resource requirements, and assigned resource elements for each of the devices installed within the computer.

It will be appreciated that this database can be accessed by the user to support a review of the present device configuration for the user's computer. Likewise, this device information can be remotely accessed if the computer is connected to a computer network or to a modem. Thus, the present invention also supports configuration management for a family of computers by enabling a central party to access and review the device configuration information for each of the computers within that family.

While there has been shown and described the preferred embodiment of the invention, it will be evident to those skilled in the art that various modifications and changes may be made thereto without departing from the spirit and the scope of the invention as set forth in the appended claims and equivalents thereof.

We claim:

1. In an operating system running on a computer having at least one system bus, said operating system characterized by enumerators and a configuration manager, each enumerator assigned to a particular system bus and operative for enumerating each device connected to said particular bus, said configuration manager operative for managing the configuration of said devices by maintaining a hardware tree containing device nodes representing enumerated devices, a method for causing a selected enumerator to enumerate one of the devices on said particular system bus in response to detecting the addition of another device to said particular system bus, comprising the steps of:

issuing, by said selected enumerator, an application program interface (API) call to said configuration manager to cause the generation of a message to enumerate one of the devices on said particular system bus assigned to said selected enumerator, said API call including a parameter defining one of said device nodes representing the device to be enumerated by said selected enumerator; and receiving, by said selected enumerator, said message from said configuration manager to enumerate said device represented by said device node defined by said parameter.

2. The method of claim 1 further comprising the step of causing a selected enumerator to enumerate one of the devices of the particular system bus in response to detecting the removal of one of the devices from the particular system bus by:

issuing, by the selected enumerator, the API call to the configuration manager to cause the generation of a message to enumerate the device on the particular system bus assigned to the selected enumerator; and receiving, by the selected enumerator, the message from the configuration manager to enumerate the device represented by the device node identified by the parameter.

3. In a program maintained in a computer-readable medium for a computer having at least one system bus, the program characterized by enumerators and a configuration manager, each enumerator assigned to a particular system bus and operative for enumerating each device connected to the particular system bus, the configuration manager operative for managing the configuration of the devices by maintaining in memory a hardware tree containing discrete device nodes having data defining the present configuration of devices, a method for causing a selected enumerator to enumerate one of the devices on the particular system bus in response to the addition of another device to the particular system bus or the removal of one of the devices from the particular system bus, comprising the steps of:

issuing an application program interface (API) call in response to the selected enumerator detecting the addition of another device to the particular system bus or the removal of one of the devices from the particular system bus, the API call including a parameter identifying one of the device nodes representing one of the devices on the particular system bus;

generating a message to the selected enumerator in response to the API call to cause the enumeration of the device represented by the device node identified by the parameter of the API call, and enumerating, in response to receipt of the message by the selected enumerator, the device represented by the device node identified by the parameter of the API call.

4. A method for adding a new device node to a hardware tree maintained by an operating system residing in a computer-readable medium and accessible by a computer, the operating system comprising enumerators assigned to each system bus of the computer and operative for enumerating devices connected to its assigned system bus, the hardware tree stored in memory of the computer and containing device nodes corresponding to the devices and containing present configuration information for the devices of the computer, the device nodes having parent-child relationships, comprising the steps of:

calling, from one of the enumerators, an application program interface (API) of the operating system, the calling enumerator assigned to the particular system bus that is connected to one of the devices represented by the new device node;

in response to the API, adding the new device node to the hardware tree by allocating the device node and placing the new device node in a list of the child device nodes for the related parent device node.

5. The method of claim 4, further comprising the step of:

upon returning a success message in response to the API call, the enumerator collects and adds the device information for the new device node.

6. The method of claim 5, wherein the operating system further comprises a configuration manager operative for managing the configuration of the devices by maintaining the present configuration information in the device nodes of the hardware tree, the method further comprising the step of:

the configuration manager loading a device driver for the new device node.

7. In a program stored in a computer-readable medium accessible by a computer, the program operative for managing the configuration of the devices by maintaining in memory a hardware tree containing subtrees, each subtree having device nodes representing the devices and containing present device configuration information, the device nodes in each subtree characterized by parent-child relationships of parent and child device nodes, a method for removing a certain subtree of the hardware tree having a selected one of the device nodes and its child nodes, comprising the steps of:

issuing an application program interface (API) call for removing the certain subtree, the API call including a parameter identifying a handle of the selected device node, the selected device node corresponding to one of the parent device nodes;

in response to the API call, notifying each device node in the certain subtree of imminent termination; and freeing each device node in the certain subtree from the hardware tree.

8. The method of claim 7 further comprising the steps of;

returning a success message in the event that the function of the API call is successfully completed and each device node in the certain subtree is removed from the hardware tree;

otherwise, returning an invalid message indicating that the function of the API call could not be completed.

9. In a program stored in a computer-readable medium, the program operative for managing the configuration of devices of a computer by maintaining in memory a hardware tree containing subtrees, each subtree having device nodes representing the devices and containing device configuration information, the device nodes in each subtree characterized by parent-child relationships, a method for determining whether a certain one of the subtrees having a selected one of the device nodes and its child nodes can be removed from the hardware tree, comprising the steps of:

issuing an application program interface (API) call for querying whether the certain subtree can be removed from the hardware tree, the API call including a parameter identifying a handle of the selected device node, the selected device node corresponding to a parent device node;

in response to the API call, notifying each device node in the certain subtree of imminent termination.

10. The method of claim 9 further comprising the steps of;

returning a success message in the event that the function of the API call is successfully completed and each device node in the certain subtree is notified of imminent termination from the hardware tree;

otherwise, returning an invalid message indicating that the function of the API call could not be completed.

11. In a program stored in a computer-readable medium and accessible by a computer, the program operative for managing the configuration of the devices by maintaining in memory of the computer a hardware tree containing subtrees, each subtree having device nodes representing the devices and containing logical configuration information and a list of allocated resource elements, a method for obtaining the list of allocated resource elements from a selected one of the device nodes, comprising the steps of:

issuing an application program interface (API) call for the function of obtaining the list of allocated resource elements from the selected device node, the API call including a parameter identifying the selected device node and a pointer to a structure in the memory to be filled with the list of allocated resource elements;

placing the list of allocated resource elements in the memory structure.

12. The method of claim 11 further comprising the steps of;

returning a success message in the event that the function of the API call is successfully completed and the list of allocated resource elements placed in the memory structure;

otherwise, returning an invalid message indicating that the function of the API call could not be completed.

13. In a program stored in a computer-readable medium and accessible by a computer characterized by resources having resource elements, the program operative for managing the configuration of the devices by maintaining in memory of the computer a hardware tree containing subtrees, each subtree having device nodes representing the devices and containing logical configuration information and a list of allocated resource elements, a method for obtaining the first logical configuration of a specified type from a selected one of the device nodes, comprising the steps of:

issuing an application program interface (API) call for the function of obtaining a handle to the first logical configuration of a specified type from the selected device node, the specified type including one of (1) logical configuration data, (2) a list of allocated resource elements, and (3) boot configuration data, the API call including an address of the memory that receives the handle of the first logical configuration, a parameter identifying the selected device node and a flag having a value that defines the specified type of the first logical configuration;

assigning the handle for the specified type of the first logical configuration to the address of the memory.

14. In a program stored in a computer-readable medium and accessible by a computer characterized by resources having resource elements, the program operative for managing the configuration of the devices by maintaining in memory of the computer a hardware tree containing subtrees, each subtree having device nodes representing the devices and containing logical configuration information, a method for adding a resource descriptor for one of the resource elements to a logical configuration of a selected one of the device nodes, comprising the steps of:

issuing an application program interface (API) call for the function of adding the resource descriptor to the logical configuration of the selected device node, the API call including an address of the memory that receives a handle of the resource descriptor, a parameter identifying the logical configuration to which the resource descriptor is to be added, a parameter identifying the type of the resource element, an address of the memory for the data structure containing the resource descriptor, and a parameter identifying a size of the data structure;

adding the resource descriptor to the logical configuration.

15. The method of claim 14, wherein the resources of the computer comprise the memory, direct memory access (DMA), interrupt requests, and I/O ports.

16. A method for communicating between a client process and a server process in a distributed processing system, comprising the steps of:
   (a) issuing, by the client process and in response to dynamic event, a reenumerate_devnode function call having a plurality of call parameters including a parameter identifying a device node to be enumerated;
   (b) receiving, by the server process, the reenumerate_devnode function call and parsing the call to retrieve the parameters; and
   (c) issuing, by the server process, a config_enumerate message to cause the client process to enumerate the device node corresponding to the identifying parameter.

17. The method of claim 16, wherein the client process is an enumerator and the server process is a configuration manager.

18. The method of claim 16, wherein the dynamic event comprises one of (1) the addition of another device to the assigned system bus and (2) the removal of one of the devices from the assigned system bus.

19. A method for communicating between a client process and a server process in a distributed processing system, comprising the steps of:
   (a) issuing, by the client process, a create_devnode function call having a plurality of call parameters including a parameter identifying an address of the of the memory that receives a handle to a device node to be added, a device identifier that identifies a particular one of the devices represented by the device node to be added, and a handle of the device node having a parent relationship with the device node to be added;
   (b) receiving, by the server process, the create_devnode function call and parsing the call to retrieve the parameters; and
   (c) adding, in response to the create_devnode function call, the new device node to a hardware tree by allocating the device node and placing the new device node in a list of child device nodes for the related parent device node.

* * * * *